(12) United States Patent
Thambynayagam et al.

(10) Patent No.: US 7,363,162 B2
(45) Date of Patent: Apr. 22, 2008

(54) GAS RESERVOIR EVALUATION AND ASSESSMENT TOOL METHOD AND APPARATUS AND PROGRAM STORAGE DEVICE

(75) Inventors: Raj Kumar Michael Thambynayagam, Abingdon (GB); Jeffrey Spath, Missouri City, TX (US); Raj Banerjee, Abingdon (GB); John Philip Gilchrist, Abingdon (GB); Tommy Miller, Cholsey (GB)

(73) Assignee: Schlumberger Technology Corporation, Houston, TX (US)

( * ) Notice: Subject to any disclaimer, the term of this patent is extended or adjusted under 35 U.S.C. 154(b) by 230 days.

(21) Appl. No.: 11/227,540

(22) Filed: Sep. 15, 2005

(65) Prior Publication Data

US 2006/0069511 A1 Mar. 30, 2006

Related U.S. Application Data

(63) Continuation of application No. 10/723,479, filed on Nov. 25, 2003, now Pat. No. 7,069,148.

(51) Int. Cl.
*G06F 19/00* (2006.01)
*G01V 1/36* (2006.01)

(52) U.S. Cl. .......................................... 702/12; 703/5
(58) Field of Classification Search ............. 702/1–12; 703/1–10, 5; 367/38
See application file for complete search history.

(56) References Cited

U.S. PATENT DOCUMENTS

| | | | |
|---|---|---|---|
| 2,727,682 A * | 12/1955 | Patterson | 703/10 |
| 5,787,050 A | 7/1998 | Slevinsky | |
| 5,960,369 A | 9/1999 | Samaroo | |
| 6,041,017 A * | 3/2000 | Goldsberry | 367/38 |
| 6,128,580 A | 10/2000 | Thomsen | |
| 6,131,071 A * | 10/2000 | Partyka et al. | 702/16 |
| 6,263,284 B1 * | 7/2001 | Crider et al. | 702/14 |
| 6,498,989 B1 | 12/2002 | Pisetski et al. | |
| 6,502,037 B1 | 12/2002 | Jorgensen et al. | |
| 7,062,420 B2 * | 6/2006 | Poe, Jr. | 703/10 |
| 7,069,148 B2 * | 6/2006 | Thambynayagam et al. | 702/12 |

* cited by examiner

*Primary Examiner*—John Barlow
*Assistant Examiner*—Victor J. Taylor
(74) *Attorney, Agent, or Firm*—John H. Bruchard

(57) ABSTRACT

A Gas Reservoir Evaluation and Assessment Tool utilizes an Analytical Engine to produce predictions of pressure values and other production data at any point in space and at any point in time in a reservoir. A computer system, such as a workstation, stores a Gas Reservoir Evaluation and Assessment software which includes the Analytical Engine and responds to input data (which includes a reservoir description and fluid properties) by generating an output record which represents a prediction of the pressure values and other data at 'any point in space' and at 'any point in time' in a reservoir. The Analytical Engine will first calculate a pressure value in 1D for a single layer of a reservoir at a single point in space and time; it will then calculate a pressure value in 1D for multiple layers in the reservoir at the single point in space and time; it will then calculate a pressure value in 2D for the multiple layers at the single point in space and time; it will then calculate a pressure value in 3D for the multiple layers at the single point in space and time; and it will then calculate a pressure values in 3D for multiple layers not only at a single point in space but also at any future point in time.

29 Claims, 6 Drawing Sheets

GAS RESERVOIR EVALUATION AND ASSESSMENT TOOL METHOD AND APPARATUS AND PROGRAM STORAGE DEVICE

CROSS REFERENCED TO RELATED APPLICATIONS

This application is a continuation of prior application Ser. No. 10/723,479, filed Nov. 25, 2003 now U.S. Pat. No. 7,069,148.

BACKGROUND OF THE INVENTION

The subject matter of the present invention relates to computer modeling of a gas reservoir, and, more particularly, to a method and apparatus and program storage device adapted for generating a computer model which will predict the pressure and the production behavior of a gas reservoir.

Reservoir simulation is an essential tool for the management of oil and gas reservoirs. Prediction of the pressure in and the production of a gas reservoir under various operating conditions allows, among other benefits, proper investment decisions to be made. In order to make such a prediction, one must construct a reservoir model. The reservoir model is essentially a mathematical model that is implemented through a computer program. History matching observed behavior of the reservoir must validate the parameters of the model. Ideally, finite difference simulators are used to construct reservoir models. This permits detailed characterization including heterogeneity, multiphase effects like water coning and fingering. However, in order to make full use of such a tool, a large amount of reliable data is required. Also, a full study, including the history matching step, may take months to carry out. Therefore, there is a demand for an alternative tool that honors the physics of fluid flow and, at the same time, generates a solution which is many orders quicker and faster than the aforementioned finite difference simulator.

SUMMARY OF THE INVENTION

One aspect of the present invention involves a method of generating a prediction of values in a reservoir, comprising the steps of: (a) receiving input data characterizing the reservoir; (b) producing a computer model in response to the input data representing the reservoir, the producing step (b) of producing the computer model including the steps of, (b1) calculating the values in one dimension associated with a single layer in the reservoir, each of the values existing at a single point in space in the reservoir and at a single point in time in the reservoir, (b2) calculating the values in the one dimension associated with multiple layers in the reservoir, each of the values in each of the multiple layers existing at a single point in space in the reservoir and at a single point in time in the reservoir, (b3) calculating the values in three dimensions associated with the multiple layers in the reservoir, each of the values in each of the multiple layers in the three dimensions existing at a single point in space in the reservoir and at a single point in time in the reservoir, (b4) calculating the values in the three dimensions as a function of time, the values being associated with the multiple layers in the reservoir, each of the values in each of the multiple layers in the three dimensions existing at a single point in space in the reservoir, the each of the values in the each of the multiple layers in the three dimensions existing at any future point in time in the reservoir, the computer model being produced in response to the calculating step (b4); verifying the computer model; and using the computer model, generating the prediction of the values in the reservoir in response to the verifying step.

Another aspect of the present invention involves a program storage device readable by a machine tangibly embodying a set of instructions executable by the machine to perform method steps for generating a prediction of values in a reservoir, the method steps comprising: (a) receiving input data characterizing the reservoir; (b) producing a computer model in response to the input data representing the reservoir, the producing step (b) of producing the computer model including the steps of, (b1) calculating the values in one dimension associated with a single layer in the reservoir, each of the values existing at a single point in space in the reservoir and at a single point in time in the reservoir, (b2) calculating the values in the one dimension associated with multiple layers in the reservoir, each of the values in each of the multiple layers existing at a single point in space in the reservoir and at a single point in time in the reservoir, (b3) calculating the values in three dimensions associated with the multiple layers in the reservoir, each of the values in each of the multiple layers in the three dimensions existing at a single point in space in the reservoir and at a single point in time in the reservoir, (b4) calculating the values in the three dimensions as a function of time, the values being associated with the multiple layers in the reservoir, each of the values in each of the multiple layers in the three dimensions existing at a single point in space in the reservoir, the each of the values in the each of the multiple layers in the three dimensions existing at any future point in time in the reservoir, the computer model being produced in response to the calculating step (b4); verifying the computer model; and using the computer model, generating the prediction of the values in the reservoir in response to the verifying step.

Another aspect of the present invention involves a system adapted for generating a prediction of values in a reservoir, comprising: first apparatus adapted for receiving input data characterizing the reservoir; second apparatus adapted for producing a computer model in response to the input data representing the reservoir, the second apparatus adapted for producing the computer model including, third apparatus adapted for calculating the values in one dimension associated with a single layer in the reservoir, each of the values existing at a single point in space in the reservoir and at a single point in time in the reservoir, fourth apparatus adapted for calculating the values in the one dimension associated with multiple layers in the reservoir, each of the values in each of the multiple layers existing at a single point in space in the reservoir and at a single point in time in the reservoir, fifth apparatus adapted for calculating the values in three dimensions associated with the multiple layers in the reservoir, each of the values in each of the multiple layers in the three dimensions existing at a single point in space in the reservoir and at a single point in time in the reservoir, sixth apparatus adapted for calculating the values in the three dimensions as a function of time, the values being associated with the multiple layers in the reservoir, each of the values in each of the multiple layers in the three dimensions existing at a single point in space in the reservoir, the each of the values in the each of the multiple layers in the three dimensions existing at any future point in time in the reservoir, the computer model being produced in response to the calculating performed by the sixth apparatus; seventh apparatus adapted for verifying the computer model thereby generating a verified computer model; and eighth apparatus, responsive to the verified computer model, adapted for generating the prediction of the values in the reservoir in response to the verifying performed by the seventh apparatus.

Another aspect of the present invention involves a method of producing a computer model in response to input data representing a reservoir, comprising the steps of: (a) calculating values in one dimension associated with a single layer in the reservoir, each of the values existing at a single point in space in the reservoir and at a single point in time in the reservoir, (b) calculating the values in the one dimension associated with multiple layers in the reservoir, each of the values in each of the multiple layers existing at a single point in space in the reservoir and at a single point in time in the reservoir, (c) calculating the values in three dimensions associated with the multiple layers in the reservoir, each of the values in each of the multiple layers in the three dimensions existing at a single point in space in the reservoir and at a single point in time in the reservoir, and (d) calculating the values in the three dimensions as a function of time, the values being associated with the multiple layers in the reservoir, each of the values in each of the multiple layers in the three dimensions existing at a single point in space in the reservoir, the each of the values in the each of the multiple layers in the three dimensions existing at any future point in time in the reservoir, the computer model being produced in response to the calculating step (d).

Another aspect of the present invention involves a program storage device readable by a machine tangibly embodying a program of instructions executable by the machine to perform method steps for producing a computer model in response to input data representing a reservoir, said method steps comprising: (a) calculating values in one dimension associated with a single layer in said reservoir, each of said values existing at a single point in space in said reservoir and at a single point in time in said reservoir, (b) calculating said values in said one dimension associated with multiple layers in said reservoir, each of said values in each of said multiple layers existing at a single point in space in said reservoir and at a single point in time in said reservoir, (c) calculating said values in three dimensions associated with said multiple layers in said reservoir, each of said values in each of said multiple layers in said three dimensions existing at a single point in space in said reservoir and at a single point in time in said reservoir, and (d) calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir, said computer model being produced in response to the calculating step (d).

Another aspect of the present invention involves a system adapted for producing a computer model in response to input data representing a reservoir, comprising: first apparatus adapted for calculating values in one dimension associated with a single layer in said reservoir, each of said values existing at a single point in space in said reservoir and at a single point in time in said reservoir, second apparatus adapted for calculating said values in said one dimension associated with multiple layers in said reservoir, each of said values in each of said multiple layers existing at a single point in space in said reservoir and at a single point in time in said reservoir, third apparatus adapted for calculating said values in three dimensions associated with said multiple layers in said reservoir, each of said values in each of said multiple layers in said three dimensions existing at a single point in space in said reservoir and at a single point in time in said reservoir, and fourth apparatus adapted for calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir, said computer model being produced when said fourth apparatus calculates said values in said three dimensions as a function of time.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DESCRIPTION OF THE INVENTION

Figure 1:
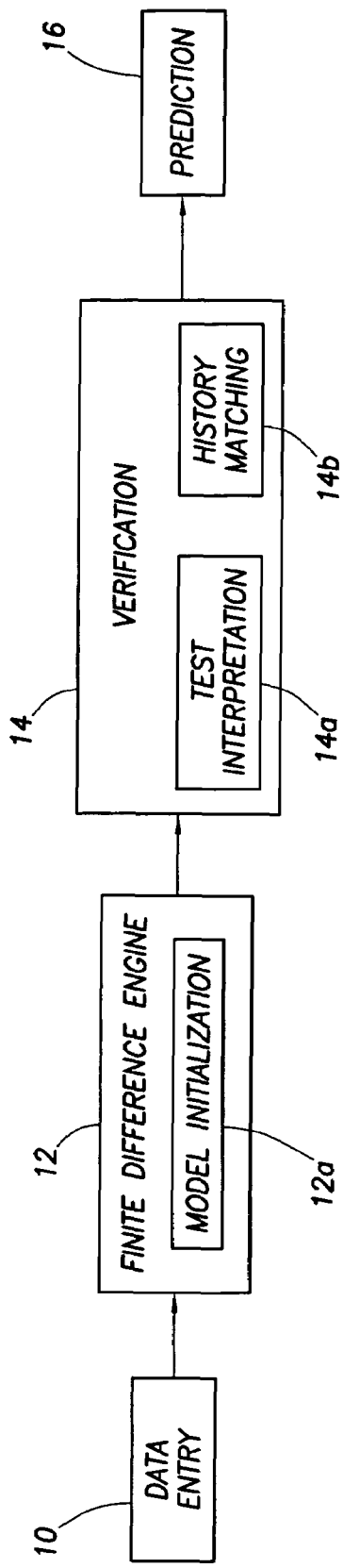
FIGS. 1 and 2 illustrate a method of computer modeling for predicting the pressure in a gas reservoir and the production of gas from the gas reservoir using a finite difference engine and an analytical engine, respectively.

Prediction of the pressure-production behavior of a hydrocarbon reservoir is essential for its effective management. Project planning and screening functions depend on time availability of such information. There is a need for a fast solution that involves history matching and subsequent prediction. A Gas Reservoir Evaluation and Assessment Tool (GREAT) disclosed in this specification is based around a newly formulated set of equations applicable to multiple wells in a single-phase system. The GREAT tool provides a complete workflow for gas reservoir evaluation comprised of data entry and manipulation, model initialization, test interpretation, history matching and prediction. The GREAT tool includes the Analytical Engine 20 which further includes a newly derived solution of diffusivity equations for multiple wells, horizontal or vertical, in a single phase layered system under a variety of boundary conditions. The solution of these equations model both transient and steady state flow regimes and is applicable to both testing and long term performance prediction. The equations applicable to laminar flow of fluids in a porous medium were the results of Darcy's experimental study of the flow characteristics of sand filters. This combined with the equation of continuity and an equation of state for slightly compressible fluid yields the diffusivity equation, which is the equation for pressure diffusion in a porous medium. Solution of the diffusivity equation under different boundary conditions forms the basis for a prediction of the bottom hole pressure response of a producing well. These analytical solutions are generally applicable for a single well and are used widely in the area of well testing. The efficiency of analytical models is generally judged by accuracy and speed. The novel set of solutions used in the GREAT tool is applicable to multiple wells, which can be vertical as well as horizontal. These wells can be operating as producers or injectors thus being of additional significance to gas well storage. The solution of the diffusivity equation set forth in this specification has been derived by application of successive integral transforms. The application of these new solutions is characterized by stability and speed.

Accordingly, in this specification, a Gas Reservoir Evaluation and Assessment Tool (GREAT) in accordance with the present invention utilizes an Analytical Engine (instead of a Finite Difference Engine) to produce predictions of pressure values and other production data at 'any point in space' and at 'any point in time' in a reservoir. A computer system, such as a workstation, stores a Gas Reservoir Evaluation and Assessment software which includes the Analytical Engine and responds to input data (which includes a reservoir description and fluid properties) by generating an output record which represents a prediction of the pressure values and other data at 'any point in space' and at 'any point in time' in a reservoir. The Analytical Engine will first calculate a pressure value in ID for a single layer of a reservoir at a 'single point in space' and a 'single point in time'; it will then calculate a pressure value in 1D for multiple layers in the reservoir at the 'single point in space' and the 'single point in time'; it will then calculate a pressure value in 2D for the multiple layers at the 'single point in space' and the 'single point in time'; it will then calculate a pressure value in 3D for the multiple layers at the 'single point in space' and the 'single point in time'; and it will then calculate a pressure value in 3D for multiple layers not only at a 'single point in space' but also at 'any future point in time'.

Referring to FIG. 1, a first method of computer modeling is illustrated adapted for predicting the pressure in a gas reservoir and/or the production of gas from the gas reservoir, this first method using a 'finite difference engine'. In FIG. 1, the first step of the method is Data Entry step 10. This Data Entry step 10 involves the entry of input data representing a Gas Reservoir, such as Well Radius, skin which represents a zone of damage around a wellbore, perforation length, fluid properties, a reservoir description, and rate data. This input data will be discussed in greater detail later in this specification. A 'Finite Difference Engine' 12 receives the input data provided via the Data Entry step 10. The 'Finite Difference Engine' 12 includes a 'Model Initialization' step 12a. Usually, the 'Model Initialization' step 12a includes a Pressure Calculator for calculating a pressure in the Gas Reservoir at a single point in space and at a single point in time (hereinafter called a 'pressure in 1D at a point in time', where 1D means 'one dimension). The 'Model Initialization' step 12a will also be discussed later in this specification. The 'Finite Difference Engine' 12 is basically a 'numerical simulation method' where the simulation or modeling is performed 'numerically'. The 'Finite Difference Engine' 12 is error prone since errors can accumulate during the numerical simulation process. In addition, the numerical simulation process associated with the 'Finite Difference Engine' 12 is very time consuming since a large amount of time is consumed during the numerical simulation process. The 'Finite Difference Engine' 12 will produce a 'computer model' which must be verified during the Verification step 14. During the Verification step 14, 'known data' (having 'known results') will be introduced into the 'computer model' that was received from the 'Finite Difference Engine' 12. Responsive thereto, the 'computer model' will generate 'results'. Those 'results' are compared with the aforementioned previously 'known results'. If the 'results' approximately equal the 'known results', the Verification step 14 reveals that the 'computer model' which was generated from the 'Finite Difference Engine' 12 does, in fact, produce accurate results and accurate predictions. The Verification step 14 includes two types of verification: (1) Test Interpretation 14a, and (2) History Matching 14b (each verification step 14a and 14b will be described later in greater detail). Following the Verification step 14, since the 'computer model' generated by the 'Finite Difference Engine 12 was properly verified (i.e., the 'computer model' does, in fact, produce accurate results or predictions), the next step includes the Prediction step 16. At this point, the 'computer model', generated by the 'Finite Difference Engine' 12 and verified during the Verification step 14, can predict the pressure in, and/or the production from, a Gas Reservoir at any point in space in the reservoir and at any future point in time in the reservoir. As a result, during the Prediction step 16, a time variable 't', representing a 'future point in time t', can be entered during the 'Data Entry' step 10, the 'enter' key on a computer system or workstation is depressed, and, as a result, the 'pressure' in the Gas Reservoir and/or other production data associated with the Gas Reservoir, for that particular future point in time 't', will be displayed or otherwise provided to a user. However, as previously mentioned, during the 'Finite Difference Engine' step 12, the 'Finite Difference Engine' 12 processing time can be very 'time consuming' and, in addition, the results produced by the 'Finite Difference Engine' 12 can include a large quantity of errors, since a number of individual errors can accumulate during the 'Finite Difference Engine' step 12.

Figure 2:
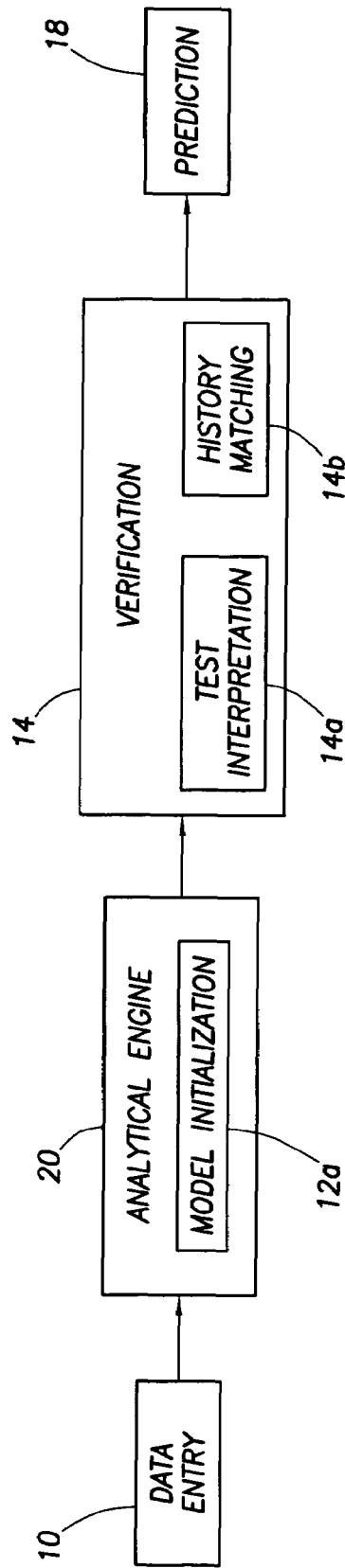

Referring to FIG. 2, a second method of computer modeling is illustrated adapted for predicting the pressure in a gas reservoir and/or the production of gas from the gas reservoir, this second method using an 'analytical engine'. In FIG. 2, this second method is identical to the first method of FIG. 1, except that the second method of FIG. 2 uses an 'Analytical Engine' which replaces the 'Finite Difference Engine' of FIG. 1. In FIG. 2, the Data Entry step 10 is followed by the 'Analytical Engine' step 20. The 'Analytical Engine' step 20 includes the 'Model Initialization' step 12a as in FIG. 1. The 'Analytical Engine' step 20 is followed by the same Verification step 14 as in FIG. 1 and the Verification step 14 is followed by a 'Prediction' step 18. The 'Prediction' step 18 is not the same as the 'Prediction' step 16 of FIG. 1 because the 'prediction' or 'results' 18 provided by the 'Prediction' step 18 are much more accurate and, in addition, that 'prediction' 18 is provided instantaneously as noted below. As mentioned earlier, the 'Analytical Engine' 20 is orders of magnitude faster than the 'Finite Difference Engine' 12 of FIG. 1 because the 'Analytical Engine' 20 provides the 'results' or 'prediction' 18 nearly instantaneously following the Data Entry step 10 of FIG. 2. In fact, when the Data Entry step 10 of FIG. 2 is complete, and when the 'enter' key on the workstation or computer keyboard is depressed, the 'prediction' from the 'prediction' step 18 is instantaneously available to a user via a Recorder or Display device of a workstation or computer system. In addition, the 'prediction' 18 produced by the 'Analytical Engine' 20 is much more accurate than the 'prediction' 16 produced by the 'Finite Difference Engine' 12. A discussion of the 'Analytical Engine' 20 will be set forth below in the 'Description of the Invention' portion of the specification; however, in addition, a detailed specification document is provided in the 'Detailed Description of the Invention' portion of this specification, that detailed specification document providing a detailed construction of the 'Analytical Engine' 20 of FIG. 2.

In FIGS. 1 and 2, the Data Entry step 10 relates to entry of historical rate and pressure data. Pressure data may include static or flowing bottom hole pressure measurements of each well over the producing history of the reservoir. In addition, it could also include pressure transient data. The GREAT tool of the present invention shown in FIG. 3 will be particularly suitable for handling data from permanent downhole gauges. Permanent downhole gauges provide a large quantity of data captured at very small time intervals over extended periods of time. Suitable filtering techniques will be provided to process this data for subsequent use. Processed well logs can be entered and displayed.

The Model Initialization step 12a will allow for initiation of the gas reservoir model with a basic model shape, layer geometry, and static properties, such as porosity. A range of correlation suites will be provided to generate fluid properties.

During the Test Interpretation step 14a, initial estimates of permeability and skin, D-factor, open flow potential, initial reservoir pressure, and reservoir volume can be made. Basic line fitting functionality on specialized transient pressure plots will be used for this purpose. Additionally, two basic material balance plots, i.e., Havlena—Odeh and p/Z, will be available to determine the reservoir volume from static pressure data.

The History Matching step 14b is essentially for model validation. Having obtained the initial parameter estimates from previous steps, non-linear regression can now be performed on the observed pressure data for all the wells in the reservoir. This would provide both final tuning of the reservoir and well parameters in the context of the entire reservoir.

The Prediction step 16 and 18 will use the tuned model to provide forecast of reservoir and well bottom hole pressures based on individual well targets. Individual well targets can be set from Daily Contracted Quantity (DCQ) and monthly profile factors. Individual well and reservoir pressure cutoffs along with swing factor will provide the necessary checks for determining the ability of a well to produce. This step will also provide an option to generate a numerical model of the reservoir for simulation engineers.

It should be noted that it is not essential to follow all the steps. If pressure transient data is not available, initial permeability values can be obtained from logs and reservoir volume can be obtained from geological information. One can move from the Model Initialization step to the History Matching step. Similarly, if no historical data is present, one may use the Prediction step as a design exercise.

Figure 3:
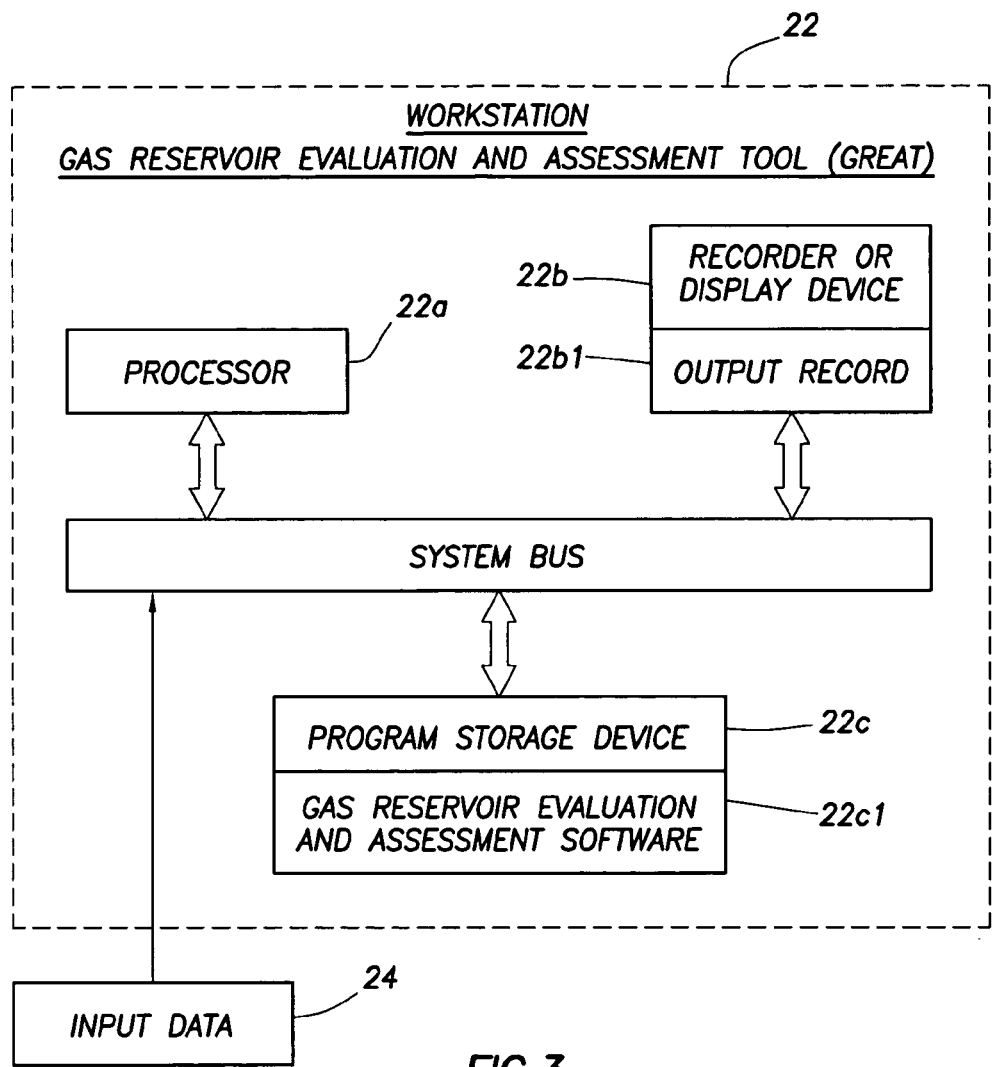
FIG. 3 illustrates a workstation which is responsive to certain specific 'input data' and which stores a Gas Reservoir Evaluation and Assessment software of a Gas Reservoir Evaluation and Assessment Tool (GREAT) in accordance with the present invention.

Referring to FIG. 3, a workstation 22 or other computer system 22, representing a Gas Reservoir Evaluation and Assessment Tool (GREAT), is illustrated. In FIG. 3, the workstation 22 includes a processor 22a operatively connected to a system bus, a Recorder or Display Device 22b operatively connected to the system bus, and a memory or other program storage device 22c operatively connected to the system bus. The program storage device 22c is adapted to receive a 'Gas Reservoir Evaluation and Assessment software' 22c1 from a CD-Rom or other such program storage device, the 'Gas Reservoir Evaluation and Assessment software' 22c1 being loaded from the CD-Rom into the memory/program storage device 22c of FIG. 3 for storage therein. The system bus of the workstation 22 is adapted to receive certain specific 'input data' 24, the 'input data' 24 being discussed below with reference to FIG. 5. When the processor 22a of the workstation 22 receives the 'input data' 24 and executes the 'Gas Reservoir Evaluation and Assessment software' 22c1 stored in the memory/program storage device 22c using such 'input data' 24, an 'Output Record' 22b1 is recorded or displayed on the Recorder or Display device 22b of the workstation or other such computer system 22 of FIG. 3. That 'Output Record' 22b1 is discussed below with reference to FIG. 12. The workstation 22 or other such computer system 22 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The memory/program storage device 22c or the aforementioned CD-Rom is a computer readable medium or a program storage device which is readable by a machine, such as the processor 22a. The processor 22a may be, for example, a microprocessor, microcontroller, or a mainframe or workstation processor. The memory/program storage device 22c, which stores the Gas Reservoir Evaluation and Assessment software 22c1, may be, for example, a hard disk, ROM, CD-ROM, DRAM, or other RAM, flash memory, magnetic storage, optical storage, registers, or other volatile and/or non-volatile memory.

Figure 4:
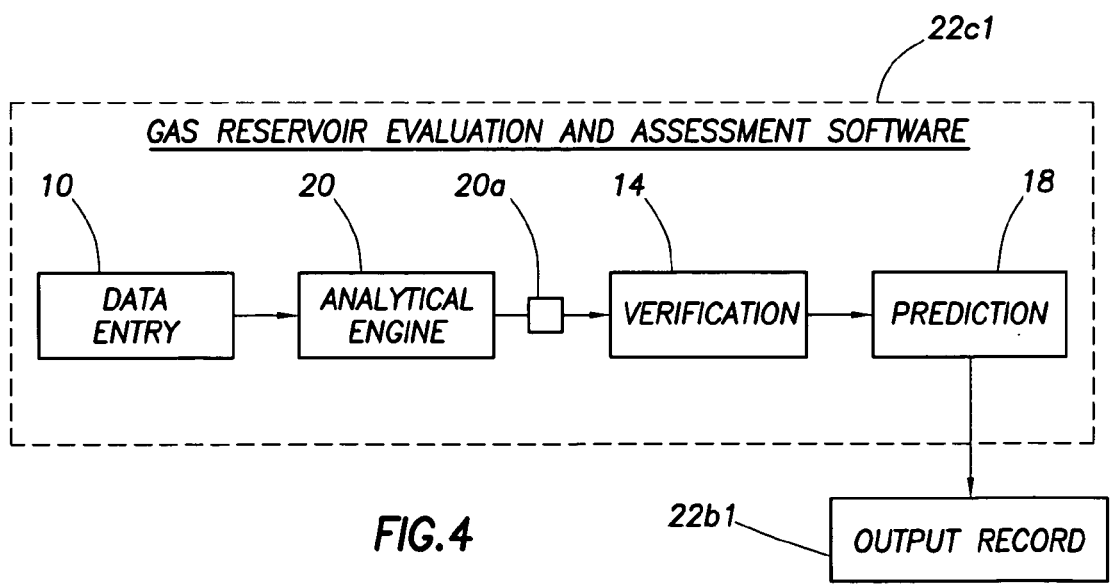
FIGS. 4 and 5 illustrate a block diagram of the Gas Reservoir Evaluation and Assessment software of FIG. 3 which includes an 'Analytical Engine', and the 'input data' which is introduced to the Gas Reservoir Evaluation and Assessment software of FIG. 3.

Referring to FIG. 4, the Gas Reservoir Evaluation and Assessment software 22c1 of FIG. 3 includes four major steps, which steps are also illustrated in FIG. 2: (1) a Data Entry step 10, (2) an Analytical Engine step 20, (3) a Verification step 14, and (4) a Prediction step 18. The 'Output Record' 22b1 of FIG. 3 is generated following the Prediction step 18. Each step is discussed below, as follows.

Figure 5:
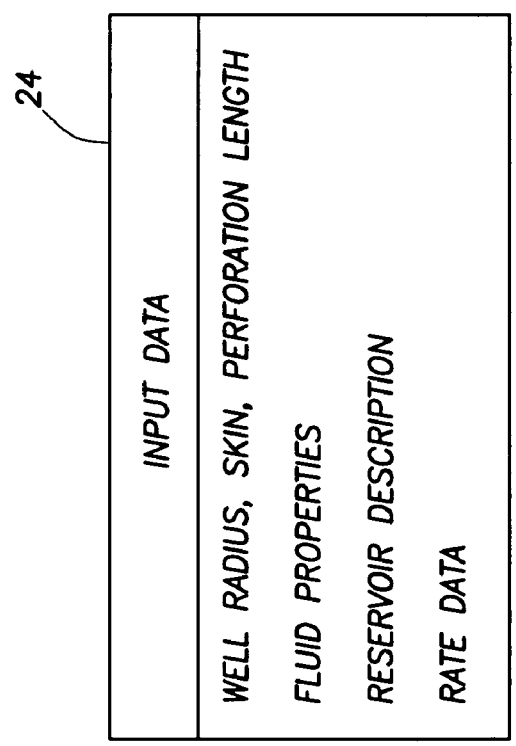

Referring to FIGS. 3, 4 and 5, during the Data Entry step 10 of FIG. 4, the 'Input Data' 24 of FIG. 3 is entered into the workstation 22 of FIG. 3 via a workstation keyboard. Recall that the Gas Reservoir Evaluation and Assessment software 22c1 is adapted to evaluate a gas (or oil) reservoir, where the reservoir includes a plurality of perforated wellbores penetrating an Earth formation, each wellbore having a well radius and a skin on a wall of the wellbore for producing a fluid from the formation. The gas (or oil) reservoir has a 'reservoir description' which includes 'reservoir data' that characterizes the formation penetrated by the one or more wellbores in the gas (or oil) reservoir, the 'reservoir data' including permeability, resistivity, porosity, and the presence or absence of boundaries in the wellbore which may impede the flow of the fluid from the formation, etc. As a result, in FIG. 5, during the Data Entry step 10 of FIG. 4, 'Input Data' 24 will be entered into the workstation 22 of FIG. 3, where that 'Input Data' 24 includes: (1) the 'well radius' representing a radius of a wellbore in the reservoir, (2) the 'skin' representing a 'zone of damage' surrounding the wellbore where the damage results from perforations in the formation penetrated by wellbore and from drilling fluid absorbed by the formation which reduces the ability of oil or gas to flow from the formation, (3) 'perforation length' representing the length of perforations in the formation penetrated by the wellbore, (4) 'fluid properties' representing properties of a fluid produced by the wellbore, such as density, and other fluid properties, such as the pressure and temperature at which gas breaks out of solution, (5) 'reservoir description' representing data that characterizes the formation penetrated by wellbores in the reservoir, such as the permeability, resistivity, or porosity of the formation, and the presence or absence of boundaries in the formation penetrated by the wellbore which may impede the flow of gas or fluid out of the perforations in the formation surrounding the wellbore, and (6) 'rate data' representing the rate at which gas (or oil) is produced at the surface of the wellbore as a result of the production of gas (or oil) from the perforations in the formation penetrated by the wellbore.

Referring to FIG. 4, during the Analytical Engine step 20, a 'computer model' 20a will be generated. That 'computer model' 20a is adapted to predict the pressure of a gas in the gas reservoir and the production characteristics of the gas from the gas reservoir at any point in space and at any point in time. The Analytical Engine step 20 will be discussed below in greater detail in the 'Description of the Invention' section of this specification with reference to FIG. 7 and in the 'Detailed Description of the Invention' section of this specification where a specification document is set forth describing in detail the characteristics of the Analytical Engine 20. The Analytical Engine 20 produces the 'computer model' 20a almost instantaneously following the Data Entry step 10 (when the 'enter' key is depressed on a keyboard of workstation 22) and the 'computer model' 20a will produce predictions 18 in FIGS. 2 and 4 which are much more accurate than are the predictions 16 of FIG. 1.

Figure 6:
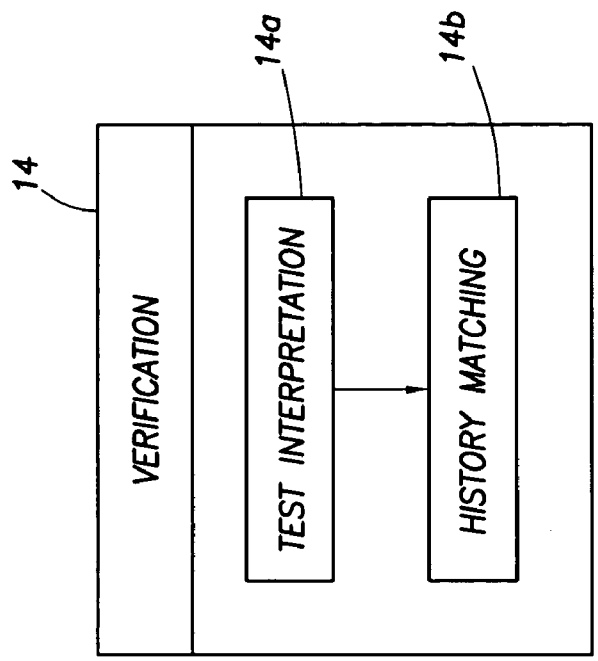
FIGS. 6 and 7 illustrate a construction of the 'verification' step and the 'Analytical Engine' step, respectively, of the Gas Reservoir Evaluation and Assessment software of FIG. 4 of the present invention.

Referring to FIGS. 4 and 6, during the Verification step 14, the 'computer model' 20a is verified to ensure that the predictions' 18 will be accurate. For example, a pressure gauge will be lowered downhole into a wellbore at a 'particular point in space' and at a 'particular point in time' to record a first pressure in the wellbore. Then, the 'computer model' 20a is interrogated responsive to the 'particular point in space' and the 'particular point in time' to produce a second pressure. If the first pressure is approximately equal to the second pressure, the 'computer model' 20a has been 'verified' to produce accurate predictions 18. In FIG. 6, the Verification step 14 includes two types of verification: (1) Test Interpretation 14a, and (2) History Matching 14b. In Test Interpretation 14a, compare a prediction of a pressure in a reservoir as a function of space and time against simpler known cases. In History Matching 14b, compare a prediction of pressure in a reservoir as a function of space and time against a known measurement as a function of that same space and time. The time scales and the methodologies used during the Test Interpretation step 14a and the History Matching step 14b are different, but they both have the same purpose; that is, to verify that the 'computer model' 20a will produce predictions 18 that are accurate, as described above.

Referring to FIGS. 3 and 4, during the Prediction step 18 of FIG. 4, now that the 'computer model' 20a has been determined to produce accurate predictions 18, the 'computer model' 20a can be interrogated to produce a 'real time' prediction 18. Recalling that the 'computer model' 20a represents the reservoir whose characteristics are set forth in the Input Data 24 of FIG. 5, two types of data are provided to the 'computer model' 20a: (1) a 'future time' representing a point in time in the reservoir when the characteristics of the reservoir are desired, and (2) a 'point in space' representing a specific location in the reservoir where the characteristics of the reservoir are desired. Responsive thereto, the 'computer model' 20a will generate a 'Prediction' 18 which includes the 'pressure' and 'other production characteristics' in the reservoir at that 'point in space' and at that 'future time'. This 'pressure' and 'other production characteristics' information is valuable to a customer because the customer will want to know how the reservoir will produce in five years, for example, or when the reservoir will be depleted, etc. When the Prediction step 18 is completed, an 'Output Record' 22b1 is generated which reflects and/or records and/or displays that prediction 18, that 'Output Record' 22b1 being generated by the Recorder or Display device 22b of FIG. 3.

Figure 7:
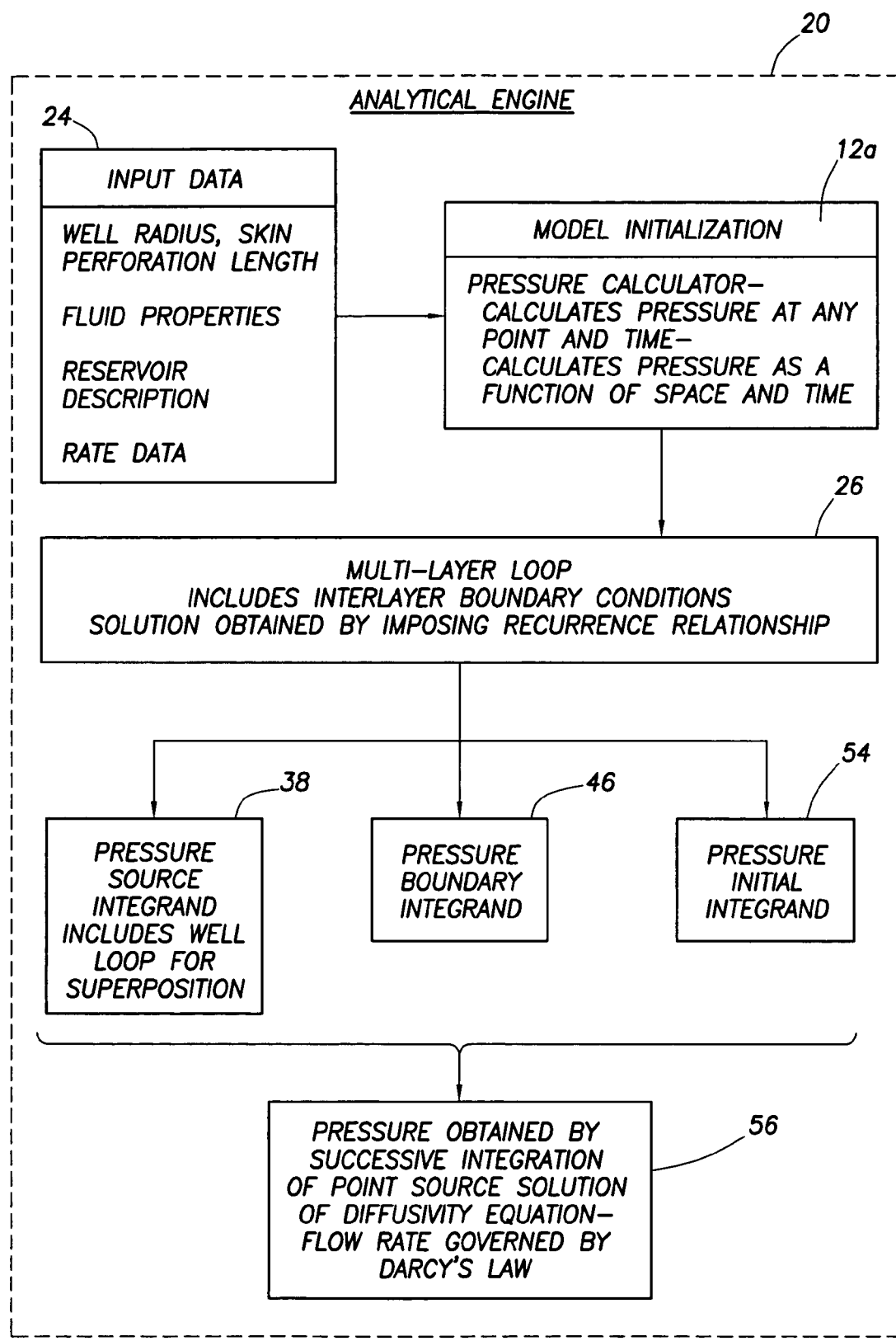

Referring to FIGS. 7 through 11, a construction of the Analytical Engine 20 of FIGS. 2 and 4 is illustrated in FIG. 7.

In FIG. 7, the Analytical Engine 20 includes a Model Initialization step 12a which responds to the Input Data 24 of FIGS. 3 and 5 including the well radius, skin, perforation length, fluid properties, reservoir description, and rate data. In FIG. 7, the Model Initialization step 12a is a 'pressure calculator' 12a which calculates a pressure in a reservoir as a function of space and time; that is, the 'pressure calculator' 12a will calculate a plurality of pressures in one-dimension (1D), such as along the x-axis in the reservoir, where each of the plurality of pressures along the one-dimensional x-axis in the reservoir represent a pressure at a single point in space and a single point in time in the reservoir. Since the 'pressure calculator' 12a of the Model Initialization step 12a calculates a plurality of pressures in 1D along the x-axis in the reservoir (each pressure representing a pressure at a single point in space and a single point in time in the reservoir), the 'pressure calculator' 12a actually calculates the plurality of pressures by performing a summation in the form of an 'Integral from 0 to x' along the reservoir, as follows:

$$\int_0^x$$

Figure 8:
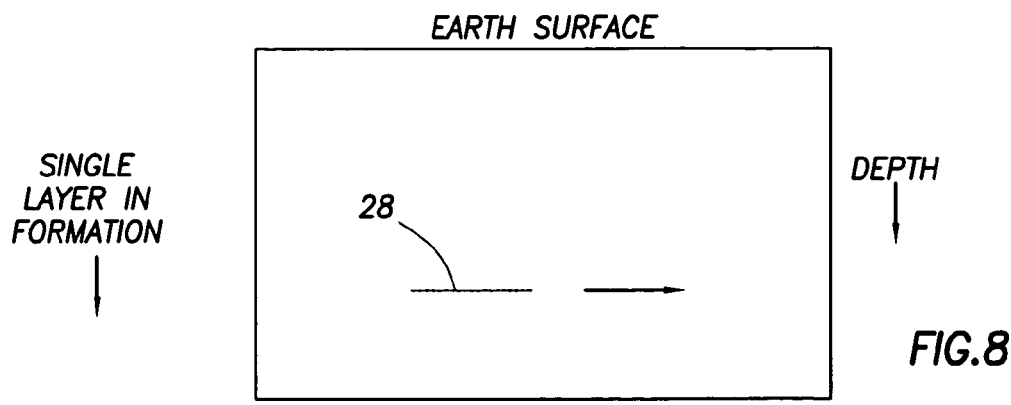
FIGS. 8-11 illustrate cross sectional views of an Earth formation designed to assist in an understanding of FIG. 7 of the drawings which represents an illustration of the Analytical Engine.

In FIG. 8, for example, a cross sectional view of an Earth formation is illustrated. FIG. 8 represents a single layer of Earth formation. A plurality of pressure values 28 have been calculated, during the Model Initialization step 12a of FIG. 7, along the x-axis in the single layer of Earth formation, each of the plurality of pressure values 28 representing a pressure which exists at a 'single point in space' and a 'single point in time' in the reservoir.

In FIG. 7, the Analytical Engine 20 also includes a Multi-Layer Loop step 26. The Model Initialization step 12a assumed that a 'single layer of formation' existed in the Earth formation of the reservoir when the plurality of pressure values 28 were calculated in a 'single point in space' within the 'single layer of formation' and during a 'single point in time'. However, we all know that the Earth formation consists of a multitude of layers (and not merely of a single layer as illustrated in FIG. 8). Therefore, the Multi-Layer Loop step 26 of FIG. 7 will respond to the 'Reservoir Description' portion of the Input Data 24 by converting the 'pressure in 1D for one layer of the reservoir' (that was generated by the 'pressure calculator' 12a of the Model Initialization step 12a) into a 'multi-layer formation' which is based on the reservoir description, the 'multi-layer formation' representing a 'plurality of Earth formation layers'. In each of the 'plurality of Earth formation layers', a plurality of pressure values are calculated in 1D along the x-axis of each layer, each pressure value being located at a 'single point in space' and existing at a 'single point in time'.

Figure 9:
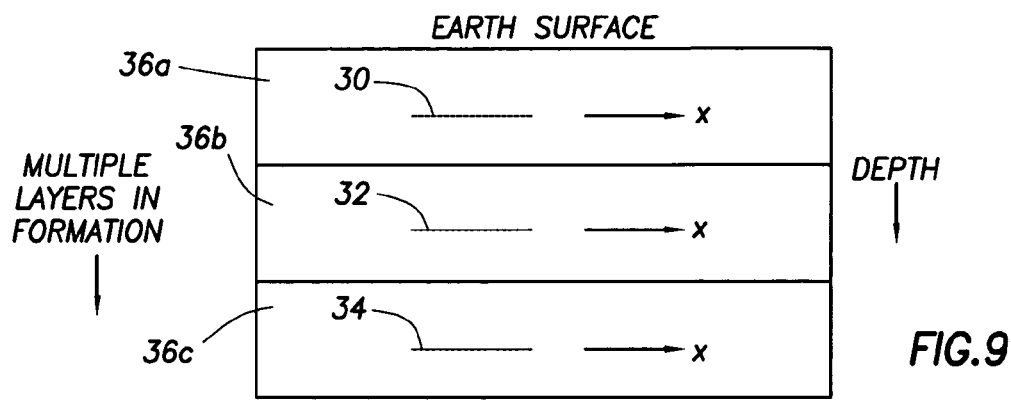

In FIG. 9, for example, whereas in FIG. 8 a single layer of Earth formation existed, in FIG. 9, the Multi-Layer Loop 26 of FIG. 7 responds to the 'reservoir description' by converting the 'pressure in 1D for one layer of the reservoir' that was generated by the pressure calculator 12a during the Model Initialization step 12a into a 'plurality of Earth formation layers' 36a, 36b, and 36c in the Earth formation. In FIG. 9, in each of the 'plurality of Earth formation layers' 36a-36c generated by the Multi-Layer Loop 26 of FIG. 7, a 'plurality of pressure values' have been calculated along the x-axis of the formation at a 'single point in space' and at a 'single point in time'. For example, in FIG. 9, a 'plurality of pressure values' 30 have each been calculated in one-dimension (1D) along the x-axis of the formation layer at a 'single point in space' and a 'single point in time' for Earth formation layer 36a. In FIG. 9, a 'plurality of pressure values' 32 have each been calculated in 1D along the x-axis at a 'single point in space' and a 'single point in time' for Earth formation layer 36b. In FIG. 9, a 'plurality of pressure values' 34 have each been calculated in 1D along the x-axis at a 'single point in space' and a 'single point in time' for Earth formation layer 36c.

Figure 10:
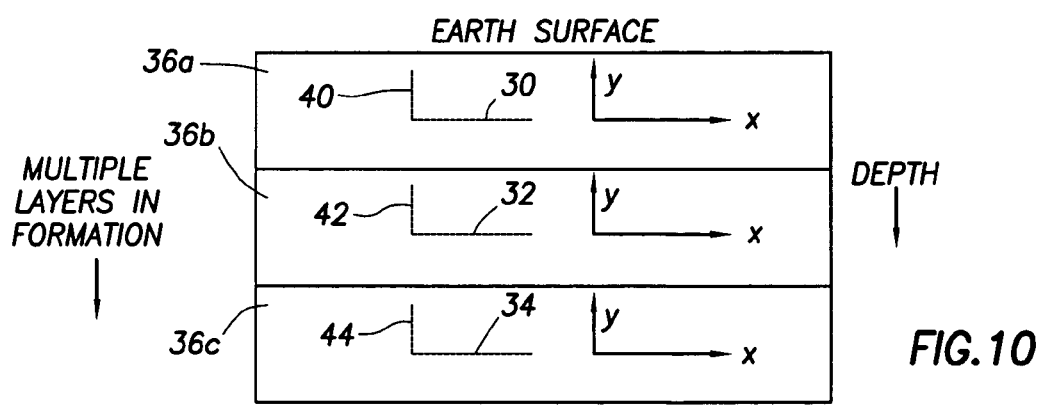

In FIG. 7, in connection with the Pressure Source Integrand 38, recall from FIG. 9 that a 'plurality of pressure values' 30, 32, and 34 have each been calculated in 1D at a 'single point in space' and a 'single point in time' for the plurality of formation layers 36a, 36b, and 36c. In FIGS. 7 and 10, the Pressure Source Integrand 38 of FIG. 7 will add an additional dimension to each formation layer 36a, 36b, 36c by converting the 'one dimensional (1D)' calculation of pressure values 30-34 for each formation layer 36a, 36b, and 36c (at the 'single point in space' and the 'single point in time') as shown in FIG. 9 into a 'two dimensional (2D)' calculation of pressure values for each formation layer 36a, 36b, and 36c (at the 'single point in space' and the 'single point in time') as shown in FIG. 10.

In FIG. 10, for example, the Pressure Source Integrand 38 of FIG. 7 will calculate an 'additional plurality of pressure values' 40, 42, 44 along the y-axis of each formation layer 36a, 36b, 36c, each pressure value of the 'additional plurality of pressure values' 40, 42, 44 being calculated at a 'single point in space' and during a 'single point in time'. Therefore, in FIG. 10, the 'plurality of pressure values' 30, 32, 34 have each been calculated in connection with the x-axis in each formation layer 36a, 36b, 36c at a 'single point in space' and during a 'single point in time'; and, in addition, the 'additional plurality of pressure values' 40, 42, 44 have each been calculated in connection with the y-axis in each formation layer 36a, 36b, and 36c at a 'single point in space' and during a 'single point in time'. The Pressure Source Integrand 38 of FIG. 7 actually calculates the 'additional plurality of pressure values' 40, 42, 44 by performing another summation in the form of an 'Integral from 0 to y' along the reservoir, as follows:

$$\int_0^y \cdot$$

Figure 11:
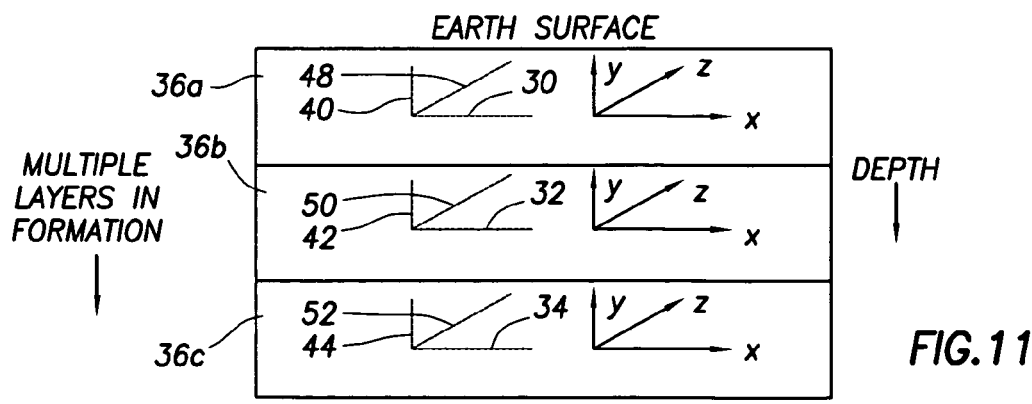

In FIG. 7, in connection with the Pressure Boundary Integrand 46, recall from FIG. 10 that a 'plurality of pressure values' 30, 32, and 34 have each been calculated in 1D along the x-axis at a 'single point in space' and at a 'single point in time' for the plurality of formation layers 36a, 36b, and 36c and that an 'additional plurality of pressure values' 40, 42, 44 have each been calculated in 2D along the y-axis at a 'single point in space' and at a 'single point in time'. In FIGS. 7 and 11, the Pressure Boundary Integrand 46 of FIG. 7 will add a further additional dimension to each formation layer 36a, 36b, 36c by converting the 'two dimensional (2D)' calculation of pressure values 30/32/34 and 40/42/44 for each formation layer 36a, 36b, and 36c (at the 'single point in space' and the 'single point in time') as shown in FIG. 10 into a 'three dimensional (3D)' calculation of pressure values for each formation layer 36a, 36b, and 36c (at the 'single point in space' and the 'single point in time') as shown in FIG. 11.

In FIG. 11, for example, the Pressure Boundary Integrand 46 of FIG. 7 will calculate a 'further additional plurality of pressure values' 48, 50, 52 along the z-axis of each formation layer 36a, 36b, 36c, each pressure value of the 'further additional plurality of pressure values' 48, 50, 52 being calculated at a 'single point in space' and at a 'single point in time'. Therefore, in FIG. 11, the 'plurality of pressure values' 30, 32, 34 have each been calculated in 1D in connection with the x-axis in each formation layer 36a, 36b, 36c at a 'single point in space' and at a 'single point in time'; the 'additional plurality of pressure values' 40, 42, 44 have each been calculated in 2D in connection with the y-axis in each formation layer 36a, 36b, and 36c at a 'single point in space' and at a 'single point in time'; and, in addition, the 'further additional plurality of pressure values' 48, 50, 52 have each been calculated in 3D in connection with the z-axis in each formation layer 36a, 36b, and 36c at a 'single point in space' and at a 'single point in time'. The Pressure Boundary Integrand 46 of FIG. 7 actually calculates the 'further additional plurality of pressure values' 48, 50, 52 by performing still another summation in the form of an 'Integral from 0 to z' along the reservoir, as follows:

$$\int_0^z \cdot$$

In FIG. 7, in connection with the Pressure Initial Integrand 54, recall from FIG. 11 that a 'plurality of pressure values' 30, 32, and 34 have each been calculated in 1D along the x-axis at a 'single point in space' and at a 'single point in time' for the plurality of formation layers 36a, 36b, and 36c; that an 'additional plurality of pressure values' 40, 42, 44 have each been calculated in 2D along the y-axis at a 'single point in space' and at a 'single point in time' for the plurality of formation layers 36a, 36b, and 36c; and that a 'further additional plurality of pressure values' 48, 50, 52 have each been calculated in 3D along the z-axis at a 'single point in space' and at a 'single point in time' for the plurality of formation layers 36a, 36b, and 36c. In FIG. 11, note that all of the pressure values 30 through 52 along the x, y, and z axes have been calculated 'at a single point in time'. The whole purpose of the 'Prediction' step 18 of FIG. 4 is to produce a prediction of the pressure in the reservoir (and other production data) at any point in space and at 'any point in time' in the reservoir. Therefore, there is a further need to produce a prediction of the pressure in the reservoir at 'any point in time', which includes any future time. In FIGS. 7 and 11, the Pressure Initial Integrand step 54 of FIG. 7 will receive the 'plurality of pressure values 30-52' for the formation layers 36a, 36b, 36c shown in 3D in FIG. 11 (where each pressure value exists at a 'single point in space' and a 'single point in time') and, responsive thereto, the Pressure Initial Integrand step 54 of FIG. 7 will generate a 'time dependent plurality of pressure values' where each pressure value of the 'time dependent plurality of pressure values' will exist not only at a 'single point in space' but also at 'any point in time'. Therefore, in FIGS. 7 and 11, the 'output' of the Pressure Initial Integrand step 54 will be comprised of 'one or more pressure values' 30, 32, 34, 40, 42, 44, 48, 50, 52 associated with 'one or more locations' along three dimensions in the reservoir, where: (1) 'each pressure value' of the 'one or more pressure values' will have a 'specific point in space' associated with the 'one or more locations' along three dimensions in the reservoir, and (2) 'each pressure value' of the 'one or more pressure values' will exist at a 'specific point in time' associated with the 'specific point in space' in the reservoir (that is, at any future time). The Pressure Initial Integrand 54 of FIG. 7 actually calculates the 'one or more pressure values', where each pressure value has a 'specific point in space' and will exist at a 'specific point in time', by performing still another summation in the form of an 'Integral from 0 to t' along the reservoir, as follows:

$$\int_0^t$$

In FIG. 7, in step 56, recall the summations in the form of integrals $$\int_0^x \int_0^y \int_0^z \int_0^t$$

The pressures values 30-52 were calculated (in '3D' and as a function of 'time') by a successive integration of a Point Source Solution in the Diffusivity Equation where the flow rate is governed by Darcy's Law. The Gas Reservoir Evaluation and Assessment Tool (GREAT) of the present invention, as shown in FIG. 3, offers a complete workflow for rapid evaluation of gas reservoirs. The GREAT tool includes the Analytical Engine 20 which further includes a newly derived solution of diffusivity equations for multiple wells, horizontal or vertical, in a single phase layered system under a variety of boundary conditions. The solution of these equations model both transient and steady state flow regimes and is applicable to both testing and long term performance prediction. The equations applicable to laminar flow of fluids in a porous medium were the results of Darcy's experimental study of the flow characteristics of sand filters. This combined with the equation of continuity and an equation of state for slightly compressible fluid yields the diffusivity equation, which is the equation for pressure diffusion in a porous medium. Solution of the diffusivity equation under different boundary conditions forms the basis for prediction of bottom hole pressure response of a producing well. These analytical solutions are generally applicable for a single well and are used widely in the area of well testing. The efficiency of analytical models is generally judged by accuracy and speed. The novel set of solutions used in the GREAT tool of FIG. 3 is applicable to multiple wells, which can be vertical as well as horizontal. These wells can be operating as producers or injectors thus being of additional significance to gas well storage. The solutions have been derived by application of successive integral transforms. The application of these new solutions is characterized by stability and speed.

Figure 12:
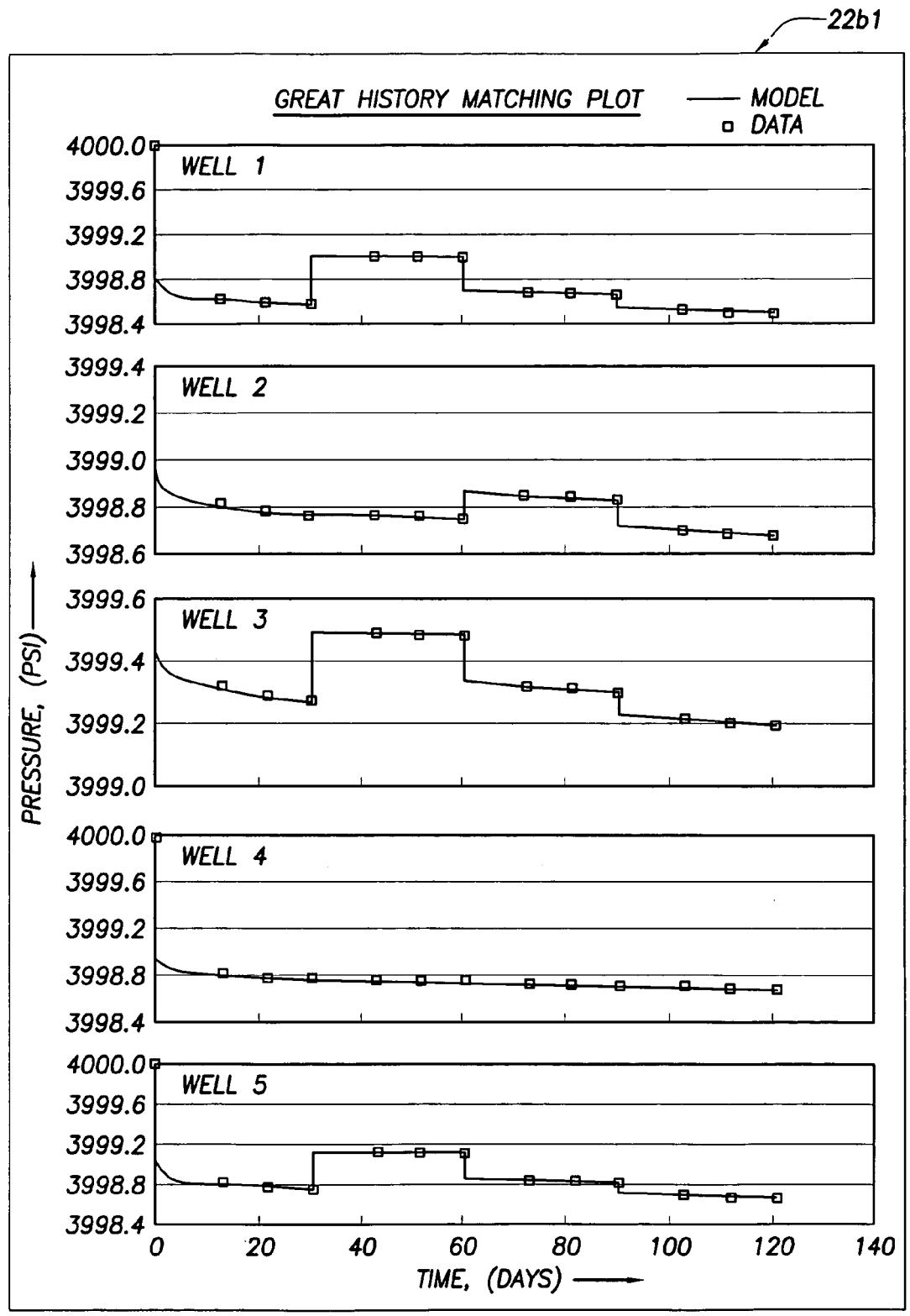
FIG. 12 illustrates an example of the Output Record which is generated by the Recorder or Display Device associated with the Gas Reservoir Evaluation and Assessment Tool (GREAT) of FIG. 3.

Referring to FIG. 12, an example of the Output Record 22b1 generated by the Recorder or Display Device 22b of FIG. 3 is illustrated. This Output Record 22b1 provides the Prediction 18 illustrated in FIG. 4, the Output Record 22b1 illustrating one or more pressure values (and/or other production data), each pressure value existing at any 'single point in space' along three dimensions (3D) in a reservoir, each pressure value existing at 'any future point in time' associated with a 'single point in space' in the reservoir.

A functional description of the operation of the Gas Reservoir Evaluation and Assessment Tool (GREAT) 22 of the present invention shown in FIG. 3 will be set forth in the following paragraphs with reference to FIGS. 1 through 12 of the drawings.

In FIG. 3, the Gas Reservoir Evaluation and Assessment software 22c1 is loaded from a CD-Rom (or other such program storage device) into the memory or program storage device 22c of the Gas Reservoir Evaluation and Assessment Tool (hereinafter, the 'GREAT tool') shown in FIG. 3 for storage therein. In FIG. 3, the Input Data 24 is also input to the workstation 22 of FIG. 3 which represents the GREAT tool of the present invention. In FIG. 5, the Input Data 24 includes the following 'particular data': well radius, skin, perforation length, fluid properties, reservoir description, and rate data. The aforementioned 'particular data' represents a reservoir, such as a gas reservoir, which includes one or more wellbores. In FIG. 3, the processor 22a executes the Gas Reservoir Evaluation and Assessment software 22c1 stored in the memory/program storage device 22c and, responsive thereto, the processor 22a will generate an Output Record 22b1, the Output Record 22b1 being recorded or displayed on the Recorder or Display device 22b of FIG. 3. When the processor 22a executes the Gas Reservoir Evaluation and Assessment software 22c1, the steps shown in FIG. 4 will be executed in sequence. In FIG. 4, in response to the Input Data 24, the processor 22a begins the Data Entry step 10 of FIG. 4 wherein the Input Data 24 will be received into the processor 22a. At this point, in FIG. 4, the processor 22a will commence the Analytical Engine step 20 wherein the Analytical Engine 20 will utilize the Input Data 24 to generate a 'computer model' 20a. In FIG. 4, the processor 22a will now commence the Verification step 14 wherein the 'computer model' 20a is verified to determine whether the 'computer model' will generate accurate results. In FIG. 6, during the Verification step 14, the 'computer model' 20a will undergo verification via the Test Interpretation step 14a and the History Matching step 14b. In both the Test Interpretation step 14a and the History Matching step 14b, previously known 'historical data' (having 'known historical results') will be introduced into the 'computer model' 20a. Responsive thereto, the 'computer model' 20a will generate 'results'. The 'results' generated by the 'computer model' 20a will be compared to the 'known historical results'. If the 'results' approximately equal the 'known historical results', the 'computer model' 20a has successfully passed the verification test embodied in the Verification step 14. In FIG. 4, at this point, the processor 22a will now commence the Prediction step 18 wherein the future behavior of the reservoir can be predicted. During the Prediction step 18, in response to certain input data which may include a 'particular point in space' in the reservoir and a 'particular future point in time', the processor 22a will predict the pressure in the reservoir (as well as other production data) at 'the particular point in space' in the reservoir and at 'the particular future point in time'. As a result, the processor 22a can predict the future behavior of the reservoir at that 'particular point in space' in the reservoir and at that 'particular future point in time'. The prediction that is generated by the processor 22a during the Prediction step 18 (i.e., the pressure and other production data in the reservoir at 'the particular point in space' and at 'the particular future point in time') is reflected on the Output Record 22b1 which is recorded or displayed on the Recorder or Display device 22b of the GREAT tool shown in FIG. 3.

Referring to FIGS. 4 and 7 through 11, recall from FIG. 4 that the processor 22a will practice the Analytical Engine step 20. During the Analytical Engine 20 step of FIG. 4, the Input Data 24 is utilized by the processor 22a to generate a 'computer model' 20a. The 'computer model' 20a is generated by the processor 22a during the Analytical Engine step 20 in the following manner.

In FIG. 7, during the Analytical Engine step 20, the Input Data 24 is received for use during the Model Initialization step 12a. In the Model Initialization step 12a, in response to the Input Data 24, a pressure calculator 12a will calculate a plurality of pressure values within a single layer of a reservoir in one dimension (1D), such as along the x-axis, at a 'single point in space' and at a 'single point in time'. For example, FIG. 8 depicts a reservoir wherein the plurality of pressure values 28 within a single layer of the reservoir has been calculated by the pressure calculator 12a in one dimension (1D), such as along the x-axis, at a 'single point in space' and at a 'single point in time'. In FIG. 7, the Multi Layer Loop step 26 will calculate a plurality of pressure values within multiple layers of a reservoir in one dimension (1D), such as along the x-axis, at a 'single point in space' and at a 'single point in time'. For example, FIG. 9 depicts a reservoir wherein the plurality of pressure values 30, 32, 34 within multiple layers 36a, 36b, 36c of the reservoir has been calculated in one dimension (1D), such as along the x-axis, at a 'single point in space' and at a 'single point in time'. In FIG. 7, the Pressure Source Integrand step 38 will calculate a plurality of pressure values within multiple layers of the reservoir in two dimensions (2D), such as along the x-axis and the y-axis, at a 'single point in space' and a 'single point in time'. For example, FIG. 10 depicts a reservoir wherein the plurality of pressure values 30, 32, 34 along the x-axis of the multiple layers 36a, 36b, 36c and the plurality of pressure values 40, 42, 44 along the y-axis of the multiple layers 36a, 36b, 36c of the reservoir has been calculated in two dimension (2D), such as along the x-axis and the y-axis, at a 'single point in space' and at a 'single point in time'. In FIG. 7, the Pressure Boundary Integrand 46 will calculate a plurality of pressure values within multiple layers of the reservoir in three dimensions (3D), such as along the x-axis and the y-axis and the z-axis, at a 'single point in space' and a 'single point in time'. For example, FIG. 11 depicts a reservoir wherein the plurality of pressure values 30, 32, 34 along the x-axis of the multiple layers 36a, 36b, 36c and the plurality of pressure values 40, 42, 44 along the y-axis of the multiple layers 36a, 36b, 36c and the plurality of pressure values 48, 50, 52 along the z-axis of the multiple layers 36a, 36b, 36c of the reservoir has been calculated in three dimension (3D), such as along the x-axis and the y-axis and the z-axis, at a 'single point in space' and at a 'single point in time'. In FIG. 7, the Pressure Initial Integrand 54 will calculate the plurality of pressure values within multiple layers of the reservoir in three dimensions (3D), such as along the x-axis and the y-axis and the z-axis. Each of the plurality of pressure values calculated by the Pressure Initial Integrand 54 is associated with a 'single point in space'. However, the Pressure Initial Integrand 54 will also calculate the plurality of pressure values within multiple layers of the reservoir in three dimensions (3D) at 'any future point in time'.

DETAILED DESCRIPTION OF THE INVENTION

The 'Detailed Description of the Invention' portion of this specification, set forth below, provides a 'detailed specification document' which discloses the construction of the Analytical Engine 20 of FIG. 4. That 'detailed specification document', which represents a 'compendium of analytic solutions', is set forth below, as follows.

---

Mathematical Operations of Special Functions

1 The diffusion mode of transference of heat, mass and pressure.
    1.1    The flux laws and the differential equation of diffusion in one dimension
    1.2    Pressure diffusion in a three dimensional porous medium
2 Integral transforms and their inversion formulae
    2.1    Laplace Transform
    2.2    Fourier Transforms
    2.3    Finite Fourier Transforms
    2.4    Hankel and Weber Transforms
    2.5    Finite Hankel Transforms
3 Semi-infinite medium
    3.1    The medium is bounded by the plane $x = 0$ and extends to $\infty$ in the direction of x positive. At $x = 0$, $p(0, t) = 0$, for all $t > 0$ and p tends to zero as $x \to \infty$. The initial pressure $p(x, 0) = 0$.
    3.2    The problem of 3.1, except at $t = 0$, $p(x, 0) = \phi(x)$; $\phi(x)$ and its derivative tend to zero as $x \to \infty$.
    3.3    The problem of 3.1, except at $t = 0$, $p(x, 0) = p_I$, a constant for all $x > 0$.
    3.4    The problem of 3.1, except at $x = 0$, $p(0, t) = \psi(t)$, an arbitrary function of time. The initial pressure $p(x, 0) = 0$.
    3.5    The problem of 3.1, except at $x = 0$, $p(0, t) = \psi(t)$, an arbitrary function of time. The initial pressure $p(x, 0) = \phi(x)$; $\phi(z)$ and its derivative with respect to x tend to zero as $x \to \infty$.
    3.6    The problem of 3.1, except at $x = 0$, $p(0, t) = \psi(t)$, an arbitrary function of time. The initial pressure $p(x, 0) = p_I$, a constant for all $x > 0$.

| -continued |
| --- |
| Mathematical Operations of Special Functions |

| | |
| --- | --- |
| 3.7 | The problem of 3.1, except at $x = 0$, there exist a no-flow boundary, that is, $\dfrac{\partial p(0, t)}{\partial x} = 0$. $\dfrac{\partial p(x, t)}{\partial x} \to 0$ as $x \to \infty$. The initial pressure $p(x, 0) = 0$. |
| 3.8 | The problem of 3.7, except at $t = 0$, $p(x, 0) = \phi(x)$; $\phi(x)$ and its derivative tend to zero as $x \to \infty$. |
| 3.9 | The problem of 3.7, except at $t = 0$, $p(x, 0) = p_I$, a constant for all $x > 0$. |
| 3.10 | The problem of 3.7, except at $x = 0$, $\dfrac{\partial p(0, t)}{\partial x} = -\left(\dfrac{\mu}{k}\right)\psi(t)$, an arbitrary function of time. The The initial pressure $p(x, 0) = 0$. |
| 3.11 | The problem of 3.7, except at $x = 0$, $\dfrac{\partial p(0, t)}{\partial x} = -\left(\dfrac{\mu}{k}\right)\psi(t)$, an arbitrary function of time. The The initial pressure $p(x, 0) = \varphi(x)$; $\varphi(x)$ and its derivative with respect to $x$ tend to zero as $x \to \infty$. |
| 3.12 | The problem of 3.1, except $\dfrac{\partial p(0, t)}{\partial x} = -\left(\dfrac{\mu}{k}\right)\psi(t)$, an arbitrary function of time. The initial pressure $p(x, 0) = p_I$, a constant for all $x > 0$. |
| 3.13 | The problem of 3.1, except $\dfrac{\partial p(0, t)}{\partial x} - \lambda p(0, t) = 0$. The initial pressure $p(x, 0) = 0$. |
| 3.14 | The problem of 3.13, except at $t = 0$, $p(x, 0) = \phi(x)$; $\phi(x)$ and its derivative tend to zero as $x \to \infty$. |
| 3.15 | The problem of 3.13, except at $t = 0$, $p(x, 0) = p_I$, a constant for all $x > 0$. |
| 3.16 | The problem of 3.13, except at $x = 0$, $\dfrac{\partial p(0, t)}{\partial x} - \lambda p(0, t) = -\left(\dfrac{\mu}{k}\right)\psi(t)$, an arbitrary function of time. The initial pressure $p(x, 0) = 0$. |
| 3.17 | The problem of 3.13, except at $x = 0$, $\dfrac{\partial p(0, t)}{\partial x} - \lambda p(0, t) = -\left(\dfrac{\mu}{k}\right)\psi(t)$, an arbitrary function of time. The initial pressure $p(x, 0) = \varphi(x)$; $\varphi(x)$ and its derivative with respect to $x$ tend to zero as $x \to \infty$. |
| 3.18 | The problem of 3.1, except at $x = 0$, $\dfrac{\partial p(0, t)}{\partial x} - \lambda p(0, t) = -\left(\dfrac{\mu}{k}\right)\psi(t)$, an arbitrary function of time. The initial pressure $p(x, 0) = p_I$, a constant for all $x > 0$. |
| 4 Bounded medium | |
| 4.1 | The medium is bounded by the planes $x = 0$ and $x = a$. $p(0, t) = p(a, t) = 0$. The initial pressure $p(x, 0) = 0$. |
| 4.2 | The problem of 4.1, except at $t = 0$, $p(x, 0) = \phi(x)$, an arbitrary function of $x$, $0 < x < a$. |
| 4.3 | The problem of 4.1, except at the extremities $x = 0$ and $x = a$, the pressures are $\psi_0(t)$ and $\psi_a(t)$, arbitrary functions of time. The initial pressure $p(x, 0) = 0$, $0 < x < a$. |
| 4.4 | The problem of 4.1, except at the extremities $x = 0$ and $x = a$, the pressures are $\psi_0(t)$ and $\psi_a(t)$, arbitrary functions of time. The initial pressure $p(x, 0) = \phi(x)$, an arbitrary function of $x$, $0 < x < a$. |
| 4.5 | The problem of 4.1, except at $x = 0$, $p(0, t) = 0$ and at $x = a$, $\dfrac{\partial p(a, t)}{\partial x} = 0$. The initial pressure $p(x, 0) = 0$, $0 < x < a$. |
| 4.6 | The problem of 4.5, except at $x = 0$, $p(0, t) = 0$ and at $x = a$, $\dfrac{\partial p(a, t)}{\partial x} = 0$. The initial pressure $p(x, 0) = \varphi(x)$, an arbitrary function of $x$, $0 < x < a$. |
| 4.7 | The problem of 4.5, except at $x = 0$, $p(0, t) = \psi_0(t)$ and at $x = a$, $\dfrac{\partial p(a, t)}{\partial x} = -\left(\dfrac{\mu}{k}\right)\psi_a(t) \cdot \psi_0(t)$ and $\psi_a(t)$ are arbitrary functions of time. The initial pressure $p(x, 0) = 0$, $0 < x < a$. |

| | -continued |
|---|---|
| | Mathematical Operations of Special Functions |
| 4.8 | The problem of 4.5, except at $x = 0$, $p(0, t) = \psi_0(t)$ and at $x = a$, $\frac{\partial p(a, t)}{\partial x} = -\left(\frac{\mu}{k}\right)\psi_a(t) \cdot \psi_0(t)$ and $\psi_a(t)$ are arbitrary functions of time. The initial pressure $p(x, 0) = \varphi(x)$, an arbitrary function of x, $0 < x < a$. |
| 4.9 | The problem of 4.1, except at $x = 0$, $p(0, t) = 0$ and at $x = a$, $\frac{\partial p(a, t)}{\partial x} + \lambda_a p(a, t) = 0$. The initial pressure $p(x, 0) = 0$, $0 < x < a$. |
| 4.10 | The problem of 4.9, except at $x = 0$, $p(0, t) = 0$ and at $x = a$, $\frac{\partial p(a, t)}{\partial x} + \lambda_a p(a, t) = 0$. The initial pressure $p(x, 0) = \varphi(x)$, an arbitrary function of x, $0 < x < a$. |
| 4.11 | The problem of 4.9, except at $x = 0$, $p(0, t) = \psi_0(t)$ and at $x = a$, $\frac{\partial p(a, t)}{\partial x} + \lambda_a p(a, t) = -\left(\frac{\mu}{k}\right)\psi_a(t)$. $\psi_0(t)$ and $\psi_a(t)$ are arbitrary functions of time. The initial pressure $p(x, 0) = 0$, $0 < x < a$. |
| 4.12 | The problem of 4.9, except at $x = 0$, $p(0, t) = \psi_0(t)$ and at $x = a$, $\frac{\partial p(a, t)}{\partial x} + \lambda_a p(a, t) = -\left(\frac{\mu}{k}\right)\psi_a(t)$. $\psi_0(t)$ and $\psi_a(t)$ are arbitrary functions of time. The initial pressure $p(x, 0) = \varphi(x)$, an arbitrary function of x, $0 < x < a$. |
| 4.13 | The problem of 4.1, except at the extremities we have no flow boundary condition, that is at $x = 0$, $\frac{\partial p(0, t)}{\partial x} = 0$ and at $x = a$, $\frac{\partial p(a, t)}{\partial x} = 0$. The initial pressure $p(x, 0) = 0$, $0 < x < a$. |
| 4.14 | The problem of 4.13, except at $x = 0$, $\frac{\partial p(0, t)}{\partial x} = 0$ and at $x = a$, $\frac{\partial p(a, t)}{\partial x} = 0$. The initial pressure $p(x, 0) = \varphi(x)$, an arbitrary function of x, $0 < x < a$. |
| 4.15 | The problem of 4.13, except at $x = 0$, $\frac{\partial p(0, t)}{\partial x} = -\left(\frac{\mu}{k}\right)\psi_0(t)$ and at $x = a$, $\frac{\partial p(a, t)}{\partial x} = -\left(\frac{\mu}{k}\right)\psi_a(t)$. $\psi_0(t)$ and $\psi_a(t)$ are arbitrary functions of time. The initial pressure $p(x, 0) = 0$, $0 < x < a$. |
| 4.16 | The problem of 4.13, except at $x = 0$, $\frac{\partial p(0, t)}{\partial x} = -\left(\frac{\mu}{k}\right)\psi_0(t)$ and at $x = a$, $\frac{\partial p(a, t)}{\partial x} = -\left(\frac{\mu}{k}\right)\psi_a(t)$. $\psi_0(t)$ and $\psi_a(t)$ are arbitrary functions of time. The initial pressure $p(x, 0) = \varphi(x)$, an arbitrary function of x, $0 < x < a$. |
| 4.17 | The problem of 4.1, except at $x = 0$, $\frac{\partial p(0, t)}{\partial x} = 0$ and at $x = a$, $p(a, t) = 0$. The initial pressure $p(x, 0) = 0$, $0 < x < a$. |
| 4.18 | The problem of 4.17 except at $t = 0$, $p(x, 0) = \phi(x)$, an arbitrary function of x, $0 < x < a$. |
| 4.19 | The problem of 4.17, except at $x = 0$, $\frac{\partial p(0, t)}{\partial x} = -\left(\frac{\mu}{k}\right)\psi_0(t)$ and at $x = a$, $p(a, t) = \psi_a(t)$. $\psi_0(t)$ and $\psi_a(t)$ are arbitrary functions of time. The initial pressure $p(x, 0) = 0$, $0 < x < a$. |
| 4.20 | The problem of 4.17, except at $x = 0$, $\frac{\partial p(0, t)}{\partial x} = -\left(\frac{\mu}{k}\right)\psi_0(t)$ and at $x = a$, $p(a, t) = \psi_a(t)$. $\psi_0(t)$ and $\psi_a(t)$ are arbitrary functions of time. The initial pressure $p(x, 0) = \varphi(x)$, an arbitrary function of x, $0 < x < a$. |
| 4.21 | The problem of 4.1, except at $x = 0$, $\frac{\partial p(0, t)}{\partial x} = 0$ and at $x = a$, $\frac{\partial p(a, t)}{\partial x} + \lambda_a p(a, t) = 0$. The initial pressure $p(x, 0) = 0$, $0 < x < a$. |

-continued

| Mathematical Operations of Special Functions |
|---|

4.22 The problem of 4.21, except at $x = 0$, $\frac{\partial p(0, t)}{\partial x} = 0$ and at $x = a$, $\frac{\partial p(a, t)}{\partial x} + \lambda_a p(a, t) = 0$. The initial pressure $p(x, 0) = \varphi(x)$, an arbitrary function of x, $0 < x < a$.

4.23 The problem of 4.21, except at $x = 0$, $\frac{\partial p(0, t)}{\partial x} = -\left(\frac{\mu}{k}\right)\psi_0(t)$ and at $x = a$, $\frac{\partial p(a, t)}{\partial x} + \lambda_a p(a, t) = -\left(\frac{\mu}{k}\right)\psi_a(t)$. $\psi_0(t)$ and $\psi_a(t)$ are arbitrary functions of time. The initial pressure $p(x, 0) = 0$, $0 < x < a$.

4.24 The problem of 4.21, except at $x = 0$, $\frac{\partial p(0, t)}{\partial x} = -\left(\frac{\mu}{k}\right)\psi_0(t)$ and at $x = a$, $\frac{\partial p(a, t)}{\partial x} + \lambda_a p(a, t) = -\left(\frac{\mu}{k}\right)\psi_a(t)$. $\psi_0(t)$ and $\psi_a(t)$ are arbitrary functions of time. The initial pressure $p(x, 0) = \varphi(x)$, an arbitrary function of x, $0 < x < a$.

4.25 The problem of 4.1, except at $x = 0$, $\frac{\partial p(0, t)}{\partial x} - \lambda_0 p(0, t) = 0$ and at $x = a$, $\frac{\partial p(a, t)}{\partial x} + \lambda_a p(a, t) = 0$. The initial pressure $p(x, 0) = 0$, $0 < x < a$.

4.26 The problem of 4.25, except at $x = 0$, $\frac{\partial p(0, t)}{\partial x} - \lambda_0 p(0, t) = 0$ and at $x = a$, $\frac{\partial p(a, t)}{\partial x} + \lambda_a p(a, t) = 0$. The initial pressure $p(x, 0) = \varphi(x)$, an arbitrary function of x, $0 < x < a$.

4.27 The problem of 4.25, except at $x = 0$, $\frac{\partial p(0, t)}{\partial x} - \lambda_0 p(0, t) = -\left(\frac{\mu}{k}\right)\psi_0(t)$ and at $x = a$, $\frac{\partial p(a, t)}{\partial x} + \lambda_a p(a, t) = -\left(\frac{\mu}{k}\right)\psi_a(t)$. $\psi_0(t)$ and $\psi_a(t)$ are arbitrary functions of time. The initial pressure $p(x, 0) = 0$, an arbitrary function of x, $0 < x < a$.

4.28 The problem of 4.25, except at $x = 0$, $\frac{\partial p(0, t)}{\partial x} - \lambda_0 p(0, t) = -\left(\frac{\mu}{k}\right)\psi_0(t)$ and at $x = a$, $\frac{\partial p(a, t)}{\partial x} + \lambda_a p(a, t) = -\left(\frac{\mu}{k}\right)\psi_a(t)$. $\psi_0(t)$ and $\psi_a(t)$ are arbitrary functions of time. The initial pressure $p(x, 0) = \varphi(x)$, an arbitrary function of x, $0 < x < a$.

4.29 The problem of 4.1, except at $x = 0$, $\frac{\partial p(0, t)}{\partial x} - \lambda_0 p(0, t) = 0$ and at $x = a$, $p(a, t) = 0$. The initial pressure $p(x, 0) = 0$, $0 < x < a$.

4.30 The problem of 4.29, except at $x = 0$, $\frac{\partial p(0, t)}{\partial x} - \lambda_0 p(0, t) = 0$ and at $x = a$, $p(a, t) = 0$. The initial pressure $p(x, 0) = \varphi(x)$, an arbitrary function of x, $0 < x < a$.

4.31 The problem of 4.29, except at $x = 0$, $\frac{\partial p(0, t)}{\partial x} - \lambda_0 p(0, t) = -\left(\frac{\mu}{k}\right)\psi_0(t)$ and at $x = a$, $p(a, t) = \psi_a(t)$. $\psi_0(t)$ and $\psi_a(t)$ are arbitrary functions of time. The initial pressure $p(x, 0) = 0$, $0 < x < a$.

4.32 The problem of 4.29, except at $x = 0$, $\frac{\partial p(0, t)}{\partial x} - \lambda_0 p(0, t) = -\left(\frac{\mu}{k}\right)\psi_0(t)$ and at $x = a$, $p(a, t) = \psi_a(t)$. $\psi_0(t)$ and $\psi_a(t)$ are arbitrary functions of time. The initial pressure $\varphi(x)$, an arbitrary function of x, $0 < x < a$.

4.33 The problem of 4.1, except at $x = 0$, $\frac{\partial p(0, t)}{\partial x} - \lambda_0 p(0, t) = 0$ and at $x = a$, $\frac{\partial p(a, t)}{\partial x} = 0$. The initial pressure $p(x, 0) = 0$, $0 < x < a$.

-continued

| Mathematical Operations of Special Functions |

4.34 The problem of 4.33, except at $x = 0$, $\frac{\partial p(0, t)}{\partial x} - \lambda_0 p(0, t) = 0$ and at $x = a$, $\frac{\partial p(a, t)}{\partial x} = 0$. The initial pressure $p(x, 0) = \varphi(x)$, an arbitrary function of $x$, $0 < x < a$.

4.35 The problem of 4.33, except at $x = 0$, $\frac{\partial p(0, t)}{\partial x} - \lambda_0 p(0, t) = -\left(\frac{\mu}{k}\right)\psi_0(t)$ and at $x = a$, $\frac{\partial p(a, t)}{\partial x} = -\left(\frac{\mu}{k}\right)\psi_a(t)$. $\psi_0(t)$ and $\psi_a(t)$ are arbitrary functions of time. The initial pressure $p(x, 0) = 0$, an arbitrary function of $x$, $0 < x < a$.

4.36 The problem of 4.33, except at $x = 0$, $\frac{\partial p(0, t)}{\partial x} - \lambda_0 p(0, t) = -\left(\frac{\mu}{k}\right)\psi_0(t)$ and at $x = a$, $\frac{\partial p(a, t)}{\partial x} = -\left(\frac{\mu}{k}\right)\psi_a(t)$. $\psi_0(t)$ and $\psi_a(t)$ are arbitrary functions of time. The initial pressure $p(x, 0) = \varphi(x)$, an arbitrary function of $x$, $0 < x < a$.

5 Cascaded medium 5.1 N connected mediums $a_j \leq x \leq a_{j+1}$, $\forall j = 0, 1, \ldots, N-1$. At $x = a_0$, $\frac{\partial p(a_0, t)}{\partial x} = -\left(\frac{\mu}{k}\right)\psi_0(t)$ and at $x = a_N$, $\frac{\partial p(a_N, t)}{\partial x} = -\left(\frac{\mu}{k}\right)\psi_N(t)$. At the interface $x = a_j$, $\forall j = 1, 2, \ldots, N-1$, $\psi_j(t) = -\left(\frac{k}{\mu}\right)_j \left(\frac{\partial p_j(a_j t)}{\partial x}\right) = -\left(\frac{k}{\mu}\right)_{j-1} \left(\frac{\partial p_{j-1}(a_j, t)}{\partial x}\right)$ and $\check{\lambda}_j \psi_j(t) = \{p_{j-1}(a_j, t) - p_j(a_j, t)\}$, $t > 0$. The initial pressure $p_j(x, 0) = 0$.

5.2 The problem of 5.1 except, the initial pressure $p_j(x, 0) = \phi_j(x)$.
5.3 The problem of 5.1 except, at $x = a_N$, $p(a_N, t) = \psi_N(t)$. The initial pressure $p_j(x, 0) = \phi_j(x)$.

5.4 The problem of 5.1 except, at $x = a_N$, $\frac{\partial p(a_N, t)}{\partial x} + \lambda_N p(a_N, t) = -\left(\frac{\mu}{k}\right)\psi_{a_N}(t)$. The initial pressure $p_j(x, 0) = \varphi_j(x)$.

5.5 The problem of 5.1 except, $a_N \to \infty$, that is, the last medium is semi-infinite. The initial pressure $p_j(x, 0) = \phi_j(x)$.

5.6 The problem of 5.1 except, at $x = a_0 =$, $p(a_0, t) = \psi_0(t)$ and at $x = a_N$, and at $x = a_N$, $\frac{\partial p(a_N, t)}{\partial x} = -\left(\frac{\mu}{k}\right)\psi_{a_N}(t)$. The inital pressure $p_j(x, 0) = \varphi_j(x)$.

5.7 The problem of 5.1 except, at $x = a_0$, $p(a_0, t) = \psi_0(t)$ and at $x = a_N$, $p(a_N, t) = \psi_N(t)$. The initial pressure $p_j(x, 0) = \phi_j(x)$.

5.8 The problem of 5.1 except, at $x = a_0$, $p(a_0, t) = \psi_0(t)$ and at $x = a_N$, $\frac{\partial p(a_N, t)}{\partial x} + \lambda_N p(a_N, t) = -\left(\frac{\mu}{k}\right)\psi_{a_N}(t)$. The initial pressure $p_j(x, 0) = \varphi_j(x)$.

5.9 The problem of 5.1 except, at $x = a_0$, $p(a_0, t) = \psi_0(t)$ and $a_N \to \infty$, that is, the last medium is semi-infinite. The initial pressure $p_j(x, 0) = \phi_j(x)$.

5.10 The problem of 5.1 except, at $x = a_0$, $\frac{\partial p(0, t)}{\partial x} - \lambda_0 p(0, t) = -\left(\frac{\mu}{k}\right)\psi_0(t)$ and at $x = a_N$, $\frac{\partial p(a_N, t)}{\partial x} = -\left(\frac{\mu}{k}\right)\psi_{a_N}(t)$. The initial pressure $p_j(x, 0) = \varphi_j(x)$.

5.11 The problem of 5.1 except, at $x = a_0$, $\frac{\partial p(0, t)}{\partial x} - \lambda_0 p(0, t) = -\left(\frac{\mu}{k}\right)\psi_0(t)$ and at $x = a_N$, $p(a_N, t) = \psi_N(t)$. The initial pressure $p_j(x, 0) = \varphi_j(x)$.

5.12 The problem of 5.1 except, at $x = a_0$, $\frac{\partial p(0, t)}{\partial x} - \lambda_0 p(0, t) = -\left(\frac{\mu}{k}\right)\psi_0(t)$ and at $x = a_N$, $\frac{\partial p(a_N, t)}{\partial x} + \lambda_N p(a_N, t) = -\left(\frac{\mu}{k}\right)\psi_{a_N}(t)$. The initial pressure $p_j(x, 0) = \varphi_j(x)$.

| Mathematical Operations of Special Functions |
|---|

5.13 The problem of 5.1 except, at $x = a_0$, $\dfrac{\partial p(0, t)}{\partial x} - \lambda_0 p(0, t) = -\left(\dfrac{\mu}{k}\right)\psi_0(t)$ and $a_N \to \infty$, that is, the last medium is semi-infinite. The initial pressure $p_j(x, 0) = \varphi_j(x)$.

6 Semi-infinite quadrant 6.1 The medium is bounded by the planes $x = 0$ and $y = 0$; x and y extend to $\infty$ the directions of x positive and y positive. At $x = 0$, $p(0, y, t) = 0$, $y > 0$, $t > 0$ and at $y = 0$, $p(x, 0, t) = 0$, $x > 0$, $t > 0$. p tend to zero as $x \to \infty$ and $y \to \infty$. The initial pressure $p(x, y, 0) = 0$.

6.2 The problem of 6.1 except, $p(x, y, 0) = \phi(x, y)$; $\phi(x, y)$ and its derivatives with respect to x and y tend to zero as $x \to \infty$ and $y \to \infty$ respectively.

6.3 The problem of 6.1 except, $p(x, y, 0) = p_I$ a constant for all $x > 0$ and $y > 0$.

6.4 The problem of 6.1, except for all $t > 0$, $p(0, y, t) = \psi_y(y, t)$, $y > 0$ and $p(x, 0, t) = \psi_x(x, t)$, $x > 0$. The initial pressure $p(x, y, 0) = \phi(x, y)$; $\phi(x, y)$ and its derivatives with respect to x and y tend to zero as $x \to \infty$ and $y \to \infty$ respectively.

6.5 The problem of 6.4, except, $p(x, y, 0) = p_I$ a constant for all $x > 0$ and $y > 0$.

6.6 The problem of 6.1, except, $\dfrac{\partial p(x, 0, t)}{\partial y} = 0$ and $p(0, y, t) = 0$. The initial pressure is zero.

6.7 The problem of 6.6, except, $p(x, y, 0) = \phi(x, y)$; $\phi(x, y)$ and its derivatives with respect to x and y tend to zero as $x \to \infty$ and $y \to \infty$ respectively.

6.8 The problem of 6.6, except, $p(x, y, 0) = p_I$ a constant for all $x > 0$ and $y > 0$.

6.9 The problem of 6.6, except for all $t > 0$, $\dfrac{\partial p(x, 0, t)}{\partial y} = -\left(\dfrac{\mu}{k_y}\right)\psi_x(x, t)$, $x > 0$ and $p(0, y, t) = \psi_y(y, t)$, $y > 0$. The initial pressure $p(x, y, 0) = \varphi(x, y)$; $\varphi(x, y)$ and its derivatives with respect to x and y tend to zero as $x \to \infty$ and $y \to \infty$ respectively.

6.10 The problem of 6.9, except, $p(x, y, 0) = p_I$ a constant for all $x > 0$ and $y > 0$.

6.11 The problem of 6.1, except, $\dfrac{\partial p(x, 0, t)}{\partial y} - \lambda p(x, 0, t) = 0$ and $p(0, y, t) = 0$. The initial pressure is zero.

6.12 The problem of 6.11, except, $p(x, y, 0) = \phi(x, y)$; $\phi(x, y)$ and its derivatives with respect to x and y tend to zero as $x \to \infty$ and $y \to \infty$ respectively.

6.13 The problem of 6.11, except, $p(x, y, 0) = p_I$ a constant for all $x > 0$ and $y > 0$.

6.14 The problem of 6.11, except for all $t > 0$, $\dfrac{\partial p(x, 0, t)}{\partial y} - \lambda p(x, 0, t) = -\left(\dfrac{\mu}{k_y}\right)\psi_x(x, t)$, $x > 0$ and $p(0, y, t) = \psi_y(y, t)$, $y > 0$. The initial pressure $p(x, y, 0) = \varphi(x, y)$; $\varphi(x, y)$ and its derivatives with respect to x and y tend to zero as $x \to \infty$ and $y \to \infty$ respectively.

6.15 The problem of 6.11, except at $t = 0$, $p(x, y, 0) = p_I$ a constant for all $x > 0$ and $y > 0$.

6.16 The problem of 6.1, except, at $x = 0$, $\dfrac{\partial p(0, y, t)}{\partial x} = 0$ and at $y = 0$, $\dfrac{\partial p(x, 0, t)}{\partial y} = 0$. The initial pressure is zero.

6.17 The problem of 6.16, except, $p(x, y, 0) = \phi(x, y)$; $\phi(x, y)$ and its derivatives with respect to x and y tend to zero as $x \to \infty$ and $y \to \infty$ respectively.

6.18 The problem of 6.16, except, $p(x, y, 0) = p_I$ a constant for all $x > 0$ and $y > 0$.

6.19 The problem of 6.16, except for all $t > 0$, $\dfrac{\partial p(0, y, t)}{\partial x} = -\left(\dfrac{\mu}{k_x}\right)\psi_y(y, t)$, $y > 0$ and $\dfrac{\partial p(x, 0, t)}{\partial y} = -\left(\dfrac{\mu}{k_y}\right)\psi_x(x, t)$, $x > 0$. The initial pressure $p(x, y, 0) = \varphi(x, y)$; $\varphi(x, y)$ and its derivatives with respect to x and y tend to zero as $x \to \infty$ and $y \to \infty$ respectively.

6.20 The problem of 6.16, except, $p(x, y, 0) = p_I$ a constant for all $x > 0$ and $y > 0$.

6.21 The problem of 6.1, except, $\dfrac{\partial p(0, y, t)}{\partial x} = 0$ and at $y = 0$, $\dfrac{\partial p(x, 0, t)}{\partial y} - \lambda p(x, 0, t) = 0$. The initial pressure is zero.

-continued

| Mathematical Operations of Special Functions |
|---|

| | |
|---|---|
| 6.22 | The problem of 6.23, except, $p(x, y, 0) = \phi(x, y)$; $\phi(x, y)$ and its derivatives with respect to x and y tend to zero as $x \to \infty$ and $y \to \infty$ respectively. |
| 6.23 | The problem of 6.23, except, $p(x, y, 0) = p_I$ a constant for all $x > 0$ and $y > 0$. |
| 6.24 | The problem of 6.21, except for all $t > 0$, $\dfrac{\partial p(0, y, t)}{\partial x} = -\left(\dfrac{\mu}{k_s}\right)\psi_y(y, t), y > 0$ and $\dfrac{\partial p(x, 0, t)}{\partial y} - \lambda p(x, 0, t) = -\left(\dfrac{\mu}{k_y}\right)\psi_x(x, t), x > 0$. The initial pressure $p(x, y, 0) = \varphi(x, y)$; $\varphi(x, y)$ and its derivatives with respect to x and y tend to zero as $x \to \infty$ and $y \to \infty$ respectively. |
| 6.25 | The problem of 6.24, except at $t = 0$, $p(x, y, 0) = p_I$ a constant for all $x > 0$ and $y > 0$. |
| 6.26 | The problem of 6.1, except, at $x = 0$, $\dfrac{\partial p(0, y, t)}{\partial x} - \lambda_x p(0, y, t) = 0$ and at $y = 0$, $\dfrac{\partial p(x, 0, t)}{\partial y} - \lambda_y p(x, 0, t) = 0$. The initial pressure is zero. |
| 6.27 | The problem of 6.26, except, $p(x, y, 0) = \phi(x, y)$; $\phi(x, y)$ and its derivatives with respect to x and y tend to zero as $x \to \infty$ and $y \to \infty$ respectively. |
| 6.28 | The problem of 6.26, except, $p(x, y, 0) = p_I$ a constant for all $x > 0$ and $y > 0$. |
| 6.29 | The problem of 6.26, except for all $t > 0$, $\dfrac{\partial p(0, y, t)}{\partial x} - \lambda_x p(0, y, t) = -\left(\dfrac{\mu}{k_z}\right)\psi_y(y, t), y > 0$ and $\dfrac{\partial p(x, 0, t)}{\partial y} - \lambda_y p(x, 0, t) = -\left(\dfrac{\mu}{k_y}\right)\psi_x(x, t), x > 0$. The initial pressure $p(x, y, 0) = \varphi(x, y)$; $\varphi(x, y)$ and its derivatives with respect to x and y tend to zero as $x \to \infty$ and $y \to \infty$ respectively. |
| 6.30 | The problem of 6.26, except, $p(x, y, 0) = p_I$ a constant for all $x > 0$ and $y > 0$. |
| 7 Semi-infinite lamella | |
| 7.1 | The medium is bounded by the planes $x = 0$, $y = 0$ and $y = b$; $x \to \infty$ in the direction of x positive. $p(0, y, t) = 0$, for $0 < y < b$, $t > 0$ and $p(x, 0, t) = p(x, b, t) = 0$, for all $x > 0, t > 0$. p tend to zero as $x \to \infty$. The initial pressure is zero. |
| 7.2 | The problem of 7.1, except at $t = 0$, $p(x, y, 0) = \phi(x, y)$; $\phi(z, y)$ and its derivative with respect to x tend to zero as $x \to \infty$. |
| 7.3 | The problem of 7.2, except, $p(x, y, 0) = p_I$; $p_I$ a constant for all $x > 0$, $0 < y < b$. |
| 7.4 | The problem of 7.1, except, $t > 0$, $0 < y < b$, $p(0, y, t) = \psi_y(y, t)$ and $x > 0$, $p(x, 0, t) = \psi_{x0}(x, t)$, $p(x, b, t) = \psi_{xb}(x, t)$. The initial pressure $p(x, y, 0) = \phi(x, y)$; $\phi(x, y)$ and its derivative with respect to x tend to zero as $x \to \infty$. |
| 7.5 | The problem of 7.4, except at $t = 0$, $p(x, y, 0) = p_I$; $p_I$, a constant for all $x > 0$, $0 < y < b$. |
| 7.6 | The problem of 7.1, except, $\dfrac{\partial p(x, 0, t)}{\partial y} = -\left(\dfrac{\mu}{k_y}\right)\psi_{x0}(x, t)$, $p(x, b, t) = \psi_{xb}(x, t)$, and $p(0, y, t) = \psi_y(y, t)$. The initial pressure $p(x, y, 0) = \varphi(x, y)$; $\varphi(x, y)$ and its derivative with respect to x tend to zero as $x \to \infty$. |
| 7.7 | The problem of 7.6, except, the initial pressure $p(x, y, 0) = p_I$, a constant. |
| 7.8 | The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $p(x, b, t) = \psi_{xb}(x, t)$, and $p(0, y, t) = \psi_y(y, t)$. The initial pressure $p(x, y, 0) = \varphi(x, y)$; $\varphi(x, y)$ and its derivative with respect to x tend to zero as $x \to \infty$. |
| 7.9 | The problem of 7.8, except, $p(x, y, 0) = p_I$, a constant. |
| 7.10 | The problem of 7.1, except, $p(x, 0, t) = \psi_{x0}(x, t)$, $\dfrac{\partial p(x, b, t)}{\partial y} = -\left(\dfrac{\mu}{k_y}\right)\psi_{xb}(x, t)$, and $p(0, y, t) = \psi_y(y, t)$. The initial pressure $p(x, y, 0) = \varphi(x, y)$; $\varphi(x, y)$ and its derivative with respect to x tend to zero as $x \to \infty$. |

-continued

| | Mathematical Operations of Special Functions |
|---|---|
| 7.11 | The problem of 7.10, except, $p(x, y, 0) = p_I$, a constant. |
| 7.12 | The problem of 7.1, except, $\dfrac{\partial p(x, 0, t)}{\partial y} = -\left(\dfrac{\mu}{k_y}\right)\psi_{x0}(x, t)$, $\dfrac{\partial p(x, b, t)}{\partial y} = -\left(\dfrac{\mu}{k_y}\right)\psi_{xb}(x, t)$ and $p(0, y, t) = \psi_y(y, t)$. The initial pressure $p(x, y, 0) = \varphi(x, y)$; $\varphi(x, y)$ and its derivative with respect to x tend to zero as $x \to \infty$. |
| 7.13 | The problem of 7.12, except $p(x, y, 0) = p_I$, a constant. |
| 7.14 | The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $\dfrac{\partial p(x, b, t)}{\partial y} = -\left(\dfrac{\mu}{k_y}\right)\psi_{xb}(x, t)$ and $p(0, y, t) = \psi_y(y, t)$. The initial pressure $(x, y, 0) = \varphi(x, y)$; $\varphi(x, y)$ and its derivative with respect to x tend to zero as $x \to \infty$. |
| 7.15 | The problem of 7.14, except $p(x, y, 0) = p_I$, a constant. |
| 7.16 | The problem of 7.1, except, $p(x, 0, t) = \psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$, and $p(0, y, t) = \psi_y(y, t)$. The initial pressure $p(x, y, 0) = \varphi(x, y)$; $\varphi(x, y)$ and its derivative with respect to x tend to zero as $x \to \infty$. |
| 7.17 | The problem of 7.16, except $p(x, y, 0) = p_I$, a constant. |
| 7.18 | The problem of 7.1, except, $\dfrac{\partial p(x, 0, t)}{\partial y} = -\left(\dfrac{\mu}{k_y}\right)\psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$ and $p(0, y, t) = \psi_y(y, t)$. The initial pressure $p(x, y, 0) = \varphi(x, y)$; $\varphi(x, y)$ and its derivative with respect to x tend to zero as $x \to \infty$. |
| 7.19 | The problem of 7.18, except $p(x, y, 0) = p_I$, a constant. |
| 7.20 | The problem of 7.1, except, $\dfrac{\partial p(x, 0, t)}{\partial y} = -\lambda_{x0} p(x, 0, t) = -\left(\dfrac{\mu}{k_y}\right)\psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$ and $p(0, y, t) = \psi_y(y, t)$. The initial pressure $(x, y, 0) = \varphi(x, y)$; $\varphi(x, y)$ and its derivative with respect to x tend to zero as $x \to \infty$. |
| 7.21 | The problem of 7.20, except $p(x, y, 0) = p_I$, a constant. |
| 7.22 | The problem of 7.1, except, $\dfrac{\partial p(x, 0, t)}{\partial y} = -\left(\dfrac{\mu}{k_y}\right)\psi_y(y, t)$, $p(x, 0, t) = \psi_{x0}(x, t)$ and $p(x, b, t) = \psi_{xb}(x, t)$. The initial pressure $p(x, y, 0) = \varphi(x, y)$; $\varphi(x, y)$ and its derivative with respect to x tend to zero as $x \to \infty$. |
| 7.23 | The problem of 7.22, except $p(x, y, 0) = p_I$, a constant. |
| 7.24 | The problem of 7.1, except, $\dfrac{\partial p(x, 0, t)}{\partial y} = -\left(\dfrac{\mu}{k_y}\right)\psi_{x0}(x, t)$, $p(x, b, t) = \psi_{xb}(x, t)$, and $\dfrac{\partial p(0, y, t)}{\partial x} = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |
| 7.25 | The problem of 7.24, except $p(x, y, 0) = p_I$ a constant. |
| 7.26 | The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $p(x, b, t) = \psi_{xb}(x, t)$, and $\dfrac{\partial p(0, y, t)}{\partial x} = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |

| Mathematical Operations of Special Functions |
|---|

| | |
|---|---|
| 7.27 | The problem of 7.26, except $p(x, y, 0) = p_I$, a constant. |
| 7.28 | The problem of 7.1, except, $p(x, 0, t) = \psi_{x0}(x, t)$, $\dfrac{\partial p(x, b, t)}{\partial y} = -\left(\dfrac{\mu}{k_y}\right)\psi_{xb}(x, t)$, and $\dfrac{\partial p(0, y, t)}{\partial x} = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |
| 7.29 | The problem of 7.28, except $p(x, y, 0) = p_I$, a constant. |
| 7.30 | The problem of 7.1, except, $\dfrac{\partial p(x, 0, t)}{\partial y} = -\left(\dfrac{\mu}{k_y}\right)\psi_{x0}(x, t)$, $\dfrac{\partial p(x, b, t)}{\partial y} = -\left(\dfrac{\mu}{k_y}\right)\psi_{xb}(x, t)$, and $\dfrac{\partial p(0, y, t)}{\partial x} = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |
| 7.31 | The problem of 7.30, except $p(x, y, 0) = p_I$, a constant. |
| 7.32 | The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $\dfrac{\partial p(x, b, t)}{\partial y} = -\left(\dfrac{\mu}{k_z}\right)\psi_{xb}(y, t)$, and $\dfrac{\partial p(0, y, t)}{\partial x} = -\left(\dfrac{\mu}{k_z}\right)\psi_y(x, t)$, The initial pressure $p(x, y, 0) = \varphi(x, y)$; $\varphi(x, y)$ and its derivative with respect to x tend to zero as $x \to \infty$. |
| 7.33 | The problem of 7.32, except $p(x, y, 0) = p_I$, a constant. |
| 7.34 | The problem of 7.1, except, $p(x, 0, t) = \psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$, and $\dfrac{\partial p(0, y, t)}{\partial x} = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |
| 7.35 | The problem of 7.34, except $p(x, y, 0) = p_I$, a constant. |
| 7.36 | The problem of 7.1, except, $\dfrac{\partial p(x, 0, t)}{\partial y} = -\left(\dfrac{\mu}{k_y}\right)\psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$, and $\dfrac{\partial p(0, y, t)}{\partial x} = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |
| 7.37 | The problem of 7.36, except $p(x, y, 0) = p_I$, a constant. |
| 7.38 | The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $\dfrac{\partial p(x, b, t)}{\partial y} = -\left(\dfrac{\mu}{k_z}\right)\psi_{xb}(y, t)$, and $\dfrac{\partial p(0, y, t)}{\partial x} = -\left(\dfrac{\mu}{k_z}\right)\psi_y(x, t)$, The initial pressure $p(x, y, 0) = \varphi(x, y)$; $\varphi(x, y)$ and its derivative with respect to x tend to zero as $x \to \infty$. |
| 7.39 | The problem of 7.38, except $p(x, y, 0) = p_I$, a constant. |
| 7.40 | The problem of 7.1, except, $p(x, 0, t) = \psi_{x0}(x, t)$, $p(x, b, t) = \psi_{xb}(x, t)$, and $\dfrac{\partial p(0, y, t)}{\partial x} = \lambda_y p(0, y, t) = -\left(\dfrac{\mu}{k_z}\right)\psi_y(y, t)$. The initial pressure $p(x, y, 0) = \varphi(x, y)$; $\varphi(x, y)$ and and its derivative with respect to x tend to zero as $x \to \infty$. |
| 7.41 | The problem of 7.40, except $p(x, y, 0) = p_I$, a constant. |
| 7.42 | The problem of 7.1, except, $\dfrac{\partial p(x, 0, t)}{\partial y} = -\left(\dfrac{\mu}{k_y}\right)\psi_{x0}(x, t)$, $p(x, b, t) = \psi_{xb}(x, t)$, and $\dfrac{\partial p(0, y, t)}{\partial x} - \lambda_y p(0, y, t) = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$. |

| | -continued |
|---|---|
| | Mathematical Operations of Special Functions |

7.43     The problem of 7.42, except $p(x, y, 0) = p_I$, a constant.

7.44     The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $p(x, b, t) = \psi_{xb}(x, t)$, and $\dfrac{\partial p(0, y, t)}{\partial x} - \lambda_y p(0, y, t) = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$.

7.45     The problem of 7.44, except $p(x, y, 0) = p_I$, a constant.

7.46     The problem of 7.1, except, $p(x, 0, t) = \psi_{x0}(x, t)$, $\dfrac{\partial p(x, b, t)}{\partial y} = -\left(\dfrac{\mu}{k_y}\right)\psi_{xb}(x, t)$, and $\dfrac{\partial p(0, y, t)}{\partial x} - \lambda_y p(0, y, t) = -\left(\dfrac{\mu}{k_z}\right)\psi_y(y, t)$. The initial pressure $p(x, y, 0) = \varphi(x, y)$; $\varphi(x, y)$ and its derivative with respect to x tend to zero as $x \to \infty$.

7.47     The problem of 7.46, except $p(x, y, 0) = p_I$, a constant.

7.48     The problem of 7.1, except, $\dfrac{\partial p(x, 0, t)}{\partial y} = -\left(\dfrac{\mu}{k_y}\right)\psi_{x0}(x, t)$, $\dfrac{\partial p(x, b, t)}{\partial y} = -\left(\dfrac{\mu}{k_y}\right)\psi_{xb}(x, t)$, and $\dfrac{\partial p(0, y, t)}{\partial x} - \lambda_y p(0, y, t) = -\left(\dfrac{\mu}{k_z}\right)\psi_y(y, t)$. The initial pressure $p(x, y, 0) = \varphi(x, y)$; $\varphi(x, y)$ and derivative with respect to x tend to zero as $x \to \infty$.

7.49     The problem of 7.48, except $p(x, y, 0) = p_I$, a constant.

7.50     The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $\dfrac{\partial p(x, b, t)}{\partial y} = -\left(\dfrac{\mu}{k_y}\right)\psi_{xb}(x, t)$, and $\dfrac{\partial p(0, y, t)}{\partial x} - \lambda_y p(0, y, t) = -\left(\dfrac{\mu}{k_z}\right)\psi_y(y, t)$. The initial pressure The initial pressure $p(x, y, 0) = \varphi(x, y)$; $\varphi(x, y)$ and derivative with respect to x tend to zero as $x \to \infty$.

7.51     The problem of 7.50, except $p(x, y, 0) = p_I$, a constant.

7.52     The problem of 7.1, except, $p(x, 0, t) = \psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$, and $\dfrac{\partial p(0, y, t)}{\partial x} - \lambda_y p(0, y, t) = -\left(\dfrac{\mu}{k_z}\right)\psi_y(y, t)$.

The initial pressure $p(x, y, 0) = \varphi(x, y)$; $\varphi(x, y)$ and derivative with respect to x tend to zero as $x \to \infty$.

7.53     The problem of 7.52, except $p(x, y, 0) = p_I$, a constant.

7.54     The problem of 7.1, except, $\dfrac{\partial p(x, 0, t)}{\partial y} = -\left(\dfrac{\mu}{k_y}\right)\psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$, and $\dfrac{\partial p(0, y, t)}{\partial x} - \lambda_y p(0, y, t) = -\left(\dfrac{\mu}{k_z}\right)\psi_y(y, t)$.

The initial pressure $p(x, y, 0) = \varphi(x, y)$; $\varphi(x, y)$ and derivative with respect to x tend to zero as $x \to \infty$.

7.55     The problem of 7.54, except $p(x, y, 0) = p_I$, a constant.

7.56     The problem of 7.1, except, $\dfrac{\partial p(x, 0, t)}{\partial y} - \lambda_{x0} p(x, 0, t) = -\left(\dfrac{\mu}{k_y}\right)\psi_{x0}(x, t)$, $\dfrac{\partial p(x, b, t)}{\partial y} + \lambda_{xb} p(x, b, t) = -\left(\dfrac{\mu}{k_y}\right)\psi_{xb}(x, t)$, and $\dfrac{\partial p(0, y, t)}{\partial x} - \lambda_y p(0, y, t) = -\left(\dfrac{\mu}{k_z}\right)\psi_y(y, t)$. The initial pressure $p(x, y, 0) = \varphi(x, y)$; $\varphi(x, y)$ and derivative with respect to x tend to zero as $x \to \infty$.

| -continued |
|---|
| Mathematical Operations of Special Functions |

7.57  The problem of 7.1, except, $p(x, y, 0,) = p_I$, a constant.

8 Rectangle 8.1 The medium is bounded by the planes $x = 0$, $x = a$, $y = 0$ and $y = b$. $p(0, y, t) = 0$ and $p(a, y, t) = 0$ for $0 < y < b$. $p(x, 0, t) = 0$ and $p(x, b, t) = 0$ for $0 < x < a$, $t > 0$. The initial pressure is zero.

8.2 The problem of 8.1, except at $t = 0$, $p(x, y, 0) = \phi(x, y)$; $\phi(x, y)$ an arbitary function of x and y, $0 < x < a$ and $0 < y < b$.

8.3 The medium is bounded by the planes $x = 0$, $x = a$, $y = 0$ and $y = b$. $p(0, y, t) = \psi_{y0}(y, t)$ and $p(a, y, t) = \psi_{ya}(y, t)$ for $0 < y < b$. $p(x, 0, t) = \psi_{x0}(x, t)$ and $p(x, b, t) = \psi_{xb}(x, t)$ for $0 < x < a$, $t > 0$. The initial pressure $p(x, y, 0) = \phi(x, y)$.

8.4 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $p(x, 0, t) = \psi_{x0}(x, t)$, and $p(x, b, t) = \psi_{xb}(x, t)$. The initial pressure $p(x, y, 0) = \varphi(x, y)$.

8.5 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $p(x, 0, t) = \psi_{x0}(x, t)$ and $p(x, b, t) = \psi_{xb}(x, t)$. The initial pressure $p(x, y, 0) = \varphi(x, y)$.

8.6 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $p(x, 0, t) = \psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.7 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $p(x, 0, t) = \psi_{x0}(x, t)$, and $\dfrac{\partial p(x, b, t)}{\partial y} + \lambda_{xb} p(x, b, t) = -\left(\dfrac{\mu}{k_y}\right)\psi_{xb}(x, t)$. The initial pressure $p(x, y, 0) = \varphi(x, y)$.

8.8 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $p(x, 0, t) = \psi_{x0}(x, t)$ and $\dfrac{\partial p(x, b, t)}{\partial y} + \lambda_{xb} p(x, b, t) = -\left(\dfrac{\mu}{k_y}\right)\psi_{xb}(x, t)$. The initial pressure $p(x, y, 0) = \varphi(x, y)$.

8.9 The problem of 8.3, except, $p(0, y, t) = \psi_{y0}(y, t)$, $p(a, y, t) = \psi_{ya}(y, t)$, $\dfrac{\partial p(x, 0, t)}{\partial y} = -\left(\dfrac{\mu}{k_y}\right)\psi_{x0}(x, t)$, and $p(x, b, t) = \psi_{xb}(x, t)$. The initial pressure $p(x, y, 0) = \varphi(x, y)$.

8.10 The problem of 8.3, except, $p(0, y, t) = \psi_{y0}(y, t)$, $\dfrac{\partial p(a, y, t)}{\partial x} = \left(\dfrac{\mu}{k_y}\right)\psi_{ya}(y, t)$, $\dfrac{\partial p(x, 0, t)}{\partial y} = -\left(\dfrac{\mu}{k_y}\right)\psi_{x0}(x, t)$, and $p(x, b, t) = \psi_{xb}(x, t)$. The initial pressure $p(x, y, 0) = \varphi(x, y)$.

8.11 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} = -\left(\dfrac{\mu}{k_y}\right)\psi_{x0}(x, t)$, and $p(x, b, t) = \psi_{xb}(x, t)$. The initial pressure $p(x, y, 0) = \varphi(x, y)$.

8.12 The problem of 8.3, except, $p(0, y, t) = \psi_{y0}(y, t)$, $p(a, y, t) = \psi_{ya}(y, t)$, $\dfrac{\partial p(x, 0, t)}{\partial y} = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.13 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $\dfrac{\partial p(x, 0, t)}{\partial y} = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

-continued

| Mathematical Operations of Special Functions |
| --- |

8.14 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.15 The problem of 8.3, except, $p(0, y, t) = \psi_{y0}(y, t)$, $p(a, y, t) = \psi_{ya}(y, t)$, $\dfrac{\partial p(x, 0, t)}{\partial y} = -\left(\dfrac{\mu}{k_y}\right)\psi_{x0}(x, t)$, and $\dfrac{\partial p(x, b, t)}{\partial y} + \lambda_{xb} p(x, b, t) = -\left(\dfrac{\mu}{k_y}\right)\psi_{xb}(x, t)$. The initial pressure $p(x, y, 0) = \varphi(x, y)$.

8.16 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $\dfrac{\partial p(x, 0, t)}{\partial y} = \left(\dfrac{\mu}{k_y}\right)\psi_{x0}(x, t)$, and $\dfrac{\partial p(x, b, t)}{\partial y} + \lambda_{xb} p(x, b, t) = \left(\dfrac{\mu}{k_y}\right)\psi_{xb}(x, t)$. The initial pressure $p(x, y, 0) = \varphi(x, y)$.

8.17 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.18 The problem of 8.3, except, $p(0, y, t) = \psi_{y0}(y, t)$, $\lambda_{ya} p(a, y, t) = \psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $p(x, b, t) = \psi_{xb}(y, t)$. The initial pressure $p(x, y, 0) = \varphi(x, y)$.

8.19 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $p(x, b, t) = \psi_{xb}(y, t)$. The initial pressure $p(x, y, 0) = \varphi(x, y)$.

8.20 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $p(x, b, t) = \psi_{xb}(y, t)$. The initial pressure $p(x, y, 0) = \varphi(x, y)$.

8.21 The problem of 8.3, except, $p(0, y, t) = \psi_{y0}(y, t)$, $p(a, y, t) = \psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.22 The problem of 8.3, except, $p(0, y, t) = \psi_{y0}(y, t)$, $\dfrac{\partial p(a, y, t)}{\partial x} = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.23 The problem of 8.3, except, $p(0, y, t) = \psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

| Mathematical Operations of Special Functions |
| --- |

8.24 The problem of 8.3, except, $p(0, y, t) = \psi_{y0}(y, t)$, $p(a, y, t) = \psi_{ya}(y, t)$, $$\frac{\partial p(x, 0, t)}{\partial y} - \lambda_{x0} p(x, 0, t) = -\left(\frac{\mu}{k_y}\right)\psi_{x0}(x, t), \text{ and } \frac{\partial p(x, b, t)}{\partial y} + \lambda_{xb} p(x, b, t) =$$

$-\left(\frac{\mu}{k_y}\right)\psi_{xb}(x, t)$. The initial pressure $p(x, y, 0) = \varphi(x, y)$.

8.25 The problem of 8.3, except, $p(0, y, t) = \psi_{y0}(y, t)$, $\frac{\partial p(a, y, t)}{\partial x} = -\left(\frac{\mu}{k_z}\right)\psi_{ya}(y, t)$, $$\frac{\partial p(x, 0, t)}{\partial y} - \lambda_{x0} p(x, 0, t) = -\left(\frac{\mu}{k_y}\right)\psi_{x0}(x, t), \text{ and } \frac{\partial p(x, b, t)}{\partial y} + \lambda_{xb} p(x, b, t) =$$

$-\left(\frac{\mu}{k_y}\right)\psi_{xb}(x, t)$. The initial pressure $p(x, y, 0) = \varphi(x, y)$.

8.26 The problem of 8.3, except, $p(0, y, t) = \psi_{y0}(y, t)$, $\frac{\partial p(a, y, t)}{\partial x} + \lambda_{ya} p(a, y, t) = -\left(\frac{\mu}{k_z}\right)\psi_{ya}(y, t)$, $$\frac{\partial p(x, 0, t)}{\partial y} - \lambda_{x0} p(x, 0, t) = -\left(\frac{\mu}{k_y}\right)\psi_{x0}(x, t), \text{ and } \frac{\partial p(x, b, t)}{\partial y} + \lambda_{xb} p(x, b, t) = -\left(\frac{\mu}{k_y}\right)\psi_{xb}(x, t).$$

The initial pressure $p(x, y, 0) = \varphi(x, y)$.

8.27 The problem of 8.3, except, $\frac{\partial p(0, y, t)}{\partial x} = -\left(\frac{\mu}{k_z}\right)\psi_{y0}(y, t)$, $p(a, y, t) = \psi_{ya}(y, t)$, $$\frac{\partial p(x, 0, t)}{\partial y} = -\left(\frac{\mu}{k_y}\right)\psi_{x0}(x, t), \text{ and } p(x, b, t) = \psi_{xb}(y, t).$$

The initial pressure $p(x, y, 0) = \varphi(x, y)$.

8.28 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} = -\left(\frac{\mu}{k_z}\right)\psi_{ya}(y, t)$, $$\frac{\partial p(x, 0, t)}{\partial y} = -\left(\frac{\mu}{k_y}\right)\psi_{x0}(x, t), \text{ and } p(x, b, t) = \psi_{xb}(y, t).$$

The initial pressure $p(x, y, 0) = \varphi(x, y)$.

8.29 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} + \lambda_{ya} p(a, y, t) =$ $-\left(\frac{\mu}{k_z}\right)\psi_{ya}(y, t)$, $\frac{\partial p(x, 0, t)}{\partial y} = -\left(\frac{\mu}{k_y}\right)\psi_{x0}(x, t)$, and $p(x, b, t) = \psi_{xb}(y, t)$.

The initial pressure $p(x, y, 0) = \varphi(x, y)$.

8.30 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} = -\left(\frac{\mu}{k_z}\right)\psi_{ya}(y, t)$, $$\frac{\partial p(x, 0, t)}{\partial y} = -\left(\frac{\mu}{k_y}\right)\psi_{x0}(x, t), \text{ and } \frac{\partial p(x, b, t)}{\partial y} = -\left(\frac{\mu}{k_y}\right)\psi_{xb}(x, t),$$

The initial pressure $p(x, y, 0) = \varphi(x, y)$.

8.31 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} + \lambda_{ya} p(a, y, t) =$ $-\left(\frac{\mu}{k_z}\right)\psi_{ya}(y, t)$, $\frac{\partial p(x, 0, t)}{\partial y} = -\left(\frac{\mu}{k_y}\right)\psi_{x0}(x, t)$, and $\frac{\partial p(x, b, t)}{\partial y} = -\left(\frac{\mu}{k_y}\right)\psi_{xb}(x, t)$.

The initial pressure $p(x, y, 0) = \varphi(x, y)$.

8.32 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} + \lambda_{ya} p(a, y, t) =$ $-\left(\frac{\mu}{k_z}\right)\psi_{ya}(y, t)$, $\frac{\partial p(x, 0, t)}{\partial y} = -\left(\frac{\mu}{k_y}\right)\psi_{x0}(x, t)$, and $\frac{\partial p(x, b, t)}{\partial y} + \lambda_{xb} p(x, b, t) = -\left(\frac{\mu}{k_y}\right)\psi_{xb}(x, t)$.

The initial pressure $p(x, y, 0) = \varphi(x, y)$.

8.33 The problem of 8.3, except, $\frac{\partial p(0, y, t)}{\partial x} = -\left(\frac{\mu}{k_z}\right)\psi_{y0}(y, t)$, $p(a, y, t) = \psi_{ya}(y, t)$, $$\frac{\partial p(x, 0, t)}{\partial y} - \lambda_{x0} p(x, 0, t) = -\left(\frac{\mu}{k_y}\right)\psi_{x0}(x, t), \text{ and } p(x, b, t) = \psi_{xb}(y, t).$$

The initial pressure $p(x, y, 0) = \varphi(x, y)$.

-continued

| Mathematical Operations of Special Functions |

8.34 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} = -\left(\frac{\mu}{k_z}\right)\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $p(x, b, t) = \psi_{xb}(y, t)$.

The initial pressure $p(x, y, 0) = \varphi(x, y)$.

8.35 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} + \lambda_{ya}p(a, y, t) =$ $-\left(\frac{\mu}{k_z}\right)\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $p(x, b, t) = \psi_{xb}(y, t)$.

The initial pressure $p(x, y, 0) = \varphi(x, y)$.

8.36 The problem of 8.3, except, $\frac{\partial p(0, y, t)}{\partial x} = -\left(\frac{\mu}{k_z}\right)\psi_{y0}(y, t)$, $p(a, y, t) = \psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $\frac{\partial p(x, b, t)}{\partial y} = -\left(\frac{\mu}{k_y}\right)\psi_{xb}(x, t)$.

The initial pressure $p(x, y, 0) = \varphi(x, y)$.

8.37 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} = -\left(\frac{\mu}{k_z}\right)\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $\frac{\partial p(x, b, t)}{\partial y} = -\left(\frac{\mu}{k_y}\right)\psi_{xb}(x, t)$.

The initial pressure $p(x, y, 0) = \varphi(x, y)$.

8.38 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} + \lambda_{ya}p(a, y, t) =$ $-\left(\frac{\mu}{k_z}\right)\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $-\left(\frac{\mu}{k_y}\right)\psi_{xb}(x, t)$.

The initial pressure $p(x, y, 0) = \varphi(x, y)$.

8.39 The problem of 8.3, except, $\frac{\partial p(0, y, t)}{\partial x} = -\left(\frac{\mu}{k_z}\right)\psi_{y0}(y, t)$, $p(a, y, t) = \psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $\frac{\partial p(x, b, t)}{\partial y} = \lambda_{xb}p(x, b, t) =$ $-\left(\frac{\mu}{k_y}\right)\psi_{xb}(x, t)$. The initial pressure $p(x, y, 0) = \varphi(x, y)$.

8.40 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} = -\left(\frac{\mu}{k_z}\right)\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $\frac{\partial p(x, b, t)}{\partial y} = \lambda_{xb}p(x, b, t) =$ $-\left(\frac{\mu}{k_y}\right)\psi_{xb}(x, t)$. The initial pressure $p(x, y, 0) = \varphi(x, y)$.

8.41 The problem of 8.3, except, $\frac{\partial p(0, y, t)}{\partial x} = -\left(\frac{\mu}{k_z}\right)\psi_{y0}(y, t)$, $\frac{\partial p(a, y, t)}{\partial x} + \lambda_{ya}p(a, y, t) =$ $-\left(\frac{\mu}{k_z}\right)\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $\frac{\partial p(x, b, t)}{\partial y} = \lambda_{xb}p(x, b, t) =$ $-\left(\frac{\mu}{k_y}\right)\psi_{xb}(x, t)$. The initial pressure $p(x, y, 0) = \varphi(x, y)$.

8.42 The problem of 8.3, except, $\frac{\partial p(0, y, t)}{\partial x} - \lambda_{x0}p(x, 0, t) = -\left(\frac{\mu}{k_z}\right)\psi_{y0}(y, t)$, $p(a, y, t) =$ $\psi_{ya}(y, t)$, $\frac{\partial p(x, 0, t)}{\partial y} - \lambda_{x0}p(x, 0, t) = -\left(\frac{\mu}{k_y}\right)\psi_{x0}(x, t)$, and $p(x, b, t) = \psi_{xb}(y, t)$.

The initial pressure $p(x, y, 0) = \varphi(x, y)$.

-continued

Mathematical Operations of Special Functions 8.43 The problem of 8.3, except, $\dfrac{\partial p(0, y, t)}{\partial x} - \lambda_{x0} p(x, 0, t) = -\left(\dfrac{\mu}{k_z}\right)\psi_{y0}(y, t)$, $\dfrac{\partial p(a, y, t)}{\partial x} = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $p(x, b, t) = \psi_{xb}(y, t)$.

The initial pressure $p(x, y, 0) = \varphi(x, y)$.

8.44 The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $p(x, b, t) = \psi_{xb}(y, t)$. The initial pressure $p(x, y, 0) = \varphi(x, y)$.

8.45 The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t)$, $p(a, y, t) = \psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{x0}(x, t)$.

The initial pressure $p(x, y, 0) = \varphi(x, y)$.

8.46 The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t)$, $\dfrac{\partial p(a, y, t)}{\partial x} = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$ The initial pressure $p(x, y, 0) = \varphi(x, y)$.

8.47 The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t)$, $\dfrac{\partial p(a, y, t)}{\partial x} + \lambda_{ya} p(a, y, t) = -\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} = -\left(\dfrac{\mu}{k_y}\right)\psi_{xb}(x, t)$. The initial pressure $p(x, y, 0) = \varphi(x, y)$.

8.48 The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t)$, $p(a, y, t) = \psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} + \lambda_{xb} p(x, b, t) =$ $-\left(\dfrac{\mu}{k_y}\right)\psi_{xb}(x, t)$. The initial pressure $p(x, y, 0) = \varphi(x, y)$.

8.49 The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t)$, $\dfrac{\partial p(a, y, t)}{\partial x} =$ $-\left(\dfrac{\mu}{k_z}\right)\psi_{ya}(y, t)$, $\dfrac{\partial p(x, 0, t)}{\partial y} - \lambda_{x0} p(x, 0, t) = -\left(\dfrac{\mu}{k_y}\right)\psi_{x0}(x, t)$, and $\dfrac{\partial p(x, b, t)}{\partial y} + \lambda_{xb} p(x, b, t) =$ $-\left(\dfrac{\mu}{k_y}\right)\psi_{xb}(x, t)$. The initial pressure $p(x, y, 0) = \varphi(x, y)$.

| Mathematical Operations of Special Functions |
|---|

8.50     The problem of 8.3, except, $\dfrac{\partial p(0, y, t)}{\partial x} - \lambda_{y0} p(x, 0, t) = -\left(\dfrac{\mu}{k_z}\right)\psi_{y0}(y, t),$ $\dfrac{\partial p(a, y, t)}{\partial x} + \lambda_{ya} p(a, y, t) = -\left(\dfrac{\mu}{k_z}\right)\psi_{ya}(y, t), \dfrac{\partial p(x, 0, t)}{\partial y} - \lambda_{x0} p(x, 0, t) = -\left(\dfrac{\mu}{k_y}\right)\psi_{x0}(x, t),$ and $\dfrac{\partial p(x, b, t)}{\partial y} + \lambda_{xb} p(x, b, t) = -\left(\dfrac{\mu}{k_y}\right)\psi_{xb}(x, t).$ The initial pressure $p(x, y, 0) = \varphi(x, y)$.

9 Cascaded semi-infinite lamella and rectangle, including mixed boundary value problems 9.1     Cascaded semi-infinite lamella: at $x = 0$, $p_j(0, y, t) = \psi_{yj}(y, t)$, $b_j < y < b_{j+1}$, $\forall\, j = 0, 1, \ldots, N-1, t > 0.$ At $y = b_0$, $\dfrac{\partial p(x, b_0, t)}{\partial y} = -\left(\dfrac{\mu}{k_y}\right)_0 \psi_0(x, t)$ and at $y = b_N$, $\dfrac{\partial p(x, b_N, t)}{\partial y} = -\left(\dfrac{\mu}{k_y}\right)_N \psi_N(x, t).$ At the interface $y = b_j$, $\forall\, j = 1, \ldots, N-1$, $\psi_j(x, t) = -\left(\dfrac{k_y}{\mu}\right)_j \left(\dfrac{\partial p_j(x, b_j, t)}{\partial y}\right) = -\left(\dfrac{k_y}{\mu}\right)_{j-1}\left(\dfrac{\partial p_{j-1}(x, b_j, t)}{\partial y}\right)$ and $\breve{\lambda}_j \psi_j(x, t) = \{p_{j-1}(x, b_j, t) - p_j(x, b_j, t)\}.$ The initial pressure $p_j(x, y, 0) = \varphi_j(x, y)$.

9.2     The problem of 9.1, except, at $x = 0$, we have a mixed boundary condition, which is $\dfrac{\partial p_j(0, y, t)}{\partial x} = -\left(\dfrac{\mu}{k_z}\right)_j \psi_{yj}(y, t)$ for $b_j < y < b_{j+1}$, $j = 0, 1, \ldots, \breve{k}-1;$ $p_j(0, y, t) = \psi_{yj}(y, t), b_j < y < b_{j+1}, j = \breve{k}, \ldots, \breve{l}-1;$ $\dfrac{\partial p_j(0, y, t)}{\partial x} = -\left(\dfrac{\mu}{k_z}\right)_j \psi_{yj}(y, t)$ for $b_j < y < b_{j+1}$, $j = \breve{l}, \ldots, N-1; \{\breve{l} \geq \breve{k}+1\}, t > 0.$ At $y = b_0$, $\dfrac{\partial p(x, b_0, t)}{\partial y} = -\left(\dfrac{\mu}{k_y}\right)_0 \psi_0(x, t)$ and at $y = b_N$, $\dfrac{\partial p(x, b_N, t)}{\partial y} = -\left(\dfrac{\mu}{k_y}\right)_N \psi_N(x, t).$ At the interface $y = b_j$, $\forall\, j = 1, \ldots, N-1$, $\psi_j(x, t) = -\left(\dfrac{k_y}{\mu}\right)_j\left(\dfrac{\partial p_j(x, b_j, t)}{\partial y}\right) = -\left(\dfrac{k_y}{\mu}\right)_{j-1}\left(\dfrac{\partial p_{j-1}(x, b_j, t)}{\partial y}\right)$ and $\breve{\lambda}_j \psi_j(x, t) = \{p_{j-1}(x, b_j, t) - p_j(x, b_j, t)\}.$ The initial pressure $p_j(x, y, 0) = \varphi_j(x, y)$.

9.3     The problem of 9.1, except, at $x = 0$, we have a mixed boundary condition, which is $\dfrac{\partial p_j(0, y, t)}{\partial x} = -\left(\dfrac{\mu}{k_z}\right)_j \psi_{yj}(y, t)$ for $b_j < y < b_{j+1}$, $j = 0, 1, \ldots, \breve{k}-1; t > 0.$ $p_j(0, y, t) = \psi_{yj}(y, t), b_j < y < b_{j+1}, j = \breve{k}, \ldots, \breve{l}-1, t > 0.$ $\dfrac{\partial p_j(0, y, t)}{\partial x} - \lambda_{yj} p_j(0, y, t) = -\left(\dfrac{\mu}{k_z}\right)_j \psi_{yj}(y, t)$ for $b_j < y < b_{j+1}$, $j = \breve{l}, \ldots, N-1, t > 0.$ At $y = b_0$, $\dfrac{\partial p(x, b_0, t)}{\partial y} = -\left(\dfrac{\mu}{k_y}\right)_0 \psi_0(x, t)$ and at $y = b_N$, $p(x, b_N, t) = \psi_N(x, t).$ At the interface $y = b_j$, $\forall\, j = 1, \ldots, N-1$, $\psi_j(x, t) = -\left(\dfrac{k_y}{\mu}\right)_j\left(\dfrac{\partial p_j(x, b_j, t)}{\partial y}\right) = -\left(\dfrac{k_y}{\mu}\right)_{j-1}\left(\dfrac{\partial p_{j-1}(x, b_j, t)}{\partial y}\right)$ and $\breve{\lambda}_j \psi_j(x, t) = \{p_{j-1}(x, b_j, t) - p_j(x, b_j, t)\}.$ The initial pressure $p_j(x, y, 0) = \varphi_j(x, y)$.

9.4     The problem of 9.1, except, at $x = 0$, we have a mixed boundary condition, which is $p_j(0, y, t) = \psi_{yj}(y, t), b_j < y < b_{j+1}, j = \breve{k}, \ldots, t > 0.$ $\dfrac{\partial p_j(0, y, t)}{\partial x} - \lambda_{yj} p_j(0, y, t) = -\left(\dfrac{\mu}{k_z}\right)_j \psi_{yj}(y, t)$ for $b_j < y < b_{j+1}$, $j = \breve{k}, \ldots, \breve{l}-1; t > 0.$ $\dfrac{\partial p_j(0, y, t)}{\partial x} = -\left(\dfrac{\mu}{k_z}\right)_j \psi_{yj}(y, t)$ for $b_j < y < b_{j+1}$, $j = \breve{l}, \ldots, N-1, t > 0.$ At $y = b_0$, $p(x, b_0, t) = \psi_0(x, t)$ and at $y = b_N$, $p(x, b_N, t) = \psi_N(x, t).$ At the interface $y = b_j$, $\forall\, j = 1, \ldots, N-1$, $\psi_j(x, t) = -\left(\dfrac{k_y}{\mu}\right)_j\left(\dfrac{\partial p_j(x, b_j, t)}{\partial y}\right) = -\left(\dfrac{k_y}{\mu}\right)_{j-1}\left(\dfrac{\partial p_{j-1}(x, b_j, t)}{\partial y}\right)$ and $\breve{\lambda}_j \psi_j(x, t) = \{p_{j-1}(x, b_j, t) - p_j(x, b_j, t)\}.$ The initial pressure $p_j(x, y, 0) = \varphi_j(x, y)$.

Mathematical Operations of Special Functions -continued 9.5    Cascaded rectangle: at $x = 0$, $p_j(0, y, t) = \psi_{y_0j}(y, t)$ and at $x = a$, $p_j(a, y, t) = \psi_{y_aj}(y, t)$, $b_j < y < b_{j+1}$, $\forall\, j = 0, 1, \ldots, N-1$, $t > 0$. At $y = b_0$, $\dfrac{\partial p(x, b_0, t)}{\partial y} = -\left(\dfrac{\mu}{k_y}\right)_0 \psi_0(x, t)$ and at $y = b_N$, $\dfrac{\partial p(x, b_N, t)}{\partial y} = -\left(\dfrac{\mu}{k_y}\right)_N \psi_N(x, t)$. At the interface $y = b_j$, $\forall\, j = 1, \ldots, N-1$, $\psi_j(x, t) = -\left(\dfrac{k_y}{\mu}\right)_j \left(\dfrac{\partial p_j(x, b_j, t)}{\partial y}\right) = -\left(\dfrac{k_y}{\mu}\right)_{j-1}\left(\dfrac{\partial p_{j-1}(x, b_j, t)}{\partial y}\right)$ and $\breve{\lambda}_j \psi_j(x, t) = \{p_{j-1}(x, b_j, t) - p_j(x, b_j, t)\}$. The initial pressure $p_j(x, y, 0) = \varphi_j(x, y)$.

9.6    The problem of 9.5, except, we have a mixed boundary condition, which is (i) At $x = 0$, $p_j(0, y, t) = \psi_{y_0j}(y, t)$ and at $x = a$, $p_j(a, y, t) = \psi_{y_aj}(y, t)$, for $b_j < y < b_{j+1}$, $j = 0, 1, \ldots, \breve{k} - 1$, $t > 0$.

(ii) At $x = 0$, $\dfrac{\partial p_j(0, y, t)}{\partial x} = -\left(\dfrac{\mu}{k_z}\right)_j \psi_{y_0j}(y, t)$ and at $x = a$, $\dfrac{\partial p_j(a, y, t)}{\partial x} = -\left(\dfrac{\mu}{k_z}\right)_j \psi_{y_aj}(y, t)$ for $b_j < y < b_{j+1}$, $j = \breve{k}, \ldots, N-1$, $t > 0$.

At $y = b_0$, $\dfrac{\partial p(x, b_0, t)}{\partial y} = -\left(\dfrac{\mu}{k_y}\right)_0 \psi_0(x, t)$ and at $y = b_N$, $\dfrac{\partial p(x, b_N, t)}{\partial y} = -\left(\dfrac{\mu}{k_y}\right)_N \psi_N(x, t)$. At the interface $y = b_j$, $\forall\, j = 1, \ldots, N-1$, $\psi_j(x, t) = -\left(\dfrac{k_y}{\mu}\right)_j\left(\dfrac{\partial p_j(x, b_j, t)}{\partial y}\right) = -\left(\dfrac{k_y}{\mu}\right)_{j-1}\left(\dfrac{\partial p_{j-1}(x, b_j, t)}{\partial y}\right)$ and $\breve{\lambda}_j \psi_j(x, t) = \{p_{j-1}(x, b_j, t) - p_j(x, b_j, t)\}$. The initial pressure $p_j(x, y, 0) = \varphi_j(x, y)$.

10   Octant 10.1    The medium is bounded by the planes $x = 0$, $y = 0$ and $z = 0$; x, y and z extend to $\infty$ in the directions of x positive, y positive and z positive. At $x = 0$, $p(0, y, z, t) = 0$, $y > 0$, $z > 0$, $t > 0$, at $y = 0$, $p(x, 0, z, t) = 0$, $x > 0$, $z > 0$, $t > 0$ and at $z = 0$, $p(x, y, 0, t) = 0$, $x > 0$, $y > 0$, $t > 0$. p tend to zero as $x \to \infty$, $y \to \infty$ and $z \to \infty$. The initial pressure $p(x, y, z, 0) = 0$.

10.2    The problem of 10.1, except for all $t > 0$, $p(0, y, z, t) = \psi_{yz}(y, z, t)$, $y > 0$, $z > 0$, $p(x, 0, z, t) = \psi_{xz}(x, z, t)$, $x > 0$, $z > 0$, and $p(z, y, 0, t) = \psi_{zy}(x, y, t)$, $x > 0$, $y > 0$. The initial pressure $p(x, y, z, 0) = \phi(x, y, z)$. $\phi(x, y, z)$ and its derivative tend to zero as $x \to \infty$, $y \to \infty$ and $z \to \infty$.

10.3    The problem of 10.2, except the initial pressure $p(x, y, z, 0) = p_I$, a constant for all $x > 0$, $y > 0$, and $z > 0$.

10.4    The problem of 10.1, except for all $t > 0$, $p(0, y, z, t) = \psi_{yz}(y, z, t)$, $y > 0$, $z > 0$, $p(x, 0, z, t) = \psi_{xz}(x, z, t)$, $x > 0$, $z > 0$, and $\dfrac{\partial p(x, y, 0, t)}{\partial z} = -\left(\dfrac{\mu}{k_z}\right)\psi_{xy}(x, y, t)$, $x > 0$, $y > 0$. The initial pressure $p(x, y, z, 0) = \varphi(x, y, z)$. $\varphi(x, y, z)$ and its derivative tend to zero as $x \to \infty$, $y \to \infty$ and $z \to \infty$.

10.5    The problem of 10.4, except the initial pressure $p(x, y, z, 0) = p_I$, a constant for all $x > 0$, $y > 0$, and $z > 0$.

10.6    The problem of 10.1, except for all $t > 0$, $p(0, y, z, t) = \psi_{yz}(y, z, t)$, $y > 0$, $z > 0$, $p(x, 0, z, t) = \psi_{xz}(x, z, t)$, $x > 0$, $z > 0$, and $\dfrac{\partial p(x, y, 0, t)}{\partial z} - \lambda_{xy} p(x, y, 0, t) = -\left(\dfrac{\mu}{k_z}\right)\psi_{xy}(x, y, t)$, $x > 0$, $y > 0$. The initial pressure $p(x, y, z, 0) = \varphi(x, y, z)$. $\varphi(x, y, z)$ and its derivative tend to zero as $x \to \infty$, $y \to \infty$ and $z \to \infty$.

10.7    The problem of 10.6, except the initial, pressure $p(x, y, z, 0) = p_I$, a constant for all $x > 0$, $y > 0$, and $z > 0$.

11   Infinite Circular Cylinder 11.1    The medium is bounded by the cylinder $r = r_a$ and extend to $\infty$ in the direction of r positive and $(-\infty < z < \infty)$. The initial pressure $p(r, \theta, z, 0) = 0$.

11.2    The medium is bounded by the cylinder $r = r_a$ and extend to $\infty$ in the direction of r positive and $(0 < z < h)$. No-flow boundaries at $z = 0$ and $z = h$. The initial pressure $p(r, \theta, z, 0) = 0$.

| Mathematical Operations of Special Functions |
|---|
| A Special Functions |
|    A.1      Gamma Function |
| B A Table of Integrals |
| C General properties and a table of Laplace transforms |
| D Series |

Octant 10.1 The medium is bounded by the planes $x=0$, $y=0$ and $z=0$; x, y and z extend to $\infty$ in the directions of x positive, y positive and z positive. At $x=0$, $p(0,y,z,t)=0$, $y>0$, $z>0$, $t>0$, at $y=0$, $p(x,0,z,t)=0$, $x>0$, $t>0$ and at $z=0$, $p(x,y,0,t)=0$, $x>0$, $y>0$, $t>0$. p tend to zero as $x\to\infty$, $y\to\infty$ and $z\to\infty$. The initial pressure $p(x,y,z,0)=0$.

A quantity Q of fluid suddenly injected at a point $(x_0,y_0,z_0)$, $[x_0>0, y_0>0, z_0>0]$, at time $t=t_0$, $[t_0 \geq 0]$, and the resulting pressure disturbance left to diffuse through the homogenous Octant. The medium is bounded by the planes $x=0$, $y=0$, $z=0$, and extended to infinity in the direction of x positive, y positive and z positive. The pressure at the planes $x=0$, $y=0$ and $z=0$ being kept at zero. The initial pressure is zero.

We find p from the partial differential equation.

$$\frac{\partial p}{\partial t} = \eta_x \frac{\partial^2 p}{\partial x^2} + \eta_y \frac{\partial^2 p}{\partial y^2} + \eta_z \frac{\partial^2 p}{\partial z^2} + \frac{Q}{\phi c_t}\delta(x-x_0)\delta(y-y_0)\delta(z-z_0)\delta(t-t_0) \quad (10.1.1)$$

where $$\eta_x = \frac{k_x}{\phi c_t \mu}, \eta_y = \frac{k_y}{\phi c_t \mu} \text{ and } \eta_z = \frac{k_z}{\phi c_t \mu}$$

with initial condition $p(x,y,z,0)=0$, for $x>0$, $y>0$, $z>0$ and boundary conditions $p(0,y,z,t)=p(\infty,y,z,t)=0$, $p(x,0,z,t)=p(x,\infty,z,t)=0$, $p(x,y,0,t)=p(x,y,\infty,t)=0$, $t>0$.

We apply the Laplace transformation to equation (6.1.1). We get, $$\eta_x \frac{\partial^2 \bar{p}}{\partial x^2} + \eta_y \frac{\partial^2 \bar{p}}{\partial y^2} + \eta_z \frac{\partial^2 \bar{p}}{\partial z^2} - s\bar{p} = \quad (10.1.2)$$
$$-\frac{Q}{\phi c_t}\delta(x-x_0)\delta(y-y_0)\delta(z-z_0)e^{-st_0}$$

where $$\bar{p} = \int_0^\infty p e^{-st} dt.$$

We now apply the appropriate Fourier transformations to equation (10.1.2). We get, $$\bar{\bar{\bar{p}}} = \frac{Q \sin(nx_0)\sin(my_0)\sin(lz_0)}{\phi c_t(n^2\eta_z + m^2\eta_y + l^2\eta_z + s)} e^{-st_0} \quad (10.1.3)$$

where $\bar{\bar{p}} = \int_0^\infty \bar{p}\sin(nx)dx,$ $$\bar{\bar{\bar{p}}} = \int_0^\infty \bar{\bar{p}}\sin(my)dy \text{ and } \bar{\bar{\bar{p}}} = \int_0^\infty \bar{\bar{\bar{p}}}\sin(lz)dz.$$

Successive inverse Fourier transforms of equation (10.1.3) yields $$\bar{p} = \frac{Qe^{-st_0}s^{\frac{1}{4}}}{\phi c_t(2\pi)^{\frac{3}{2}}\sqrt{\eta_x \eta_y \eta_z}} \left[ \frac{K_{\frac{1}{2}}\left(\sqrt{\left\{\frac{(x-x_0)^2}{\eta_x} + \frac{(y-y_0)^2}{\eta_y} + \frac{(z-z_0)^2}{\eta_z}\right\}s}\right)}{\left\{\frac{(x-x_0)^2}{\eta_x} + \frac{(y-y_0)^2}{\eta_y} + \frac{(z-z_0)^2}{\eta_z}\right\}^{\frac{1}{4}}} - \frac{K_{\frac{1}{2}}\left(\sqrt{\left\{\frac{(x+x_0)^2}{\eta_x} + \frac{(y-y_0)^2}{\eta_y} + \frac{(z-z_0)^2}{\eta_z}\right\}s}\right)}{\left\{\frac{(x+x_0)^2}{\eta_x} + \frac{(y-y_0)^2}{\eta_y} + \frac{(z-z_0)^2}{\eta_z}\right\}^{\frac{1}{4}}} - \right. \quad (10.1.4)$$

$$\frac{K_{\frac{1}{2}}\left(\sqrt{\left\{\frac{(x-x_0)^2}{\eta_x} + \frac{(y+y_0)^2}{\eta_y} + \frac{(z-z_0)^2}{\eta_z}\right\}s}\right)}{\left\{\frac{(x-x_0)^2}{\eta_x} + \frac{(y+y_0)^2}{\eta_y} + \frac{(z-z_0)^2}{\eta_z}\right\}^{\frac{1}{4}}} + \frac{K_{\frac{1}{2}}\left(\sqrt{\left\{\frac{(x+x_0)^2}{\eta_x} + \frac{(y+y_0)^2}{\eta_y} + \frac{(z-z_0)^2}{\eta_z}\right\}s}\right)}{\left\{\frac{(x+x_0)^2}{\eta_x} + \frac{(y+y_0)^2}{\eta_y} + \frac{(z-z_0)^2}{\eta_z}\right\}^{\frac{1}{4}}} -$$

$$\frac{K_{\frac{1}{2}}\left(\sqrt{\left\{\frac{(x-x_0)^2}{\eta_x} + \frac{(y-y_0)^2}{\eta_y} + \frac{(z+z_0)^2}{\eta_z}\right\}s}\right)}{\left\{\frac{(x-x_0)^2}{\eta_x} + \frac{(y-y_0)^2}{\eta_y} + \frac{(z+z_0)^2}{\eta_z}\right\}^{\frac{1}{4}}} + \frac{K_{\frac{1}{2}}\left(\sqrt{\left\{\frac{(x+x_0)^2}{\eta_x} + \frac{(y-y_0)^2}{\eta_y} + \frac{(z+z_0)^2}{\eta_z}\right\}s}\right)}{\left\{\frac{(x+x_0)^2}{\eta_x} + \frac{(y-y_0)^2}{\eta_y} + \frac{(z+z_0)^2}{\eta_z}\right\}^{\frac{1}{4}}} +$$

-continued $$\frac{K_{\frac{1}{2}}\left(\sqrt{\left\{\frac{(x-x_0)^2}{\eta_x}+\frac{(y+y_0)^2}{\eta_y}+\frac{(z+z_0)^2}{\eta_z}\right\}s}\right)}{\left\{\frac{(x-x_0)^2}{\eta_x}+\frac{(y+y_0)^2}{\eta_y}+\frac{(z+z_0)^2}{\eta_z}\right\}^{\frac{1}{4}}} - \frac{K_{\frac{1}{2}}\left(\sqrt{\left\{\frac{(x+x_0)^2}{\eta_x}+\frac{(y+y_0)^2}{\eta_y}+\frac{(z+z_0)^2}{\eta_z}\right\}s}\right)}{\left\{\frac{(x+x_0)^2}{\eta_x}+\frac{(y+y_0)^2}{\eta_y}+\frac{(z+z_0)^2}{\eta_z}\right\}^{\frac{1}{4}}}$$

Inverse Laplace transform of equation (10.1.4) yields $$p = \frac{U(t-t_0)Q}{8\phi c_t\{\pi(t-t_0)\}^{\frac{3}{2}}\sqrt{\eta_x\eta_y\eta_z}}\left\{e^{-\frac{(x-x_0)^2}{4\eta_x(t-t_0)}} - e^{-\frac{(x+x_0)^2}{4\eta_x(t-t_0)}}\right\} \quad (10.1.5)$$

$$\left\{e^{-\frac{(y-y_0)^2}{4\eta_y(t-t_0)}} - e^{-\frac{(y+y_0)^2}{4\eta_y(t-t_0)}}\right\} \times \left\{e^{-\frac{(z-z_0)^2}{4\eta_z(t-t_0)}} - e^{-\frac{(z+z_0)^2}{4\eta_z(t-t_0)}}\right\}$$

where $$U(t-t_0) = \begin{cases} 0 & t < t_0 \\ 1 & t \geq t_0 \end{cases}$$

is the Heaviside's Unit step function. As $t \to t_0$, pressure from equation (10.1.5) tends to zero at all points except at $[x_0, y_0, z_0]$ where it becomes infinite.

With a change of notation the equivalent solutions for heat and mass diffusion problems may be formally written as*

*To convert from pressure diffusion to heat diffusion, we take $\eta = k$, $$K = \frac{k}{\mu},$$

and $\Phi c_t = C_p$; to convert to mass diffusion we take $\eta = D$ and set $\Phi c_t = 1$.

Heat Diffusion:

$$\bar{v} = \frac{Qe^{-st_0}s^{\frac{1}{4}}}{\phi c_t(2\pi C_p)^{\frac{3}{2}}\sqrt{\kappa_x\kappa_y\kappa_z}}\left[\frac{K_{\frac{1}{2}}\left(\sqrt{\left\{\frac{(x-x_0)^2}{\kappa_x}+\frac{(y-y_0)^2}{\kappa_y}+\frac{(z-z_0)^2}{\kappa_z}\right\}s}\right)}{\left\{\frac{(x-x_0)^2}{\kappa_x}+\frac{(y-y_0)^2}{\kappa_y}+\frac{(z-z_0)^2}{\kappa_z}\right\}^{\frac{1}{4}}} - \frac{K_{\frac{1}{2}}\left(\sqrt{\left\{\frac{(x+x_0)^2}{\kappa_x}+\frac{(y-y_0)^2}{\kappa_y}+\frac{(z-z_0)^2}{\kappa_z}\right\}s}\right)}{\left\{\frac{(x+x_0)^2}{\kappa_x}+\frac{(y-y_0)^2}{\kappa_y}+\frac{(z-z_0)^2}{\kappa_z}\right\}^{\frac{1}{4}}} - \right.$$

$$\frac{K_{\frac{1}{2}}\left(\sqrt{\left\{\frac{(x-x_0)^2}{\kappa_x}+\frac{(y+y_0)^2}{\kappa_y}+\frac{(z-z_0)^2}{\kappa_z}\right\}s}\right)}{\left\{\frac{(x-x_0)^2}{\kappa_x}+\frac{(y+y_0)^2}{\kappa_y}+\frac{(z-z_0)^2}{\kappa_z}\right\}^{\frac{1}{4}}} + \frac{K_{\frac{1}{2}}\left(\sqrt{\left\{\frac{(x+x_0)^2}{\kappa_x}+\frac{(y+y_0)^2}{\kappa_y}+\frac{(z-z_0)^2}{\kappa_z}\right\}s}\right)}{\left\{\frac{(x+x_0)^2}{\kappa_x}+\frac{(y+y_0)^2}{\kappa_y}+\frac{(z-z_0)^2}{\kappa_z}\right\}^{\frac{1}{4}}} - \frac{K_{\frac{1}{2}}\left(\sqrt{\left\{\frac{(x-x_0)^2}{\kappa_x}+\frac{(y-y_0)^2}{\kappa_y}+\frac{(z+z_0)^2}{\kappa_z}\right\}s}\right)}{\left\{\frac{(x-x_0)^2}{\kappa_x}+\frac{(y-y_0)^2}{\kappa_y}+\frac{(z+z_0)^2}{\kappa_z}\right\}^{\frac{1}{4}}} +$$

$$\frac{K_{\frac{1}{2}}\left(\sqrt{\left\{\frac{(x+x_0)^2}{\kappa_x}+\frac{(y-y_0)^2}{\kappa_y}+\frac{(z+z_0)^2}{\kappa_z}\right\}s}\right)}{\left\{\frac{(x+x_0)^2}{\kappa_x}+\frac{(y-y_0)^2}{\kappa_y}+\frac{(z+z_0)^2}{\kappa_z}\right\}^{\frac{1}{4}}} + \frac{K_{\frac{1}{2}}\left(\sqrt{\left\{\frac{(x-x_0)^2}{\kappa_x}+\frac{(y+y_0)^2}{\kappa_y}+\frac{(z+z_0)^2}{\kappa_z}\right\}s}\right)}{\left\{\frac{(x-x_0)^2}{\kappa_x}+\frac{(y+y_0)^2}{\kappa_y}+\frac{(z+z_0)^2}{\kappa_z}\right\}^{\frac{1}{4}}} - \frac{K_{\frac{1}{2}}\left(\sqrt{\left\{\frac{(x+x_0)^2}{\kappa_x}+\frac{(y+y_0)^2}{\kappa_y}+\frac{(z+z_0)^2}{\kappa_z}\right\}s}\right)}{\left\{\frac{(x+x_0)^2}{\kappa_x}+\frac{(y+y_0)^2}{\kappa_y}+\frac{(z+z_0)^2}{\kappa_z}\right\}^{\frac{1}{4}}}\right] \quad (10.1.6)$$

and $$v = \frac{U(t-t_0)Q}{8\phi c_t\{\pi(t-t_0)\}^{\frac{3}{2}}\sqrt{\kappa_x\kappa_y\kappa_z}}\left\{e^{-\frac{(x-x_0)^2}{4\kappa_x(t-t_0)}} - e^{-\frac{(x+x_0)^2}{4\kappa_x(t-t_0)}}\right\}\left\{e^{-\frac{(y-y_0)^2}{4\kappa_y(t-t_0)}} - e^{-\frac{(y+y_0)^2}{4\kappa_y(t-t_0)}}\right\} \times \left\{e^{-\frac{(z-z_0)^2}{4\kappa_z(t-t_0)}} - e^{-\frac{(z+z_0)^2}{4\kappa_z(t-t_0)}}\right\} \quad (10.1.7)$$

where the Q is the total quantity of heat instantaneously liberated at time $t = t_0$ at a point $[x_0, y_0, z_0]$.

Mass Diffusion:

$$\bar{c} = \frac{Qe^{-st_0}s^{\frac{1}{4}}}{(2\pi)^{\frac{3}{2}}\sqrt{D_xD_yD_z}}\left[\frac{K_{\frac{1}{2}}\left(\sqrt{\left\{\frac{(x-x_0)^2}{D_x}+\frac{(y-y_0)^2}{D_y}+\frac{(z-z_0)^2}{D_z}\right\}s}\right)}{\left\{\frac{(x-x_0)^2}{D_x}+\frac{(y-y_0)^2}{D_y}+\frac{(z-z_0)^2}{D_z}\right\}^{\frac{1}{4}}} - \frac{K_{\frac{1}{2}}\left(\sqrt{\left\{\frac{(x+x_0)^2}{D_x}+\frac{(y-y_0)^2}{D_y}+\frac{(z-z_0)^2}{D_z}\right\}s}\right)}{\left\{\frac{(x+x_0)^2}{D_x}+\frac{(y-y_0)^2}{D_y}+\frac{(z-z_0)^2}{D_z}\right\}^{\frac{1}{4}}} - \quad (10.1.8)$$

-continued $$\frac{K_{\frac{1}{2}}\left(\sqrt{\left\{\frac{(x-x_0)^2}{D_x}+\frac{(y+y_0)^2}{D_y}+\frac{(z-z_0)^2}{D_z}\right\}}s\right)}{\left\{\frac{(x-x_0)^2}{D_x}+\frac{(y+y_0)^2}{D_y}+\frac{(z-z_0)^2}{D_z}\right\}^{\frac{1}{4}}}+\frac{K_{\frac{1}{2}}\left(\sqrt{\left\{\frac{(x+x_0)^2}{D_x}+\frac{(y+y_0)^2}{D_y}+\frac{(z-z_0)^2}{D_z}\right\}}s\right)}{\left\{\frac{(x+x_0)^2}{D_x}+\frac{(y+y_0)^2}{D_y}+\frac{(z-z_0)^2}{D_z}\right\}^{\frac{1}{4}}}-$$

$$\frac{K_{\frac{1}{2}}\left(\sqrt{\left\{\frac{(x-x_0)^2}{D_x}+\frac{(y-y_0)^2}{D_y}+\frac{(z+z_0)^2}{D_z}\right\}}s\right)}{\left\{\frac{(x-x_0)^2}{D_x}+\frac{(y-y_0)^2}{D_y}+\frac{(z+z_0)^2}{D_z}\right\}^{\frac{1}{4}}}+\frac{K_{\frac{1}{2}}\left(\sqrt{\left\{\frac{(x+x_0)^2}{D_x}+\frac{(y-y_0)^2}{D_y}+\frac{(z+z_0)^2}{D_z}\right\}}s\right)}{\left\{\frac{(x+x_0)^2}{D_x}+\frac{(y-y_0)^2}{D_y}+\frac{(z+z_0)^2}{D_z}\right\}^{\frac{1}{4}}}+$$

$$\frac{K_{\frac{1}{2}}\left(\sqrt{\left\{\frac{(x-x_0)^2}{D_x}+\frac{(y+y_0)^2}{D_y}+\frac{(z+z_0)^2}{D_z}\right\}}s\right)}{\left\{\frac{(x-x_0)^2}{D_x}+\frac{(y+y_0)^2}{D_y}+\frac{(z+z_0)^2}{D_z}\right\}^{\frac{1}{4}}}-\frac{K_{\frac{1}{2}}\left(\sqrt{\left\{\frac{(x+x_0)^2}{D_x}+\frac{(y+y_0)^2}{D_y}+\frac{(z+z_0)^2}{D_z}\right\}}s\right)}{\left\{\frac{(x+x_0)^2}{D_x}+\frac{(y+y_0)^2}{D_y}+\frac{(z+z_0)^2}{D_z}\right\}^{\frac{1}{4}}}\Bigg] \text{ and}$$

(10.1.9)

$$c = \frac{U(t-t_0)Q}{8\{\pi(t-t_0)\}^{\frac{3}{2}}\sqrt{D_xD_yD_z}}\left\{e^{-\frac{(x-x_0)^2}{4D_x(t-t_0)}}-e^{-\frac{(x+x_0)^2}{4D_x(t-t_0)}}\right\}\left\{e^{-\frac{(y-y_0)^2}{4D_y(t-t_0)}}-e^{-\frac{(y+y_0)^2}{4D_y(t-t_0)}}\right\}\times\left\{e^{-\frac{(z-z_0)^2}{4D_z(t-t_0)}}-e^{-\frac{(z+z_0)^2}{4D_z(t-t_0)}}\right\}$$

Here Q represents the amount of substance deposited at time $t=t_0$ at a point $[x_0,y_0,z_0]$.

The continuous constant source solution may be obtained by integrating the instantaneous line source solution with respect to time. However, for illustrative purposes, here we solve the problem in a formal way. Fluid is produced at the rate of $q(t)$ per unit time from $t=t_0$ to $t=t$ at the point $[x_0,y_0,z_0]$. We find p $$\frac{\partial p}{\partial t}=\eta_x\frac{\partial^2 p}{\partial x^2}+\eta_y\frac{\partial^2 p}{\partial y^2}+\eta_z\frac{\partial^2 p}{\partial z^2}+ \quad (10.1.10)$$
$$U(t-t_0)\frac{q(t-t_0)}{\phi c_t}\delta(x-x_0)\delta(y-y_0)\delta(z-z_0)$$

with initial condition $p(x,y,z,0)=0$, for $x>0$, $y>0$, $z>0$ and boundary conditions $p(0,y,z,t)=p(\infty,y,z,t)=0$, $p(x,0,z,t)=p(x,\infty,z,t)=0$, $p(x,y,0,t)=p(x,y,\infty,t)=0$, $t>0$. Following the procedure outlined earlier, the successive application of Laplace and Fourier transforms reduces equation (10.1.10) to an algebraic equation, which is $$\overline{\overline{\overline{p}}}=\frac{q(s)\sin(nx_0)\sin(my_0)\sin(lz_0)}{\phi c_t(n^2\eta_x+m^2\eta_y+l^2\eta_z+s)}e^{-st_0} \quad (10.1.11)$$

Successive inverse Fourier and Laplace transforms yield (10.1.12)

$$\overline{p}=\frac{q(s)e^{-st_0}s^{\frac{1}{4}}}{\phi c_t(2\pi)^{\frac{3}{2}}\sqrt{\eta_x\eta_y\eta_z}}\Bigg[\frac{K_{\frac{1}{2}}\left(\sqrt{\left\{\frac{(x-x_0)^2}{\eta_x}+\frac{(y-y_0)^2}{\eta_y}+\frac{(z-z_0)^2}{\eta_z}\right\}}s\right)}{\left\{\frac{(x-x_0)^2}{\eta_x}+\frac{(y-y_0)^2}{\eta_y}+\frac{(z-z_0)^2}{\eta_z}\right\}^{\frac{1}{4}}}-\frac{K_{\frac{1}{2}}\left(\sqrt{\left\{\frac{(x+x_0)^2}{\eta_x}+\frac{(y-y_0)^2}{\eta_y}+\frac{(z-z_0)^2}{\eta_z}\right\}}s\right)}{\left\{\frac{(x+x_0)^2}{\eta_x}+\frac{(y-y_0)^2}{\eta_y}+\frac{(z-z_0)^2}{\eta_z}\right\}^{\frac{1}{4}}}-$$

$$\frac{K_{\frac{1}{2}}\left(\sqrt{\left\{\frac{(x-x_0)^2}{\eta_x}+\frac{(y+y_0)^2}{\eta_y}+\frac{(z-z_0)^2}{\eta_z}\right\}}s\right)}{\left\{\frac{(x-x_0)^2}{\eta_x}+\frac{(y+y_0)^2}{\eta_y}+\frac{(z-z_0)^2}{\eta_z}\right\}^{\frac{1}{4}}}+\frac{K_{\frac{1}{2}}\left(\sqrt{\left\{\frac{(x+x_0)^2}{\eta_x}+\frac{(y+y_0)^2}{\eta_y}+\frac{(z-z_0)^2}{\eta_z}\right\}}s\right)}{\left\{\frac{(x+x_0)^2}{\eta_x}+\frac{(y+y_0)^2}{\eta_y}+\frac{(z-z_0)^2}{\eta_z}\right\}^{\frac{1}{4}}}-$$

$$\frac{K_{\frac{1}{2}}\left(\sqrt{\left\{\frac{(x-x_0)^2}{\eta_x}+\frac{(y-y_0)^2}{\eta_y}+\frac{(z+z_0)^2}{\eta_z}\right\}}s\right)}{\left\{\frac{(x-x_0)^2}{\eta_x}+\frac{(y-y_0)^2}{\eta_y}+\frac{(z+z_0)^2}{\eta_z}\right\}^{\frac{1}{4}}}+\frac{K_{\frac{1}{2}}\left(\sqrt{\left\{\frac{(x+x_0)^2}{\eta_x}+\frac{(y-y_0)^2}{\eta_y}+\frac{(z+z_0)^2}{\eta_z}\right\}}s\right)}{\left\{\frac{(x+x_0)^2}{\eta_x}+\frac{(y-y_0)^2}{\eta_y}+\frac{(z+z_0)^2}{\eta_z}\right\}^{\frac{1}{4}}}+$$

$$\left. \frac{K_{\frac{1}{2}}\left(\sqrt{\left\{\frac{(x-x_0)^2}{\eta_x}+\frac{(y-y_0)^2}{\eta_y}+\frac{(z+z_0)^2}{\eta_z}\right\}}s\right)}{\left\{\frac{(x-x_0)^2}{\eta_x}+\frac{(y-y_0)^2}{\eta_y}+\frac{(z+z_0)^2}{\eta_z}\right\}^{\frac{1}{4}}} - \frac{K_{\frac{1}{2}}\left(\sqrt{\left\{\frac{(x+x_0)^2}{\eta_x}+\frac{(y+y_0)^2}{\eta_y}+\frac{(z+z_0)^2}{\eta_z}\right\}}s\right)}{\left\{\frac{(x+x_0)^2}{\eta_x}+\frac{(y+y_0)^2}{\eta_y}+\frac{(z+z_0)^2}{\eta_z}\right\}^{\frac{1}{4}}} \right]$$ and (10.1.13)

$$p = \frac{U(t-t_0)}{8\phi c_t \pi^{\frac{3}{2}}\sqrt{\eta_x\eta_y\eta_z}} \int_0^{t-t_0} \frac{q(t-t_0-\tau)}{\tau^{\frac{3}{2}}} \left\{ e^{-\frac{(x-x_0)^2}{4\eta_x\tau}} - e^{-\frac{(x+x_0)^2}{4\eta_x\tau}} \right\} \left\{ e^{-\frac{(y-y_0)^2}{4\eta_y\tau}} - e^{-\frac{(y+y_0)^2}{4\eta_y\tau}} \right\} \times \left\{ e^{-\frac{(z-z_0)^2}{4\eta_z\tau}} - e^{-\frac{(z+z_0)^2}{4\eta_z\tau}} \right\} d\tau$$

If $q(t)$ is a constant and equal to $q$, integration of equation (10.1.13) gives (10.1.14)

$$p = \frac{U(t-t_0)q}{4\phi c_t \pi^{\frac{3}{2}}\sqrt{\eta_x\eta_y\eta_z}} \left[ \frac{\Gamma\left\{\frac{1}{2}, \frac{1}{4(t-t_0)}\left(\frac{(x-x_0)^2}{\eta_x}+\frac{(y-y_0)^2}{\eta_y}+\frac{(z-z_0)^2}{\eta_z}\right)\right\}}{\sqrt{\left\{\frac{(x-x_0)^2}{\eta_x}+\frac{(y-y_0)^2}{\eta_y}+\frac{(z-z_0)^2}{\eta_z}\right\}}} - \frac{\Gamma\left\{\frac{1}{2}, \frac{1}{4(t-t_0)}\left(\frac{(x+x_0)^2}{\eta_x}+\frac{(y-y_0)^2}{\eta_y}+\frac{(z-z_0)^2}{\eta_z}\right)\right\}}{\sqrt{\left\{\frac{(x+x_0)^2}{\eta_x}+\frac{(y-y_0)^2}{\eta_y}+\frac{(z-z_0)^2}{\eta_z}\right\}}} - \right.$$

$$\frac{\Gamma\left\{\frac{1}{2}, \frac{1}{4(t-t_0)}\left(\frac{(x-x_0)^2}{\eta_x}+\frac{(y+y_0)^2}{\eta_y}+\frac{(z-z_0)^2}{\eta_z}\right)\right\}}{\sqrt{\left\{\frac{(x-x_0)^2}{\eta_x}+\frac{(y+y_0)^2}{\eta_y}+\frac{(z-z_0)^2}{\eta_z}\right\}}} + \frac{\Gamma\left\{\frac{1}{2}, \frac{1}{4(t-t_0)}\left(\frac{(x+x_0)^2}{\eta_x}+\frac{(y+y_0)^2}{\eta_y}+\frac{(z-z_0)^2}{\eta_z}\right)\right\}}{\sqrt{\left\{\frac{(x+x_0)^2}{\eta_x}+\frac{(y+y_0)^2}{\eta_y}+\frac{(z-z_0)^2}{\eta_z}\right\}}} -$$

$$\frac{\Gamma\left\{\frac{1}{2}, \frac{1}{4(t-t_0)}\left(\frac{(x-x_0)^2}{\eta_x}+\frac{(y-y_0)^2}{\eta_y}+\frac{(z+z_0)^2}{\eta_z}\right)\right\}}{\sqrt{\left\{\frac{(x-x_0)^2}{\eta_x}+\frac{(y-y_0)^2}{\eta_y}+\frac{(z+z_0)^2}{\eta_z}\right\}}} + \frac{\Gamma\left\{\frac{1}{2}, \frac{1}{4(t-t_0)}\left(\frac{(x+x_0)^2}{\eta_x}+\frac{(y-y_0)^2}{\eta_y}+\frac{(z+z_0)^2}{\eta_z}\right)\right\}}{\sqrt{\left\{\frac{(x+x_0)^2}{\eta_x}+\frac{(y-y_0)^2}{\eta_y}+\frac{(z+z_0)^2}{\eta_z}\right\}}} +$$

$$\left. \frac{\Gamma\left\{\frac{1}{2}, \frac{1}{4(t-t_0)}\left(\frac{(x-x_0)^2}{\eta_x}+\frac{(y+y_0)^2}{\eta_y}+\frac{(z+z_0)^2}{\eta_z}\right)\right\}}{\sqrt{\left\{\frac{(x-x_0)^2}{\eta_x}+\frac{(y+y_0)^2}{\eta_y}+\frac{(z+z_0)^2}{\eta_z}\right\}}} - \frac{\Gamma\left\{\frac{1}{2}, \frac{1}{4(t-t_0)}\left(\frac{(x+x_0)^2}{\eta_x}+\frac{(y+y_0)^2}{\eta_y}+\frac{(z+z_0)^2}{\eta_z}\right)\right\}}{\sqrt{\left\{\frac{(x+x_0)^2}{\eta_x}+\frac{(y+y_0)^2}{\eta_y}+\frac{(z+z_0)^2}{\eta_z}\right\}}} \right]$$

For the case where $q(t)=qt^\nu$, $\nu \geq 0$, $t>0$, integration of equation (10.1.13) gives (10.1.15)

$$p = \frac{q\Gamma(\nu+1)U(t-t_0)t^{\left(\nu-\frac{1}{2}\right)}}{4\phi c_t \pi^{\frac{3}{2}}\sqrt{\eta_x\eta_y\eta_z}} \times$$

$$\left[ \frac{\left(e^{-\frac{1}{4(t-t_0)}\left\{\frac{(x-x_0)^2}{\eta_x}+\frac{(y-y_0)^2}{\eta_y}+\frac{(z-z_0)^2}{\eta_z}\right\}}\psi\left(\nu+1,\frac{3}{2};\frac{1}{4(t-t_0)}\left\{\frac{(x-x_0)^2}{\eta_x}+\frac{(y-y_0)^2}{\eta_y}+\frac{(z-z_0)^2}{\eta_z}\right\}\right)\right)}{\left(\sqrt{\left\{\frac{(x-x_0)^2}{\eta_x}+\frac{(y-y_0)^2}{\eta_y}+\frac{(z-z_0)^2}{\eta_z}\right\}}\right)} - \frac{\left(e^{-\frac{1}{4(t-t_0)}\left\{\frac{(x+x_0)^2}{\eta_x}+\frac{(y-y_0)^2}{\eta_y}+\frac{(z-z_0)^2}{\eta_z}\right\}}\psi\left(\nu+1,\frac{3}{2};\frac{1}{4(t-t_0)}\left\{\frac{(x+x_0)^2}{\eta_x}+\frac{(y-y_0)^2}{\eta_y}+\frac{(z-z_0)^2}{\eta_z}\right\}\right)\right)}{\left(\sqrt{\left\{\frac{(x+x_0)^2}{\eta_x}+\frac{(y-y_0)^2}{\eta_y}+\frac{(z-z_0)^2}{\eta_z}\right\}}\right)} -$$

-continued $$\left[\frac{\left(e^{-\frac{1}{4(t-t_0)}\left\{\frac{(x-x_0)^2}{\eta_x}+\frac{(y+y_0)^2}{\eta_y}+\frac{(z-z_0)^2}{\eta_z}\right\}}\Psi\left(v+1,\frac{3}{2};\frac{1}{4(t-t_0)}\left\{\frac{(x-x_0)^2}{\eta_x}+\frac{(y+y_0)^2}{\eta_y}+\frac{(z-z_0)^2}{\eta_z}\right\}\right)\right)}{\left(\sqrt{\left\{\frac{(x-x_0)^2}{\eta_x}+\frac{(y+y_0)^2}{\eta_y}+\frac{(z-z_0)^2}{\eta_z}\right\}}\right)}+\frac{\left(e^{-\frac{1}{4(t-t_0)}\left\{\frac{(x+x_0)^2}{\eta_x}+\frac{(y+y_0)^2}{\eta_y}+\frac{(z-z_0)^2}{\eta_z}\right\}}\Psi\left(v+1,\frac{3}{2};\frac{1}{4(t-t_0)}\left\{\frac{(x+x_0)^2}{\eta_x}+\frac{(y+y_0)^2}{\eta_y}+\frac{(z-z_0)^2}{\eta_z}\right\}\right)\right)}{\left(\sqrt{\left\{\frac{(x+x_0)^2}{\eta_x}+\frac{(y+y_0)^2}{\eta_y}+\frac{(z-z_0)^2}{\eta_z}\right\}}\right)}-$$

$$\frac{\left(e^{-\frac{1}{4(t-t_0)}\left\{\frac{(x-x_0)^2}{\eta_x}+\frac{(y-y_0)^2}{\eta_y}+\frac{(z+z_0)^2}{\eta_z}\right\}}\Psi\left(v+1,\frac{3}{2};\frac{1}{4(t-t_0)}\left\{\frac{(x-x_0)^2}{\eta_x}+\frac{(y-y_0)^2}{\eta_y}+\frac{(z+z_0)^2}{\eta_z}\right\}\right)\right)}{\left(\sqrt{\left\{\frac{(x-x_0)^2}{\eta_x}+\frac{(y-y_0)^2}{\eta_y}+\frac{(z+z_0)^2}{\eta_z}\right\}}\right)}+\frac{\left(e^{-\frac{1}{4(t-t_0)}\left\{\frac{(x+x_0)^2}{\eta_x}+\frac{(y-y_0)^2}{\eta_y}+\frac{(z+z_0)^2}{\eta_z}\right\}}\Psi\left(v+1,\frac{3}{2};\frac{1}{4(t-t_0)}\left\{\frac{(x+x_0)^2}{\eta_x}+\frac{(y-y_0)^2}{\eta_y}+\frac{(z+z_0)^2}{\eta_z}\right\}\right)\right)}{\left(\sqrt{\left\{\frac{(x+x_0)^2}{\eta_x}+\frac{(y-y_0)^2}{\eta_y}+\frac{(z+z_0)^2}{\eta_z}\right\}}\right)}+$$

$$\frac{\left(e^{-\frac{1}{4(t-t_0)}\left\{\frac{(x-x_0)^2}{\eta_x}+\frac{(y+y_0)^2}{\eta_y}+\frac{(z+z_0)^2}{\eta_z}\right\}}\Psi\left(v+1,\frac{3}{2};\frac{1}{4(t-t_0)}\left\{\frac{(x-x_0)^2}{\eta_x}+\frac{(y+y_0)^2}{\eta_y}+\frac{(z+z_0)^2}{\eta_z}\right\}\right)\right)}{\left(\sqrt{\left\{\frac{(x-x_0)^2}{\eta_x}+\frac{(y+y_0)^2}{\eta_y}+\frac{(z+z_0)^2}{\eta_z}\right\}}\right)}-\frac{\left(e^{-\frac{1}{4(t-t_0)}\left\{\frac{(x+x_0)^2}{\eta_x}+\frac{(y+y_0)^2}{\eta_y}+\frac{(z+z_0)^2}{\eta_z}\right\}}\Psi\left(v+1,\frac{3}{2};\frac{1}{4(t-t_0)}\left\{\frac{(x+x_0)^2}{\eta_x}+\frac{(y+y_0)^2}{\eta_y}+\frac{(z+z_0)^2}{\eta_z}\right\}\right)\right)}{\left(\sqrt{\left\{\frac{(x+x_0)^2}{\eta_x}+\frac{(y+y_0)^2}{\eta_y}+\frac{(z+z_0)^2}{\eta_z}\right\}}\right)}\right]$$

The solution corresponding to the case where instantaneous and continuous multiple point sources at $[x_{0_i}, y_{0_i}, z_{0_i}]$ at times $t=t_{0_i}$, $i=1, 2, \ldots, N$, may be obtained by solving the partial differential equations $$\frac{\partial p}{\partial t} = \eta_x \frac{\partial^2 p}{\partial x^2} + \eta_y \frac{\partial^2 p}{\partial y^2} + \eta_z \frac{\partial^2 p}{\partial z^2} + \frac{1}{\phi c_t} \sum_{i=1}^{N} Q_i \delta(x-x_{0i})\delta(y-y_{0i})\delta(z-z_{0i})\delta(t-t_{0i}) \quad (10.1.16)$$

and $$\frac{\partial p}{\partial t} = \eta_x \frac{\partial^2 p}{\partial x^2} + \eta_y \frac{\partial^2 p}{\partial y^2} + \eta_z \frac{\partial^2 p}{\partial z^2} + \frac{1}{\phi c_t} \sum_{i=1}^{N} U(t-t_{0i})q_i(t-t_{0i})\delta(x-x_{0i})\delta(y-y_{0i})\delta(z-z_{0i}) \quad (10.1.17)$$

respectively. The solutions for instantaneous multiple point sources in an Octant are $$\bar{p} = \frac{s^{\frac{1}{4}}}{\phi c_t (2\pi)^{\frac{3}{2}} \sqrt{\eta_x \eta_y \eta_z}} \sum_{i=0}^{N} Q_i e^{-st_{0i}} \left[ \frac{K_{\frac{1}{2}}\left(\sqrt{\left\{\frac{(x-x_{0i})^2}{\eta_x}+\frac{(y-y_{0i})^2}{\eta_y}+\frac{(z-z_{0i})^2}{\eta_z}\right\}s}\right)}{\left\{\frac{(x-x_{0i})^2}{\eta_x}+\frac{(y-y_{0i})^2}{\eta_y}+\frac{(z-z_{0i})^2}{\eta_z}\right\}^{\frac{1}{4}}} - \frac{K_{\frac{1}{2}}\left(\sqrt{\left\{\frac{(x+x_{0i})^2}{\eta_x}+\frac{(y-y_{0i})^2}{\eta_y}+\frac{(z-z_{0i})^2}{\eta_z}\right\}s}\right)}{\left\{\frac{(x+x_{0i})^2}{\eta_x}+\frac{(y-y_{0i})^2}{\eta_y}+\frac{(z-z_{0i})^2}{\eta_z}\right\}^{\frac{1}{4}}} -$$

$$\frac{K_{\frac{1}{2}}\left(\sqrt{\left\{\frac{(x-x_{0i})^2}{\eta_x}+\frac{(y+y_{0i})^2}{\eta_y}+\frac{(z-z_{0i})^2}{\eta_z}\right\}s}\right)}{\left\{\frac{(x-x_{0i})^2}{\eta_x}+\frac{(y-y_{0i})^2}{\eta_y}+\frac{(z-z_{0i})^2}{\eta_z}\right\}^{\frac{1}{4}}} + \frac{K_{\frac{1}{2}}\left(\sqrt{\left\{\frac{(x+x_0)^2}{\eta_x}+\frac{(y+y_{0i})^2}{\eta_y}+\frac{(z-z_{0i})^2}{\eta_z}\right\}s}\right)}{\left\{\frac{(x+x_0)^2}{\eta_x}+\frac{(y+y_{0i})^2}{\eta_y}+\frac{(z-z_{0i})^2}{\eta_z}\right\}^{\frac{1}{4}}} -$$

$$\frac{K_{\frac{1}{2}}\left(\sqrt{\left\{\frac{(x-x_{0i})^2}{\eta_x}+\frac{(y-y_{0i})^2}{\eta_y}+\frac{(z+z_{0i})^2}{\eta_z}\right\}s}\right)}{\left\{\frac{(x-x_{0i})^2}{\eta_x}+\frac{(y-y_{0i})^2}{\eta_y}+\frac{(z+z_{0i})^2}{\eta_z}\right\}^{\frac{1}{4}}} + \frac{K_{\frac{1}{2}}\left(\sqrt{\left\{\frac{(x+x_{0i})^2}{\eta_x}+\frac{(y-y_{0i})^2}{\eta_y}+\frac{(z+z_{0i})^2}{\eta_z}\right\}s}\right)}{\left\{\frac{(x+x_{0i})^2}{\eta_x}+\frac{(y-y_{0i})^2}{\eta_y}+\frac{(z+z_{0i})^2}{\eta_z}\right\}^{\frac{1}{4}}} +$$

$$\frac{K_{\frac{1}{2}}\left(\sqrt{\left\{\frac{(x-x_{0i})^2}{\eta_x}+\frac{(y+y_{0i})^2}{\eta_y}+\frac{(z+z_{0i})^2}{\eta_z}\right\}s}\right)}{\left\{\frac{(x-x_{0i})^2}{\eta_x}+\frac{(y+y_{0i})^2}{\eta_y}+\frac{(z+z_{0i})^2}{\eta_z}\right\}^{\frac{1}{4}}} - \frac{K_{\frac{1}{2}}\left(\sqrt{\left\{\frac{(x+x_{0i})^2}{\eta_x}+\frac{(y+y_{0i})^2}{\eta_y}+\frac{(z+z_{0i})^2}{\eta_z}\right\}s}\right)}{\left\{\frac{(x+x_{0i})^2}{\eta_z}+\frac{(y+y_{0i})^2}{\eta_y}+\frac{(z+z_{0i})^2}{\eta_z}\right\}^{\frac{1}{4}}} \right]$$

(10.1.18)

-continued (10.1.19)
$$p = \frac{1}{8\phi c_t \pi^{\frac{3}{2}} \sqrt{\eta_x \eta_y \eta_z}} \sum_{i=0}^{N} \frac{U(t-t_{0i})Q_i}{(t-t_{0i})^{\frac{3}{2}}} \left\{ e^{-\frac{(x-x_{0i})^2}{4\eta_x(t-t_{0i})}} - e^{-\frac{(x+x_{0i})^2}{4\eta_x(t-t_{0i})}} \right\} \left\{ e^{-\frac{(y-y_{0i})^2}{4\eta_y(t-t_{0i})}} - e^{-\frac{(y+y_{0i})^2}{4\eta_y(t-t_{0i})}} \right\} \times \left\{ e^{-\frac{(z-z_{0i})^2}{4\eta_z(t-t_{0i})}} - e^{-\frac{(z+z_{0i})^2}{4\eta_z(t-t_{0i})}} \right\}$$

The solutions for continuous multiple point sources are (10.1.20)
$$\bar{p} = \frac{s^{\frac{1}{4}}}{\phi c_t (2\pi)^{\frac{3}{2}} \sqrt{\eta_x \eta_y \eta_z}} \sum_{i=0}^{N} q_i(s) e^{-st_{0i}} \left[ \frac{K_{\frac{1}{2}}\left(\sqrt{\left\{\frac{(x-x_{0i})^2}{\eta_x} + \frac{(y-y_{0i})^2}{\eta_y} + \frac{(z-z_{0i})^2}{\eta_z}\right\}s}\right)}{\left\{\frac{(x-x_{0i})^2}{\eta_x} + \frac{(y-y_{0i})^2}{\eta_y} + \frac{(z-z_{0i})^2}{\eta_z}\right\}^{\frac{1}{4}}} - \frac{K_{\frac{1}{2}}\left(\sqrt{\left\{\frac{(x+x_{0i})^2}{\eta_x} + \frac{(y-y_{0i})^2}{\eta_y} + \frac{(z-z_{0i})^2}{\eta_z}\right\}s}\right)}{\left\{\frac{(x+x_{0i})^2}{\eta_x} + \frac{(y-y_{0i})^2}{\eta_y} + \frac{(z-z_{0i})^2}{\eta_z}\right\}^{\frac{1}{4}}} - $$

$$\frac{K_{\frac{1}{2}}\left(\sqrt{\left\{\frac{(x-x_{0i})^2}{\eta_x} + \frac{(y+y_{0i})^2}{\eta_y} + \frac{(z-z_{0i})^2}{\eta_z}\right\}s}\right)}{\left\{\frac{(x-x_{0i})^2}{\eta_x} + \frac{(y+y_{0i})^2}{\eta_y} + \frac{(z-z_{0i})^2}{\eta_z}\right\}^{\frac{1}{4}}} + \frac{K_{\frac{1}{2}}\left(\sqrt{\left\{\frac{(x+x_{0i})^2}{\eta_x} + \frac{(y+y_{0i})^2}{\eta_y} + \frac{(z-z_{0i})^2}{\eta_z}\right\}s}\right)}{\left\{\frac{(x+x_{0i})^2}{\eta_x} + \frac{(y+y_{0i})^2}{\eta_y} + \frac{(z-z_{0i})^2}{\eta_z}\right\}^{\frac{1}{4}}} - $$

$$\frac{K_{\frac{1}{2}}\left(\sqrt{\left\{\frac{(x-x_{0i})^2}{\eta_x} + \frac{(y-y_{0i})^2}{\eta_y} + \frac{(z+z_{0i})^2}{\eta_z}\right\}s}\right)}{\left\{\frac{(x-x_{0i})^2}{\eta_x} + \frac{(y-y_{0i})^2}{\eta_y} + \frac{(z+z_{0i})^2}{\eta_z}\right\}^{\frac{1}{4}}} + \frac{K_{\frac{1}{2}}\left(\sqrt{\left\{\frac{(x+x_{0i})^2}{\eta_x} + \frac{(y-y_{0i})^2}{\eta_y} + \frac{(z+z_{0i})^2}{\eta_z}\right\}s}\right)}{\left\{\frac{(x+x_{0i})^2}{\eta_x} + \frac{(y-y_{0i})^2}{\eta_y} + \frac{(z+z_{0i})^2}{\eta_z}\right\}^{\frac{1}{4}}} +$$

$$\frac{K_{\frac{1}{2}}\left(\sqrt{\left\{\frac{(x-x_{0i})^2}{\eta_x} + \frac{(y+y_{0i})^2}{\eta_y} + \frac{(z+z_{0i})^2}{\eta_z}\right\}s}\right)}{\left\{\frac{(x-x_{0i})^2}{\eta_x} + \frac{(y+y_{0i})^2}{\eta_y} + \frac{(z+z_{0i})^2}{\eta_z}\right\}^{\frac{1}{4}}} - \frac{K_{\frac{1}{2}}\left(\sqrt{\left\{\frac{(x+x_{0i})^2}{\eta_x} + \frac{(y+y_{0i})^2}{\eta_y} + \frac{(z+z_{0i})^2}{\eta_z}\right\}s}\right)}{\left\{\frac{(x+x_{0i})^2}{\eta_x} + \frac{(y+y_{0i})^2}{\eta_y} + \frac{(z+z_{0i})^2}{\eta_z}\right\}^{\frac{1}{4}}} \right]$$

(10.1.21)
$$p = \frac{1}{8\phi c_t \pi^{\frac{3}{2}} \sqrt{\eta_x \eta_y \eta_z}} \sum_{i=0}^{N} U(t-t_{0i}) \int_0^{t-t_{0i}} \frac{q_i(t-t_{0i}-\tau)}{\tau^{\frac{3}{2}}} \left\{ e^{-\frac{(x-x_{0i})^2}{4\eta_x \tau}} - e^{-\frac{(x+x_{0i})^2}{4\eta_x \tau}} \right\} \left\{ e^{-\frac{(y-y_{0i})^2}{4\eta_y \tau}} - e^{-\frac{(y+y_{0i})^2}{4\eta_y \tau}} \right\} \times \left\{ e^{-\frac{(z-z_{0i})^2}{4\eta_z \tau}} - e^{-\frac{(z+z_{0i})^2}{4\eta_z \tau}} \right\} d\tau$$

We consider some special cases of practical relevance.

(i) A line of infinite length $[z_{02}\text{-}z_{01}]$ passing through $(x_0, y_0)$.

The solution is obtained by single integration. For an instantaneous source, we get (10.1.22)
$$\bar{p} = \frac{Q e^{-st_0}}{\phi c_t \pi^2 \sqrt{\eta_x \eta_y}} \int_0^{\infty} \frac{\sin(lz)}{l} \{\cos(lz_{01}) - \cos(lz_{02})\} \left[ K_0\left\{\sqrt{\left\{\frac{(x-x_0)^2}{\eta_x} + \frac{(y-y_0)^2}{\eta_y}\right\}(s+l^2\eta_z)}\right\} - K_0\left\{\sqrt{\left\{\frac{(x+x_0)^2}{\eta_x} + \frac{(y-y_0)^2}{\eta_y}\right\}(s+l^2\eta_z)}\right\} - K_0\left\{\sqrt{\left\{\frac{(x-x_0)^2}{\eta_x} + \frac{(y+y_0)^2}{\eta_y}\right\}(s+l^2\eta_z)}\right\} +$$

-continued $$K_0\left\{\sqrt{\left\{\frac{(x+x_0)^2}{\eta_x} + \frac{(y+y_0)^2}{\eta_y}\right\}(s+l^2\eta_z)}\right\} \right] dl$$

(10.1.23)
$$p = \frac{U(t-t_0)Q}{8\phi c_t \pi\{(t-t_0)\}\sqrt{\eta_x \eta_y}} \left\{ e^{-\frac{(x-x_0)^2}{4\eta_x(t-t_0)}} - e^{-\frac{(x+x_0)^2}{4\eta_x(t-t_0)}} \right\} \left\{ e^{-\frac{(y-y_0)^2}{4\eta_y(t-t_0)}} - e^{-\frac{(y+y_0)^2}{4\eta_y(t-t_0)}} \right\} \times \left\{ \text{erf}\left(\frac{z-z_{01}}{2\sqrt{\eta_z(t-t_0)}}\right) + \text{erf}\left(\frac{z+z_{01}}{2\sqrt{\eta_z(t-t_0)}}\right) - \text{erf}\left(\frac{z-z_{02}}{2\sqrt{\eta_z(t-t_0)}}\right) - \text{erf}\left(\frac{z+z_{02}}{2\sqrt{\eta_z(t-t_0)}}\right) \right\}$$

Solution for a continuous source is*

*The solution is relevant to pressure transient methods associated with partially penetrating or horizontal wells in the fields of ground water movement and the production of oil and gas from hydrocarbon reservoirs.

$$\bar{p} = \frac{q(s)e^{-st_0}}{\phi c_t \pi^2 \sqrt{\eta_x \eta_y}} \int_0^\infty \frac{\sin(lz)}{l} \{\cos(lz_{01}) - \cos(lz_{02})\} \left[ K_0\left\{\sqrt{\left\{\frac{(x-x_0)^2}{\eta_x} + \frac{(y-y_0)^2}{\eta_y}\right\}(s+l^2\eta_z)}\right\} - \right.$$

$$\left. K_0\left\{\sqrt{\left\{\frac{(x-x_0)^2}{\eta_x} + \frac{(y+y_0)^2}{\eta_y}\right\}(s+l^2\eta_z)}\right\} + K_0\left\{\sqrt{\left\{\frac{(x+x_0)^2}{\eta_x} + \frac{(y+y_0)^2}{\eta_y}\right\}(s+l^2\eta_z)}\right\} \right] dl \quad (10.1.24)$$

and $$p = \frac{U(t-t_0)}{8\phi c_t \pi \sqrt{\eta_x \eta_y}} \int_0^{t-t_0} \frac{q(t-t_0-\tau)}{\tau} \left\{ e^{-\frac{(x-x_0)^2}{4\eta_x \tau}} - e^{-\frac{(x+x_0)^2}{4\eta_x \tau}} \right\} \left\{ e^{-\frac{(y-y_0)^2}{4\eta_y \tau}} - e^{-\frac{(y+y_0)^2}{4\eta_y \tau}} \right\} \times$$

$$\left\{ \text{erf}\left(\frac{z-z_{01}}{2\sqrt{\eta_z \tau}}\right) + \text{erf}\left(\frac{z+z_{01}}{2\sqrt{\eta_z \tau}}\right) - \text{erf}\left(\frac{z-z_{02}}{2\sqrt{\eta_z \tau}}\right) - \text{erf}\left(\frac{z+z_{02}}{2\sqrt{\eta_z \tau}}\right) \right\} d\tau \quad (10.1.25)$$

The spatial average response of the line $[z_{02}\text{-}z_{01}]$ is obtained by a further integration†.

†The general results given by the equations (10.1.24) and (10.1.25) assumes that the pressure flux is uniform along the well. A good approximation to the wellbore pressure is obtained by computing the spatial average pressure along the line.

$$\bar{p} = \frac{q(s)e^{-st_0}}{\phi c_t \pi^2 (z_{02}-z_{01})\sqrt{\eta_x \eta_y}} \int_0^\infty \frac{1}{l^2} \{\cos(lz_{01}) - \cos(lz_{02})\}^2 \left[ K_0\left\{\sqrt{\left\{\frac{(x-x_0)^2}{\eta_x} + \frac{(y-y_0)^2}{\eta_y}\right\}(s+l^2\eta_z)}\right\} - \right.$$

$$K_0\left\{\sqrt{\left\{\frac{(x+x_0)^2}{\eta_x} + \frac{(y-y_0)^2}{\eta_y}\right\}(s+l^2\eta_z)}\right\} - K_0\left\{\sqrt{\left\{\frac{(x-x_0)^2}{\eta_x} + \frac{(y+y_0)^2}{\eta_y}\right\}(s+l^2\eta_z)}\right\} +$$

$$\left. K_0\left\{\sqrt{\left\{\frac{(x+x_0)^2}{\eta_x} + \frac{(y+y_0)^2}{\eta_y}\right\}(s+l^2\eta_z)}\right\} \right] dl \quad (10.1.26)$$

and $$p = \frac{U(t-t_0)}{4\phi c_t \pi (z_{02}-z_{01})\sqrt{\eta_x \eta_y}} \int_0^{t-t_0} \frac{q(t-t_0-\tau)}{\tau} \left[ (z_{02}-z_{01})\text{erf}\left(\frac{z_{02}-z_{01}}{2\sqrt{\eta_z \tau}}\right) + (z_{02}+z_{01})\text{erf}\left(\frac{z_{02}+z_{01}}{2\sqrt{\eta_z \tau}}\right) + \right. \quad (10.1.27)$$

$$2\sqrt{\frac{\eta_z \tau}{\pi}} \left\{ 2e^{-\frac{(z_{01}^2+z_{02}^2)}{4\eta_x \tau}} \cos\left(\frac{z_{01}z_{02}}{2\eta_z \tau}\right) - 1 \right\} - z_{02}\,\text{erf}\left(\frac{z_{02}}{\sqrt{\eta_z \tau}}\right) - z_{01}\,\text{erf}\left(\frac{z_{01}}{\sqrt{\eta_z \tau}}\right) -$$

$$\left. \sqrt{\frac{\eta_z \tau}{\pi}} \left( e^{-\frac{z_{01}^2}{\eta_x \tau}} + e^{-\frac{z_{02}^2}{\eta_x \tau}} \right) \right] \left\{ e^{-\frac{(x-x_0)^2}{4\eta_x \tau}} - e^{-\frac{(x+x_0)^2}{4\eta_x \tau}} \right\} \left\{ e^{-\frac{(y-y_0)^2}{4\eta_y \tau}} - e^{-\frac{(y+y_0)^2}{4\eta_y \tau}} \right\} d\tau$$

(ii) Multiple lines of infinite length $[z_{02_\iota}\text{-}z_{01_\iota}]$, $[x_{02_\iota}\text{-}x_{01_\iota}]$ and $[y_{02_\iota}\text{-}y_{01_\iota}]$ passing through $(x_{0_\iota}, y_{0_\iota})$ for $\iota=1, 2, \ldots, L$, $(y_{0_\iota}, z_{0_\iota})$ for $\iota=L+1, 2, \ldots, M$, and $(x_{0_\iota}, z_{0_\iota})$ for $\iota=M+1, 2, \ldots, N$ respectively. Where $(L<M<N)$*.

*The solution corresponds to the case where there are sets of partially penetrating vertical wells and horizontal wells in an artesian aquifer or hydrocarbon reservoir.

$$\bar{p} = \frac{1}{\phi c_t \pi^2 \sqrt{\eta_x \eta_y}} \times \sum_{i=1}^L q_i(s) e^{-st_{0i}} \int_0^\infty \frac{\sin(uz)}{u} \{\cos(uz_{01i}) - \cos(uz_{02i})\} \left[ K_0\left\{\sqrt{\left\{\frac{(x-x_{0i})^2}{\eta_x} + \frac{(y-y_{0i})^2}{\eta_y}\right\}(s+u^2\eta_z)}\right\} - \right. \quad (10.1.28)$$

-continued $$K_0\left\{\sqrt{\left\{\frac{(x+x_{0i})^2}{\eta_x}+\frac{(y-y_{0i})^2}{\eta_y}\right\}(s+u^2\eta_z)}\right\} - K_0\left\{\sqrt{\left\{\frac{(x-x_{0i})^2}{\eta_x}+\frac{(y+y_{0i})^2}{\eta_y}\right\}(s+u^2\eta_z)}\right\} + K_0\left\{\sqrt{\left\{\frac{(x+x_{0i})^2}{\eta_x}+\frac{(y+y_{0i})^2}{\eta_y}\right\}(s+u^2\eta_z)}\right\}\right]du +$$

$$\frac{1}{\phi c_t \pi^2 \sqrt{\eta_z \eta_y}} \times \sum_{i=L+1}^{M} q_i(s) e^{-st_{0i}} \int_0^\infty \frac{\sin(ux)}{u}\{\cos(ux_{01i})-\cos(ux_{02i})\}\left[K_0\left\{\sqrt{\left\{\frac{(z-z_{0i})^2}{\eta_z}+\frac{(y-y_{0i})^2}{\eta_y}\right\}(s+u^2\eta_x)}\right\} - \right.$$

$$K_0\left\{\sqrt{\left\{\frac{(x+x_{0i})^2}{\eta_x}+\frac{(y-y_{0i})^2}{\eta_y}\right\}(s+u^2\eta_z)}\right\} - K_0\left\{\sqrt{\left\{\frac{(z-z_{0i})^2}{\eta_z}+\frac{(y+y_{0i})^2}{\eta_y}\right\}(s+u^2\eta_x)}\right\} +$$

$$\left. K_0\left\{\sqrt{\left\{\frac{(z+z_{0i})^2}{\eta_z}+\frac{(y+y_{0i})^2}{\eta_y}\right\}(s+u^2\eta_x)}\right\}\right]du + \frac{1}{\phi c_t \pi^2 \sqrt{\eta_x \eta_y}} \times \sum_{i=M+1}^{N} q_i(s) e^{-st_{0i}}$$

$$\int_0^\infty \frac{\sin(uy)}{u}\{\cos(uy_{01i})-\cos(uy_{02i})\}\left[K_0\left\{\sqrt{\left\{\frac{(x-x_{0i})^2}{\eta_x}+\frac{(z-z_{0i})^2}{\eta_z}\right\}(s+u^2\eta_y)}\right\} - K_0\left\{\sqrt{\left\{\frac{(x+x_{0i})^2}{\eta_x}+\frac{(z-z_{0i})^2}{\eta_z}\right\}(s+u^2\eta_y)}\right\} - \right.$$

$$\left. K_0\left\{\sqrt{\left\{\frac{(x-x_{0i})^2}{\eta_x}+\frac{(z+z_{0i})^2}{\eta_z}\right\}(s+u^2\eta_y)}\right\} + K_0\left\{\sqrt{\left\{\frac{(x+x_{0i})^2}{\eta_x}+\frac{(z+z_{0i})^2}{\eta_z}\right\}(s+u^2\eta_y)}\right\}\right]du$$

and $$p = \frac{1}{8\phi c_t \pi \sqrt{\eta_x \eta_y}} \sum_{i=0}^{L} U(t-t_{0i}) \int_0^{t-t_{0i}} \frac{q_i(t-t_{0i}-u)}{u}\left\{e^{-\frac{(x-x_{0i})^2}{4\eta_x u}} - e^{-\frac{(x+x_{0i})^2}{4\eta_x u}}\right\}\left\{e^{-\frac{(y-y_{0i})^2}{4\eta_y u}} - e^{-\frac{(y+y_{0i})^2}{4\eta_y u}}\right\} \times \tag{10.1.29}$$

$$\left\{\text{erf}\left(\frac{z-z_{01i}}{2\sqrt{\eta_z u}}\right) + \text{erf}\left(\frac{z+z_{01i}}{2\sqrt{\eta_z u}}\right) - \text{erf}\left(\frac{z-z_{02i}}{2\sqrt{\eta_z u}}\right) - \text{erf}\left(\frac{z+z_{02i}}{2\sqrt{\eta_z u}}\right)\right\}du +$$

$$\frac{1}{8\phi c_t \pi \sqrt{\eta_z \eta_y}} \sum_{i=L+1}^{M} U(t-t_{0i}) \int_0^{t-t_{0i}} \frac{q_i(t-t_{0i}-u)}{u}\left\{e^{-\frac{(z-z_{0i})^2}{4\eta_z u}} - e^{-\frac{(z+z_{0i})^2}{4\eta_z u}}\right\}\left\{e^{-\frac{(y-y_{0i})^2}{4\eta_y u}} - e^{-\frac{(y+y_{0i})^2}{4\eta_y u}}\right\} \times$$

$$\left\{\text{erf}\left(\frac{x-x_{01i}}{2\sqrt{\eta_x u}}\right) + \text{erf}\left(\frac{x+x_{01i}}{2\sqrt{\eta_x u}}\right) - \text{erf}\left(\frac{x-x_{02i}}{2\sqrt{\eta_x u}}\right) - \text{erf}\left(\frac{x+x_{02i}}{2\sqrt{\eta_x u}}\right)\right\}du +$$

$$\frac{1}{8\phi c_t \pi \sqrt{\eta_z \eta_x}} \sum_{i=M+1}^{N} U(t-t_{0i}) \int_0^{t-t_{0i}} \frac{q_i(t-t_{0i}-u)}{u}\left\{e^{-\frac{(x-x_{0i})^2}{4\eta_x u}} - e^{-\frac{(x+x_{0i})^2}{4\eta_x u}}\right\}\left\{e^{-\frac{(x-x_{0i})^2}{4\eta_x u}} - e^{-\frac{(x+x_{0i})^2}{4\eta_x u}}\right\} \times$$

$$\left\{\text{erf}\left(\frac{y-y_{01i}}{2\sqrt{\eta_y u}}\right) + \text{erf}\left(\frac{y+y_{01i}}{2\sqrt{\eta_y u}}\right) - \text{erf}\left(\frac{y-y_{02i}}{2\sqrt{\eta_y u}}\right) - \text{erf}\left(\frac{y+y_{02i}}{2\sqrt{\eta_y u}}\right)\right\}du$$

45

The spatial average pressure response of the line $[z_{02_\diamond} - z_{01_\diamond}]$, $\iota=\diamond$, is obtained by a further integration.

$$\bar{p} = \frac{1}{\phi c_t \pi^2 (z_{02\diamond} - z_{01\diamond}) \sqrt{\eta_x \eta_y}} \times \sum_{i=1}^{L} q_i(s)^{-st_{0i}} \int_0^\infty \{\cos(uz_{01\diamond}) - \cos(uz_{02\diamond})\}\{\cos(uz_{01i}) - \tag{10.1.30}$$

$$\cos(uz_{02i})\} \times \left[K_0\left\{\sqrt{\left\{\frac{(x-x_{0i})^2}{\eta_x}+\frac{(y-y_{0i})^2}{\eta_y}\right\}(s+u^2\eta_z)}\right\} - K_0\left\{\sqrt{\left\{\frac{(x+x_{0i})^2}{\eta_x}+\frac{(y-y_{0i})^2}{\eta_y}\right\}(s+u^2\eta_z)}\right\} - \right.$$

$$\left. K_0\left\{\sqrt{\left\{\frac{(x-x_{0i})^2}{\eta_x}+\frac{(y+y_{0i})^2}{\eta_y}\right\}(s+u^2\eta_z)}\right\} + K_0\left\{\sqrt{\left\{\frac{(x+x_{0i})^2}{\eta_x}+\frac{(y+y_{0i})^2}{\eta_y}\right\}(s+u^2\eta_z)}\right\}\right]du +$$

$$\frac{1}{\phi c_t \pi^2 (z_{02\diamond} - z_{01\diamond}) \sqrt{\eta_z \eta_y}} \times \sum_{i=L+1}^{M} q_i(s) e^{-st_{0i}} \int_0^\infty \frac{\sin(ux)}{u}\{\cos(ux_{01i}) - \cos(ux_{02i})\} \int_{z_{01\diamond}}^{z_{02\diamond}}\left[K_0\left\{\sqrt{\left\{\frac{(z-z_{0i})^2}{\eta_z}+\frac{(y-y_{0i})^2}{\eta_y}\right\}(s+u^2\eta_x)}\right\} - \right.$$

-continued $$K_0\left\{\sqrt{\left\{\frac{(z+z_{0i})^2}{\eta_x}+\frac{(y-y_{0i})^2}{\eta_y}\right\}(s+u^2\eta_z)}\right\}-K_0\left\{\sqrt{\left\{\frac{(z-z_{0i})^2}{\eta_z}+\frac{(y+y_{0i})^2}{\eta_y}\right\}(s+u^2\eta_x)}\right\}+K_0\left\{\sqrt{\left\{\frac{(z+z_{0i})^2}{\eta_z}+\frac{(y+y_{0i})^2}{\eta_y}\right\}(s+u^2\eta_x)}\right\}\Bigg]dzdu+$$

$$\frac{1}{\phi c_t \pi^2 (z_{02\diamond}-z_{01\diamond})\sqrt{\eta_x\eta_z}}\times \sum_{i=M+1}^{N} q_i(s)e^{-st_{0i}} \int_0^\infty \frac{\sin(uy)}{u}\{\cos(uy_{01i})-\cos(uy_{02i})\} \int_{z_{01\diamond}}^{z_{02\diamond}}\left[K_0\left\{\sqrt{\left\{\frac{(x-x_{0i})^2}{\eta_x}+\frac{(z-z_{0i})^2}{\eta_z}\right\}(s+u^2\eta_y)}\right\}-\right.$$

$$K_0\left\{\sqrt{\left\{\frac{(x+x_{0i})^2}{\eta_x}+\frac{(z-z_{0i})^2}{\eta_z}\right\}(s+u^2\eta_y)}\right\}-K_0\left\{\sqrt{\left\{\frac{(x-x_{0i})^2}{\eta_x}+\frac{(z+z_{0i})^2}{\eta_z}\right\}(s+u^2\eta_y)}\right\}+K_0\left\{\sqrt{\left\{\frac{(x+x_{0i})^2}{\eta_x}+\frac{(z+z_{0i})^2}{\eta_z}\right\}(s+u^2\eta_y)}\right\}\Bigg]dzdu$$

and $$p=\frac{1}{8\phi c_t \pi(z_{02\diamond}-z_{01\diamond})\sqrt{\eta_x\eta_y}}\times \sum_{i=0}^{L} U(t-t_{0i})\int_0^{t-t_{0i}} \frac{q_i(t-t-u)}{u}\left\{e^{-\frac{(x-x_{0i})^2}{4\eta_x u}}-e^{-\frac{(x+x_{0i})^2}{4\eta_x u}}\right\}\left\{e^{-\frac{(y-y_{0i})^2}{4\eta_y u}}-e^{-\frac{(y+y_{0i})^2}{4\eta_y u}}\right\}\times \quad (10.1.31)$$

$$\left[(z_{02\diamond}-z_{01i})\operatorname{erf}\left(\frac{z_{02\diamond}-z_{01i}}{2\sqrt{\eta_x u}}\right)-(z_{01\diamond}-z_{01i})\operatorname{erf}\left(\frac{z_{01\diamond}-z_{01i}}{2\sqrt{\eta_z u}}\right)+(z_{02\diamond}+z_{01i})\operatorname{erf}\left(\frac{z_{02\diamond}+z_{01i}}{2\sqrt{\eta_z u}}\right)-(z_{01\diamond}+z_{01i})\operatorname{erf}\left(\frac{z_{01\diamond}+z_{01i}}{2\sqrt{\eta_z u}}\right)+\right.$$

$$2\sqrt{\frac{\eta_z u}{\pi}}\left\{e^{-\frac{(z_{02\diamond}-z_{01i})^2}{4\eta_z u}}-e^{-\frac{(z_{01\diamond}-z_{01i})^2}{4\eta_z u}}\right\}+2\sqrt{\frac{\eta_z u}{\pi}}\left\{e^{-\frac{(z_{02\diamond}+z_{01i})^2}{4\eta_z u}}-e^{-\frac{(z_{01\diamond}+z_{01i})^2}{4\eta_z u}}\right\}-(z_{02\diamond}-z_{02i})\operatorname{erf}\left(\frac{z_{02\diamond}-z_{02i}}{2\sqrt{\eta_z u}}\right)-$$

$$(z_{01\diamond}-z_{02i})\operatorname{erf}\left(\frac{z_{01\diamond}-z_{02i}}{2\sqrt{\eta_z u}}\right)-(z_{02\diamond}+z_{02i})\operatorname{erf}\left(\frac{z_{02\diamond}+z_{02i}}{2\sqrt{\eta_z u}}\right)-(z_{01\diamond}+z_{02i})\operatorname{erf}\left(\frac{z_{01\diamond}+z_{02i}}{2\sqrt{\eta_z u}}\right)+2\sqrt{\frac{\eta_z u}{\pi}}\left\{e^{-\frac{(z_{02\diamond}-z_{02i})^2}{4\eta_z u}}-e^{-\frac{(z_{01\diamond}-z_{02i})^2}{4\eta_z u}}\right\}+$$

$$2\sqrt{\frac{\eta_z u}{\pi}}\left\{e^{-\frac{(z_{02\diamond}-z_{02i})^2}{4\eta_z u}}-e^{-\frac{(z_{01\diamond}-z_{02i})^2}{4\eta_z u}}\right\}\Bigg]du+\frac{1}{8\phi c_t(z_{02\diamond}-z_{01\diamond})\sqrt{\pi\eta_y}}\sum_{i=L+1}^{M} U(t-t_{0i})\int_0^{t-t_{0i}} \frac{q_i(t-t_{0i}-u)}{\sqrt{u}}\left\{e^{-\frac{(y-y_{0i})^2}{4\eta_y u}}-e^{-\frac{(y+y_{0i})^2}{4\eta_y u}}\right\}\times$$

$$\left\{\operatorname{erf}\left(\frac{z_{02\diamond}-z_{0i}}{2\sqrt{\eta_z u}}\right)-\operatorname{erf}\left(\frac{z_{01\diamond}-z_{0i}}{2\sqrt{\eta_z u}}\right)-\operatorname{erf}\left(\frac{z_{02\diamond}+z_{0i}}{2\sqrt{\eta_z u}}\right)+\operatorname{erf}\left(\frac{z_{01\diamond}+z_{0i}}{2\sqrt{\eta_z u}}\right)\right\}\times \left\{\operatorname{erf}\left(\frac{x-x_{01i}}{2\sqrt{\eta_x u}}\right)+\right.$$

$$\operatorname{erf}\left(\frac{x+x_{01i}}{2\sqrt{\eta_x u}}\right)-\operatorname{erf}\left(\frac{x-x_{02i}}{2\sqrt{\eta_x u}}\right)-\operatorname{erf}\left(\frac{x+x_{02i}}{2\sqrt{\eta_x u}}\right)\right\}du+\frac{1}{8\phi c_t(z_{02\diamond}-z_{01\diamond})\sqrt{\pi\eta_x}}\sum_{i=M+1}^{N} U(t-t_{0i})\int_0^{t-t_{0i}} \frac{q_i(t-t_{0i}-u)}{\sqrt{u}}\left\{e^{-\frac{(x-x_{0i})^2}{4\eta_x u}}-e^{-\frac{(x+x_{0i})^2}{4\eta_x u}}\right\}\times$$

$$\left\{\operatorname{erf}\left(\frac{z_{02\diamond}-z_{0i}}{2\sqrt{\eta_z u}}\right)-\operatorname{erf}\left(\frac{z_{01\diamond}-z_{0i}}{2\sqrt{\eta_z u}}\right)-\operatorname{erf}\left(\frac{z_{02\diamond}+z_{0i}}{2\sqrt{\eta_z u}}\right)+\operatorname{erf}\left(\frac{z_{01\diamond}+z_{0i}}{2\sqrt{\eta_z u}}\right)\right\}\times \left\{\operatorname{erf}\left(\frac{y-y_{01i}}{2\sqrt{\eta_y u}}\right)+\operatorname{erf}\left(\frac{y+y_{01i}}{2\sqrt{\eta_y u}}\right)-\operatorname{erf}\left(\frac{y-y_{02i}}{2\sqrt{\eta_y u}}\right)-\operatorname{erf}\left(\frac{y+y_{02i}}{2\sqrt{\eta_y u}}\right)\right\}du$$

The solution of equation (10.1.2) in the infinite region $[-\infty<x<\infty]$, $[-\infty<y<\infty]$ and $[-\infty<z<\infty]$ may be obtained by taking the complex Fourier transform [equation (2.2.1)].

$$\bar{\bar{\bar{p}}} = \frac{Qe^{inx_0}e^{imy_0}e^{ilz_0}e^{-st_0}}{\phi c_t(n^2\eta_x + m^2\eta_y + l^2\eta_z + s)} \qquad (10.1.32)$$

Successive inverse Fourier* and Laplace transforms of equation (10.1.14) are

*See equation (2.2.11).

$$\bar{p} = \frac{Qe^{-st_0}s^{\frac{1}{4}}K_{\frac{1}{2}}\left(\sqrt{\left\{\frac{(x-x_0)^2}{\eta_x} + \frac{(y-y_0)^2}{\eta_y} + \frac{(z-z_0)^2}{\eta_z}\right\}s}\right)}{\phi c_t (2\pi)^{\frac{3}{2}}\sqrt{\eta_x\eta_y\eta_z}\left\{\frac{(x-x_0)^2}{\eta_x} + \frac{(y-y_0)^2}{\eta_y} + \frac{(z-z_0)^2}{\eta_z}\right\}^{\frac{1}{4}}} \qquad (10.1.33)$$

and $$p = \frac{U(t-t_0)Qe^{-\left\{\frac{(x-x_0)^2}{4\eta_x(t-t_0)} + \frac{(y-y_0)^2}{4\eta_y(t-t_0)} + \frac{(z-z_0)^2}{4\eta_z(t-t_0)}\right\}}}{8\phi c_t \{\pi(t-t_0)\}^{\frac{3}{2}}\sqrt{\eta_x\eta_y\eta_z}} \qquad (10.1.34)$$

respectively*. The corresponding continuous solution is given by

*For translation into cylindrical coordinates we write $x = r\cos\theta$, $y = r\sin\theta$, $x_0 = r_0\cos\theta_0$, $y_0 = r_0\sin\theta_0$ and $\eta_x = \eta_y = \eta_r$.

$$\bar{p} = \frac{q(s)e^{-st_0}K_{\frac{1}{2}}\left(\sqrt{\left\{\frac{(x-x_0)^2}{\eta_x} + \frac{(y-y_0)^2}{\eta_y} + \frac{(z-z_0)^2}{\eta_z}\right\}s}\right)}{\phi c_t (2\pi)^{\frac{3}{2}}\sqrt{\eta_x\eta_y\eta_z}\left\{\frac{(x-x_0)^2}{\eta_x} + \frac{(y-y_0)^2}{\eta_y} + \frac{(z-z_0)^2}{\eta_z}\right\}^{\frac{1}{4}}} \qquad (10.1.35)$$

and $$p = \frac{U(t-t_0)}{8\phi c_t \pi^{\frac{3}{2}}\sqrt{\eta_x\eta_y\eta_z}} \int_0^{t-t_0} \frac{q(t-t_0-\tau)}{\sqrt{\tau^3}} e^{-\left\{\frac{(x-x_0)^2}{4\eta_x\tau} + \frac{(y-y_0)^2}{4\eta_y\tau} + \frac{(z-z_0)^2}{4\eta_z\tau}\right\}} d\tau \qquad (10.1.36)$$

We consider some special cases of practical relevance.
(i) q(t) is a constant and equal to q $$\bar{p} = \frac{qe^{-st_0}K_{\frac{1}{2}}\left(\sqrt{\left\{\frac{(x-x_0)^2}{\eta_x} + \frac{(y-y_0)^2}{\eta_y} + \frac{(z-z_0)^2}{\eta_z}\right\}s}\right)}{\phi c_t (2\pi)^{\frac{3}{2}}s^{\frac{3}{4}}\sqrt{\eta_x\eta_y\eta_z}\left\{\frac{(x-x_0)^2}{\eta_x} + \frac{(y-y_0)^2}{\eta_y} + \frac{(z-z_0)^2}{\eta_z}\right\}^{\frac{1}{4}}} \qquad (10.1.37)$$

and $$p = \frac{qU(t-t_0)\Gamma\left[\frac{1}{2}, \frac{1}{4(t-t_0)}\left\{\frac{(x-x_0)^2}{\eta_x} + \frac{(y-y_0)^2}{\eta_y} + \frac{(z-z_0)^2}{\eta_z}\right\}\right]}{4\phi c_t \pi^{\frac{3}{2}}\sqrt{\eta_x\eta_y\eta_z}\sqrt{\left\{\frac{(x-x_0)^2}{\eta_x} + \frac{(y-y_0)^2}{\eta_y} + \frac{(z-z_0)^2}{\eta_z}\right\}}} \qquad (10.1.38)$$

(ii) $q(t) = qt^\nu$, $\nu \geq 0$, $t > 0$ $$\bar{p} = \frac{q\Gamma(\nu+1)e^{-st_0}K_{\frac{1}{2}}\left(\sqrt{\left\{\frac{(x-x_0)^2}{\eta_x} + \frac{(y-y_0)^2}{\eta_y} + \frac{(z-z_0)^2}{\eta_z}\right\}s}\right)}{\phi c_t (2\pi)^{\frac{3}{2}}s^{\nu+\frac{3}{4}}\sqrt{\eta_x\eta_y\eta_z}\left\{\frac{(x-x_0)^2}{\eta_x} + \frac{(y-y_0)^2}{\eta_y} + \frac{(z-z_0)^2}{\eta_z}\right\}^{\frac{1}{4}}} \qquad (10.1.39)$$

and $$p = \frac{q\Gamma(v+1)U(t-t_0)t^{(v-\frac{1}{2})}e^{-\frac{1}{4(t-t_0)}\left\{\frac{(x-x_0)^2}{\eta_x}+\frac{(y-y_0)^2}{\eta_y}+\frac{(z-z_0)^2}{\eta_z}\right\}}}{4\phi c_t \pi^{\frac{3}{2}}\sqrt{\eta_x\eta_y\eta_z}\sqrt{\left\{\frac{(x-x_0)^2}{\eta_x}+\frac{(y-y_0)^2}{\eta_y}+\frac{(z-z_0)^2}{\eta_z}\right\}}} \times \quad (10.1.40)$$

$$\Psi\left(v+1,\frac{3}{2};\frac{1}{4(t-t_0)}\left\{\frac{(x-x_0)^2}{\eta_x}+\frac{(y-y_0)^2}{\eta_y}+\frac{(z-z_0)^2}{\eta_z}\right\}\right)$$

(iii) A line of finite length $[z_{02}\text{-}z_{01}]$ passing through $(x_0, y_0)$. Instantaneous source $$\bar{p} = \frac{Qe^{-st_0}}{2\phi c_t \pi^2 \sqrt{\eta_x\eta_y}} \int_0^\infty \frac{1}{l} K_0\left\{\sqrt{\left\{\frac{(x-x_0)^2}{\eta_x}+\frac{(y-y_0)^2}{\eta_y}\right\}(s+l^2\eta_z)}\right\}[\sin\{l(z-z_{01})\}-\sin\{l(z-z_{02})\}]\,dl \quad (10.1.41)$$

Then for an instantaneous point source equation (10.1.16) becomes $$p = \frac{U(t-t_0)Qe^{-\left[\frac{\{r^2+r_0^2-2rr_0\cos(\theta-\theta_0)\}}{4\eta_r(t-t_0)}+\frac{(z-z_0)^2}{4\eta_z(t-t_0)}\right]}}{8\phi c_t\{\pi(t-t_0)\}^{\frac{3}{2}}\sqrt{\eta_r^2\eta_x}}$$

and for a continuous point source equation (10.1.18) becomes $$p = \frac{U(t-t_0)}{8\phi c_t \pi^{\frac{3}{2}}\sqrt{\eta_r^2\eta_z}} \int_0^{t-t_0}\left(\frac{q(t-t_0-\tau)}{\sqrt{\tau^3}}e\right)^{-\left[\frac{\{r^2+r_0^2-2rr_0\cos(\theta-\theta_0)\}}{4\eta_r\tau}+\frac{(z-z_0)^2}{4\eta_z\tau}\right]}d\tau$$

and for a continuous source $$\bar{p} = \frac{q(s)e^{-st_0}}{2\phi c_t \pi^2 \sqrt{\eta_x\eta_y}} \int_0^\infty \frac{1}{l} K_0\left\{\sqrt{\left\{\frac{(x-x_0)^2}{\eta_x}+\frac{(y-y_0)^2}{\eta_y}\right\}(s+l^2\eta_z)}\right\}[\sin\{l(z-z_{01})\}-\sin\{l(z-z_{02})\}]\,dl \quad (10.1.43)$$

and $$p = \frac{U(t-t_0)}{8\phi c_t \pi\sqrt{\eta_x\eta_y}} \int_0^{t-t_0} \frac{q(t-t_0-u)}{u}\left\{\text{erf}\left(\frac{z-z_{01}}{2\sqrt{\eta_z u}}\right)-\text{erf}\left(\frac{z-z_{02}}{2\sqrt{\eta_z u}}\right)\right\}e^{-\frac{1}{4u}\left\{\frac{(z-z_0)^2}{\eta_z}+\frac{(y-y_0)^2}{\eta_y}\right\}}du \quad (10.1.44)$$

For the case $q(t)$ is a constant and equal $q$ $$\bar{p} = \quad (10.1.45)$$

$$\frac{qe^{-st_0}}{2\phi c_t \pi^2 s\sqrt{\eta_x\eta_y}} \int_0^\infty \frac{1}{l} K_0\left\{\sqrt{\left\{\frac{(x-x_0)^2}{\eta_x}+\frac{(y-y_0)^2}{\eta_y}\right\}(s+l^2\eta_z)}\right\}[\sin\{l(z-z_{01})\}-\sin\{l(z-z_{02})\}]\,dl$$

and $$p = \frac{U(t-t_0)q}{8\phi c_t \pi\sqrt{\eta_x\eta_y}} \int_0^{t-t_0} \frac{1}{u}\left\{\text{erf}\left(\frac{z-z_{01}}{2\sqrt{\eta_z u}}\right)-\text{erf}\left(\frac{z-z_{02}}{2\sqrt{\eta_z u}}\right)\right\}e^{-\frac{1}{4u}\left\{\frac{(z-z_0)^2}{\eta_z}+\frac{(y-y_0)^2}{\eta_y}\right\}}du \quad (10.1.46)$$

(iv) Spatial average pressure response of the line $[z_{02}\text{-}z_{01}]$ $$\bar{p} = \frac{q(s)e^{-st_0}}{\phi c_t \pi^2 (z_{02}-z_{01})\sqrt{\eta_x\eta_y}} \int_0^\infty \frac{1}{l^2}[1-\cos\{l(z_{02}-z_{01})\}]K_0\left\{\sqrt{\left\{\frac{(x-x_0)^2}{\eta_x}+\frac{(y-y_0)^2}{\eta_y}\right\}(s+l^2\eta_z)}\right\}dl \qquad (10.1.47)$$

and $$p = \frac{U(t-t_0)}{4\phi c_t \pi \sqrt{\eta_x\eta_y}} \int_0^{t-t_0} q(t-t_0-u)\left\{\frac{1}{u}\mathrm{erf}\left(\frac{z_{02}-z_{01}}{2\sqrt{\eta_z u}}\right)+2\sqrt{\frac{\eta_z}{\pi u}}\left(\frac{e^{-\frac{(z_{02}-z_{01})^2}{4\eta_z u}}-1}{z_{02}-z_{01}}\right)\right\}(e)^{-\frac{1}{4u}\left\{\frac{(z-z_0)^2}{\eta_z}+\frac{(y-y_0)^2}{\eta_y}\right\}}du \qquad (10.1.48)$$

(v) Multiple lines of finite length $[z_{02_\iota}\text{-}z_{01_\iota}]$, $[x_{02_\iota}\text{-}x_{01_\iota}]$ and $[y_{02_\iota}\text{-}y_{01_\iota}]$ passing through $(x_{0_\iota}, y_{0_\iota})$ for $\iota=1, 2, \ldots, L$, $(y_{0_\iota}, z_{0_\iota})$ for $\iota=L+1, 2, \ldots, M$, and $(x_{0_\iota}, z_{0_\iota})$ for $\iota=M+1, 2, \ldots, N$ respectively. Where $(L<M<N)$.

$$\bar{p} = \frac{1}{2\phi c_t \pi^2 \sqrt{\eta_x\eta_y}} \sum_{\iota=1}^{L} q_\iota(s)e^{-st_{0\iota}} \int_0^\infty \frac{1}{u} K_0\left\{\sqrt{\left\{\frac{(x-x_{0\iota})^2}{\eta_x}+\frac{(y-y_{0\iota})^2}{\eta_y}\right\}(s+u^2\eta_z)}\right\} \times [\sin\{u(z-z_{01\iota})\}-\sin\{u(z-z_{02\iota})\}]du \; +$$

$$\frac{1}{2\phi c_t \pi^2 \sqrt{\eta_z\eta_y}} \sum_{\iota=L+1}^{M} q_\iota(s)e^{-st_{0\iota}} \int_0^\infty \frac{1}{u} K_0\left\{\sqrt{\left\{\frac{(z-z_{0\iota})^2}{\eta_z}+\frac{(y-y_{0\iota})^2}{\eta_y}\right\}(s+u^2\eta_x)}\right\} \times [\sin\{u(x-x_{01\iota})\}-\sin\{u(x-x_{02\iota})\}]du \; +$$

$$\frac{1}{2\phi c_t \pi^2 \sqrt{\eta_z\eta_x}} \sum_{\iota=M+1}^{N} q_\iota(s)e^{-st_{0\iota}} \int_0^\infty \frac{1}{u} K_0\left\{\sqrt{\left\{\frac{(z-z_{0\iota})^2}{\eta_z}+\frac{(x-x_{0\iota})^2}{\eta_x}\right\}(s+u^2\eta_y)}\right\} \times [\sin\{u(y-y_{01\iota})\}-\sin\{u(y-y_{02\iota})\}]du \qquad (10.1.49)$$

and $$p = \frac{1}{8\phi c_t \pi \sqrt{\eta_x\eta_y}} \times \sum_{\iota=1}^{L} U(t-t_{0\iota}) \int_0^{t-t_{0\iota}} \frac{q_\iota(t-t_{0\iota}-\tau)}{\tau}\left\{\mathrm{erf}\left(\frac{z-z_{01\iota}}{2\sqrt{\eta_z\tau}}\right)-\mathrm{erf}\left(\frac{z-z_{02\iota}}{2\sqrt{\eta_z\tau}}\right)\right\}e^{-\frac{1}{4\tau}\left\{\frac{(z-z_{0\iota})^2}{\eta_z}+\frac{(y-y_{0\iota})^2}{\eta_y}\right\}} d\tau \; +$$

$$\frac{1}{8\phi c_t \pi \sqrt{\eta_x\eta_y}} \times \sum_{\iota=L+1}^{M} U(t-t_{0\iota}) \int_0^{t-t_{0\iota}} \frac{q_\iota(t-t_{0\iota}-\tau)}{\tau}\left\{\mathrm{erf}\left(\frac{x-x_{01\iota}}{2\sqrt{\eta_x\tau}}\right)-\mathrm{erf}\left(\frac{x-x_{02\iota}}{2\sqrt{\eta_x\tau}}\right)\right\}e^{-\frac{1}{4\tau}\left\{\frac{(z-z_{0\iota})^2}{\eta_z}+\frac{(y-y_{0\iota})^2}{\eta_y}\right\}} d\tau \; +$$

$$\frac{1}{8\phi c_t \pi \sqrt{\eta_x\eta_z}} \times \sum_{\iota=M+1}^{N} U(t-t_{0\iota}) \int_0^{t-t_{0\iota}} \frac{q_\iota(t-t_{0\iota}-\tau)}{\tau}\left\{\mathrm{erf}\left(\frac{y-y_{01\iota}}{2\sqrt{\eta_y\tau}}\right)-\mathrm{erf}\left(\frac{y-y_{02\iota}}{2\sqrt{\eta_y\tau}}\right)\right\}e^{-\frac{1}{4\tau}\left\{\frac{(x-x_{0\iota})^2}{\eta_x}+\frac{(z-z_{0\iota})^2}{\eta_z}\right\}} d\tau \qquad (10.1.50)$$

The spatial average pressure response of the line $[z_{02_\diamond}\text{-}z_{01_\diamond}]$, $\iota=\diamond$, is obtained by a further integration.

$$\bar{p} = \frac{1}{2\phi c_t \pi^2 \sqrt{\eta_x\eta_y}} \sum_{\iota=1}^{L} \frac{q_\iota(s)e^{-st_{0\iota}}}{(z_{02\diamond}-z_{01\diamond})} \times$$

$$\int_0^\infty \frac{1}{u^2}[\cos\{u(z_{01\diamond}-z_{01\iota})\}-\cos\{u(z_{02\diamond}-z_{01\iota})\}-\cos\{u(z_{01\diamond}-z_{02\iota})\}+\cos\{u(z_{02\diamond}-z_{02\iota})\}] \times$$

$$K_0\left\{\sqrt{\left\{\frac{(x-x_{0\iota})^2}{\eta_x}+\frac{(y-y_{0\iota})^2}{\eta_y}\right\}(s+u^2\eta_z)}\right\}du + \frac{1}{2\phi c_t \pi^2 \sqrt{\eta_z\eta_y}} \sum_{\iota=L+1}^{M} \frac{q_\iota(s)e^{-st_{0\iota}}}{(z_{02\diamond}-z_{01\diamond})} \times$$

$$\int_0^\infty \frac{1}{u}[\sin\{u(x-x_{01\iota})\}-\sin\{u(x-x_{02\iota})\}]\int_{z_{01\diamond}}^{z_{02\diamond}} K_0\left\{\sqrt{\left\{\frac{(z-z_{0\iota})^2}{\eta_z}+\frac{(y-y_{0\iota})^2}{\eta_y}\right\}(s+u^2\eta_x)}\right\}dz\,du \; +$$

$$\frac{1}{2\phi c_t \pi^2 \sqrt{\eta_z\eta_x}} \sum_{\iota=M+1}^{N} \frac{q_\iota(s)e^{-st_{0\iota}}}{(z_{02\diamond}-z_{01\diamond})} \times \int_0^\infty \frac{1}{u}[\sin\{u(y-y_{01\iota})\}-\sin\{u(y-y_{02\iota})\}]\int_{z_{01\diamond}}^{z_{02\diamond}} K_0\left\{\sqrt{\left\{\frac{(z-z_{0\iota})^2}{\eta_z}+\frac{(x-x_{0\iota})^2}{\eta_x}\right\}(s+u^2\eta_y)}\right\}dz\,du \qquad (10.1.51)$$

and $$p = \frac{1}{8\phi c_t \pi (z_{02\diamond} - z_{01\diamond})\sqrt{\eta_x \eta_y}} \times \sum_{\iota=1}^{L} U(t-t_{0\iota}) \int_0^{t-t_{0\iota}} \frac{q_\iota(t-t_{0\iota}-u)}{u} \left[ (z_{02\diamond} - z_{01\iota})\mathrm{erf}\left(\frac{z_{02\diamond} - z_{01\iota}}{2\sqrt{\eta_z u}}\right) - \right.$$

$$(z_{01\diamond} - z_{01\iota})\mathrm{erf}\left(\frac{z_{01\diamond} - z_{01\iota}}{2\sqrt{\eta_z u}}\right) - (z_{02\diamond} - z_{02\iota})\mathrm{erf}\left(\frac{z_{02\diamond} - z_{02\iota}}{2\sqrt{\eta_z u}}\right) + (z_{01\diamond} - z_{02\iota})\mathrm{erf}\left(\frac{z_{01\diamond} - z_{02\iota}}{2\sqrt{\eta_z u}}\right) +$$

$$2\sqrt{\frac{\eta_z u}{\pi}} \left\{ e^{-\frac{(z_{02\diamond}-z_{01\iota})^2}{4\eta_z u}} - e^{-\frac{(z_{01\diamond}-z_{01\iota})^2}{4\eta_z u}} - e^{-\frac{(z_{02\diamond}-z_{02\iota})^2}{4\eta_z u}} + e^{-\frac{(z_{01\diamond}-z_{02\iota})^2}{4\eta_z u}} \right\} \left. e^{-\frac{1}{4u}\left\{\frac{(x-x_{0\iota})^2}{\eta_x} + \frac{(y-y_{0\iota})^2}{\eta_y}\right\}} \right] du +$$

(10.1.52)

$$\frac{1}{8\phi c_t (z_{02\diamond} - z_{01\diamond})\sqrt{\pi\eta_y}} \sum_{\iota=L+1}^{M} u(t-t_{0\iota}) \int_0^{t-t_{0\iota}} \frac{q_\iota(t-t_{0\iota}-u)}{\sqrt{u}} \left\{ \mathrm{erf}\left(\frac{x-x_{01\iota}}{2\sqrt{\eta_x u}}\right) - \mathrm{erf}\left(\frac{y-y_{02\iota}}{2\sqrt{\eta_x u}}\right) \right\} \times$$

$$\left\{ \mathrm{erf}\left(\frac{z_{02\diamond} - z_{0\iota}}{2\sqrt{\eta_z u}}\right) - \mathrm{erf}\left(\frac{z_{01\diamond} - z_{0\iota}}{2\sqrt{\eta_z u}}\right) \right\} e^{-\frac{(y-y_{0\iota})^2}{4\eta_y u}} du +$$

$$\frac{1}{8\phi c_t (z_{02\diamond} - z_{01\diamond})\sqrt{\pi\eta_x}} \sum_{\iota=M+1}^{N} U(t-t_{0\iota}) \int_0^{t-t_{0\iota}} \frac{q_\iota(t-t_{0\iota}-u)}{\sqrt{u}} \left\{ \mathrm{erf}\left(\frac{y-y_{01\iota}}{2\sqrt{\eta_y u}}\right) - \mathrm{erf}\left(\frac{y-y_{02\iota}}{2\sqrt{\eta_y u}}\right) \right\} \times \left\{ \mathrm{erf}\left(\frac{z_{02\diamond} - z_{0\iota}}{2\sqrt{\eta_z u}}\right) - \mathrm{erf}\left(\frac{z_{01\diamond} - z_{0\iota}}{2\sqrt{\eta_z u}}\right) \right\} e^{-\frac{(z-z_{0\iota})^2}{4\eta_z u}} du$$

10.2 The problem of 10.1, except for all $t>0$, $p(0,y,z,t)=\psi_{yz}(y,z,t)$, $y>0$, $z>0$, $p(x,0,z,t)=\psi_{xz}(x,z,t)$, $x>0$, $z>0$, and $p(x,y,0,t)=\psi_{xy}(x,y,t)$, $x>0$, $y>0$. The initial pressure $p(x,y,z,0)=\Phi(x,y,z)$. $\Phi(x,y,z)$ and its derivative tend to zero as $x\to\infty$, $y\to\infty$ and $z\to\infty$.

The solution for the continuous point source is (10.2.1)

$$\overline{p} = \frac{q(s)e^{-st_0}s^{\frac{1}{4}}}{\phi c_t (2\pi)^{\frac{3}{2}}\sqrt{\eta_x\eta_y\eta_z}} \left[ \frac{K_{\frac{1}{2}}\left(\sqrt{\left\{\frac{(x-x_0)^2}{\eta_x} + \frac{(y-y_0)^2}{\eta_y} + \frac{(z-z_0)^2}{\eta_z}\right\}s}\right)}{\left\{\frac{(x-x_0)^2}{\eta_x} + \frac{(y-y_0)^2}{\eta_y} + \frac{(z-z_0)^2}{\eta_z}\right\}^{\frac{1}{4}}} - \frac{K_{\frac{1}{2}}\left(\sqrt{\left\{\frac{(x+x_0)^2}{\eta_x} + \frac{(y-y_0)^2}{\eta_y} + \frac{(z-z_0)^2}{\eta_z}\right\}s}\right)}{\left\{\frac{(x+x_0)^2}{\eta_x} + \frac{(y-y_0)^2}{\eta_y} + \frac{(z-z_0)^2}{\eta_z}\right\}^{\frac{1}{4}}} - \right.$$

$$\frac{K_{\frac{1}{2}}\left(\sqrt{\left\{\frac{(x-x_0)^2}{\eta_x} + \frac{(y+y_0)^2}{\eta_y} + \frac{(z-z_0)^2}{\eta_z}\right\}s}\right)}{\left\{\frac{(x-x_0)^2}{\eta_x} + \frac{(y+y_0)^2}{\eta_y} + \frac{(z-z_0)^2}{\eta_z}\right\}^{\frac{1}{4}}} + \frac{K_{\frac{1}{2}}\left(\sqrt{\left\{\frac{(x+x_0)^2}{\eta_x} + \frac{(y+y_0)^2}{\eta_y} + \frac{(z-z_0)^2}{\eta_z}\right\}s}\right)}{\left\{\frac{(x+x_0)^2}{\eta_x} + \frac{(y+y_0)^2}{\eta_y} + \frac{(z-z_0)^2}{\eta_z}\right\}^{\frac{1}{4}}} - \frac{K_{\frac{1}{2}}\left(\sqrt{\left\{\frac{(x-x_0)^2}{\eta_x} + \frac{(y-y_0)^2}{\eta_y} + \frac{(z+z_0)^2}{\eta_z}\right\}s}\right)}{\left\{\frac{(x-x_0)^2}{\eta_x} + \frac{(y-y_0)^2}{\eta_y} + \frac{(z+z_0)^2}{\eta_z}\right\}^{\frac{1}{4}}} +$$

$$\frac{K_{\frac{1}{2}}\left(\sqrt{\left\{\frac{(x+x_0)^2}{\eta_x} + \frac{(y-y_0)^2}{\eta_y} + \frac{(z+z_0)^2}{\eta_z}\right\}s}\right)}{\left\{\frac{(x+x_0)^2}{\eta_x} + \frac{(y-y_0)^2}{\eta_y} + \frac{(z+z_0)^2}{\eta_z}\right\}^{\frac{1}{4}}} + \frac{K_{\frac{1}{2}}\left(\sqrt{\left\{\frac{(x-x_0)^2}{\eta_x} + \frac{(y+y_0)^2}{\eta_y} + \frac{(z+z_0)^2}{\eta_z}\right\}s}\right)}{\left\{\frac{(x-x_0)^2}{\eta_x} + \frac{(y+y_0)^2}{\eta_y} + \frac{(z+z_0)^2}{\eta_z}\right\}^{\frac{1}{4}}} - \frac{K_{\frac{1}{2}}\left(\sqrt{\left\{\frac{(x+x_0)^2}{\eta_x} + \frac{(y+y_0)^2}{\eta_y} + \frac{(z+z_0)^2}{\eta_z}\right\}s}\right)}{\left\{\frac{(x+x_0)^2}{\eta_x} + \frac{(y+y_0)^2}{\eta_y} + \frac{(z+z_0)^2}{\eta_z}\right\}^{\frac{1}{4}}} \right] +$$

$$\frac{8}{\pi^3} \int_0^\infty \int_0^\infty \int_0^\infty \left\{ \frac{n\eta_x \overline{\overline{\psi}}_{yz}(m,l,s) + m\eta_y \overline{\overline{\psi}}_{xz}(n,l,s) + l\eta_z \overline{\overline{\psi}}_{xy}(n,m,s)}{(s + \eta_x n^2 + \eta_y m^2 + \eta_z l^2)} \right\} \sin(nx)\sin(my)\sin(lz)\, dn\, dm\, dl +$$

$$\frac{s^{\frac{1}{4}}}{(2\pi)^{\frac{3}{2}}\sqrt{\eta_x\eta_y\eta_z}} \int_0^\infty \int_0^\infty \int_0^\infty \varphi(u,v,w) \left[ \frac{K_{\frac{1}{2}}\left(\sqrt{\left\{\frac{(x-u)^2}{\eta_x} + \frac{(y-v)^2}{\eta_y} + \frac{(z-w)^2}{\eta_z}\right\}s}\right)}{\left\{\frac{(x-u)^2}{\eta_x} + \frac{(y-v)^2}{\eta_y} + \frac{(z-w)^2}{\eta_z}\right\}^{\frac{1}{4}}} - \frac{K_{\frac{1}{2}}\left(\sqrt{\left\{\frac{(x+u)^2}{\eta_x} + \frac{(y-v)^2}{\eta_y} + \frac{(z-w)^2}{\eta_z}\right\}s}\right)}{\left\{\frac{(x+u)^2}{\eta_x} + \frac{(y-v)^2}{\eta_y} + \frac{(z-w)^2}{\eta_z}\right\}^{\frac{1}{4}}} -$$

-continued $$\frac{K_{\frac{1}{2}}\left(\sqrt{\left\{\frac{(x-u)^2}{\eta_x}+\frac{(y+v)^2}{\eta_y}+\frac{(z-w)^2}{\eta_z}\right\}s}\right)}{\left\{\frac{(x-u)^2}{\eta_x}+\frac{(y-v)^2}{\eta_y}+\frac{(z-w)^2}{\eta_z}\right\}^{\frac{1}{4}}}+\frac{K_{\frac{1}{2}}\left(\sqrt{\left\{\frac{(x+u)^2}{\eta_x}+\frac{(y+v)^2}{\eta_y}+\frac{(z-w)^2}{\eta_z}\right\}s}\right)}{\left\{\frac{(x+u)^2}{\eta_x}+\frac{(y+v)^2}{\eta_y}+\frac{(z-w)^2}{\eta_z}\right\}^{\frac{1}{4}}}-$$

$$\frac{K_{\frac{1}{2}}\left(\sqrt{\left\{\frac{(x-u)^2}{\eta_x}+\frac{(y-v)^2}{\eta_y}+\frac{(z+w)^2}{\eta_z}\right\}s}\right)}{\left\{\frac{(x-u)^2}{\eta_x}+\frac{(y-v)^2}{\eta_y}+\frac{(z+w)^2}{\eta_z}\right\}^{\frac{1}{4}}}+\frac{K_{\frac{1}{2}}\left(\sqrt{\left\{\frac{(x+u)^2}{\eta_x}+\frac{(y-v)^2}{\eta_y}+\frac{(z+w)^2}{\eta_z}\right\}s}\right)}{\left\{\frac{(x+u)^2}{\eta_x}+\frac{(y-v)^2}{\eta_y}+\frac{(z+w)^2}{\eta_z}\right\}^{\frac{1}{4}}}+$$

$$\frac{K_{\frac{1}{2}}\left(\sqrt{\left\{\frac{(x-u)^2}{\eta_x}+\frac{(y+v)^2}{\eta_y}+\frac{(z+w)^2}{\eta_z}\right\}s}\right)}{\left\{\frac{(x-u)^2}{\eta_x}+\frac{(y+v)^2}{\eta_y}+\frac{(z+w)^2}{\eta_z}\right\}^{\frac{1}{4}}}-\frac{K_{\frac{1}{2}}\left(\sqrt{\left\{\frac{(x+u)^2}{\eta_x}+\frac{(y+v)^2}{\eta_y}+\frac{(z+w)^2}{\eta_z}\right\}s}\right)}{\left\{\frac{(x+u)^2}{\eta_x}+\frac{(y+v)^2}{\eta_y}+\frac{(z+w)^2}{\eta_z}\right\}^{\frac{1}{4}}}\Bigg]du\,dv\,dw \text{ and}$$

(10.2.2)

$$p=\frac{U(t-t_0)}{8\phi c_t \pi^{\frac{3}{2}}\sqrt{\eta_x\eta_y\eta_z}}\int_0^{t-t_0}\frac{q(t-t_0-\tau)}{\tau^{\frac{3}{2}}}\left\{e^{-\frac{(x-x_0)^2}{4\eta_x\tau}}-e^{-\frac{(x+x_0)^2}{4\eta_x\tau}}\right\}\left\{e^{-\frac{(y-y_0)^2}{4\eta_y\tau}}-e^{-\frac{(y+y_0)^2}{4\eta_y\tau}}\right\}\times\left\{e^{-\frac{(z-z_0)^2}{4\eta_z\tau}}-e^{-\frac{(z+z_0)^2}{4\eta_z\tau}}\right\}d\tau+$$

$$\frac{8}{\pi^3}\int_0^\infty\int_0^\infty\int_0^\infty\int_0^t\left\{n\eta_x\overline{\overline{\psi}}_{yz}(m,l,t-\tau)+m\eta_y\overline{\overline{\psi}}_{xz}(n,l,t-\tau)+l\eta_z\overline{\overline{\psi}}_{xy}(n,m,t-\tau)\right\}\times\sin(nx)e^{-\eta_x n^2\tau}\sin(my)e^{-\eta_y m^2\tau}\sin(lz)e^{-\eta_z l^2\tau}d\tau\,dn\,dm\,dl+$$

$$\frac{1}{8(\pi t)^{\frac{3}{2}}\sqrt{\eta_x\eta_y\eta_z}}\int_0^\infty\int_0^\infty\int_0^\infty\varphi(u,v,w)\left\{e^{-\frac{(x-u)^2}{4\eta_x t}}-e^{-\frac{(x+u)^2}{4\eta_x t}}\right\}\left\{e^{-\frac{(y-u)^2}{4\eta_y t}}-e^{-\frac{(y+v)^2}{4\eta_y t}}\right\}\times\left\{e^{-\frac{(z-w)^2}{4\eta_z t}}-e^{-\frac{(z+w)^2}{4\eta_z t}}\right\}du\,dv\,dw$$

where $\overline{\overline{\psi}}_{xz}(n,l,s)=\int_0^\infty\int_0^\infty\overline{\psi}_{xz}(x,z,s)\sin(nx)\sin(lz)\,dx\,dz$, $\overline{\overline{\psi}}_{yz}(m,l,s)=\int_0^\infty\int_0^\infty\overline{\psi}_{yz}(y,z,s)\sin(my)\sin(lz)\,dy\,dz$, $\overline{\overline{\psi}}_{xy}(n,m,s)=\int_0^\infty\int_0^\infty\overline{\psi}_{xy}(x,y,s)\sin(nx)\sin(my)\,dx\,dy$, $\overline{\overline{\psi}}_{xz}(n,l,t)=\int_0^\infty\int_0^\infty\psi_{xz}(x,z,t)\sin(nx)\sin(lz)\,dx\,dz$, $\overline{\overline{\psi}}_{yz}(m,l,t)=\int_0^\infty\int_0^\infty\psi_{yz}(y,z,t)\sin(my)\sin(lz)\,dy\,dz$, $\overline{\overline{\psi}}_{xy}(n,m,t)=\int_0^\infty\int_0^\infty\psi_{xy}(x,y,t)\sin(nx)\sin(my)\,dx\,dy$, $\overline{\psi}_{xz}(x,z,s)=\int_0^\infty\psi_{xz}(x,z,t)e^{-st}\,dt$, $\overline{\psi}_{yz}(y,z,s)=\int_0^\infty\psi_{yz}(y,z,t)e^{-st}\,dt$, and $\overline{\psi}_{xy}(x,y,s)=\int_0^\infty\psi_{xy}(x,y,t)e^{-st}\,dt$.

We consider some special cases.

(i) $\psi_{yz}(y,z,t)=\psi_{yz}(t)$, $\psi_{xz}(x,z,t)=\psi_{xz}(t)$,
$\psi_{xy}(x,y,t)=\psi_{xy}(t)$, $q(t)=0$ and $\varphi(u,v,w)=0$.  (10.2.3)

$$\overline{p}=\frac{8}{\pi^3}\int_0^\infty\int_0^\infty\int_0^\infty\left(\frac{n^2\eta_x\overline{\psi}_{yz}(s)+m^2\eta_y\overline{\psi}_{xz}(s)+l^2\eta_z\overline{\psi}_{xy}(s)}{nml(s+\eta_x n^2+\eta_y m^2+\eta_z l^2)}\right)\sin(nx)\sin(my)\sin(lz)\,dn\,dm\,dl \text{ and}$$

$$p=\frac{1}{2\sqrt{\pi}}\left\{\frac{x}{\sqrt{\eta_x}}\int_0^t\frac{\psi_{yz}(t-\tau)e^{-\frac{x^2}{4\eta_x\tau}}}{\sqrt{\tau^3}}\,erf\left(\frac{y}{2\sqrt{\eta_y\tau}}\right)erf\left(\frac{z}{2\sqrt{\eta_z\tau}}\right)d\tau+\right.$$ (10.2.4)

$$\left.\frac{y}{\sqrt{\eta_y}}\int_0^t\frac{\psi_{xz}(t-\tau)e^{-\frac{y^2}{4\eta_y\tau}}}{\sqrt{\tau^3}}erf\left(\frac{x}{2\sqrt{\eta_x\tau}}\right)erf\left(\frac{z}{2\sqrt{\eta_z\tau}}\right)d\tau+\frac{z}{2\sqrt{\eta_z}}\int_0^t\frac{\psi_{xy}(t-\tau)e^{-\frac{z^2}{4\eta_z\tau}}}{\sqrt{\tau^3}}erf\left(\frac{x}{2\sqrt{\eta_x\tau}}\right)erf\left(\frac{y}{2\sqrt{\eta_y\tau}}\right)d\tau\right\}$$

(ii) $\psi_{yz}(y,z,t)=p_{yz}$, $\psi_{xz}(x,z,t)=p_{xz}$, $\psi_{xy}(x,y,t)=p_{xy}$; $p_{yz}$, $p_{xz}$ and $p_{xy}$ are constants. $q(t)=0$ and $\varphi(u,v,w)=0$.

$$\overline{p}=\frac{8}{\pi^3}\int_0^\infty\int_0^\infty\int_0^\infty\left\{\frac{n^2\eta_x p_{yz}+m^2\eta_y p_{xz}+l^2\eta_x p_{xy}}{snml(s+\eta_x n^2+\eta_y m^2+\eta_z l^2)}\right\}\sin(nx)\sin(my)\sin(lz)\,dn\,dm\,dl \text{ and}$$ (10.2.5)

$$p = \frac{1}{2\sqrt{\pi}}\left\{\frac{p_{yz}x}{\sqrt{\eta_x}}\int_0^t \frac{e^{-\frac{x^2}{4\eta_x\tau}}}{\sqrt{\tau^3}}\mathrm{erf}\left(\frac{y}{2\sqrt{\eta_y\tau}}\right)\mathrm{erf}\left(\frac{z}{2\sqrt{\eta_z\tau}}\right)d\tau + \right.$$
$$\left. \frac{p_{xz}y}{\sqrt{\eta_y}}\int_0^t \frac{e^{-\frac{y^2}{4\eta_y\tau}}}{\sqrt{\tau^3}}\mathrm{erf}\left(\frac{x}{2\sqrt{\eta_x\tau}}\right)\mathrm{erf}\left(\frac{z}{2\sqrt{\eta_z\tau}}\right)d\tau + \frac{p_{xy}z}{\sqrt{\eta_z}}\int_0^t \frac{e^{-\frac{x^2}{4\eta_z\tau}}}{\sqrt{\tau^3}}\mathrm{erf}\left(\frac{x}{2\sqrt{\eta_x\tau}}\right)\mathrm{erf}\left(\frac{y}{2\sqrt{\eta_y\tau}}\right)\right\}$$
(10.2.6)

(iii) $\varphi(x, y, z) = \frac{p_I}{xyz}$; $x > 0, y > 0, z > 0$, $q(t) = 0$ and $\psi_{yz}(y, z, t) = \psi_{xz}(x, z, t) = \psi_{xy}(x, y, t) = 0$.

$$\bar{p} = p_I \int_0^\infty \int_0^\infty \int_0^\infty \frac{\sin(nx)\sin(my)\sin(lz)}{(n^2\eta_x + m^2\eta_y + l^2\eta_x + s)}\, dn\, dm\, dl \text{ and}$$
(10.2.7)

$$p = \frac{p_I xyz}{8\eta_x\eta_y\eta_z t^3}e^{-\frac{1}{4t}\left(\frac{x^2}{\eta_x}+\frac{y^2}{\eta_y}+\frac{z^2}{\eta_z}\right)}\Phi\left(\frac{1}{2},\frac{3}{2};\frac{x^2}{4\eta_x t}\right)\Phi\left(\frac{1}{2},\frac{3}{2};\frac{y^2}{4\eta_y t}\right)\Phi\left(\frac{1}{2},\frac{3}{2};\frac{z^2}{4\eta_z t}\right)$$
(10.2.8)

(iv) $\varphi(x, y, z) = \frac{p_I}{\sqrt{xyz}}$; $x > 0, y > 0, z > 0$, $q(t) = 0$ and $\psi_{yz}(y, z, t) = \psi_{xz}(x, z, t) = \psi_{xy}(x, y, t) = 0$.

$$\bar{p} = p_I\sqrt{\left(\frac{2}{\pi}\right)^3}\int_0^\infty \int_0^\infty \int_0^\infty \frac{\sin(nx)\sin(my)\sin(lz)}{\sqrt{nml}\,(n^2\eta_x + m^2\eta_y + l^2\eta_z + s)}\,dn\,dm\,dl \text{ and}$$
(10.2.9)

$$p = \frac{p_I}{8}\left(\frac{\pi}{t}\right)^{\frac{3}{2}}\sqrt{\frac{xyz}{\eta_x\eta_y\eta_z}}\,e^{-\frac{1}{8t}\left(\frac{x^2}{\eta_x}+\frac{y^2}{\eta_y}+\frac{z^2}{\eta_z}\right)}I_{\frac{1}{4}}\left(\frac{x^2}{8\eta_x t}\right)I_{\frac{1}{4}}\left(\frac{y^2}{8\eta_y t}\right)I_{\frac{1}{4}}\left(\frac{z^2}{8\eta_z t}\right)$$
(10.2.10)

(v) A line of finite length $[z_{02}\text{-}z_{01}]$ passing through $(x_0, y_0)$.

(10.2.11)

$$\bar{p} = \frac{q(s)e^{-st_0}}{\phi c_t \pi^2 \sqrt{\eta_x\eta_y}}\int_0^\infty \frac{\sin(lz)}{l}\{\cos(lz_{01}) - \cos(lz_{02})\}\left[K_0\left\{\sqrt{\left\{\frac{(x-x_0)^2}{\eta_x}+\frac{(y-y_0)^2}{\eta_y}\right\}(s+l^2\eta_z)}\right\} - \right.$$

$$\left. K_0\left\{\sqrt{\left\{\frac{(x+x_0)^2}{\eta_x}+\frac{(y-y_0)^2}{\eta_y}\right\}(s+l^2\eta_z)}\right\} - K_0\left\{\sqrt{\left\{\frac{(x-x_0)^2}{\eta_x}+\frac{(y+y_0)^2}{\eta_y}\right\}(s+l^2\eta_z)}\right\} + K_0\left\{\sqrt{\left\{\frac{(x+x_0)^2}{\eta_x}+\frac{(y+y_0)^2}{\eta_y}\right\}(s+l^2\eta_z)}\right\}\right]dl +$$

$$\frac{8}{\pi^3}\int_0^\infty\int_0^\infty\int_0^\infty \left\{\frac{n\eta_x\bar{\bar{\psi}}_{yz}(m,l,s) + m\eta_y\bar{\bar{\psi}}_{xz}(n,l,s) + l\eta_z\bar{\bar{\psi}}_{xy}(n,m,s)}{(s+\eta_x n^2 + \eta_y m^2 + \eta_z l^2)}\right\}\sin(nx)\sin(my)\sin(lz)\,dn\,dm\,dl +$$

$$\frac{s^{\frac{1}{4}}}{(2\pi)^{\frac{3}{2}}\sqrt{\eta_x\eta_y\eta_z}}\int_0^\infty\int_0^\infty\int_0^\infty \varphi(u,v,w)\left[\frac{K_{\frac{1}{2}}\left(\sqrt{\left\{\frac{(x-u)^2}{\eta_x}+\frac{(y-v)^2}{\eta_y}+\frac{(z-w)^2}{\eta_z}\right\}s}\right)}{\left\{\frac{(x-u)^2}{\eta_x}+\frac{(y-v)^2}{\eta_y}+\frac{(z-w)^2}{\eta_z}\right\}^{\frac{1}{4}}} - \frac{K_{\frac{1}{2}}\left(\sqrt{\left\{\frac{(x+u)^2}{\eta_x}+\frac{(y-v)^2}{\eta_y}+\frac{(z-w)^2}{\eta_z}\right\}s}\right)}{\left\{\frac{(x+u)^2}{\eta_x}+\frac{(y-v)^2}{\eta_y}+\frac{(z-w)^2}{\eta_z}\right\}^{\frac{1}{4}}} - \right.$$

$$\frac{K_{\frac{1}{2}}\left(\sqrt{\left\{\frac{(x-u)^2}{\eta_x}+\frac{(y+v)^2}{\eta_y}+\frac{(z-w)^2}{\eta_z}\right\}s}\right)}{\left\{\frac{(x-u)^2}{\eta_x}+\frac{(y+v)^2}{\eta_y}+\frac{(z-w)^2}{\eta_z}\right\}^{\frac{1}{4}}} + \frac{K_{\frac{1}{2}}\left(\sqrt{\left\{\frac{(x+u)^2}{\eta_x}+\frac{(y+v)^2}{\eta_y}+\frac{(z-w)^2}{\eta_z}\right\}s}\right)}{\left\{\frac{(x+u)^2}{\eta_x}+\frac{(y+v)^2}{\eta_y}+\frac{(z-w)^2}{\eta_z}\right\}^{\frac{1}{4}}} -$$

$$\frac{K_{\frac{1}{2}}\left(\sqrt{\left\{\frac{(x-u)^2}{\eta_x}+\frac{(y-v)^2}{\eta_y}+\frac{(z+w)^2}{\eta_z}\right\}s}\right)}{\left\{\frac{(x-u)^2}{\eta_x}+\frac{(y-v)^2}{\eta_y}+\frac{(z+w)^2}{\eta_z}\right\}^{\frac{1}{4}}} + \frac{K_{\frac{1}{2}}\left(\sqrt{\left\{\frac{(x+u)^2}{\eta_x}+\frac{(y-v)^2}{\eta_y}+\frac{(z+w)^2}{\eta_z}\right\}s}\right)}{\left\{\frac{(x+u)^2}{\eta_x}+\frac{(y-v)^2}{\eta_y}+\frac{(z+w)^2}{\eta_z}\right\}^{\frac{1}{4}}} +$$

-continued $$\left. \frac{K_{\frac{1}{2}}\left(\sqrt{\left\{\frac{(x-u)^2}{\eta_x}+\frac{(y+v)^2}{\eta_y}+\frac{(z+w)^2}{\eta_z}\right\}s}\right)}{\left\{\frac{(x-u)^2}{\eta_x}+\frac{(y+v)^2}{\eta_y}+\frac{(z+w)^2}{\eta_z}\right\}^{\frac{1}{4}}} - \frac{K_{\frac{1}{2}}\left(\sqrt{\left\{\frac{(x+u)^2}{\eta_x}+\frac{(y+v)^2}{\eta_y}+\frac{(z+w)^2}{\eta_z}\right\}s}\right)}{\left\{\frac{(x+u)^2}{\eta_x}+\frac{(y+v)^2}{\eta_y}+\frac{(z+w)^2}{\eta_z}\right\}^{\frac{1}{4}}} \right] du\,dv\,dw \text{ and}$$

(10.2.12)

$$p = \frac{U(t-t_0)}{8\phi c_t \pi \sqrt{\eta_x \eta_y}} \int_0^{t-t_0} \frac{q(t-t_0-\tau)}{\tau} \left\{ e^{-\frac{(x-x_0)^2}{4\eta_x \tau}} - e^{-\frac{(x+x_0)^2}{4\eta_x \tau}} \right\} \left\{ e^{-\frac{(y-y_0)^2}{4\eta_y \tau}} - e^{-\frac{(y+y_0)^2}{4\eta_y \tau}} \right\} \times \left\{ erf\left(\frac{z-z_{01}}{2\sqrt{\eta_z \tau}}\right) + erf\left(\frac{z+z_{01}}{2\sqrt{\eta_z \tau}}\right) - erf\left(\frac{z-z_{02}}{2\sqrt{\eta_z \tau}}\right) - erf\left(\frac{z+z_{02}}{2\sqrt{\eta_z \tau}}\right) \right\} d\tau +$$

$$\frac{8}{\pi^3} \int_0^\infty \int_0^\infty \int_0^\infty \int_0^t \{n\eta_x \overline{\overline{\psi}}_{yz}(m,l,t-\tau) + m\eta_y \overline{\overline{\psi}}_{xz}(n,l,t-\tau) + l\eta_z \overline{\overline{\psi}}_{xy}(n,m,t-\tau)\} \times \sin(nx)e^{-\eta_x n^2 \tau} \sin(my)e^{-\eta_y m^2 \tau} \sin(lz)e^{-\eta_z l^2 \tau} d\tau\,dn\,dm\,dl +$$

$$\frac{1}{8(\pi t)^{\frac{3}{2}}\sqrt{\eta_x \eta_y \eta_z}} \int_0^\infty \int_0^\infty \int_0^\infty \varphi(u,v,w) \left\{ e^{-\frac{(x-u)^2}{4\eta_x t}} - e^{-\frac{(x+u)^2}{4\eta_x t}} \right\} \left\{ e^{-\frac{(y-v)^2}{4\eta_y t}} - e^{-\frac{(y+v)^2}{4\eta_y t}} \right\} \times \left\{ e^{-\frac{(z-w)^2}{4\eta_z t}} - e^{-\frac{(z+w)^2}{4\eta_z t}} \right\} du\,dv\,dw$$

The spatial average pressure response of the line $[z_{02}\text{-}z_{01}]$ is obtained by a further integration.

(10.2.13)

$$\overline{p} = \frac{q(s)e^{-st_0}}{\phi c_t \pi^2 \cdot (z_{02}-z_{01})\sqrt{\eta_x \eta_y}} \int_0^\infty \frac{1}{l^2} \{\cos(lz_{01}) - \cos(lz_{02})\}^2 \left[ K_0\left\{\sqrt{\left\{\frac{(x-x_0)^2}{\eta_x}+\frac{(y-y_0)^2}{\eta_y}\right\}(s+l^2\eta_z)}\right\} - \right.$$

$$\left. K_0\left\{\sqrt{\left\{\frac{(x+x_0)^2}{\eta_x}+\frac{(y-y_0)^2}{\eta_y}\right\}(s+l^2\eta_z)}\right\} - K_0\left\{\sqrt{\left\{\frac{(x-x_0)^2}{\eta_x}+\frac{(y+y_0)^2}{\eta_y}\right\}(s+l^2\eta_x)}\right\} + K_0\left\{\sqrt{\left\{\frac{(x+x_0)^2}{\eta_x}+\frac{(y+y_0)^2}{\eta_y}\right\}(s+l^2\eta_z)}\right\} \right] dl +$$

$$\frac{8}{\pi^3(z_{02}-z_{01})} \int_0^\infty \int_0^\infty \int_0^\infty \frac{1}{l} \left\{ \frac{n\eta_x \overline{\overline{\psi}}_{yz}(m,l,s) + m\eta_y \overline{\overline{\psi}}_{xz}(n,l,s) + l\eta_x \overline{\overline{\psi}}_{xy}(n,m,s)}{(s+\eta_x n^2 + \eta_y m^2 + \eta_z l^2)} \right\} \times \sin(nx)\sin(my)\{\cos(lz_{01}) - \cos(lz_{02})\} dn\,dm\,dl +$$

$$\frac{1}{2\pi^2(z_{02}-z_{01})\sqrt{\eta_x \eta_y}} \int_0^\infty \int_0^\infty \int_0^\infty \varphi(u,v,w) \int_0^\infty \frac{1}{l} \left[ K_0\left\{\sqrt{\left\{\frac{(x-u)^2}{\eta_x}+\frac{(y-v)^2}{\eta_y}\right\}(s+l^2\eta_z)}\right\} - K_0\left\{\sqrt{\left\{\frac{(x+u)^2}{\eta_x}+\frac{(y-v)^2}{\eta_y}\right\}(s+l^2\eta_z)}\right\} - \right.$$

$$\left. K_0\left\{\sqrt{\left\{\frac{(x-u)^2}{\eta_x}+\frac{(y+v)^2}{\eta_y}\right\}(s+l^2\eta_z)}\right\} + K_0\left\{\sqrt{\left\{\frac{(x+u)^2}{\eta_x}+\frac{(y+v)^2}{\eta_y}\right\}(s+l^2\eta_z)}\right\} \right] \sin(lw)\{\cos(lz_{01}) - \cos(lz_{02})\} dl\,du\,dv\,dw \text{ and}$$

(10.2.14)

$$p = \frac{U(t-t_0)}{4\phi c_t \pi(z_{02}-z_{01})\sqrt{\eta_x \eta_y}} \int_0^{t-t_0} \frac{q(t-t_0-\tau)}{\tau} \left[ (z_{02}-z_{01})erf\left(\frac{z_{02}-z_{01}}{2\sqrt{\eta_z \tau}}\right) + (z_{02}+z_{01})erf\left(\frac{z_{02}+z_{01}}{2\sqrt{\eta_z \tau}}\right) + 2\sqrt{\frac{\eta_z \tau}{\pi}} \left\{ 2e^{-\frac{(z_{01}^2+z_{02}^2)}{4\eta_z \tau}} \cosh\left(\frac{z_{01}z_{02}}{2\eta_z \tau}\right) - 1 \right\} - \right.$$

$$\left. z_{02}\,erf\left(\frac{z_{02}}{\sqrt{\eta_z \tau}}\right) - z_{01}\,erf\left(\frac{z_{01}}{\sqrt{\eta_x \tau}}\right) - \sqrt{\frac{\eta_z \tau}{\pi}}\left(e^{-\frac{z_{01}^2}{\eta_z \tau}} + e^{-\frac{z_{02}^2}{\eta_z \tau}}\right) \right] \left\{ e^{-\frac{(x-x_0)^2}{4\eta_z \tau}} - e^{-\frac{(x+x_0)^2}{4\eta_z \tau}} \right\} \left\{ e^{-\frac{(y-y_0)^2}{4\eta_y \tau}} - e^{-\frac{(y+y_0)^2}{4\eta_y \tau}} \right\} d\tau +$$

$$\frac{8}{\pi^3(z_{02}-z_{01})} \int_0^\infty \int_0^\infty \int_0^\infty \int_0^t \frac{1}{l} \{n\eta_x \overline{\overline{\psi}}_{yz}(m,l,t-\tau) + m\eta_y \overline{\overline{\psi}}_{xz}(n,l,t-\tau) + l\eta_x \overline{\overline{\psi}}_{xy}(n,m,t-\tau)\} \times$$

$$\sin(nx)e^{-\eta_x n^2 \tau}\sin(my)e^{-\eta_y m^2 \tau}\{\cos(lz_{01}) - \cos(lz_{02})\}e^{-\eta_z l^2 \tau} d\tau\,dn\,dm\,dl +$$

$$\frac{1}{8\pi(z_{02}-z_{01})t\sqrt{\eta_x \eta_y}} \int_0^\infty \int_0^\infty \int_0^\infty \varphi(u,v,w) \left\{ e^{-\frac{(x-u)^2}{4\eta_x t}} - e^{-\frac{(x+u)^2}{4\eta_x t}} \right\} \left\{ e^{-\frac{(y-v)^2}{4\eta_y t}} - e^{-\frac{(y+v)^2}{4\eta_y t}} \right\} \times$$

$$\left\{ erf\left(\frac{w-z_{01}}{2\sqrt{\eta_z t}}\right) + erf\left(\frac{w+z_{01}}{2\sqrt{\eta_z t}}\right) - erf\left(\frac{w-z_{02}}{2\sqrt{\eta_z t}}\right) - erf\left(\frac{w+z_{02}}{2\sqrt{\eta_z t}}\right) \right\} du\,dv\,dw$$

(vi) Multiple lines of finite length $[z_{02_\iota}-z_{01_\iota}]$, $[x_{02_\iota}-x_{01_\iota}]$ and $[y_{02_\iota}-y_{01_\iota}]$ passing through $(x_{0_\iota},y_{0_\iota})$ for $\iota=1, 2, \ldots, L$, $(y_{0_\iota}, z_{0_\iota})$ for $\iota=L+1, 2, \ldots, M$, and $(x_{0_\iota}, z_{0_\iota})$ for $\iota=L+1, 2, \ldots, N$ respectively. Where $(L<M<N)$.

(10.2.15)

$$\bar{p} = \frac{1}{\phi c_t \pi^2 \sqrt{\eta_x \eta_y}} \times$$

$$\sum_{i=1}^{L} q_i(s) e^{-st_{0i}} \int_0^\infty \frac{\sin(uz)}{u} \{\cos(uz_{01i}) - \cos(uz_{02i})\} \left[ K_0\left\{\sqrt{\left\{\frac{(x-x_{0i})^2}{\eta_x} + \frac{(y-y_{0i})^2}{\eta_y}\right\}(s+u^2\eta_z)}\right\} - K_0\left\{\sqrt{\left\{\frac{(x+x_{0i})^2}{\eta_x} + \frac{(y-y_{0i})^2}{\eta_y}\right\}(s+u^2\eta_z)}\right\} - K_0\left\{\sqrt{\left\{\frac{(x-x_{0i})^2}{\eta_x} + \frac{(y+y_{0i})^2}{\eta_y}\right\}(s+u^2\eta_z)}\right\} + K_0\left\{\sqrt{\left\{\frac{(x+x_{0i})^2}{\eta_x} + \frac{(y+y_{0i})^2}{\eta_y}\right\}(s+u^2\eta_z)}\right\} \right] du +$$

$$\frac{1}{\phi c_t \pi^2 \sqrt{\eta_z \eta_y}} \times \sum_{i=L+1}^{M} q_i(s) e^{-st_{0i}} \int_0^\infty \frac{\sin(ux)}{u} \{\cos(ux_{01i}) - \cos(ux_{02i})\} \left[ K_0\left\{\sqrt{\left\{\frac{(z-z_{0i})^2}{\eta_z} + \frac{(y-y_{0i})^2}{\eta_y}\right\}(s+u^2\eta_x)}\right\} - K_0\left\{\sqrt{\left\{\frac{(z+z_{0i})^2}{\eta_z} + \frac{(y-y_{0i})^2}{\eta_y}\right\}(s+u^2\eta_z)}\right\} - K_0\left\{\sqrt{\left\{\frac{(z-z_{0i})^2}{\eta_z} + \frac{(y+y_{0i})^2}{\eta_y}\right\}(s+u^2\eta_x)}\right\} + K_0\left\{\sqrt{\left\{\frac{(z+z_{0i})^2}{\eta_z} + \frac{(y+y_{0i})^2}{\eta_y}\right\}(s+u^2\eta_x)}\right\} \right] du +$$

$$\frac{1}{\phi c_t \pi^2 \sqrt{\eta_x \eta_y}} \times \sum_{i=M+1}^{N} q_i(s) e^{-st_{0i}} \int_0^\infty \frac{\sin(uy)}{u} \{\cos(uy_{01i}) - \cos(uy_{02i})\} \left[ K_0\left\{\sqrt{\left\{\frac{(x-x_{0i})^2}{\eta_x} + \frac{(z-z_{0i})^2}{\eta_z}\right\}(s+u^2\eta_y)}\right\} - K_0\left\{\sqrt{\left\{\frac{(x+x_{0i})^2}{\eta_x} + \frac{(z-z_{0i})^2}{\eta_z}\right\}(s+u^2\eta_y)}\right\} - K_0\left\{\sqrt{\left\{\frac{(x-x_{0i})^2}{\eta_x} + \frac{(z+z_{0i})^2}{\eta_z}\right\}(s+u^2\eta_y)}\right\} + K_0\left\{\sqrt{\left\{\frac{(x+x_{0i})^2}{\eta_x} + \frac{(z+z_{0i})^2}{\eta_z}\right\}(s+u^2\eta_y)}\right\} \right] du +$$

$$\frac{8}{\pi^3} \int_0^\infty \int_0^\infty \int_0^\infty \left\{ \frac{n\eta_x \bar{\bar{\psi}}_{yz}(m,l,s) + m\eta_y \bar{\bar{\psi}}_{xz}(n,l,s) + l\eta_z \bar{\bar{\psi}}_{xy}(n,m,s)}{(s+\eta_x n^2 + \eta_y m^2 + \eta_z l^2)} \right\} \sin(nx)\sin(my)\sin(lz) \, dn \, dm \, dl +$$

$$\frac{s^{\frac{1}{4}}}{(2\pi)^{\frac{3}{2}}\sqrt{\eta_x \eta_y \eta_z}} \int_0^\infty \int_0^\infty \int_0^\infty \varphi(u,v,w) \left[ \frac{K_{\frac{1}{2}}\left(\sqrt{\left\{\frac{(x-u)^2}{\eta_x} + \frac{(y-v)^2}{\eta_y} + \frac{(z-w)^2}{\eta_z}\right\}s}\right)}{\left\{\frac{(x-u)^2}{\eta_x} + \frac{(y-v)^2}{\eta_y} + \frac{(z-w)^2}{\eta_z}\right\}^{\frac{1}{4}}} - \frac{K_{\frac{1}{2}}\left(\sqrt{\left\{\frac{(x+u)^2}{\eta_x} + \frac{(y-v)^2}{\eta_y} + \frac{(z-w)^2}{\eta_z}\right\}s}\right)}{\left\{\frac{(x+u)^2}{\eta_x} + \frac{(y-v)^2}{\eta_y} + \frac{(z-w)^2}{\eta_z}\right\}^{\frac{1}{4}}} -$$

$$\frac{K_{\frac{1}{2}}\left(\sqrt{\left\{\frac{(x-u)^2}{\eta_x} + \frac{(y+v)^2}{\eta_y} + \frac{(z-w)^2}{\eta_z}\right\}s}\right)}{\left\{\frac{(x-u)^2}{\eta_x} + \frac{(y+V)^2}{\eta_y} + \frac{(z-w)^2}{\eta_z}\right\}^{\frac{1}{4}}} + \frac{K_{\frac{1}{2}}\left(\sqrt{\left\{\frac{(x+u)^2}{\eta_x} + \frac{(y+v)^2}{\eta_y} + \frac{(z-w)^2}{\eta_z}\right\}s}\right)}{\left\{\frac{(x+u)^2}{\eta_x} + \frac{(y+v)^2}{\eta_y} + \frac{(z-w)^2}{\eta_z}\right\}^{\frac{1}{4}}} -$$

$$\frac{K_{\frac{1}{2}}\left(\sqrt{\left\{\frac{(x-u)^2}{\eta_x} + \frac{(y-v)^2}{\eta_y} + \frac{(z+w)^2}{\eta_z}\right\}s}\right)}{\left\{\frac{(x-u)^2}{\eta_x} + \frac{(y-v)^2}{\eta_y} + \frac{(z+w)^2}{\eta_z}\right\}^{\frac{1}{4}}} + \frac{K_{\frac{1}{2}}\left(\sqrt{\left\{\frac{(x+u)^2}{\eta_x} + \frac{(y-v)^2}{\eta_y} + \frac{(z+w)^2}{\eta_z}\right\}s}\right)}{\left\{\frac{(x+u)^2}{\eta_x} + \frac{(y-v)^2}{\eta_y} + \frac{(z+w)^2}{\eta_z}\right\}^{\frac{1}{4}}} +$$

$$\frac{K_{\frac{1}{2}}\left(\sqrt{\left\{\frac{(x-u)^2}{\eta_x} + \frac{(y-v)^2}{\eta_y} + \frac{(z+w)^2}{\eta_z}\right\}s}\right)}{\left\{\frac{(x-u)^2}{\eta_x} + \frac{(y+v)^2}{\eta_y} + \frac{(z+w)^2}{\eta_z}\right\}^{\frac{1}{4}}} - \frac{K_{\frac{1}{2}}\left(\sqrt{\left\{\frac{(x+u)^2}{\eta_x} + \frac{(y+v)^2}{\eta_y} + \frac{(z+w)^2}{\eta_z}\right\}s}\right)}{\left\{\frac{(x+u)^2}{\eta_x} + \frac{(y+v)^2}{\eta_y} + \frac{(z+w)^2}{\eta_z}\right\}^{\frac{1}{4}}} \right] du \, dv \, dw \text{ and}$$

(10.2.16)

$$p = \frac{1}{8\phi c_t \pi \sqrt{\eta_x \eta_y}} \sum_{i=0}^{L} U(t-t_{0i})$$

$$\int_0^{t-t_{0i}} \frac{q_i(t-t_{0i}-u)}{u} \left\{ e^{-\frac{(x-x_{0i})^2}{4\eta_x u}} - e^{-\frac{(x+x_{0i})^2}{4\eta_x u}} \right\} \left\{ e^{-\frac{(y-y_{0i})^2}{4\eta_y u}} - e^{-\frac{(y+y_{0i})^2}{4\eta_y u}} \right\} \times \left\{ erf\left(\frac{z-z_{01i}}{2\sqrt{\eta_z u}}\right) + erf\left(\frac{z+z_{01i}}{2\sqrt{\eta_z u}}\right) - erf\left(\frac{z-z_{02i}}{2\sqrt{\eta_z u}}\right) - erf\left(\frac{z+z_{02i}}{2\sqrt{\eta_z u}}\right) \right\} du +$$

-continued $$\frac{1}{8\phi c_t\pi\sqrt{\eta_x\eta_y}}\sum_{i=L+1}^{M}U(t-t_{0i})\int_0^{t-t_{0i}}\frac{q_i(t-t_{0i}-u)}{u}\left\{e^{-\frac{(x-x_{0i})^2}{4\eta_x u}}-e^{-\frac{(x+x_{0i})^2}{4\eta_x u}}\right\}\left\{e^{-\frac{(y-y_{0i})^2}{4\eta_y u}}-e^{-\frac{(y+y_{0i})^2}{4\eta_y u}}\right\}\times$$

$$\left\{erf\left(\frac{x-x_{01i}}{2\sqrt{\eta_x u}}\right)+erf\left(\frac{x+x_{01i}}{2\sqrt{\eta_x u}}\right)-erf\left(\frac{x-x_{02i}}{2\sqrt{\eta_x u}}\right)-erf\left(\frac{x+x_{02i}}{2\sqrt{\eta_x u}}\right)\right\}du+$$

$$\frac{1}{8\phi c_t\pi\sqrt{\eta_z\eta_x}}\sum_{i=M+1}^{N}U(t-t_{0i})\int_0^{t-t_{0i}}\frac{q_i(t-t_{0i}-u)}{u}\left\{e^{-\frac{(x-x_{0i})^2}{4\eta_x t}}-e^{-\frac{(x+x_{0i})^2}{4\eta_x u}}\right\}\left\{e^{-\frac{(x-x_{0i})^2}{4\eta_x u}}-e^{-\frac{(x+x_{0i})^2}{4\eta_x u}}\right\}\times$$

$$\left\{erf\left(\frac{y-y_{01i}}{2\sqrt{\eta_y u}}\right)+erf\left(\frac{y+y_{01i}}{2\sqrt{\eta_y u}}\right)-erf\left(\frac{y-y_{02i}}{2\sqrt{\eta_y u}}\right)-erf\left(\frac{y+y_{02i}}{2\sqrt{\eta_y u}}\right)\right\}du+$$

$$\frac{8}{\pi^3}\int_0^{\infty}\int_0^{\infty}\int_0^{\infty}\int_0^{t}\{n\eta_x\overline{\overline{\psi}}_{yz}(m,l,t-\tau)+m\eta_y\overline{\overline{\psi}}_{xz}(n,l,t-\tau)+l\eta_z\overline{\overline{\psi}}_{xy}(n,m,t-\tau)\}\times\sin(nx)e^{-\eta_x n^2\tau}\sin(my)e^{-\eta_y m^2\tau}\sin(lz)e^{-\eta_x l^2\tau}d\tau\,dn\,dm\,dl+$$

$$\frac{1}{8(\pi t)^{\frac{3}{2}}\sqrt{\eta_x\eta_y\eta_z}}\int_0^{\infty}\int_0^{\infty}\int_0^{\infty}\varphi(u,v,w)\left\{e^{-\frac{(x-u)^2}{4\eta_x t}}-e^{-\frac{(x+u)^2}{4\eta_x t}}\right\}\left\{e^{-\frac{(y-v)^2}{4\eta_y t}}-e^{-\frac{(y+v)^2}{4\eta_y t}}\right\}\times\left\{e^{-\frac{(z-w)^2}{4\eta_x t}}-e^{-\frac{(z+w)^2}{4\eta_x t}}\right\}du\,dv\,dw$$

The spatial average pressure response of the line $[z_{02\diamond}-z_{01\diamond}]$, $\iota=\diamond$, is obtained by a further integration.

(10.2.17)

$$p=\frac{1}{\phi c_t\pi^2(z_{02\diamond}-z_{01\diamond})\sqrt{\eta_x\eta_y}}\times\sum_{i=1}^{L}q_i(s)e^{-st_{0i}}\int_0^{\infty}\frac{1}{u^2}\{\cos(uz_{01\diamond})-\cos(uz_{02\diamond})\}\{\cos(uz_{01i})-\cos(uz_{02i})\}\times$$

$$\left[K_0\left\{\sqrt{\left\{\frac{(x-x_{0i})^2}{\eta_x}+\frac{(y-y_{0i})^2}{\eta_y}\right\}(s+u^2\eta_z)}\right\}-K_0\left\{\sqrt{\left\{\frac{(x+x_{0i})^2}{\eta_x}+\frac{(y-y_{0i})^2}{\eta_y}\right\}(s+u^2\eta_z)}\right\}-$$

$$K_0\left\{\sqrt{\left\{\frac{(x-x_{0i})^2}{\eta_x}+\frac{(y+y_{0i})^2}{\eta_y}\right\}(s+u^2\eta_z)}\right\}+K_0\left\{\sqrt{\left\{\frac{(x+x_{0i})^2}{\eta_x}+\frac{(y+y_{0i})^2}{\eta_y}\right\}(s+u^2\eta_z)}\right\}\right]du+$$

$$\frac{1}{\phi c_t\pi^2(z_{02\diamond}-z_{01\diamond})\sqrt{\eta_x\eta_y}}\times\left[\sum_{i=L+1}^{M}q_i(s)e^{-st_{0i}}\int_0^{\infty}\frac{\sin(ux)}{u}\{\cos(ux_{01i})-\cos(ux_{02i})\}\int_{z_{01\diamond}}^{z_{02\diamond}}\left[K_0\left\{\sqrt{\left\{\frac{(z-z_{0i})^2}{\eta_z}+\frac{(y-y_{0i})^2}{\eta_y}\right\}(s+u^2\eta_x)}\right\}-\right.\right.$$

$$K_0\left\{\sqrt{\left\{\frac{(z+z_{0i})^2}{\eta_z}+\frac{(y-y_{0i})^2}{\eta_y}\right\}(s+u^2\eta_x)}\right\}-K_0\left\{\sqrt{\left\{\frac{(z-z_{0i})^2}{\eta_z}+\frac{(y+y_{0i})^2}{\eta_y}\right\}(s+u^2\eta_x)}\right\}+$$

$$K_0\left\{\sqrt{\left\{\frac{(z+z_{0i})^2}{\eta_z}+\frac{(y+y_{0i})^2}{\eta_y}\right\}(s+u^2\eta_x)}\right\}\right]dz\,du+\frac{1}{\phi c_t\pi^2(z_{02\diamond}-z_{01\diamond})\sqrt{\eta_x\eta_z}}\times\sum_{i=M+1}^{N}q_i(s)e^{-st_{0i}}\int_0^{\infty}\frac{\sin(uy)}{u}$$

$$\{\cos(uy_{01i})-\cos(uy_{02i})\}\int_{z_{01\diamond}}^{z_{02\diamond}}\left[K_0\left\{\sqrt{\left\{\frac{(x-x_{0i})^2}{\eta_x}+\frac{(z-z_{0i})^2}{\eta_z}\right\}(s+u^2\eta_y)}\right\}-K_0\left\{\sqrt{\left\{\frac{(x+x_{0i})^2}{\eta_x}+\frac{(z-z_{0i})^2}{\eta_z}\right\}(s+u^2\eta_y)}\right\}-$$

$$K_0\left\{\sqrt{\left\{\frac{(x-x_{0i})^2}{\eta_x}+\frac{(z+z_{0i})^2}{\eta_z}\right\}(s+u^2\eta_y)}\right\}+K_0\left\{\sqrt{\left\{\frac{(x+x_{0i})^2}{\eta_x}+\frac{(z+z_{0i})^2}{\eta_z}\right\}(s+u^2\eta_y)}\right\}\right]dz\,du+$$

$$\frac{8}{\pi^3(z_{02\diamond}-z_{01\diamond})}\int_0^{\infty}\int_0^{\infty}\int_0^{\infty}\frac{1}{l}\left\{\frac{\left(n\eta_x\overline{\overline{\psi}}_{yz}(m,l,s)+m\eta_y\overline{\overline{\psi}}\psi_{xz}(n,l,s)+l\eta_z\overline{\overline{\psi}}_{xy}(n,m,s)\right)}{(s+\eta_x n^2+\eta_y m^2+\eta_z l^2)}\right\}\times\sin(nx)\sin(my)\{\cos(lz_{01\diamond})-\cos(lz_{02\diamond})\}$$

$$dn\,dm\,dl+\frac{1}{2\pi^2(z_{02\diamond}-z_{01\diamond})\sqrt{\eta_x\eta_y}}\int_0^{\infty}\int_0^{\infty}\int_0^{\infty}\varphi(u,v,w)\int_0^{\infty}\frac{1}{l^2}\left[K_0\left\{\sqrt{\left\{\frac{(x-u)^2}{\eta_x}+\frac{(y-v)^2}{\eta_y}\right\}(s+l^2\eta_z)}\right\}-\right.$$

$$K_0\left\{\sqrt{\left\{\frac{(x+u)^2}{\eta_x}+\frac{(y-v)^2}{\eta_y}\right\}(s+l^2\eta_z)}\right\}-K_0\left\{\sqrt{\left\{\frac{(x-u)^2}{\eta_x}+\frac{(y+v)^2}{\eta_y}\right\}(s+l^2\eta_x)}\right\}+$$

-continued $$K_0\left\{\sqrt{\left\{\frac{(x+u)^2}{\eta_x}+\frac{(y+v)^2}{\eta_y}\right\}(s+l^2\eta_z)}\right\}\right]\sin(lw)\{\cos(lz_{01\diamond})-\cos(lz_{02\diamond})\}e^{-l^2\eta_x t}dl\,du\,dv\,dw \text{ and}$$

(10.2.18)

$$p = \frac{1}{8\phi c_t\pi(z_{02\diamond}-z_{01\diamond})\sqrt{\eta_x\eta_y}}\times\sum_{i=0}^{L}U(t-t_{0i})\int_0^{t-t_{0i}}\frac{q_i(t-t-u)}{u}\left\{e^{-\frac{(x-x_{0i})^2}{4\eta_x u}}-e^{-\frac{(x+x_{0i})^2}{4\eta_x u}}\right\}\left\{e^{-\frac{(y-y_{0i})^2}{4\eta_y u}}-e^{-\frac{(y+y_{0i})^2}{4\eta_y u}}\right\}\times$$

$$\left[(z_{02\diamond}-z_{01i})erf\left(\frac{z_{02\diamond}-z_{01i}}{2\sqrt{\eta_z u}}\right)-(z_{01\diamond}-z_{01i})erf\left(\frac{z_{01\diamond}-z_{01i}}{2\sqrt{\eta_z u}}\right)+(z_{02\diamond}+z_{01i})erf\left(\frac{z_{02\diamond}+z_{01i}}{2\sqrt{\eta_z u}}\right)-(z_{01\diamond}+x_{01i})erf\right.$$

$$\left(\frac{z_{01\diamond}+z_{01i}}{2\sqrt{\eta_z u}}\right)+2\sqrt{\frac{\eta_z u}{\pi}}\left\{e^{-\frac{(z_{02\diamond}-z_{01i})^2}{4\eta_x u}}-e^{-\frac{(z_{01\diamond}-z_{01i})^2}{4\eta_x u}}\right\}+2\sqrt{\frac{\eta_x u}{\pi}}\left\{e^{-\frac{(z_{02\diamond}+z_{01i})^2}{4\eta_x u}}-e^{-\frac{(z_{01\diamond}+z_{01i})^2}{4\eta_x u}}\right\}-$$

$$(z_{02\diamond}-z_{02i})erf\left(\frac{z_{02\diamond}-z_{02i}}{2\sqrt{\eta_z u}}\right)-(z_{01\diamond}-z_{02i})erf\left(\frac{z_{01\diamond}-z_{02i}}{2\sqrt{\eta_z u}}\right)-(z_{02\diamond}+z_{02i})erf\left(\frac{z_{02\diamond}+z_{02i}}{2\sqrt{\eta_z u}}\right)-$$

$$(z_{\diamond 01}+z_{02i})erf\left(\frac{z_{01\diamond}+z_{02i}}{2\sqrt{\eta_z u}}\right)+2\sqrt{\frac{\eta_z u}{\pi}}\left\{e^{-\frac{(z_{02\diamond}-z_{02i})^2}{4\eta_x u}}-e^{-\frac{(z_{01\diamond}-z_{02i})^2}{4\eta_x u}}\right\}+2\sqrt{\frac{\eta_z u}{\pi}}\left\{e^{-\frac{(z_{02\diamond}+z_{02i})^2}{4\eta_x u}}-\right.$$

$$\left.e^{-\frac{(z_{01\diamond}+z_{02i})^2}{4\eta_x u}}\right\}\right]du+\frac{1}{8\phi c_t(z_{02\diamond}-z_{01\diamond})\sqrt{\pi\eta_y}}\sum_{i=L+1}^{M}U(t-t_{0i})\int_0^{t-t_{0i}}\frac{q_i(t-t_{0i}-u)}{\sqrt{u}}\left\{e^{-\frac{(y-y_{0i})^2}{4\eta_y u}}-\right.$$

$$\left.e^{-\frac{(y+y_{0i})^2}{4\eta_y u}}\right\}\times\left\{erf\left(\frac{z_{02\diamond}-z_{0i}}{2\sqrt{\eta_z u}}\right)-erf\left(\frac{z_{01\diamond}-z_{0i}}{2\sqrt{\eta_z u}}\right)-erf\left(\frac{z_{02\diamond}-z_{0i}}{2\sqrt{\eta_z u}}\right)+erf\left(\frac{z_{01\diamond}+z_{0i}}{2\sqrt{\eta_z u}}\right)\right\}\times$$

$$\left\{erf\left(\frac{x-x_{01i}}{2\sqrt{\eta_x u}}\right)+erf\left(\frac{x+x_{01i}}{2\sqrt{\eta_x u}}\right)-erf\left(\frac{x-x_{02i}}{2\sqrt{\eta_x u}}\right)-erf\left(\frac{x+x_{02i}}{2\sqrt{\eta_x u}}\right)\right\}du+$$

$$\frac{1}{8\phi c_t(z_{02\diamond}-z_{01\diamond})\sqrt{\pi\eta_x}}\sum_{i=M+1}^{N}U(t-t_{0i})\int_0^{t-t_{0i}}\frac{q_i(t-t_{0i}-u)}{\sqrt{u}}\left\{e^{-\frac{(x-x_{0i})^2}{4\eta_x u}}-e^{-\frac{(x+x_{0i})^2}{4\eta_x u}}\right\}\times$$

$$\left\{erf\left(\frac{z_{02\diamond}-z_{0i}}{2\sqrt{\eta_z u}}\right)-erf\left(\frac{z_{01\diamond}-z_{0i}}{2\sqrt{\eta_z u}}\right)-erf\left(\frac{z_{02\diamond}+z_{0i}}{2\sqrt{\eta_z u}}\right)+erf\left(\frac{z_{01\diamond}+z_{0i}}{2\sqrt{\eta_z u}}\right)\right\}\times$$

$$\left\{erf\left(\frac{y-y_{01i}}{2\sqrt{\eta_y u}}\right)+erf\left(\frac{y+y_{01i}}{2\sqrt{\eta_y u}}\right)-erf\left(\frac{y-y_{02i}}{2\sqrt{\eta_y u}}\right)-erf\left(\frac{y+y_{02i}}{2\sqrt{\eta_y u}}\right)\right\}du+$$

$$\frac{8}{\pi^3(z_{02\diamond}-z_{01\diamond})}\int_0^{\infty}\int_0^{\infty}\int_0^{\infty}\int_0^t\frac{1}{l}\left\{mn\eta_x\overline{\overline{\psi}}_{yz}(m,l,t-\tau)+mn\eta_y\overline{\overline{\psi}}_{xz}(n,l,t-\tau)+ln\eta_z\overline{\overline{\psi}}_{xy}(n,m,t-\tau)\right\}\times$$

$$\sin(nx)e^{-\eta_x n^2\tau}\sin(my)e^{-\eta_y m^2\tau}\{\cos(lz_{01\diamond})-\cos(lz_{02\diamond})\}e^{-\eta_x l^2\tau}d\tau\,dn\,dm\,dl+$$

$$\frac{1}{8\pi(z_{02\diamond}-z_{01\diamond})t\sqrt{\eta_x\eta_y}}\int_0^{\infty}\int_0^{\infty}\int_0^{\infty}\varphi(u,v,w)\left\{e^{-\frac{(x-u)^2}{4\eta_x t}}-\right.$$

$$\left.e^{-\frac{(x+u)^2}{4\eta_x t}}\right\}\left\{e^{-\frac{(y-v)^2}{4\eta_y t}}-e^{-\frac{(y+v)^2}{4\eta_y t}}\right\}\times\left\{erf\left(\frac{w-z_{01\diamond}}{2\sqrt{\eta_z t}}\right)+\right.$$

$$\left.erf\left(\frac{w+z_{01\diamond}}{2\sqrt{\eta_z t}}\right)-erf\left(\frac{w-z_{02\diamond}}{2\sqrt{\eta_z t}}\right)-erf\left(\frac{w+z_{02\diamond}}{2\sqrt{\eta_z t}}\right)\right\}du\,dv\,dw$$

10.3 The problem of 10.2, except the initial pressure $p(x,y,z,0)=p_I$, a constant for all $x>0$, $y>0$, and $z>0$.
The solution for the continuous point source is $$\bar{p} = \frac{q(s)e^{-st_0}s^{\frac{1}{4}}}{\phi c_t (2\pi)^{\frac{3}{2}}\sqrt{\eta_x\eta_y\eta_z}} \left[ \frac{K_{\frac{1}{2}}\left(\sqrt{\left\{\frac{(x-x_0)^2}{\eta_x}+\frac{(y-y_0)^2}{\eta_y}+\frac{(z-z_0)^2}{\eta_z}\right\}s}\right)}{\left\{\frac{(x-x_0)^2}{\eta_x}+\frac{(y-y_0)^2}{\eta_y}+\frac{(z-z_0)^2}{\eta_z}\right\}^{\frac{1}{4}}} - \frac{K_{\frac{1}{2}}\left(\sqrt{\left\{\frac{(x+x_0)^2}{\eta_x}+\frac{(y-y_0)^2}{\eta_y}+\frac{(z-z_0)^2}{\eta_z}\right\}s}\right)}{\left\{\frac{(x+x_0)^2}{\eta_x}+\frac{(y-y_0)^2}{\eta_y}+\frac{(z-z_0)^2}{\eta_z}\right\}^{\frac{1}{4}}} - \right.$$

$$\frac{K_{\frac{1}{2}}\left(\sqrt{\left\{\frac{(x-x_0)^2}{\eta_x}+\frac{(y+y_0)^2}{\eta_y}+\frac{(z-z_0)^2}{\eta_z}\right\}s}\right)}{\left\{\frac{(x-x_0)^2}{\eta_x}+\frac{(y+y_0)^2}{\eta_y}+\frac{(z-z_0)^2}{\eta_z}\right\}^{\frac{1}{4}}} + \frac{K_{\frac{1}{2}}\left(\sqrt{\left\{\frac{(x+x_0)^2}{\eta_x}+\frac{(y+y_0)^2}{\eta_y}+\frac{(z-z_0)^2}{\eta_z}\right\}s}\right)}{\left\{\frac{(x+x_0)^2}{\eta_x}+\frac{(y+y_0)^2}{\eta_y}+\frac{(z-z_0)^2}{\eta_z}\right\}^{\frac{1}{4}}} - \frac{K_{\frac{1}{2}}\left(\sqrt{\left\{\frac{(x-x_0)^2}{\eta_x}+\frac{(y-y_0)^2}{\eta_y}+\frac{(z+z_0)^2}{\eta_z}\right\}s}\right)}{\left\{\frac{(x-x_0)^2}{\eta_x}+\frac{(y-y_0)^2}{\eta_y}+\frac{(z+z_0)^2}{\eta_z}\right\}^{\frac{1}{4}}} +$$

$$\frac{K_{\frac{1}{2}}\left(\sqrt{\left\{\frac{(x+x_0)^2}{\eta_x}+\frac{(y-y_0)^2}{\eta_y}+\frac{(z+z_0)^2}{\eta_z}\right\}s}\right)}{\left\{\frac{(x+x_0)^2}{\eta_x}+\frac{(y-y_0)^2}{\eta_y}+\frac{(z+z_0)^2}{\eta_z}\right\}^{\frac{1}{4}}} + \frac{K_{\frac{1}{2}}\left(\sqrt{\left\{\frac{(x-x_0)^2}{\eta_x}+\frac{(y+y_0)^2}{\eta_y}+\frac{(z+z_0)^2}{\eta_z}\right\}s}\right)}{\left\{\frac{(x-x_0)^2}{\eta_x}+\frac{(y+y_0)^2}{\eta_y}+\frac{(z+z_0)^2}{\eta_z}\right\}^{\frac{1}{4}}} - \frac{K_{\frac{1}{2}}\left(\sqrt{\left\{\frac{(x+x_0)^2}{\eta_x}+\frac{(y+y_0)^2}{\eta_y}+\frac{(z+z_0)^2}{\eta_z}\right\}s}\right)}{\left\{\frac{(x+x_0)^2}{\eta_x}+\frac{(y+y_0)^2}{\eta_y}+\frac{(z+z_0)^2}{\eta_z}\right\}^{\frac{1}{4}}} \Bigg] +$$

$$\frac{8}{\pi^3}\int_0^\infty\int_0^\infty\int_0^\infty \left\{\frac{\left(n\eta_x\bar{\bar{\psi}}_{yz}(m,l,s)+m\eta_y\bar{\bar{\psi}}_{xz}(n,l,s)+l\eta_z\bar{\bar{\psi}}_{xy}(n,m,s)\right)}{(s+\eta_x n^2+\eta_y m^2+\eta_z l^2)}\right\}\sin(nx)\sin(my)\sin(lz)\,dn\,dm\,dl +$$

$$\frac{8p_I}{\pi^3}\int_0^\infty\int_0^\infty\int_0^\infty \frac{\sin(nx)\sin(my)\sin(lz)}{(s+\eta_x n^2+\eta_y m^2+\eta_z l^2)nml}\,dn\,dm\,dl$$

(10.3.1)

$$p = \frac{U(t-t_0)}{8\phi c_t \pi^{\frac{3}{2}}\sqrt{\eta_x\eta_y\eta_z}}\int_0^{t-t_0}\frac{q(t-t_0-\tau)}{\tau^{\frac{3}{2}}}\left\{e^{-\frac{(x-x_0)^2}{4\eta_x\tau}}-e^{-\frac{(x+x_0)^2}{4\eta_x\tau}}\right\}\left\{e^{-\frac{(y-y_0)^2}{4\eta_y\tau}}-e^{-\frac{(y+y_0)^2}{4\eta_y\tau}}\right\}\times\left\{e^{-\frac{(z-z_0)^2}{4\eta_z\tau}}-e^{-\frac{(z+z_0)^2}{4\eta_z\tau}}\right\}d\tau +$$

$$\frac{8}{\pi^3}\int_0^\infty\int_0^\infty\int_0^\infty\int_0^t \left\{n\eta_x\bar{\bar{\psi}}_{yz}(m,l,t-\tau)+m\eta_y\bar{\bar{\psi}}_{xz}(n,l,t-\tau)+l\eta_z\bar{\bar{\psi}}_{xy}(n,m,t-\tau)\right\}\times\sin(nx)e^{-\eta_x n^2\tau}\sin(my)e^{-\eta_y m^2\tau}\sin(lz)e^{-\eta_z l^2\tau}d\tau\,dn\,dm\,dl +$$

$$p_I\,\mathrm{erf}\left(\frac{x}{2\sqrt{\eta_x t}}\right)\mathrm{erf}\left(\frac{y}{2\sqrt{\eta_y t}}\right)\mathrm{erf}\left(\frac{z}{2\sqrt{\eta_z t}}\right)$$

(10.3.2)

where $\bar{\bar{\psi}}_{xz}(n,l,s) = \int_0^\infty\int_0^\infty \bar{\psi}_{xz}(x,z,s)\sin(nx)\sin(lz)\,dx\,dz$, $\bar{\bar{\psi}}_{yz}(m,l,s) = \int_0^\infty\int_0^\infty \bar{\psi}_{yz}(y,z,s)\sin(my)\sin(lz)\,dy\,dz$, $\bar{\bar{\psi}}_{xy}(n,m,s) = \int_0^\infty\int_0^\infty \bar{\psi}_{xy}(x,y,s)\sin(nx)\sin(my)\,dx\,dy$, $\bar{\bar{\psi}}_{xz}(n,l,t) = \int_0^\infty\int_0^\infty \psi_{xz}(x,z,t)\sin(nx)\sin(lz)\,dx\,dz$, $\bar{\bar{\psi}}_{yz}(m,l,t) = \int_0^\infty\int_0^\infty \psi_{yz}(y,z,t)\sin(my)\sin(lz)\,dy\,dz$, $\bar{\bar{\psi}}_{xy}(n,m,t) = \int_0^\infty\int_0^\infty \psi_{xy}(x,y,t)\sin(nx)\sin(my)\,dx\,dy$, $\bar{\psi}_{xz}(x,z,s) = \int_0^\infty \psi_{xz}(x,z,t)e^{-st}\,dt$, $\bar{\psi}_{yz}(y,z,s) = \int_0^\infty \psi_{yz}(y,z,t)e^{-st}\,dt$, and $\bar{\psi}_{xy}(x,y,s) = \int_0^\infty \psi_{xy}(x,y,t)e^{-st}\,dt$.

We consider some special cases.
(i) A line of finite length $[z_{02}-z_{01}]$ passing through $(x_0, y_0)$.

$$\bar{p} = \frac{q(s)e^{-st_0}}{\phi c_t \pi^2\sqrt{\eta_x\eta_y}}\int_0^\infty \frac{\sin(lz)}{l}\{\cos(lz_{01})-\cos(lz_{02})\}\left[K_0\left\{\sqrt{\left\{\frac{(x-x_0)^2}{\eta_x}+\frac{(y-y_0)^2}{\eta_y}\right\}(s+l^2\eta_z)}\right\} - \right.$$

$$K_0\left\{\sqrt{\left\{\frac{(x+x_0)^2}{\eta_x}+\frac{(y-y_0)^2}{\eta_y}\right\}(s+l^2\eta_z)}\right\} - K_0\left\{\sqrt{\left\{\frac{(x-x_0)^2}{\eta_x}+\frac{(y+y_0)^2}{\eta_y}\right\}(s+l^2\eta_z)}\right\} + K_0\left\{\sqrt{\left\{\frac{(x+x_0)^2}{\eta_x}+\frac{(y+y_0)^2}{\eta_y}\right\}(s+l^2\eta_z)}\right\}\Bigg]dl +$$

(10.3.3)

-continued $$+ \frac{8}{\pi^3} \int_0^\infty \int_0^\infty \int_0^\infty \left\{ \frac{\left(n\eta_x \overline{\overline{\psi}}_{yz}(m,l,s) + m\eta_y \overline{\overline{\psi}}_{xz}(n,l,s) + l\eta_z \overline{\overline{\psi}}_{xy}(n,m,s)\right)}{(s + \eta_x n^2 + \eta_y m^2 + \eta_z l^2)} \right\} \sin(nx)\sin(my)\sin(lz)\, dn\, dm\, dl +$$

$$\frac{8p_I}{\pi^3} \int_0^\infty \int_0^\infty \int_0^\infty \frac{\sin(nx)\sin(my)\sin(lz)}{(s + \eta_x n^2 + \eta_y m^2 + \eta_z l^2)nml}\, dn\, dm\, dl$$

(10.3.4)

$$p = \frac{U(t-t_0)}{8\phi c_t \pi \sqrt{\eta_x \eta_y}} \int_0^{t-t_0} \frac{q(t-t_0-\tau)}{\tau} \left\{ e^{-\frac{(x-x_0)^2}{4\eta_x \tau}} - e^{-\frac{(x+x_0)^2}{4\eta_x \tau}} \right\} \left\{ e^{-\frac{(y-y_0)^2}{4\eta_y \tau}} - e^{-\frac{(y+y_0)^2}{4\eta_y \tau}} \right\} \times \left\{ erf\left(\frac{z-z_{01}}{2\sqrt{\eta_z \tau}}\right) + erf\left(\frac{z+z_{01}}{2\sqrt{\eta_z \tau}}\right) - erf\left(\frac{z-z_{02}}{2\sqrt{\eta_z \tau}}\right) - erf\left(\frac{z+z_{02}}{2\sqrt{\eta_z \tau}}\right) \right\} d\tau +$$

$$\frac{8}{\pi^3} \int_0^\infty \int_0^\infty \int_0^\infty \int_0^t \{n\eta_x \overline{\overline{\psi}}_{yz}(m,l,t-\tau) + m\eta_y \overline{\overline{\psi}}_{xz}(n,l,t-\tau) + l\eta_z \overline{\overline{\psi}}_{xy}(n,m,t-\tau)\} \times \sin(nx)e^{-\eta_x n^2 \tau}\sin(my)e^{-\eta_y m^2 \tau}\sin(lz)e^{-\eta_z l^2 \tau}\, d\tau\, dn\, dm\, dl +$$

$$p_I\, erf\left(\frac{x}{2\sqrt{\eta_x t}}\right) erf\left(\frac{y}{2\sqrt{\eta_y t}}\right) erf\left(\frac{z}{2\sqrt{\eta_z t}}\right)$$

The spatial average pressure response of the line $[z_{02}\text{-}z_{01}]$ is obtained by a further integration.

(10.3.5)

$$\overline{p} = \frac{q(s)e^{-st_0}}{\phi c_t \pi^2 (z_{02} - z_{01})\sqrt{\eta_x \eta_y}} \int_0^\infty \frac{1}{l^2} \{\cos(lz_{01}) - \cos(lz_{02})\}^2 \left[ K_0\left\{\sqrt{\left\{\frac{(x-x_0)^2}{\eta_x} + \frac{(y-y_0)^2}{\eta_y}\right\}(s + l^2\eta_z)}\right\} - \right.$$

$$K_0\left\{\sqrt{\left\{\frac{(x+x_0)^2}{\eta_x} + \frac{(y-y_0)^2}{\eta_y}\right\}(s + l^2\eta_z)}\right\} - K_0\left\{\sqrt{\left\{\frac{(x-x_0)^2}{\eta_x} + \frac{(y+y_0)^2}{\eta_y}\right\}(s + l^2\eta_z)}\right\} + K_0\left\{\sqrt{\left\{\frac{(x+x_0)^2}{\eta_x} + \frac{(y+y_0)^2}{\eta_y}\right\}(s + l^2\eta_z)}\right\} \right] dl +$$

$$\frac{8}{\pi^3 (z_{02} - z_{01})} \int_0^\infty \int_0^\infty \int_0^\infty \frac{1}{l} \left\{ \frac{n\eta_x \overline{\overline{\psi}}_{yz}(m,l,s) + m\eta_y \overline{\overline{\psi}}_{xz}(n,l,s) + l\eta_z \overline{\overline{\psi}}_{xy}(n,m,s)}{(s + \eta_x n^2 + \eta_y m^2 + \eta_x l^2)} \right\} \times \sin(nx)\sin(my)\{\cos(lz_{01}) - \cos(lz_{02})\}\, dn\, dm\, dl +$$

$$\frac{8p_I}{\pi^3 (z_{02} - z_{01})} \int_0^\infty \int_0^\infty \int_0^\infty \frac{\sin(nx)\sin(my)\{\cos(lz_{01}) - \cos(lz_{02})\}}{(s + \eta_x n^2 + \eta_y m^2 + \eta_x l^2)nml^2}\, dn\, dm\, dl \text{ and}$$

(10.3.6)

$$p = \frac{U(t-t_0)}{4\phi c_t \pi (z_{02} - z_{01})\sqrt{\eta_x \eta_y}}$$

$$\int_0^{t-t_0} \frac{q(t-t_0-\tau)}{\tau} \left[ (z_{02} - z_{01})erf\left(\frac{z_{02} - z_{01}}{2\sqrt{\eta_z \tau}}\right) + (z_{02} + z_{01})erf\left(\frac{z_{02} + z_{01}}{2\sqrt{\eta_z \tau}}\right) + 2\sqrt{\frac{\eta_z \tau}{\pi}} \left\{ 2e^{-\frac{(z_{01}^2 + z_{02}^2)}{4\eta_x \tau}}\cosh\left(\frac{z_{01}z_{02}}{2\eta_z \tau}\right) - 1 \right\} - z_{02}\, erf\left(\frac{z_{02}}{\sqrt{\eta_z \tau}}\right) - \right.$$

$$\left. z_{01}\, erf\left(\frac{z_{01}}{\sqrt{\eta_z \tau}}\right) - \sqrt{\frac{\eta_z \tau}{\pi}} \left( e^{-\frac{z_{01}^2}{\eta_x \tau}} + e^{-\frac{z_{02}^2}{\eta_x \tau}} \right) \right] \left\{ e^{-\frac{(x-x_0)^2}{4\eta_x \tau}} - e^{-\frac{(x+z_0)^2}{4\eta_x \tau}} \right\} \left\{ e^{-\frac{(y-y_0)^2}{4\eta_y \tau}} - e^{-\frac{(y+y_0)^2}{4\eta_y \tau}} \right\} d\tau +$$

$$\frac{8}{\pi^3 (z_{02} - z_{01})} \int_0^\infty \int_0^\infty \int_0^\infty \int_0^t \frac{1}{l} \{n\eta_x \overline{\overline{\psi}}_{yz}(m,l,t-\tau) + m\eta_y \overline{\overline{\psi}}_{xz}(n,l,t-\tau) + l\eta_z \overline{\overline{\psi}}_{xy}(n,m,t-\tau)\} \times$$

$$\sin(nx)e^{-\eta_x n^2 \tau}\sin(my)e^{-\eta_y m^2 \tau}\left\{\cos(lz_{01}) - \cos(lz_{02})\right\}e^{-\eta_x l^2 \tau}\, d\tau\, dn\, dm\, dl +$$

$$\frac{p_I\, erf\left(\frac{x}{2\sqrt{\eta_x t}}\right) erf\left(\frac{y}{2\sqrt{\eta_y t}}\right)}{(z_{02} - z_{01})} \left[ z_{02}\, erf\left(\frac{z_{02}}{2\sqrt{\eta_z t}}\right) - z_{01}\, erf\left(\frac{z_{01}}{2\sqrt{\eta_z t}}\right) + 2\sqrt{\frac{\eta_z t}{\pi}} \left\{ e^{-\frac{z_{02}^2}{4\eta_x t}} - e^{-\frac{z_{01}^2}{4\eta_x t}} \right\} \right]$$

(ii) Multiple lines of finite length $[z_{02_\iota}-z_{01_\iota}]$, $[x_{02_\iota}-x_{01_\iota}]$ and $[y_{02_\iota}-y_{01_\iota}]$ passing through $(x_{0_\iota}, y_{0_\iota})$ for $\iota=1, 2, \ldots, L$, $(y_{0_\iota}, z_{0_\iota})$ for $\iota=L+1, 2, \ldots, M$, and $(x_{0_\iota}, z_{0_\iota})$ for $\iota=M+1, 2, \ldots, N$ respectively. Where $(L<M<N)$.

(10.3.7)

$$\bar{p} = \frac{1}{\phi c_t \pi^2 \sqrt{\eta_x \eta_y}} \times$$

$$\sum_{i=1}^{L} q_i(s) e^{-st_{0i}} \int_0^\infty \frac{\sin(uz)}{u} \{\cos(uz_{01i}) - \cos(uz_{02i})\} \Bigg[ K_0 \Bigg\{ \sqrt{\left\{\frac{(x-x_{0i})^2}{\eta_x} + \frac{(y-y_{0i})^2}{\eta_y}\right\}(s+u^2\eta_z)} \Bigg\} - K_0 \Bigg\{ \sqrt{\left\{\frac{(x+x_{0i})^2}{\eta_x} + \frac{(y-y_{0i})^2}{\eta_y}\right\}(s+u^2\eta_z)} \Bigg\} -$$

$$K_0\Bigg\{\sqrt{\left\{\frac{(x-x_{0i})^2}{\eta_x}+\frac{(y+y_{0i})^2}{\eta_y}\right\}(s+u^2\eta_z)}\Bigg\} + K_0\Bigg\{\sqrt{\left\{\frac{(x+x_{0i})^2}{\eta_x}+\frac{(y+y_{0i})^2}{\eta_y}\right\}(s+u^2\eta_z)}\Bigg\}\Bigg]du + \frac{1}{\phi c_t \pi^2 \sqrt{\eta_z \eta_y}} \times$$

$$\sum_{i=L+1}^{M} q_i(s) e^{-st_{0i}} \int_0^\infty \frac{\sin(ux)}{u} \{\cos(ux_{01i}) - \cos(ux_{02i})\} \Bigg[ K_0 \Bigg\{ \sqrt{\left\{\frac{(z-z_{0i})^2}{\eta_z} + \frac{(y-y_{0i})^2}{\eta_y}\right\}(s+u^2\eta_x)} \Bigg\} - K_0 \Bigg\{ \sqrt{\left\{\frac{(x+x_{0i})^2}{\eta_x} + \frac{(y-y_{0i})^2}{\eta_y}\right\}(s+u^2\eta_z)} \Bigg\} -$$

$$K_0\Bigg\{\sqrt{\left\{\frac{(z-z_{0i})^2}{\eta_z}+\frac{(y+y_{0i})^2}{\eta_y}\right\}(s+u^2\eta_x)}\Bigg\} + K_0\Bigg\{\sqrt{\left\{\frac{(z+z_{0i})^2}{\eta_z}+\frac{(y+y_{0i})^2}{\eta_y}\right\}(s+u^2\eta_x)}\Bigg\}\Bigg]du + \frac{1}{\phi c_t \pi^2 \sqrt{\eta_x \eta_y}} \times$$

$$\sum_{i=M+1}^{N} q_i(s) e^{-st_{0i}} \int_0^\infty \frac{\sin(uy)}{u} \{\cos(uy_{01i}) - \cos(uy_{02i})\} \Bigg[ K_0 \Bigg\{ \sqrt{\left\{\frac{(x-x_{0i})^2}{\eta_x} + \frac{(z-z_{0i})^2}{\eta_z}\right\}(s+u^2\eta_y)} \Bigg\} - K_0 \Bigg\{ \sqrt{\left\{\frac{(x+x_{0i})^2}{\eta_x} + \frac{(z-z_{0i})^2}{\eta_z}\right\}(s+u^2\eta_y)} \Bigg\} -$$

$$K_0\Bigg\{\sqrt{\left\{\frac{(x-x_{0i})^2}{\eta_x}+\frac{(z+z_{0i})^2}{\eta_z}\right\}(s+u^2\eta_y)}\Bigg\} + K_0\Bigg\{\sqrt{\left\{\frac{(x+x_{0i})^2}{\eta_x}+\frac{(z+z_{0i})^2}{\eta_z}\right\}(s+u^2\eta_y)}\Bigg\}du +$$

$$\frac{8}{\pi^3} \int_0^\infty \int_0^\infty \int_0^\infty \left\{ \frac{\left(n\eta_x \bar{\bar{\psi}}_{yz}(m,l,s) + m\eta_y \bar{\bar{\psi}}_{xz}(n,l,s) + l\eta_z \bar{\bar{\psi}}_{xy}(n,m,s)\right)}{(s+\eta_x n^2+\eta_y m^2+\eta_z l^2)} \right\} \sin(nx)\sin(my)\sin(lz) dn\,dm\,dl +$$

$$\frac{8 p_I}{\pi^3} \int_0^\infty \int_0^\infty \int_0^\infty \frac{\sin(nx)\sin(my)\sin(lz)}{(s+\eta_x n^2+\eta_y m^2+\eta_z l^2)nml} dn\,dm\,dl$$

(10.3.8)

$$p = \frac{1}{8\phi c_t \pi \sqrt{\eta_x \eta_y}} \sum_{i=0}^{L} U(t-t_{0i}) \int_0^{t-t_{0i}} \frac{q_i(t-t_{0i}-u)}{u} \left\{ e^{-\frac{(x-x_{0i})^2}{4\eta_x u}} - e^{-\frac{(z+z_{0i})^2}{4\eta_x u}} \right\} \left\{ e^{-\frac{(y-y_{0i})^2}{4\eta_y u}} - e^{-\frac{(y+y_{0i})^2}{4\eta_y u}} \right\} \times$$

$$\left\{ erf\left(\frac{z-z_{01i}}{2\sqrt{\eta_z u}}\right) + erf\left(\frac{z+z_{01i}}{2\sqrt{\eta_z u}}\right) - erf\left(\frac{z-z_{02i}}{2\sqrt{\eta_z u}}\right) - erf\left(\frac{z+z_{02i}}{2\sqrt{\eta_z u}}\right) \right\} du +$$

$$\frac{1}{8\phi c_t \pi \sqrt{\eta_z \eta_y}} \sum_{i=L+1}^{M} U(t-t_{0i}) \int_0^{t-t_{0i}} \frac{q_i(t-t_{0i}-u)}{u} \left\{ e^{-\frac{(z-z_{0i})^2}{4\eta_x u}} - e^{-\frac{(x+x_{0i})^2}{4\eta_x u}} \right\} \left\{ e^{-\frac{(y-y_{0i})^2}{4\eta_y x}} - e^{-\frac{(y+y_{0i})^2}{4\eta_y u}} \right\} \times \left\{ erf\left(\frac{x-x_{01i}}{2\sqrt{\eta_x u}}\right) + \right.$$

$$\left. erf\left(\frac{x+x_{01i}}{2\sqrt{\eta_x u}}\right) - erf\left(\frac{x-x_{02i}}{2\sqrt{\eta_x u}}\right) - erf\left(\frac{x+x_{02i}}{2\sqrt{\eta_x u}}\right)\right\} du + \frac{1}{8\phi c_t \pi \sqrt{\eta_z \eta_x}} \sum_{i=M+1}^{N} U(t-t_{0i}) \int_0^{t-t_{0i}} \frac{q_i(t-t_{0i}-u)}{u} \left\{ e^{-\frac{(z-z_{0i})^2}{4\eta_z u}} - \right.$$

$$\left. e^{-\frac{(z+z_{0i})^2}{4\eta_x u}} \right\} \left\{ e^{-\frac{(x-x_{0i})^2}{4\eta_x u}} - e^{-\frac{(x+x_{0i})^2}{4\eta_x u}} \right\} \times \left\{ erf\left(\frac{y-y_{01i}}{2\sqrt{\eta_y u}}\right) + erf\left(\frac{y+y_{01i}}{2\sqrt{\eta_y u}}\right) - erf\left(\frac{y-y_{02i}}{2\sqrt{\eta_y u}}\right) - erf\left(\frac{y+y_{02i}}{2\sqrt{\eta_y u}}\right) \right\} du +$$

$$\frac{8}{\pi^3} \int_0^\infty \int_0^\infty \int_0^\infty \int_0^t \left\{n\eta_x \bar{\bar{\psi}}_{yz}(m,l,t-\tau) + m\eta_y \bar{\bar{\psi}}_{xz}(n,l,t-\tau) + l\eta_z \bar{\bar{\psi}}_{xy}(n,m,t-\tau)\right\} \times$$

$$\sin(nx)e^{-\eta_x n^2 \tau}\sin(my)e^{-\eta_y m^2 \tau}\sin(lz)e^{-\eta_x l^2 \tau} d\tau\, dn\, dm\, dl + p_I\, erf\left(\frac{x}{2\sqrt{\eta_x t}}\right) erf\left(\frac{y}{2\sqrt{\eta_y t}}\right) erf\left(\frac{z}{2\sqrt{\eta_z t}}\right)$$

The spatial average pressure response of the line $[z_{02_\diamond} - z_{01_\diamond}]$, $\iota = \diamond$, is obtained by a further integration.

(10.3.9)

$$\bar{p} = \frac{1}{\phi c_t \pi^2 (z_{02\diamond} - z_{01\diamond}) \sqrt{\eta_x \eta_y}} \times \sum_{i=1}^{L} q_i(s) e^{-st_{0i}} \int_0^\infty \{\cos(uz_{01\diamond}) - \cos(uz_{02\diamond})\}\{\cos(uz_{01i}) - \cos(uz_{02i})\} \times$$

$$\left[ K_0 \left\{ \sqrt{\left\{ \frac{(x-x_{0i})^2}{\eta_x} + \frac{(y-y_{0i})^2}{\eta_y} \right\}(s+u^2\eta_z)} \right\} - K_0 \left\{ \sqrt{\left\{ \frac{(x+x_{0i})^2}{\eta_x} + \frac{(y-y_{0i})^2}{\eta_y} \right\}(s+u^2\eta_z)} \right\} - \right.$$

$$\left. K_0 \left\{ \sqrt{\left\{ \frac{(x-x_{0i})^2}{\eta_x} + \frac{(y+y_{0i})^2}{\eta_y} \right\}(s+u^2\eta_z)} \right\} + K_0 \left\{ \sqrt{\left\{ \frac{(x+x_{0i})^2}{\eta_x} + \frac{(y+y_{0i})^2}{\eta_y} \right\}(s+u^2\eta_z)} \right\} \right] du +$$

$$\frac{1}{\phi c_t \pi^2 (z_{02\diamond} - z_{01\diamond}) \sqrt{\eta_z \eta_y}} \times \sum_{i=L+1}^{M} q_i(s) e^{-st_{0i}} \int_0^\infty \frac{\sin(ux)}{u} \{\cos(ux_{01i}) - \cos(ux_{02i})\} \int_{z_{01\diamond}}^{z_{02\diamond}} \left[ K_0 \left\{ \sqrt{\left\{ \frac{(z-z_{0i})^2}{\eta_z} + \frac{(y-y_{0i})^2}{\eta_y} \right\}(s+u^2\eta_x)} \right\} - \right.$$

$$\left. K_0 \left\{ \sqrt{\left\{ \frac{(z+z_{0i})^2}{\eta_x} + \frac{(y-y_{0i})^2}{\eta_y} \right\}(s+u^2\eta_z)} \right\} - K_0 \left\{ \sqrt{\left\{ \frac{(z-z_{0i})^2}{\eta_z} + \frac{(y+y_{0i})^2}{\eta_y} \right\}(s+u^2\eta_x)} \right\} + \right.$$

$$\left. K_0 \left\{ \sqrt{\left\{ \frac{(z+z_{0i})^2}{\eta_z} + \frac{(y+y_{0i})^2}{\eta_y} \right\}(s+u^2\eta_x)} \right\} \right] dz\, du + \frac{1}{\phi c_t \pi^2 (z_{02\diamond} - z_{01\diamond}) \sqrt{\eta_x \eta_z}} \times \sum_{i=M+1}^{N} q_i(s) e^{-st_{0i}} \int_0^\infty \frac{\sin(uy)}{u} \{\cos(uy_{01i}) - $$

$$\cos(uy_{02i})\} \int_{z_{01\diamond}}^{z_{02\diamond}} \left[ K_0 \left\{ \sqrt{\left\{ \frac{(x-x_{0i})^2}{\eta_x} + \frac{(z-z_{0i})^2}{\eta_z} \right\}(s+u^2\eta_y)} \right\} - K_0 \left\{ \sqrt{\left\{ \frac{(x+x_{0i})^2}{\eta_x} + \frac{(z-z_{0i})^2}{\eta_z} \right\}(s+u^2\eta_y)} \right\} - \right.$$

$$\left. K_0 \left\{ \sqrt{\left\{ \frac{(x-x_{0i})^2}{\eta_x} + \frac{(z+z_{0i})^2}{\eta_z} \right\}(s+u^2\eta_y)} \right\} + K_0 \left\{ \sqrt{\left\{ \frac{(x+x_{0i})^2}{\eta_x} + \frac{(z+z_{0i})^2}{\eta_z} \right\}(s+u^2\eta_y)} \right\} \right] dz\, du +$$

$$\frac{8}{\pi^3 (z_{02\diamond} - z_{01\diamond})} \int_0^\infty \int_0^\infty \int_0^\infty \frac{1}{l} \left\{ \frac{n\eta_x \bar{\bar{\psi}}_{yz}(m,l,s) + m\eta_y \bar{\bar{\psi}}_{xz}(n,l,s) + l\eta_z \bar{\bar{\psi}}_{xy}(n,m,s)}{(s+\eta_x n^2 + \eta_y m^2 + \eta_z l^2)} \right\} \times \sin(nx)\sin(my)\{\cos(lz_{01\diamond}) - $$

$$\cos(lz_{02\diamond})\} dn\, dm\, dl + \frac{8 p_I}{\pi^3 (z_{02\diamond} - z_{01\diamond})} \int_0^\infty \int_0^\infty \int_0^\infty \frac{\sin(mx)\sin(my)\{\cos(lz_{01\diamond}) - \cos(lz_{02\diamond})\}}{(s+\eta_x n^2 + \eta_y m^2 + \eta_z l^2) nml^2} dn\, dm\, dl \text{ and}$$

(10.3.10)

$$p = \frac{1}{8\phi c_t \pi (z_{02\diamond} - z_{01\diamond}) \sqrt{\eta_x \eta_y}} \times \sum_{i=0}^{L} U(t-t_{0i}) \int_0^{t-t_{0i}} \frac{q_i(t-t_{0i}-u)}{u} \left\{ e^{-\frac{(x-x_{0i})^2}{4\eta_x u}} - e^{-\frac{(x+x_{0i})^2}{4\eta_x u}} \right\} \left\{ e^{-\frac{(y-y_{0i})^2}{4\eta_y u}} - e^{-\frac{(y+y_{0i})^2}{4\eta_y u}} \right\} \times \left[ (z_{02\diamond} - z_{01i}) \text{erf}\left(\frac{z_{02\diamond} - z_{01i}}{2\sqrt{\eta_z u}}\right) - \right.$$

$$(z_{01\diamond} - z_{01i}) \text{erf}\left(\frac{z_{01\diamond} - z_{01i}}{2\sqrt{\eta_z u}}\right) + (z_{02\diamond} + z_{01i}) \text{erf}\left(\frac{z_{02\diamond} + z_{01i}}{2\sqrt{\eta_z u}}\right) - (z_{01\diamond} - z_{01i}) \text{erf}\left(\frac{z_{01\diamond} + z_{01i}}{2\sqrt{\eta_z u}}\right) +$$

$$2\sqrt{\frac{\eta_z u}{\pi}} \left\{ e^{-\frac{(z_{02\diamond} - z_{01i})^2}{4\eta_x u}} - e^{-\frac{(z_{01\diamond} - z_{01i})^2}{4\eta_x u}} \right\} + 2\sqrt{\frac{\eta_z u}{\pi}} \left\{ e^{-\frac{(z_{02\diamond} + z_{01i})^2}{4\eta_x u}} - e^{-\frac{(x_{01\diamond} + z_{01i})^2}{4\eta_x u}} \right\} - (z_{02\diamond} - z_{02i}) \text{erf}\left(\frac{z_{02\diamond} - z_{02i}}{2\sqrt{\eta_z u}}\right) -$$

$$(z_{01\diamond} - z_{02i}) \text{erf}\left(\frac{z_{01\diamond} - z_{02i}}{2\sqrt{\eta_z u}}\right) - (z_{02\diamond} + z_{02i}) \text{erf}\left(\frac{z_{02\diamond} + z_{02i}}{2\sqrt{\eta_z u}}\right) - (z_{011} + z_{02i}) \text{erf}\left(\frac{z_{01\diamond} + z_{02i}}{2\sqrt{\eta_z u}}\right) +$$

$$2\sqrt{\frac{\eta_z u}{\pi}} \left\{ e^{-\frac{(z_{02\diamond} - z_{02i})^2}{4\eta_x u}} - e^{-\frac{(z_{01\diamond} - z_{02i})^2}{4\eta_x u}} \right\} + 2\sqrt{\frac{\eta_z u}{\pi}} \left\{ e^{-\frac{(z_{02\diamond} + z_{02i})^2}{4\eta_x u}} - e^{-\frac{(z_{01\diamond} + z_{02i})^2}{4\eta_x u}} \right\} \right] du +$$

$$\frac{1}{8\phi c_t (z_{02\diamond} - z_{01\diamond}) \sqrt{\pi \eta_y}} \sum_{i=L+1}^{M} t - t_{0i} \int_0^{t-t_{0i}} \frac{q_i(t-t_{0i}-u)}{\sqrt{u}} \left\{ e^{-\frac{(y-y_{0i})^2}{4\eta_y u}} - e^{-\frac{(y+y_{0i})^2}{4\eta_y u}} \right\} \times \left\{ \text{erf}\left(\frac{z_{02\diamond} - z_{0i}}{2\sqrt{\eta_z u}}\right) - \right.$$

$$\text{erf}\left(\frac{z_{01\diamond} - z_{0i}}{2\sqrt{\eta_x u}}\right) - \text{erf}\left(\frac{z_{02\diamond} + z_{0i}}{2\sqrt{\eta_z u}}\right) + \text{erf}\left(\frac{z_{01\diamond} + z_{0i}}{2\sqrt{\eta_z u}}\right) \right\} \times \left\{ \text{erf}\left(\frac{x-x_{01i}}{2\sqrt{\eta_x u}}\right) + \text{erf}\left(\frac{x+x_{01i}}{2\sqrt{\eta_x u}}\right) - \text{erf}\left(\frac{x-x_{02i}}{2\sqrt{\eta_x u}}\right) - $$

$$\text{erf}\left(\frac{x+x_{02i}}{2\sqrt{\eta_x u}}\right) \right\} du + \frac{1}{8\phi c_t (z_{02\diamond} - z_{01\diamond}) \sqrt{\pi \eta_x}} \sum_{i=M+1}^{N} U(t-t_{0i}) \int_0^{t-t_{0i}} \frac{q_i(t-t_{0i}-u)}{\sqrt{u}} \left\{ e^{-\frac{(x-x_{0i})^2}{4\eta_x u}} - \right.$$

-continued $$e^{-\frac{(x+x_{0i})^2}{4\eta_x u}}\right\} \times \left\{erf\left(\frac{z_{02\diamond}-z_{0i}}{2\sqrt{\eta_z u}}\right) - erf\left(\frac{z_{01\diamond}-z_{0i}}{2\sqrt{\eta_z u}}\right) - erf\left(\frac{z_{02\diamond}+z_{0i}}{2\sqrt{\eta_z u}}\right) + erf\left(\frac{z_{01\diamond}+z_{0i}}{2\sqrt{\eta_z u}}\right)\right\} \times$$

$$\left\{erf\left(\frac{y-y_{01i}}{2\sqrt{\eta_y u}}\right) + erf\left(\frac{y+y_{01i}}{2\sqrt{\eta_y u}}\right) - erf\left(\frac{y-y_{02i}}{2\sqrt{\eta_y u}}\right) - erf\left(\frac{y+y_{02i}}{2\sqrt{\eta_y u}}\right)\right\} du +$$

$$\frac{8}{\pi^3(z_{02\diamond}-z_{01\diamond})}\int_0^\infty\int_0^\infty\int_0^\infty\int_0^\tau \frac{1}{l}\{n\eta_x\overline{\overline{\psi}}_{yz}(m,l,t-\tau) + m\eta_y\overline{\overline{\psi}}_{xz}(n,l,t-\tau) + ln\eta_z\overline{\overline{\psi}}_{xy}(n,m,t-\tau)\} \times$$

$$\sin(nx)e^{-\eta_x n^2\tau}s\sin(my)e^{-\eta_y m^2\tau}\{\cos(lz_{01\diamond}) - \cos(lz_{02\diamond})\}e^{-\eta_z l^2\tau} d\tau dn dm dl +$$

$$\frac{p_l \, erf\left(\frac{x}{2\sqrt{\eta_x t}}\right)erf\left(\frac{y}{2\sqrt{\eta_y t}}\right)}{(z_{02\diamond}-z_{01\diamond})}\left[z_{02\diamond}\, erf\left(\frac{z_{02\diamond}}{2\sqrt{\eta_z t}}\right) - z_{01\diamond}\, erf\left(\frac{z_{01\diamond}}{2\sqrt{\eta_z t}}\right) + 2\sqrt{\frac{\eta_z t}{\pi}}\left\{e^{-\frac{z_{02\diamond}^2}{4\eta_n t}} - e^{-\frac{z_{01\diamond}^2}{4\eta_x t}}\right\}\right]$$

20. 10.4 The problem of 10.1, except for all $t>0$, $p(0,y,z,t)=\psi_{yz}(y,z,t)$, $y>0$, $z>0$, $p(x,0,z,t)=\psi_{xz}(x,z,t)$, $x>0$, $z>0$, and $$\frac{\partial p(x,y,0,t)}{\partial x} = -\left(\frac{p}{k_x}\right)\varphi_{xy}(x,y,t), x>0, y>0.$$

The initial pressure $p(x,y,z,0)=\Phi(x,y,z)$. $\Phi(x,y,z)$ and its derivative tend to zero as $x\to\infty$, $y\to\infty$ and $z\to\infty$.

The solution for the continuous point source is (10.4.1)

$$\overline{p} = \frac{q(s)e^{-st_0}s^{\frac{1}{4}}}{\phi c_t (2\pi)^{\frac{3}{2}}\sqrt{\eta_x\eta_y\eta_z}}\left[\frac{K_{\frac{1}{2}}\left(\sqrt{\left\{\frac{(x-x_0)^2}{\eta_x}+\frac{(y-y_0)^2}{\eta_y}+\frac{(z-z_0)^2}{\eta_z}\right\}s}\right)}{\left\{\frac{(x-x_0)^2}{\eta_x}+\frac{(y-y_0)^2}{\eta_y}+\frac{(z-z_0)^2}{\eta_z}\right\}^{\frac{1}{4}}} - \frac{K_{\frac{1}{2}}\left(\sqrt{\left\{\frac{(x+x_0)^2}{\eta_x}+\frac{(y-y_0)^2}{\eta_y}+\frac{(z-z_0)^2}{\eta_z}\right\}s}\right)}{\left\{\frac{(x+x_0)^2}{\eta_x}+\frac{(y-y_0)^2}{\eta_y}+\frac{(z-z_0)^2}{\eta_z}\right\}^{\frac{1}{4}}} -$$

$$\frac{K_{\frac{1}{2}}\left(\sqrt{\left\{\frac{(x-x_0)^2}{\eta_x}+\frac{(y+y_0)^2}{\eta_y}+\frac{(z-z_0)^2}{\eta_z}\right\}s}\right)}{\left\{\frac{(x-x_0)^2}{\eta_z}+\frac{(y+y_0)^2}{\eta_y}+\frac{(z-z_0)^2}{\eta_z}\right\}^{\frac{1}{4}}} + \frac{K_{\frac{1}{2}}\left(\sqrt{\left\{\frac{(x+x_0)^2}{\eta_x}+\frac{(y+y_0)^2}{\eta_y}+\frac{(z-z_0)^2}{\eta_z}\right\}s}\right)}{\left\{\frac{(x+x_0)^2}{\eta_x}+\frac{(y+y_0)^2}{\eta_y}+\frac{(z-z_0)^2}{\eta_z}\right\}^{\frac{1}{4}}} + \frac{K_{\frac{1}{2}}\left(\sqrt{\left\{\frac{(x-x_0)^2}{\eta_x}+\frac{(y-y_0)^2}{\eta_y}+\frac{(z+z_0)^2}{\eta_z}\right\}s}\right)}{\left\{\frac{(x-x_0)^2}{\eta_x}+\frac{(y-y_0)^2}{\eta_y}+\frac{(z+z_0)^2}{\eta_z}\right\}^{\frac{1}{4}}} -$$

$$\frac{K_{\frac{1}{2}}\left(\sqrt{\left\{\frac{(x+x_0)^2}{\eta_x}+\frac{(y-y_0)^2}{\eta_y}+\frac{(z+z_0)^2}{\eta_z}\right\}s}\right)}{\left\{\frac{(x+x_0)^2}{\eta_x}+\frac{(y-y_0)^2}{\eta_y}+\frac{(z+z_0)^2}{\eta_z}\right\}^{\frac{1}{4}}} - \frac{K_{\frac{1}{2}}\left(\sqrt{\left\{\frac{(x-x_0)^2}{\eta_x}+\frac{(y+y_0)^2}{\eta_y}+\frac{(z+z_0)^2}{\eta_z}\right\}s}\right)}{\left\{\frac{(x-x_0)^2}{\eta_x}+\frac{(y+y_0)^2}{\eta_y}+\frac{(z+z_0)^2}{\eta_z}\right\}^{\frac{1}{4}}} + \frac{K_{\frac{1}{2}}\left(\sqrt{\left\{\frac{(x+x_0)^2}{\eta_x}+\frac{(y+y_0)^2}{\eta_y}+\frac{(z+z_0)^2}{\eta_z}\right\}s}\right)}{\left\{\frac{(x+x_0)^2}{\eta_x}+\frac{(y+y_0)^2}{\eta_y}+\frac{(z+z_0)^2}{\eta_z}\right\}^{\frac{1}{4}}}\right] +$$

$$\frac{8}{\pi^3}\int_0^\infty\int_0^\infty\int_0^\infty \left\{\frac{n\eta_x\overline{\overline{\psi}}_{yz}(m,l,s) + m\eta_y\overline{\overline{\psi}}_{xz}(n,l,s) + \frac{1}{\phi c_t}\overline{\overline{\psi}}_{xy}(n,m,s)}{(s+\eta_x n^2 + \eta_y m^2 + \eta_z l^2)}\right\}\sin(nx)\sin(my)\cos(lz)\,dn\,dm\,dl +$$

$$\frac{s^{\frac{1}{4}}}{(2\pi)^{\frac{3}{2}}\sqrt{\eta_x\eta_y\eta_z}}\int_0^\infty\int_0^\infty\int_0^\infty \varphi(u,v,w)\left[\frac{K_{\frac{1}{2}}\left(\sqrt{\left\{\frac{(x-u)^2}{\eta_x}+\frac{(y-v)^2}{\eta_y}+\frac{(z-w)^2}{\eta_z}\right\}s}\right)}{\left\{\frac{(x-u)^2}{\eta_x}+\frac{(y-v)^2}{\eta_y}+\frac{(z-w)^2}{\eta_z}\right\}^{\frac{1}{4}}} - \frac{K_{\frac{1}{2}}\left(\sqrt{\left\{\frac{(x+u)^2}{\eta_x}+\frac{(y-v)^2}{\eta_y}+\frac{(z-w)^2}{\eta_z}\right\}s}\right)}{\left\{\frac{(x+u)^2}{\eta_x}+\frac{(y-v)^2}{\eta_y}+\frac{(z-w)^2}{\eta_z}\right\}^{\frac{1}{4}}} -$$

$$\frac{K_{\frac{1}{2}}\left(\sqrt{\left\{\frac{(x-u)^2}{\eta_x}+\frac{(y+v)^2}{\eta_y}+\frac{(z-w)^2}{\eta_z}\right\}s}\right)}{\left\{\frac{(x-u)^2}{\eta_x}+\frac{(y+v)^2}{\eta_y}+\frac{(z-w)^2}{\eta_z}\right\}^{\frac{1}{4}}} + \frac{K_{\frac{1}{2}}\left(\sqrt{\left\{\frac{(x+u)^2}{\eta_x}+\frac{(y+v)^2}{\eta_y}+\frac{(z-w)^2}{\eta_z}\right\}s}\right)}{\left\{\frac{(x+u)^2}{\eta_x}+\frac{(y+v)^2}{\eta_y}+\frac{(z-w)^2}{\eta_z}\right\}^{\frac{1}{4}}} +$$

-continued $$\frac{K_{\frac{1}{2}}\left(\sqrt{\left\{\frac{(x-u)^2}{\eta_x}+\frac{(y-v)^2}{\eta_y}+\frac{(z+w)^2}{\eta_z}\right\}s}\right)}{\left\{\frac{(x-u)^2}{\eta_x}+\frac{(y-v)^2}{\eta_y}+\frac{(z+w)^2}{\eta_z}\right\}^{\frac{1}{4}}} - \frac{K_{\frac{1}{2}}\left(\sqrt{\left\{\frac{(x+u)^2}{\eta_x}+\frac{(y-v)^2}{\eta_y}+\frac{(x+w)^2}{\eta_z}\right\}s}\right)}{\left\{\frac{(x+u)^2}{\eta_x}+\frac{(y-v)^2}{\eta_y}+\frac{(z+w)^2}{\eta_z}\right\}^{\frac{1}{4}}} -$$

$$\frac{K_{\frac{1}{2}}\left(\sqrt{\left\{\frac{(x-u)^2}{\eta_x}+\frac{(y+v)^2}{\eta_y}+\frac{(z+w)^2}{\eta_z}\right\}s}\right)}{\left\{\frac{(x-u)^2}{\eta_x}+\frac{(y+v)^2}{\eta_y}+\frac{(z+w)^2}{\eta_z}\right\}^{\frac{1}{4}}} + \frac{K_{\frac{1}{2}}\left(\sqrt{\left\{\frac{(x+u)^2}{\eta_x}+\frac{(y+v)^2}{\eta_y}+\frac{(z+w)^2}{\eta_z}\right\}s}\right)}{\left\{\frac{(x+u)^2}{\eta_x}+\frac{(y+v)^2}{\eta_y}+\frac{(z+w)^2}{\eta_z}\right\}^{\frac{1}{4}}}\Bigg] du\,dv\,dw \text{ and}$$

(10.4.2)

$$p = \frac{U(t-t_0)}{8\phi c_t \pi^{\frac{3}{2}}\sqrt{\eta_x\eta_y\eta_z}}\int_0^{t-t_0}\frac{q(t-t_0-\tau)}{\tau^{\frac{3}{2}}}\left\{e^{-\frac{(x-x_0)^2}{4\eta_x\tau}}-e^{-\frac{(x+x_0)^2}{4\eta_x\tau}}\right\}\left\{e^{-\frac{(y-y_0)^2}{4\eta_y\tau}}-e^{-\frac{(y+y_0)^2}{4\eta_y\tau}}\right\}\times\left\{e^{-\frac{(x-x_0)^2}{4\eta_x\tau}}+e^{-\frac{(x+x_0)^2}{4\eta_x\tau}}\right\}d\tau +$$

$$\frac{8}{\pi^3}\int_0^\infty\int_0^\infty\int_0^\infty\int_0^t\left\{n\eta_x\overline{\overline{\psi}}_{yz}(m,l,t-\tau)+m\eta_y\overline{\overline{\psi}}_{xz}(n,l,t-\tau)+\frac{1}{\phi c_t}\overline{\overline{\psi}}_{xy}(n,m,t-\tau)\right\}\times\sin(nx)e^{-\eta_x n^2\tau}\sin(my)e^{-\eta_y m^2\tau}\cos(lz)e^{-\eta_z l^2\tau}d\tau\,dn\,dm\,dl +$$

$$\frac{1}{8(\pi t)^{\frac{3}{2}}\sqrt{\eta_x\eta_y\eta_z}}\int_0^\infty\int_0^\infty\int_0^\infty\varphi(u,v,w)\left\{e^{-\frac{(x-u)^2}{4\eta_x t}}-e^{-\frac{(x+u)^2}{4\eta_x t}}\right\}\left\{e^{-\frac{(y-v)^2}{4\eta_y t}}-e^{-\frac{(y+v)^2}{4\eta_y t}}\right\}\times\left\{e^{-\frac{(z-w)^2}{4\eta_z t}}+e^{-\frac{(z+w)^2}{4\eta_z t}}\right\}du\,dv\,dw$$

where $\overline{\overline{\psi}}_{xz}(n,l,s) = \int_0^\infty\int_0^\infty \overline{\psi}_{xz}(x,z,s)\sin(nx)\cos(lz)\,dx\,dz$, $\overline{\overline{\psi}}_{yz}(m,l,s) = \int_0^\infty\int_0^\infty \overline{\psi}_{yz}(y,z,s)\sin(my)\cos(lz)\,dy\,dz$, $\overline{\overline{\psi}}_{xy}(n,m,s) = \int_0^\infty\int_0^\infty \overline{\psi}_{xy}(x,y,s)\sin(nx)\sin(my)\,dx\,dy$, $\overline{\overline{\psi}}_{xz}(n,l,t) = \int_0^\infty\int_0^\infty \psi_{xz}(x,z,t)\sin(nx)\cos(lz)\,dx\,dz$, $\overline{\overline{\psi}}_{yz}(m,l,t) = \int_0^\infty\int_0^\infty \psi_{yz}(y,z,t)\sin(my)\cos(lz)\,dy\,dz$, $\overline{\overline{\psi}}_{xy}(n,m,t) = \int_0^\infty\int_0^\infty \psi_{xy}(x,y,t)\sin(nx)\sin(my)\,dx\,dy$, $\overline{\psi}_{xz}(x,z,s) = \int_0^\infty \psi_{xz}(x,z,t)e^{-st}\,dt$, $\overline{\psi}_{yz}(y,z,s) = \int_0^\infty \psi_{yz}(y,z,t)e^{-st}\,dt$, and $\overline{\psi}_{xy}(x,y,s) = \int_0^\infty \psi_{xy}(x,y,t)e^{-st}\,dt$.

We consider some special cases.
(i) $\psi_{yz}(y,z,t)=\psi_{yz}(t)$, $\psi_{xz}(x,z,t)=\psi_{xz}(t)$, $\psi_{xy}(x,y,t)=\psi_{xy}(t)$, $q(t)=0$ and $\Phi(u,v,w)=0$.

(10.4.3)

$$\overline{p} = \frac{4}{\pi^2}\int_0^\infty\int_0^\infty\left\{\frac{n\eta_x\overline{\psi}_{yz}(s)}{m(s+\eta_x n^2+\eta_y m^2)}+\frac{m\eta_y\overline{\psi}_{xz}(s)}{n(s+\eta_x n^2+\eta_y m^2)}+\frac{\overline{\psi}_{xy}(s)}{\phi c_t nm\sqrt{\eta_z}}\frac{e^{-z\sqrt{\frac{(s+\eta_x n^2+\eta_y m^2)}{\eta_z}}}}{\sqrt{(s+\eta_x n^2+\eta_y m^2)}}\right\}\times\sin(nx)\sin(my)\,dn\,dm \text{ and}$$

(10.4.4)

$$p = \frac{1}{2\sqrt{\pi}}\int_0^t\frac{1}{\sqrt{\tau}}\left\{\frac{x\psi_{yz}(t-\tau)e^{-\frac{x^2}{4\eta_x\tau}}}{\tau\sqrt{\eta_x}}erf\left(\frac{y}{2\sqrt{\eta_y\tau}}\right)+\frac{y\psi_{xz}(t-\tau)e^{-\frac{y^2}{4\eta_y\tau}}}{\tau\sqrt{\eta_y}}erf\left(\frac{x}{2\sqrt{\eta_x\tau}}\right)+\frac{2\psi_{xy}(t-\tau)e^{-\frac{z^2}{4\eta_z\tau}}}{\phi c_t\sqrt{\eta_x}}erf\left(\frac{x}{2\sqrt{\eta_x\tau}}\right)erf\left(\frac{y}{2\sqrt{\eta_y\tau}}\right)\right\}d\tau$$

(ii) $\psi_{yz}(y,z,t)=p_{yz}$, $\psi_{xz}(x,z,t)=p_{xz}$, $\psi_{xy}(x,y,t)=q_{xy}$; $p_{yz}$, $p_{xz}$ and $q_{xy}$ are constants. $q(t)=0$ and $\Phi(u,v,w)=0$.

(10.4.5)

$$\overline{p} = \frac{4}{s\pi^2}\int_0^\infty\int_0^\infty\left\{\frac{n\eta_x p_{yz}}{m(s+\eta_x n^2+\eta_y m^2)}+\frac{m\eta_y p_{xz}}{n(s+\eta_x n^2+\eta_y m^2)}+\frac{q_{xy}e^{-z\sqrt{\frac{(s+\eta_x n^2+\eta_y m^2)}{\eta_z}}}}{\phi c_t nm\sqrt{\eta_z(s+\eta_x n^2+\eta_y m^2)}}\right\}\times\sin(nx)\sin(my)\,dn\,dm \text{ and}$$

$$p = \frac{1}{2\sqrt{\pi}} \int_0^t \frac{1}{\sqrt{\tau}} \left\{ \frac{xp_{yz}e^{-\frac{x^2}{4\eta_x\tau}}}{\tau\sqrt{\eta_x}} erf\left(\frac{y}{2\sqrt{\eta_y\tau}}\right) + \frac{yp_{xz}e^{-\frac{y^2}{4\eta_y\tau}}}{\tau\sqrt{\eta_y}} erf\left(\frac{x}{2\sqrt{\eta_x\tau}}\right) + \frac{2q_{xy}e^{-\frac{z^2}{4\eta_z\tau}}}{\phi c_t\sqrt{\eta_z}} erf\left(\frac{x}{2\sqrt{\eta_x\tau}}\right) erf\left(\frac{y}{2\sqrt{\eta_y\tau}}\right) \right\} d\tau \tag{10.4.6}$$

(iii) $\varphi(x, y, z) = \frac{p_I}{\sqrt{xyz}}$; $x > 0$, $y > 0$, $z > 0$, $q(t) = 0$ and $\psi_{yz}(y, z, t) = \psi_{xz}(x, z, t) = \psi_{xy}(x, y, t) = 0$.

$$\bar{p} = p_I \sqrt{\left(\frac{2}{\pi}\right)^3} \int_0^\infty \int_0^\infty \int_0^\infty \frac{\sin(nx)\sin(my)\cos(lz)}{\sqrt{nml}\,(n^2\eta_x + m^2\eta_y + l^2\eta_z + s)} \, dn\, dm\, dl \text{ and} \tag{10.4.7}$$

$$p = \frac{p_I}{8}\left(\frac{\pi}{t}\right)^{\frac{3}{2}} \sqrt{\frac{xyz}{\eta_x\eta_y\eta_z}} \, e^{-\frac{1}{8t}\left(\frac{x^2}{\eta_x}+\frac{y^2}{\eta_y}+\frac{z^2}{\eta_z}\right)} I_{\frac{1}{4}}\left(\frac{x^2}{8\eta_x t}\right) I_{\frac{1}{4}}\left(\frac{y^2}{8\eta_y t}\right) I_{-\frac{1}{4}}\left(\frac{z^2}{8\eta_z t}\right) \tag{10.4.8}$$

(iv) A line of finite length $[z_{02}-z_{01}]$ passing through $(x_0, y_0)$.

$$\bar{p} = \frac{q(s)e^{-st_0}}{\phi c_t \pi^2 \sqrt{\eta_x\eta_y}} \int_0^\infty \frac{\cos(lz)}{l}\{\sin(lz_{02}) - \sin(lz_{01})\}\left[K_0\left\{\sqrt{\left\{\frac{(x-x_0)^2}{\eta_x} + \frac{(y-y_0)^2}{\eta_y}\right\}(s+l^2\eta_z)}\right\} - \right. \tag{10.4.9}$$
$$K_0\left\{\sqrt{\left\{\frac{(x+x_0)^2}{\eta_x} + \frac{(y+y_0)^2}{\eta_y}\right\}(s+l^2\eta_z)}\right\} + K_0\left\{\sqrt{\left\{\frac{(x+x_0)^2}{\eta_x} + \frac{(y+y_0)^2}{\eta_y}\right\}(s+l^2\eta_z)}\right\}\right] dl +$$
$$\frac{8}{\pi^3} \int_0^\infty \int_0^\infty \int_0^\infty \left\{ \frac{m\eta_x \bar{\bar{\psi}}_{yz}(m,l,s) + m\eta_y \bar{\bar{\psi}}_{xz}(n,l,s) + \frac{1}{\phi c_t}\bar{\bar{\psi}}_{xy}(n,m,s)}{(s+\eta_x n^2 + \eta_y m^2 + \eta_z l^2)} \right\} \sin(nx)\sin(my)\cos(lz)\, dn\, dm\, dl +$$
$$\frac{s^{\frac{1}{4}}}{(2\pi)^{\frac{3}{2}}\sqrt{\eta_x\eta_y\eta_z}} \int_0^\infty \int_0^\infty \int_0^\infty \varphi(u,v,w) \left[ \frac{K_{\frac{1}{2}}\left(\sqrt{\left\{\frac{(x-u)^2}{\eta_x}+\frac{(y-v)^2}{\eta_y}+\frac{(z-w)^2}{\eta_z}\right\}s}\right)}{\left\{\frac{(x-u)^2}{\eta_x}+\frac{(y-v)^2}{\eta_y}+\frac{(z-w)^2}{\eta_z}\right\}^{\frac{1}{4}}} - \frac{K_{\frac{1}{2}}\left(\sqrt{\left\{\frac{(x+u)^2}{\eta_x}+\frac{(y-v)^2}{\eta_y}+\frac{(z-w)^2}{\eta_z}\right\}s}\right)}{\left\{\frac{(x+u)^2}{\eta_x}+\frac{(y-v)^2}{\eta_y}+\frac{(z-w)^2}{\eta_z}\right\}^{\frac{1}{4}}} - \right.$$
$$\frac{K_{\frac{1}{2}}\left(\sqrt{\left\{\frac{(x-u)^2}{\eta_x}+\frac{(y+v)^2}{\eta_y}+\frac{(z-w)^2}{\eta_z}\right\}s}\right)}{\left\{\frac{(x-u)^2}{\eta_x}+\frac{(y+v)^2}{\eta_y}+\frac{(z-w)^2}{\eta_z}\right\}^{\frac{1}{4}}} + \frac{K_{\frac{1}{2}}\left(\sqrt{\left\{\frac{(x+u)^2}{\eta_x}+\frac{(y+v)^2}{\eta_y}+\frac{(z-w)^2}{\eta_z}\right\}s}\right)}{\left\{\frac{(x+u)^2}{\eta_x}+\frac{(y+v)^2}{\eta_y}+\frac{(z-w)^2}{\eta_z}\right\}^{\frac{1}{4}}} +$$
$$\frac{K_{\frac{1}{2}}\left(\sqrt{\left\{\frac{(x-u)^2}{\eta_x}+\frac{(y-v)^2}{\eta_y}+\frac{(z+w)^2}{\eta_z}\right\}s}\right)}{\left\{\frac{(x-u)^2}{\eta_x}+\frac{(y-v)^2}{\eta_y}+\frac{(z+w)^2}{\eta_z}\right\}^{\frac{1}{4}}} - \frac{K_{\frac{1}{2}}\left(\sqrt{\left\{\frac{(x+u)^2}{\eta_x}+\frac{(y-v)^2}{\eta_y}+\frac{(z+w)^2}{\eta_z}\right\}s}\right)}{\left\{\frac{(x+u)^2}{\eta_x}+\frac{(y-v)^2}{\eta_y}+\frac{(z+w)^2}{\eta_z}\right\}^{\frac{1}{4}}} -$$
$$\left. \frac{K_{\frac{1}{2}}\left(\sqrt{\left\{\frac{(x-u)^2}{\eta_x}+\frac{(y+v)^2}{\eta_y}+\frac{(z+w)^2}{\eta_z}\right\}s}\right)}{\left\{\frac{(x-u)^2}{\eta_x}+\frac{(y+v)^2}{\eta_y}+\frac{(z+w)^2}{\eta_z}\right\}^{\frac{1}{4}}} + \frac{K_{\frac{1}{2}}\left(\sqrt{\left\{\frac{(x+u)^2}{\eta_x}+\frac{(y+v)^2}{\eta_y}+\frac{(z+w)^2}{\eta_z}\right\}s}\right)}{\left\{\frac{(x+u)^2}{\eta_x}+\frac{(y+v)^2}{\eta_y}+\frac{(z+w)^2}{\eta_z}\right\}^{\frac{1}{4}}} \right] du\, dv\, dw \text{ and}$$

$$p = \frac{U(t-t_0)}{8\phi c_t \pi \sqrt{\eta_x\eta_y}} \int_0^{t-t_0} \frac{q(t-t_0-\tau)}{\tau} \left\{ e^{-\frac{(x-x_0)^2}{4\eta_x\tau}} - e^{-\frac{(x+x_0)^2}{4\eta_x\tau}} \right\} \left\{ e^{-\frac{(y-y_0)^2}{4\eta_y\tau}} - e^{-\frac{(y+y_0)^2}{4\eta_y\tau}} \right\} \times \left\{ erf\left(\frac{z+z_{02}}{2\sqrt{\eta_z\tau}}\right) - erf\left(\frac{z-z_{02}}{2\sqrt{\eta_z\tau}}\right) + erf\left(\frac{z-z_{01}}{2\sqrt{\eta_z\tau}}\right) - erf\left(\frac{z+z_{01}}{2\sqrt{\eta_z\tau}}\right) \right\} d\tau + \tag{10.4.10}$$

-continued $$\frac{8}{\pi^3} \int_0^\infty \int_0^\infty \int_0^\infty \int_0^t \left\{ n\eta_x \overline{\overline{\psi}}_{yz}(m, l, t-\tau) + m\eta_y \overline{\overline{\psi}}_{xz}(n, l, t-\tau) + \frac{1}{\phi c_t} \overline{\overline{\psi}}_{xy}(n, m, t-\tau) \right\} \times \sin(nx) e^{-\eta_x n^2 \tau} \sin(my) e^{-\eta_y m^2 \tau} \cos(lz) e^{-\eta_z l^2 \tau} d\tau\, dn\, dm\, dl +$$

$$\frac{1}{8(\pi t)^{\frac{3}{2}} \sqrt{\eta_x \eta_y \eta_z}} \int_0^\infty \int_0^\infty \int_0^\infty \varphi(u, v, w) \left\{ e^{-\frac{(x-u)^2}{4\eta_x t}} - e^{-\frac{(x+u)^2}{4\eta_x t}} \right\} \left\{ e^{-\frac{(y-v)^2}{4\eta_y t}} - e^{-\frac{(y+v)^2}{4\eta_y t}} \right\} \times \left\{ e^{-\frac{(z-w)^2}{4\eta_z t}} + e^{-\frac{(z+w)^2}{4\eta_z t}} \right\} du\, dv\, dw$$

The spatial average pressure response of the line $[z_{02}\text{-}z_{01}]$ is obtained by a further integration.

(10.4.11)

$$\overline{p} = \frac{q(s)e^{-st_0}}{\phi c_t \pi^2 (z_{02} - z_{01})\sqrt{\eta_x \eta_y}} \int_0^\infty \frac{1}{l^2} \{\sin(lz_{02}) - \sin(lz_{01})\}^2 \left[ K_0 \left\{ \sqrt{\left\{ \frac{(x-x_0)^2}{\eta_x} + \frac{(y-y_0)^2}{\eta_y} \right\}(s + l^2\eta_z)} \right\} - \right.$$

$$K_0 \left\{ \sqrt{\left\{ \frac{(x+x_0)^2}{\eta_x} + \frac{(y-y_0)^2}{\eta_y} \right\}(s + l^2\eta_z)} \right\} - K_0 \left\{ \sqrt{\left\{ \frac{(x-x_0)^2}{\eta_x} + \frac{(y+y_0)^2}{\eta_y} \right\}(s + l^2\eta_z)} \right\} + K_0 \left\{ \sqrt{\left\{ \frac{(x+x_0)^2}{\eta_x} + \frac{(y+y_0)^2}{\eta_y} \right\}(s + l^2\eta_z)} \right\} \right] dl +$$

$$\frac{8}{\pi^3 (z_{02} - z_{01})} \int_0^\infty \int_0^\infty \int_0^\infty \frac{1}{l} \left\{ \frac{n\eta_x \overline{\overline{\psi}}_{yz}(m, l, s) + m\eta_y \overline{\overline{\psi}}_{xz}(n, l, s) + \frac{1}{\phi c_t} \overline{\overline{\psi}}_{xy}(n, m, s)}{(s + \eta_x n^2 + \eta_y m^2 + \eta_z l^2)} \right\} \times \sin(nx)\sin(my)\{\sin(lz_{02}) - \sin(lz_{01})\} dn\, dm\, dl +$$

$$\frac{1}{2\pi^2 (z_{02} - z_{01})\sqrt{\eta_x \eta_y}} \int_0^\infty \int_0^\infty \int_0^\infty \varphi(u, v, w) \int_0^\infty \frac{1}{l} \left[ K_0 \left\{ \sqrt{\left\{ \frac{(x-u)^2}{\eta_x} + \frac{(y-v)^2}{\eta_y} \right\}(s + l^2\eta_z)} \right\} - K_0 \left\{ \sqrt{\left\{ \frac{(x+u)^2}{\eta_x} + \frac{(y-v)^2}{\eta_y} \right\}(s + l^2\eta_z)} \right\} - \right.$$

$$K_0 \left\{ \sqrt{\left\{ \frac{(x-u)^2}{\eta_x} + \frac{(y+v)^2}{\eta_y} \right\}(s + l^2\eta_z)} \right\} + K_0 \left\{ \sqrt{\left\{ \frac{(x+u)^2}{\eta_x} + \frac{(y+v)^2}{\eta_y} \right\}(s + l^2\eta_z)} \right\} \right] \cos(lw)\{\sin(lz_{02}) - \sin(lz_{01})\} dl\, du\, dv\, dw \text{ and}$$

(10.4.12)

$$p = \frac{U(t-t_0)}{4\phi c_t \pi (z_{02} - z_{01})\sqrt{\eta_x \eta_y}} \int_0^{t-t_0} \frac{q(t-t_0-\tau)}{\tau} \left[ (z_{02} - zz_{01})erf\left(\frac{z_{02} - z_{01}}{2\sqrt{\eta_z \tau}}\right) - (z_{02} + z_{01})erf\left(\frac{z_{02} + z_{01}}{2\sqrt{\eta_z \tau}}\right) + 2\sqrt{\frac{\eta_z \tau}{\pi}} \left\{ 2e^{-\frac{z_{01}^2 + z_{02}^2}{4\eta_x \tau}} \cosh\left(\frac{z_{01}z_{02}}{2\eta_z \tau}\right) - 1 \right\} + \right.$$

$$z_{02}\, erf\left(\frac{z_{02}}{\sqrt{\eta_x \tau}}\right) - z_{01}\, erf\left(\frac{z_{01}}{\sqrt{\eta_z \tau}}\right) - \sqrt{\frac{\eta_z \tau}{\pi}} \left( e^{-\frac{z_{01}^2}{\eta_x \tau}} - e^{-\frac{z_{02}^2}{\eta_x \tau}} \right) \right] \left\{ e^{-\frac{(x-x_0)^2}{4\eta_x \tau}} - e^{-\frac{(x+x_0)^2}{4\eta_x \tau}} \right\} \left\{ e^{-\frac{(y-y_0)^2}{4\eta_y \tau}} - e^{-\frac{(y+y_0)^2}{4\eta_y \tau}} \right\} d\tau +$$

$$\frac{8}{\pi^3 (z_{02} - z_{01})} \int_0^\infty \int_0^\infty \int_0^\infty \int_0^t \frac{1}{l} \left\{ n\eta_x \overline{\overline{\psi}}_{yz}(m, l, t-\tau) + m\eta_y \overline{\overline{\psi}}_{xz}(n, l, t-\tau) + \frac{1}{\phi c_t} \overline{\overline{\psi}}_{xy}(n, m, t-\tau) \right\} \times$$

$$\sin(nx) e^{-\eta_x n^2 \tau} \sin(my) e^{-\eta_y m^2 \tau} \{\sin(lz_{02}) - \sin(lz_{01})\} e^{-\eta_z l^2 \tau} d\tau\, dn\, dm\, dl +$$

$$\frac{1}{8\pi (z_{02} - z_{01}) t \sqrt{\eta_x \eta_y}} \int_0^\infty \int_0^\infty \int_0^\infty \varphi(u, v, w) \left\{ e^{-\frac{(x-u)^2}{4\eta_x t}} - e^{-\frac{(x+u)^2}{4\eta_x t}} \right\} \left\{ e^{-\frac{(y-u)^2}{4\eta_y t}} - e^{-\frac{(y+v)^2}{4\eta_y t}} \right\} \times$$

$$\left\{ erf\left(\frac{w + z_{02}}{2\sqrt{\eta_z t}}\right) - erf\left(\frac{w - z_{02}}{2\sqrt{\eta_z t}}\right) + erf\left(\frac{w - z_{01}}{2\sqrt{\eta_z t}}\right) - erf\left(\frac{w + z_{01}}{2\sqrt{\eta_z t}}\right) \right\} du\, dv\, dw$$

(v) A line of finite length $[x_{02}\text{-}x_{01}]$ passing through $(y_0, z_0)$ (10.4.13)

$$\overline{p} = \frac{q(s)e^{-st_0}}{\phi c_t \pi^2 \sqrt{\eta_y \eta_z}} \int_0^\infty \frac{\sin(ux)}{u} \{\cos(ux_{01}) - \cos(ux_{02})\} \left[ K_0 \left\{ \sqrt{\left\{ \frac{(y-y_0)^2}{\eta_y} + \frac{(z-z_0)^2}{\eta_x} \right\}(s + u^2\eta_x)} \right\} + \right.$$

$$K_0 \left\{ \sqrt{\left\{ \frac{(y-y_0)^2}{\eta_y} + \frac{(z+z_0)^2}{\eta_x} \right\}(s + u^2\eta_x)} \right\} - K_0 \left\{ \sqrt{\left\{ \frac{(y+y_0)^2}{\eta_y} + \frac{(z-z_0)^2}{\eta_x} \right\}(s + u^2\eta_x)} \right\} - K_0 \left\{ \sqrt{\left\{ \frac{(y+y_0)^2}{\eta_y} + \frac{(z+z_0)^2}{\eta_x} \right\}(s + u^2\eta_x)} \right\} \right] du +$$

-continued $$\frac{8}{\pi^3}\int_0^\infty\int_0^\infty\int_0^\infty\left\{\frac{n\eta_x\overline{\overline{\psi}}_{yz}(m,l,s)+m\eta_y\overline{\overline{\psi}}_{xz}(n,l,s)+\frac{1}{\phi c_t}\overline{\overline{\psi}}_{xy}(n,m,s)}{(s+\eta_xn^2+\eta_ym^2+\eta_zl^2)}\right\}\sin(nx)\sin(my)\cos(lz)\,dn\,dm\,dl+$$

$$\frac{s^{\frac{1}{4}}}{(2\pi)^{\frac{3}{2}}\sqrt{\eta_x\eta_y\eta_z}}\int_0^\infty\int_0^\infty\int_0^\infty\varphi(u,v,w)\left[\frac{K_{\frac{1}{2}}\left(\sqrt{\left\{\frac{(x-u)^2}{\eta_x}+\frac{(y-v)^2}{\eta_y}+\frac{(z-w)^2}{\eta_z}\right\}s}\right)}{\left\{\frac{(x-u)^2}{\eta_x}+\frac{(y-v)^2}{\eta_y}+\frac{(z-w)^2}{\eta_z}\right\}^{\frac{1}{4}}}-\frac{K_{\frac{1}{2}}\left(\sqrt{\left\{\frac{(x+u)^2}{\eta_x}+\frac{(y-v)^2}{\eta_y}+\frac{(z-w)^2}{\eta_z}\right\}s}\right)}{\left\{\frac{(x+u)^2}{\eta_x}+\frac{(y-v)^2}{\eta_y}+\frac{(z-w)^2}{\eta_z}\right\}^{\frac{1}{4}}}-$$

$$\frac{K_{\frac{1}{2}}\left(\sqrt{\left\{\frac{(x-u)^2}{\eta_x}+\frac{(y+v)^2}{\eta_y}+\frac{(z-w)^2}{\eta_z}\right\}s}\right)}{\left\{\frac{(x-u)^2}{\eta_x}+\frac{(y+v)^2}{\eta_y}+\frac{(z-w)^2}{\eta_z}\right\}^{\frac{1}{4}}}+\frac{K_{\frac{1}{2}}\left(\sqrt{\left\{\frac{(x+u)^2}{\eta_x}+\frac{(y+v)^2}{\eta_y}+\frac{(z-w)^2}{\eta_z}\right\}s}\right)}{\left\{\frac{(x+u)^2}{\eta_x}+\frac{(y+v)^2}{\eta_y}+\frac{(z-w)^2}{\eta_z}\right\}^{\frac{1}{4}}}+$$

$$\frac{K_{\frac{1}{2}}\left(\sqrt{\left\{\frac{(x-u)^2}{\eta_x}+\frac{(y-v)^2}{\eta_y}+\frac{(z+w)^2}{\eta_z}\right\}s}\right)}{\left\{\frac{(x-u)^2}{\eta_x}+\frac{(y-v)^2}{\eta_y}+\frac{(z+w)^2}{\eta_z}\right\}^{\frac{1}{4}}}-\frac{K_{\frac{1}{2}}\left(\sqrt{\left\{\frac{(x+u)^2}{\eta_x}+\frac{(y-v)^2}{\eta_y}+\frac{(z+w)^2}{\eta_z}\right\}s}\right)}{\left\{\frac{(x+u)^2}{\eta_x}+\frac{(y-v)^2}{\eta_y}+\frac{(z+w)^2}{\eta_z}\right\}^{\frac{1}{4}}}-$$

$$\frac{K_{\frac{1}{2}}\left(\sqrt{\left\{\frac{(x-u)^2}{\eta_x}+\frac{(y+v)^2}{\eta_y}+\frac{(z+w)^2}{\eta_z}\right\}s}\right)}{\left\{\frac{(x-u)^2}{\eta_x}+\frac{(y+v)^2}{\eta_y}+\frac{(z+w)^2}{\eta_z}\right\}^{\frac{1}{4}}}+\frac{K_{\frac{1}{2}}\left(\sqrt{\left\{\frac{(x+u)^2}{\eta_x}+\frac{(y+v)^2}{\eta_y}+\frac{(z+w)^2}{\eta_z}\right\}s}\right)}{\left\{\frac{(x+u)^2}{\eta_x}+\frac{(y+v)^2}{\eta_y}+\frac{(z+w)^2}{\eta_z}\right\}^{\frac{1}{4}}}\right]du\,dv\,dw\;\text{and}$$

(10.4.14)

$$p=\frac{U(t-t_0)}{8\phi c_t\pi\sqrt{\eta_y\eta_z}}\int_0^{t-t_0}\frac{q(t-t_0-u)}{u}\left\{e^{-\frac{(y-y_0)^2}{4\eta_yu}}-e^{-\frac{(y+y_0)^2}{4\eta_yu}}\right\}\left\{e^{-\frac{(z-z_0)^2}{4\eta_x(t-t_0)}}+e^{-\frac{(z+z_0)^2}{4\eta_x(t-t_0)}}\right\}\times$$

$$\left\{erf\left(\frac{x-x_{01}}{2\sqrt{\eta_xu}}\right)+erf\left(\frac{x+x_{01}}{2\sqrt{\eta_xu}}\right)-erf\left(\frac{x-x_{02}}{2\sqrt{\eta_xu}}\right)-erf\left(\frac{x+x_{02}}{2\sqrt{\eta_xu}}\right)-erf\left(\frac{(x+x_{02})}{2\sqrt{\eta_xu}}\right)\right\}du+$$

$$\frac{8}{\pi^3}\int_0^\infty\int_0^\infty\int_0^\infty\int_0^t\left\{n\eta_x\overline{\overline{\psi}}_{yz}(m,l,t-\tau)+m\eta_y\overline{\overline{\psi}}_{xz}(n,l,t-\tau)+\frac{1}{\phi c_t}\overline{\overline{\psi}}_{xy}(n,m,t-\tau)\right\}\times\sin(nx)e^{-\eta_xn^2\tau}\sin(my)e^{-\eta_ym^2\tau}\cos(lz)e^{-\eta_zl^2\tau}\,d\tau\,dn\,dm\,dl+$$

$$\frac{1}{8(\pi t)^{\frac{3}{2}}}\int_0^\infty\int_0^\infty\int_0^\infty\varphi(u,v,w)\left\{e^{-\frac{(x-u)^2}{4\eta_xt}}-e^{-\frac{(x+u)^2}{4\eta_xt}}\right\}\left\{e^{-\frac{(y-v)^2}{4\eta_yt}}-e^{-\frac{(y+v)^2}{4\eta_yt}}\right\}\times\left\{e^{-\frac{(z-w)^2}{4\eta_zt}}-e^{-\frac{(z+w)^2}{4\eta_zt}}\right\}du\,dv\,dw$$

The spatial average pressure response of the line $[x_{02}\text{-}x_{01}]$ is obtained by a further integration.

(10.4.15)

$$\overline{p}=\frac{q(s)e^{-st_0}}{\phi c_t\pi^2(x_{02}-x_{01})\sqrt{\eta_x\eta_y}}\int_0^\infty\frac{1}{u^2}\{\cos(ux_{01})-\cos(lu_{02})\}^2\left[K_0\left\{\sqrt{\left\{\frac{(z-z_0)^2}{\eta_x}+\frac{(y-y_0)^2}{\eta_y}\right\}(s+u^2\eta_x)}\right\}+\right.$$

$$\left.K_0\left\{\sqrt{\left\{\frac{(z+z_0)^2}{\eta_z}+\frac{(y-y_0)^2}{\eta_y}\right\}(s+u^2\eta_x)}\right\}-K_0\left\{\sqrt{\left\{\frac{(z-z_0)^2}{\eta_z}+\frac{(y+y_0)^2}{\eta_y}\right\}(s+u^2\eta_x)}\right\}-K_0\left\{\sqrt{\left\{\frac{(z+z_0)^2}{\eta_z}+\frac{(y+y_0)^2}{\eta_y}\right\}(s+u^2\eta_x)}\right\}\right]du+$$

$$\frac{8}{\pi^3(x_{02}-x_{01})}\int_0^\infty\int_0^\infty\int_0^\infty\frac{1}{n}\left\{\frac{n\eta_x\overline{\overline{\psi}}_{yz}(m,l,s)+m\eta_y\overline{\overline{\psi}}_{xz}(n,l,s)+\frac{1}{\phi c_t}\overline{\overline{\psi}}_{xy}(n,m,s)}{(s+\eta_xn^2+\eta_ym^2+\eta_zl^2)}\right\}\times\cos(lz)\sin(my)\{\cos(nx_{01})-\cos(nx_{02})\}\,dn\,dm\,dl+$$

$$\frac{1}{2\pi^2(x_{02}-x_{01})\sqrt{\eta_x\eta_y}}\int_0^\infty\int_0^\infty\int_0^\infty\varphi(u,v,w)\int_0^\infty\frac{1}{n}\left[K_0\left\{\sqrt{\left\{\frac{(z-w)^2}{\eta_z}+\frac{(y-v)^2}{\eta_y}\right\}(s+n^2\eta_x)}\right\}+K_0\left\{\sqrt{\left\{\frac{(z+w)^2}{\eta_z}+\frac{(y-v)^2}{\eta_y}\right\}(s+n^2\eta_x)}\right\}-\right.$$

-continued $$K_0\left\{\sqrt{\left\{\frac{(z-w)^2}{\eta_z}+\frac{(y+v)^2}{\eta_y}\right\}(s+n^2\eta_x)}\right\}-K_0\left\{\sqrt{\left\{\frac{(z+w)^2}{\eta_z}+\frac{(y+v)^2}{\eta_y}\right\}(s+n^2\eta_x)}\right\}\right]\sin(nu)\{\cos(nx_{01})-\cos(nx_{02})\}\,dn\,du\,dv\,dw \text{ and}$$

(10.4.16)

$$p = \frac{U(t-t_0)}{4\phi c_t \pi(x_{02}-x_{01})\sqrt{\eta_y\eta_x}}\int_0^{t-t_0}\frac{q(t-t_0-\tau)}{\tau}\left[(x_{02}-x_{01})\mathrm{erf}\left(\frac{x_{02}-x_{01}}{2\sqrt{\eta_x\tau}}\right)+(x_{02}+x_{01})\mathrm{erf}\left(\frac{x_{02}+x_{01}}{2\sqrt{\eta_x\tau}}\right)+2\sqrt{\frac{\eta_x\tau}{\pi}}\left(2e^{-\frac{(x_{01}^2+x_{02}^2)}{4\eta_x\tau}}\cosh\left(\frac{x_{01}x_{02}}{2\eta_x\tau}\right)-1\right)-$$

$$x_{02}\,\mathrm{erf}\left(\frac{x_{02}}{\sqrt{\eta_x\tau}}\right)-x_{01}\,\mathrm{erf}\left(\frac{x_{01}}{\sqrt{\eta_x\tau}}\right)-\sqrt{\frac{\eta_x\tau}{\pi}}\left(e^{-\frac{x_{01}^2}{\eta_x\tau}}+e^{-\frac{x_{02}^2}{\eta_x\tau}}\right)\right]\left\{e^{-\frac{(y-y_0)^2}{4\eta_y\tau}}-e^{-\frac{(y+y_0)^2}{4\eta_y\tau}}\right\}\left\{e^{-\frac{(z-z_0)^2}{4\eta_z\tau}}+e^{-\frac{(z+z_0)^2}{4\eta_z\tau}}\right\}d\tau+$$

$$\frac{8}{\pi^3(x_{02}-x_{01})}\int_0^\infty\int_0^\infty\int_0^\infty\int_0^t\frac{1}{n}\left(m\eta_x\overline{\overline{\psi}}_{yz}(m,l,t-\tau)+mn\eta_y\overline{\overline{\psi}}_{xz}(n,l,t-\tau)+\frac{1}{\phi c_t}\overline{\overline{\psi}}_{xy}(n,m,t-\tau)\right)\times$$

$$\sin(lz)e^{-\eta_z l^2\tau}\sin(my)e^{-\eta_y m^2\tau}\{\sin(nx_{01})-\sin(nx_{02})\}e^{-\eta_x n^2\tau}d\tau\,dn\,dm\,dl+\frac{1}{8\pi t(x_{02}-x_{01})\sqrt{\eta_y\eta_z}}\int_0^\infty\int_0^\infty\int_0^\infty\varphi(u,v,w)\left\{e^{-\frac{(y-v)^2}{4\eta_y t}}-\right.$$

$$\left.e^{-\frac{(y+v)^2}{4\eta_y t}}\right\}\left\{e^{-\frac{(z-w)^2}{4\eta_z t}}+e^{-\frac{(z+w)^2}{4\eta_z t}}\right\}\times\left\{\mathrm{erf}\left(\frac{x_{02}-u}{2\sqrt{\eta_x t}}\right)-\mathrm{erf}\left(\frac{x_{02}+u}{2\sqrt{\eta_x t}}\right)-\mathrm{erf}\left(\frac{x_{01}-u}{2\sqrt{\eta_x t}}\right)+\mathrm{erf}\left(\frac{x_{01}+u}{2\sqrt{\eta_x t}}\right)\right\}du\,dv\,dw$$

(vi) Multiple lines of finite length $[z_{02_\iota}\text{-}z_{01_\iota}]$, $[x_{02_\iota}\text{-}x_{01_\iota}]$ and $[y_{02_\iota}\text{-}y_{01_\iota}]$ passing through $(x_{0_\iota},y_{0_\iota})$ for $\iota=1, 2, \ldots, L$, $(y_{0_\iota}, z_{0_\iota})$ for $\iota=L+1, 2, \ldots, M$, and $(x_{0_\iota}, z_{0_\iota})$ for $\iota=M+1, 2, \ldots, N$ respectively. Where (L<M<N).

(10.4.17)

$$\overline{p} = \frac{1}{\phi c_t \pi^2 \sqrt{\eta_x\eta_y}} \times$$

$$\sum_{i=1}^L q_i(s)e^{-st_{0i}}\int_0^\infty\frac{\cos(uz)}{u}\{\sin(uz_{02i})-\sin(uz_{01i})\}\left[K_0\left\{\sqrt{\left\{\frac{(x-x_{0i})^2}{\eta_x}+\frac{(y-y_{0i})^2}{\eta_y}\right\}(s+u^2\eta_z)}\right\}-K_0\left\{\sqrt{\left\{\frac{(x+x_{0i})^2}{\eta_x}+\frac{(y-y_{0i})^2}{\eta_y}\right\}(s+u^2\eta_z)}\right\}-$$

$$K_0\left\{\sqrt{\left\{\frac{(x-x_{0i})^2}{\eta_x}+\frac{(y+y_{0i})^2}{\eta_y}\right\}(s+u^2\eta_z)}\right\}+K_0\left\{\sqrt{\left\{\frac{(x+x_{0i})^2}{\eta_x}+\frac{(y+y_{0i})^2}{\eta_y}\right\}(s+u^2\eta_z)}\right\}\right]du + \frac{1}{\phi c_t\pi^2\sqrt{\eta_z\eta_y}}\times$$

$$\sum_{i=L+1}^M q_i(s)e^{-st_{0i}}\int_0^\infty\frac{\sin(ux)}{u}\{\cos(ux_{01i})-\cos(ux_{02i})\}\left[K_0\left\{\sqrt{\left\{\frac{(z-z_{0i})^2}{\eta_z}+\frac{(y-y_{0i})^2}{\eta_y}\right\}(s+u^2\eta_x)}\right\}+K_0\left\{\sqrt{\left\{\frac{(z+z_{0i})^2}{\eta_z}+\frac{(y-y_{0i})^2}{\eta_y}\right\}(s+u^2\eta_z)}\right\}-$$

$$K_0\left\{\sqrt{\left\{\frac{(z-z_{0i})^2}{\eta_z}+\frac{(y+y_{0i})^2}{\eta_y}\right\}(s+u^2\eta_x)}\right\}-K_0\left\{\sqrt{\left\{\frac{(z+z_{0i})^2}{\eta_z}+\frac{(y+y_{0i})^2}{\eta_y}\right\}(s+u^2\eta_x)}\right\}\right]du + \frac{1}{\phi c_t\pi^2\sqrt{\eta_x\eta_y}}\times$$

$$\sum_{i=M+1}^N q_i(s)e^{-st_{0i}}\int_0^\infty\frac{\sin(uy)}{u}\{\cos(uy_{01i})-\cos(uy_{02i})\}\left[K_0\left\{\sqrt{\left\{\frac{(x-x_{0i})^2}{\eta_x}+\frac{(z-z_{0i})^2}{\eta_z}\right\}(s+u^2\eta_y)}\right\}+K_0\left\{\sqrt{\left\{\frac{(x+x_{0i})^2}{\eta_x}+\frac{(z-z_{0i})^2}{\eta_z}\right\}(s+u^2\eta_y)}\right\}-$$

$$K_0\left\{\sqrt{\left\{\frac{(x-x_{0i})^2}{\eta_x}+\frac{(z+z_{0i})^2}{\eta_z}\right\}(s+u^2\eta_y)}\right\}-K_0\left\{\sqrt{\left\{\frac{(x+x_{0i})^2}{\eta_x}+\frac{(z+z_{0i})^2}{\eta_z}\right\}(s+u^2\eta_y)}\right\}\right]du +$$

$$\frac{8}{\pi^3}\int_0^\infty\int_0^\infty\int_0^\infty\left\{\frac{m\eta_x\overline{\overline{\psi}}_{yz}(m,l,s)+mn\eta_y\overline{\overline{\psi}}_{xz}(n,l,s)+\frac{1}{\phi c_t}\overline{\overline{\psi}}_{xy}(n,m,s)}{(s+\eta_x n^2+\eta_y m^2+\eta_z l^2)}\right\}\sin(nx)\sin(my)\cos(lz)n\,dm\,dl +$$

$$\frac{s^{\frac{1}{4}}}{(2\pi)^{\frac{3}{2}}\sqrt{\eta_x\eta_y\eta_z}}\int_0^\infty\int_0^\infty\int_0^\infty\varphi(u,v,w)\left[\frac{K_{\frac{1}{2}}\left(\sqrt{\left\{\frac{(x-u)^2}{\eta_x}+\frac{(y-v)^2}{\eta_y}+\frac{(z-w)^2}{\eta_z}\right\}s}\right)}{\left\{\frac{(x-u)^2}{\eta_x}+\frac{(y-v)^2}{\eta_y}+\frac{(z-w)^2}{\eta_z}\right\}^{\frac{1}{4}}}-\frac{K_{\frac{1}{2}}\left(\sqrt{\left\{\frac{(x+u)^2}{\eta_x}+\frac{(y-v)^2}{\eta_y}+\frac{(z-w)^2}{\eta_z}\right\}s}\right)}{\left\{\frac{(x+u)^2}{\eta_x}+\frac{(y-v)^2}{\eta_y}+\frac{(z-w)^2}{\eta_z}\right\}^{\frac{1}{4}}}-$$

-continued $$\frac{K_{\frac{1}{2}}\left(\sqrt{\left\{\frac{(x-u)^2}{\eta_x}+\frac{(y+v)^2}{\eta_y}+\frac{(z-w)^2}{\eta_z}\right\}}s\right)}{\left\{\frac{(x-u)^2}{\eta_x}+\frac{(y+v)^2}{\eta_y}+\frac{(z-w)^2}{\eta_z}\right\}^{\frac{1}{4}}}+\frac{K_{\frac{1}{2}}\left(\sqrt{\left\{\frac{(x+u)^2}{\eta_x}+\frac{(y+v)^2}{\eta_y}+\frac{(z-w)^2}{\eta_z}\right\}}s\right)}{\left\{\frac{(x+u)^2}{\eta_x}+\frac{(y-v)^2}{\eta_y}+\frac{(z-w)^2}{\eta_z}\right\}^{\frac{1}{4}}}+$$

$$\frac{K_{\frac{1}{2}}\left(\sqrt{\left\{\frac{(x-u)^2}{\eta_x}+\frac{(y-v)^2}{\eta_y}+\frac{(z+w)^2}{\eta_z}\right\}}s\right)}{\left\{\frac{(x-u)^2}{\eta_x}+\frac{(y-v)^2}{\eta_y}+\frac{(z+w)^2}{\eta_z}\right\}^{\frac{1}{4}}}-\frac{K_{\frac{1}{2}}\left(\sqrt{\left\{\frac{(x+u)^2}{\eta_x}+\frac{(y-v)^2}{\eta_y}+\frac{(z+w)^2}{\eta_z}\right\}}s\right)}{\left\{\frac{(x+u)^2}{\eta_x}+\frac{(y-v)^2}{\eta_y}+\frac{(z+w)^2}{\eta_z}\right\}^{\frac{1}{4}}}-$$

$$\frac{K_{\frac{1}{2}}\left(\sqrt{\left\{\frac{(x-u)^2}{\eta_x}+\frac{(y+v)^2}{\eta_y}+\frac{(z+w)^2}{\eta_z}\right\}}s\right)}{\left\{\frac{(x-u)^2}{\eta_x}+\frac{(y+v)^2}{\eta_y}+\frac{(z+w)^2}{\eta_z}\right\}^{\frac{1}{4}}}+\frac{K_{\frac{1}{2}}\left(\sqrt{\left\{\frac{(x+u)^2}{\eta_x}+\frac{(y+v)^2}{\eta_y}+\frac{(z+w)^2}{\eta_z}\right\}}s\right)}{\left\{\frac{(x+u)^2}{\eta_x}+\frac{(y+v)^2}{\eta_y}+\frac{(z+w)^2}{\eta_z}\right\}^{\frac{1}{4}}} du\,dv\,dw \text{ and}$$

(10.4.18)

$$p = \frac{1}{8\phi c_t \pi \sqrt{\eta_x \eta_y}} \sum_{i=0}^{L} U(t-t_{0i}) \int_0^{t-t_{0i}} \frac{q_i(t-t_0-u)}{u} \left\{ e^{-\frac{(x-x_{0i})^2}{4\eta_x u}} - e^{-\frac{(x+x_{0i})^2}{4\eta_x u}} \right\} \left\{ e^{-\frac{(y-y_{0i})^2}{4\eta_y u}} - e^{-\frac{(y+y_{0i})^2}{4\eta_y u}} \right\} \times$$

$$\left\{ erf\left(\frac{z+z_{02i}}{2\sqrt{\eta_z u}}\right) - erf\left(\frac{z-z_{02i}}{2\sqrt{\eta_z u}}\right) + erf\left(\frac{z-z_{01i}}{2\sqrt{\eta_z u}}\right) - erf\left(\frac{z+z_{01i}}{2\sqrt{\eta_z u}}\right) \right\} du +$$

$$\frac{1}{8\phi c_t \pi \sqrt{\eta_z \eta_y}} \sum_{i=L+1}^{M} U(t-t_{0i}) \int_0^{t-t_{0i}} \frac{q_i(t-t_{0i}-u)}{u} \left\{ e^{-\frac{(x-x_{0i})^2}{4\eta_x u}} + e^{-\frac{(x+x_{0i})^2}{4\eta_x u}} \right\} \left[ e^{-\frac{(y-y_{0i})^2}{4\eta_y u}} - e^{-\frac{(y+y_{0i})^2}{4\eta_y u}} \right] \times \left\{ erf\left(\frac{x-x_{01i}}{2\sqrt{\eta_x u}}\right) + \right.$$

$$\left. erf\left(\frac{x+x_{01i}}{2\sqrt{\eta_x u}}\right) - erf\left(\frac{x-x_{02i}}{2\sqrt{\eta_x u}}\right) - erf\left(\frac{x+x_{02i}}{2\sqrt{\eta_x u}}\right) \right\} du + \frac{1}{8\phi c_t \pi \sqrt{\eta_z \eta_x}} \sum_{i=M+1}^{N} U(t-t_{0i}) \int_0^{t-t_{0i}} \frac{q_i(t-t_{0i}-u)}{u} \left\{ e^{-\frac{(x-x_{0i})^2}{4\eta_x u}} + \right.$$

$$\left. e^{-\frac{(x+x_{0i})^2}{4\eta_x u}} \right\} \left\{ e^{-\frac{(x-x_{0i})^2}{4\eta_x u}} - e^{-\frac{(x+x_{0i})^2}{4\eta_x u}} \right\} \times \left\{ erf\left(\frac{y-y_{01i}}{2\sqrt{\eta_y u}}\right) + erf\left(\frac{y+y_{01i}}{2\sqrt{\eta_y u}}\right) - erf\left(\frac{y-y_{02i}}{2\sqrt{\eta_y u}}\right) - erf\left(\frac{y+y_{02i}}{2\sqrt{\eta_y u}}\right) \right\} du +$$

$$\frac{8}{\pi^3} \int_0^\infty \int_0^\infty \int_0^\infty \int_0^t \left\{ m\eta_x \overline{\overline{\psi}}_{yz}(m,l,t-\tau) + m\eta_y \overline{\overline{\psi}}_{xz}(n,l,t-\tau) + \frac{1}{\phi c_t} \overline{\overline{\psi}}_{xy}(n,m,t-\tau) \right\} \times \sin(nx) e^{-\eta_x n^2 \tau} \sin(my) e^{-\eta_y m^2 \tau} \cos(lz) e^{-\eta_z l^2 \tau} d\tau dn\,dm\,dl +$$

$$\frac{1}{8(\pi t)^{\frac{3}{2}} \sqrt{\eta_x \eta_y \eta_z}} \int_0^\infty \int_0^\infty \int_0^\infty \varphi(u,v,w) \left\{ e^{-\frac{(x-u)^2}{4\eta_x t}} - e^{-\frac{(x+u)^2}{4\eta_x t}} \right\} \left\{ e^{-\frac{(y-v)^2}{4\eta_y t}} - e^{-\frac{(y+v)^2}{4\eta_y t}} \right\} \times \left\{ e^{-\frac{(z-w)^2}{4\eta_z t}} + e^{-\frac{(z+w)^2}{4\eta_z t}} \right\} du\,dv\,dw$$

The spatial average pressure response of the line $[z_{02_\diamond}-z_{01_\diamond}]$, $\iota=\diamond$, is given by (10.4.19)

$$\overline{p} = \frac{1}{\phi c_t \pi^2 (z_{02\diamond}-z_{01\diamond})\sqrt{\eta_x \eta_y}} \times \sum_{\iota=1}^{L} q_\iota(s) e^{-st_{0\iota}} \int_0^\infty \frac{1}{u^2} \left\{ \sin(uz_{02\diamond}) - \right.$$

$$\left. \sin(uz_{01\diamond}) \right\} \left\{ \sin(uz_{02\iota}) - \cos(uz_{01\iota}) \right\} \times \left[ K_0 \left\{ \sqrt{\left\{ \frac{(x-x_{0\iota})^2}{\eta_x} + \frac{(y-y_{0\iota})^2}{\eta_y} \right\} (s+u^2 \eta_z)} \right\} - K_0 \left\{ \sqrt{\left\{ \frac{(x+x_{0\iota})^2}{\eta_x} + \frac{(y-y_{0\iota})^2}{\eta_y} \right\} (s+u^2 \eta_z)} \right\} -$$

$$K_0 \left\{ \sqrt{\left\{ \frac{(x-x_{0\iota})^2}{\eta_x} + \frac{(y+y_{0\iota})^2}{\eta_y} \right\} (s+u^2 \eta_z)} \right\} + K_0 \left\{ \sqrt{\left\{ \frac{(x+x_{0\iota})^2}{\eta_x} + \frac{(y+y_{0\iota})^2}{\eta_y} \right\} (s+u^2 \eta_z)} \right\} \right] du + \frac{1}{\phi c_t \pi^2 (z_{02\diamond}-z_{01\diamond})\sqrt{\eta_z \eta_y}} \times$$

-continued $$\sum_{l=L+1}^{M} q_l(s)e^{-st_{0l}} \int_0^\infty \frac{\sin(ux)}{u}\{\cos(ux_{01l})-\cos(ux_{02l})\} \int_{z_{01\diamond}}^{z_{02\diamond}} \left[ K_0\left\{\sqrt{\left\{\frac{(z-z_{0l})^2}{\eta_z}+\frac{(y-y_{0l})^2}{\eta_y}\right\}(s+u^2\eta_x)}\right\} + \right.$$

$$K_0\left\{\sqrt{\left\{\frac{(z+z_{0l})^2}{\eta_z}+\frac{(y-y_{0l})^2}{\eta_y}\right\}(s+u^2\eta_z)}\right\} - K_0\left\{\sqrt{\left\{\frac{(z-z_{0l})^2}{\eta_z}+\frac{(y+y_{0l})^2}{\eta_y}\right\}(s+u^2\eta_x)}\right\} -$$

$$\left. K_0\left\{\sqrt{\left\{\frac{(z+z_{0l})^2}{\eta_z}+\frac{(y+y_{0l})^2}{\eta_y}\right\}(s+u^2\eta_x)}\right\} \right]dzdu + \frac{1}{\phi c_t \pi^2(z_{02\diamond}-z_{01\diamond})\sqrt{\eta_x\eta_z}} \times$$

$$\sum_{l=M+1}^{N} q_l(s)e^{-st_{0l}} \int_0^\infty \frac{\sin(uy)}{u}\{\cos(uy_{01l})-\cos(uy_{02l})\} \int_{z_{01\diamond}}^{z_{02\diamond}} \left[ K_0\left\{\sqrt{\left\{\frac{(x-x_{0l})^2}{\eta_x}+\frac{(z-z_{0l})^2}{\eta_z}\right\}(s+u^2\eta_y)}\right\} + \right.$$

$$K_0\left\{\sqrt{\left\{\frac{(x+x_{0l})^2}{\eta_x}+\frac{(z-z_{0l})^2}{\eta_z}\right\}(s+u^2\eta_y)}\right\} - K_0\left\{\sqrt{\left\{\frac{(x-x_{0l})^2}{\eta_x}+\frac{(z+z_{0l})^2}{\eta_z}\right\}(s+u^2\eta_y)}\right\} -$$

$$\left. K_0\left\{\sqrt{\left\{\frac{(x+x_{0l})^2}{\eta_x}+\frac{(z+z_{0l})^2}{\eta_z}\right\}(s+u^2\eta_y)}\right\} \right]dzdu +$$

$$\frac{8}{\pi^3(z_{02\diamond}-z_{01\diamond})} \int_0^\infty \int_0^\infty \int_0^\infty \frac{1}{l} \left\{ \frac{n\eta_x \bar{\bar{\psi}}_{yz}(m,l,s)+m\eta_y \bar{\bar{\psi}}_{xz}(n,l,s)+\frac{1}{\phi c_t}\bar{\bar{\psi}}_{xy}(n,m,s)}{(s+\eta_x n^2+\eta_y m^2+\eta_z l^2)} \right\} \times$$

$$\sin(nx)\sin(my)\left\{\sin(lz_{02\diamond})-\sin(lz_{01\diamond})\right\}dndmdl +$$

$$\frac{1}{2\pi^2(z_{02\diamond}-z_{01\diamond})\sqrt{\eta_x\eta_y}} \int_0^\infty \int_0^\infty \int_0^\infty \varphi(u,v,w) \int_0^\infty \frac{1}{l}\left[ K_0\left\{\sqrt{\left\{\frac{(x-u)^2}{\eta_x}+\frac{(y-v)^2}{\eta_y}\right\}(s+l^2\eta_z)}\right\} - \right.$$

$$K_0\left\{\sqrt{\left\{\frac{(x+u)^2}{\eta_x}+\frac{(y-v)^2}{\eta_y}\right\}(s+l^2\eta_z)}\right\} -$$

$$K_0\left\{\sqrt{\left\{\frac{(x-u)^2}{\eta_x}+\frac{(y+v)^2}{\eta_y}\right\}(s+l^2\eta_z)}\right\} +$$

$$\left. K_0\left\{\sqrt{\left\{\frac{(x-u)^2}{\eta_x}+\frac{(y-v)^2}{\eta_y}\right\}(s+l^2\eta_z)}\right\} \right]\cos(lw)\{\sin(lz_{02\diamond}) -$$

$$\sin(lz_{01\diamond})\}dldudvdw \text{ and}$$

(10.4.20)

$$p = \frac{1}{8\phi c_t \pi(z_{02\diamond}-z_{01\diamond})\sqrt{\eta_x\eta_y}} \times \sum_{l=0}^{L} U(t-t_{0l}) \int_0^{t-t_{0l}} \frac{q_l(t-t-u)}{u} \left\{ e^{-\frac{(x-x_{0l})^2}{4\eta_x u}} - e^{-\frac{(x+x_{0l})^2}{4\eta_x u}} \right\} \left\{ e^{-\frac{(y-y_{0l})^2}{4\eta_y u}} - e^{-\frac{(y+y_{0l})^2}{4\eta_y u}} \right\} \times \left[ (z_{02\diamond}-z_{01l})\mathrm{erf}\left(\frac{z_{02\diamond}-z_{01l}}{2\sqrt{\eta_z u}}\right) - \right.$$

$$(z_{01\diamond}-z_{01l})\mathrm{erf}\left(\frac{z_{01\diamond}-z_{01l}}{2\sqrt{\eta_z u}}\right) - (z_{02\diamond}-z_{02l})\mathrm{erf}\left(\frac{z_{02\diamond}-z_{02l}}{2\sqrt{\eta_z u}}\right) +$$

$$(z_{01\diamond}-z_{02l})\mathrm{erf}\left(\frac{z_{01\diamond}-z_{01l}}{2\sqrt{\eta_z u}}\right) + 2\sqrt{\frac{\eta_z u}{\pi}}\left\{ e^{-\frac{(z_{02\diamond}-z_{01l})^2}{4\eta_z u}} - e^{-\frac{(z_{01\diamond}-z_{01l})^2}{4\eta_z u}} - \right.$$

$$\left. e^{-\frac{(z_{02\diamond}-z_{02l})^2}{4\eta_z u}} + e^{-\frac{(z_{01\diamond}-z_{02l})^2}{4\eta_z u}} \right\} - (z_{02\diamond}+z_{01l})\mathrm{erf}\left(\frac{z_{02\diamond}-z_{01l}}{2\sqrt{\eta_z u}}\right) +$$

$$(z_{01\diamond}+z_{01l})\mathrm{erf}\left(\frac{z_{01\diamond}+z_{01l}}{2\sqrt{\eta_z u}}\right) + (z_{02\diamond}+z_{02l})\mathrm{erf}\left(\frac{z_{02\diamond}-z_{02l}}{2\sqrt{\eta_z u}}\right) -$$

$$(z_{01\diamond}+z_{02l})\mathrm{erf}\left(\frac{z_{01\diamond}-z_{02l}}{2\sqrt{\eta_z u}}\right) - 2\sqrt{\frac{\eta_z u}{\pi}}\left\{ e^{-\frac{(z_{02\diamond}+z_{01l})^2}{4\eta_z u}} - e^{-\frac{(z_{01\diamond}+z_{01l})^2}{4\eta_z u}} - \right.$$

$$\left. \left. e^{-\frac{(z_{02\diamond}+z_{02l})^2}{4\eta_z u}} + e^{-\frac{(z_{01\diamond}-z_{02l})^2}{4\eta_z u}} \right\} \right]du + \frac{1}{8\phi c_t \pi(z_{02\diamond}-z_{01\diamond})\sqrt{\eta_x\eta_y}} \sum_{l=L+1}^{M} U(t-$$

-continued $$t_{0t}) \int_0^{t-t_{0t}} \frac{q_t(t-t_{0t}-u)}{u} \left\{ e^{-\frac{(y-y_{0t})^2}{4\eta_y u}} - e^{-\frac{(y+y_{0t})^2}{4\eta_y u}} \right\} \times$$

$$\left\{ \text{erf}\left(\frac{z_{02\diamond}-z_{0t}}{2\sqrt{\eta_z u}}\right) - \text{erf}\left(\frac{z_{01\diamond}-z_{0t}}{2\sqrt{\eta_z u}}\right) + \text{erf}\left(\frac{z_{02\diamond}+z_{0t}}{2\sqrt{\eta_z u}}\right) - \text{erf}\left(\frac{z_{01\diamond}-z_{0t}}{2\sqrt{\eta_z u}}\right) \right\} \times$$

$$\left\{ \text{erf}\left(\frac{x-x_{01t}}{2\sqrt{\eta_z u}}\right) + \text{erf}\left(\frac{x+x_{01t}}{2\sqrt{\eta_z u}}\right) - \text{erf}\left(\frac{x-x_{02t}}{2\sqrt{\eta_z u}}\right) - \text{erf}\left(\frac{x+x_{02t}}{2\sqrt{\eta_z u}}\right) \right\}$$

$$du + \frac{1}{8\phi c_t(z_{02\diamond}-z_{01\diamond})\sqrt{\pi\eta_x}} \sum_{t=M+1}^{N} U(t-t_{0t}) \int_0^{t-t_{0t}} \frac{q_t(t-t_{0t}-u)}{\sqrt{u}} \left\{ e^{-\frac{(x-x_{0t})^2}{4\eta_x u}} - \right.$$

$$\left. e^{-\frac{(x+z_{0t})^2}{4\eta_x u}} \right\} \times \left\{ \text{erf}\left(\frac{z_{02\diamond}-z_{0t}}{2\sqrt{\eta_z u}}\right) - \text{erf}\left(\frac{z_{01\diamond}-z_{0t}}{2\sqrt{\eta_z u}}\right) + \text{erf}\left(\frac{z_{02\diamond}+z_{0t}}{2\sqrt{\eta_z u}}\right) - \right.$$

$$\left. \text{erf}\left(\frac{z_{01\diamond}-z_{0t}}{2\sqrt{\eta_z u}}\right) \right\} \times \left\{ \text{erf}\left(\frac{y-y_{01t}}{2\sqrt{\eta_y u}}\right) + \text{erf}\left(\frac{y+y_{01t}}{2\sqrt{\eta_y u}}\right) - \text{erf}\left(\frac{y-y_{02t}}{2\sqrt{\eta_y u}}\right) - \right.$$

$$\left. \text{erf}\left(\frac{y+y_{02t}}{2\sqrt{\eta_y u}}\right) \right\} du + \frac{8}{\pi^3(z_{02\diamond}-z_{01\diamond})} \int_0^\infty \int_0^\infty \int_0^\infty \int_0^t \frac{1}{l} \left\{ n\eta_x \bar{\bar{\psi}}_{yz}(m, l, t-\tau) + \right.$$

$$\left. m\eta_y \bar{\bar{\psi}}_{xz}(n, l, t-\tau) + \frac{1}{\phi c_t} \bar{\bar{\psi}}_{xy}(n, m, t-\tau) \right\} \times$$

$$\sin(nx) e^{-\eta_x n^2 \tau} \sin(my) e^{-\eta_y m^2 \tau} \{\sin(l z_{02\diamond}) - \sin(l z_{01\diamond})\} e^{-\eta_y l^2 \tau} d\tau dn dm dl +$$

$$\frac{1}{8\pi(z_{02\diamond}-z_{01\diamond})t\sqrt{\eta_x\eta_y}} \int_0^\infty \int_0^\infty \int_0^\infty \varphi(u, v, w) \left\{ e^{-\frac{(x-u)^2}{4\eta_x t}} - \right.$$

$$\left. e^{-\frac{(x+u)^2}{4x_z t}} \right\} \left\{ e^{-\frac{(y-v)^2}{4\eta_y t}} - e^{-\frac{(y+v)^2}{4\eta_y t}} \right\} \times \left\{ \text{erf}\left(\frac{w+z_{02\diamond}}{2\sqrt{\eta_z ut}}\right) + \right.$$

$$\left. \text{erf}\left(\frac{w-z_{02\diamond}}{2\sqrt{\eta_z t}}\right) - \text{erf}\left(\frac{w-z_{01\diamond}}{2\sqrt{\eta_z t}}\right) - \text{erf}\left(\frac{w+z_{01\diamond}}{2\sqrt{\eta_z t}}\right) \right\} du dv dw$$

The spatial pressure response of the line $[x_{02\diamond}\text{-}x_{01\diamond}]$, $\iota = \diamond$, is given by (10.4.21)

$$\bar{p} = \frac{1}{\phi c_t \pi^2 (x_{02\diamond}-x_{01\diamond})\sqrt{\eta_x\eta_y}} \times$$

$$\sum_{t=1}^{L} q_t(s) e^{-st_{0t}} \int_0^\infty \frac{\cos(uz)}{u} \{\sin(uz_{02t}) - \sin(uz_{01t})\} \int_{x_{01\diamond}}^{x_{02\diamond}} \left[ K_0\left\{ \sqrt{\left\{\frac{(x-x_{0t})^2}{\eta_x} + \frac{(y-y_{0t})^2}{\eta_y}\right\}(s+u^2\eta_z)} \right\} - K_0\left\{ \sqrt{\left\{\frac{(x+x_{0t})^2}{\eta_x} + \frac{(y-y_{0t})^2}{\eta_y}\right\}(s+u^2\eta_z)} \right\} - \right.$$

$$\left. K_0\left\{ \sqrt{\left\{\frac{(x-x_{0t})^2}{\eta_x} + \frac{(y+y_{0t})^2}{\eta_y}\right\}(s+u^2\eta_z)} \right\} + K_0\left\{ \sqrt{\left\{\frac{(x+x_{0t})^2}{\eta_x} + \frac{(y+y_{0t})^2}{\eta_y}\right\}(s+u^2\eta_z)} \right\} \right] dx du +$$

$$\frac{1}{\phi c_t \pi^2 (x_{02\diamond}-x_{01\diamond})\sqrt{\eta_z\eta_y}} \times \sum_{t=L+1}^{M} q_t(s) e^{-st_{0t}} \int_0^\infty \frac{1}{u^2} \{\cos(ux_{01\diamond}) - \cos(ux_{02\diamond})\}\{\cos(ux_{01t}) - \cos(ux_{02t})\} \times$$

$$\left[ K_0\left\{ \sqrt{\left\{\frac{(z-z_{0t})^2}{\eta_x} + \frac{(y-y_{0t})^2}{\eta_y}\right\}(s+u^2\eta_x)} \right\} + K_0\left\{ \sqrt{\left\{\frac{(z+z_{0t})^2}{\eta_x} + \frac{(y-y_{0t})^2}{\eta_y}\right\}(s+u^2\eta_z)} \right\} - K_0\left\{ \sqrt{\left\{\frac{(z-z_{0t})^2}{\eta_z} + \frac{(y+y_{0t})^2}{\eta_y}\right\}(s+u^2\eta_x)} \right\} - \right.$$

$$\left. K_0\left\{ \sqrt{\left\{\frac{(z+z_{0t})^2}{\eta_z} + \frac{(y+y_{0t})^2}{\eta_y}\right\}(s+u^2\eta_x)} \right\} \right] du + \frac{1}{\phi c_t \pi^2 (x_{02\diamond}-x_{01\diamond})\sqrt{\eta_x\eta_z}} \times \sum_{t=M+1}^{N} q_t(s) e^{-st_{0t}} \int_0^\infty \frac{\sin(uy)}{u} \{\cos(uy_{01t}) - $$

-continued $$\cos(uy_{02t})\}\int_{x_{01\diamond}}^{x_{02\diamond}}\left[K_0\left\{\sqrt{\left\{\frac{(x-x_{0t})^2}{\eta_x}+\frac{(z-z_{0t})^2}{\eta_z}\right\}(s+u^2\eta_y)}\right\}+K_0\left\{\sqrt{\left\{\frac{(x+x_{0t})^2}{\eta_x}+\frac{(z-z_{0t})^2}{\eta_z}\right\}(s+u^2\eta_y)}\right\}-\right.$$

$$\left.K_0\left\{\sqrt{\left\{\frac{(x-x_{0t})^2}{\eta_x}+\frac{(z+z_{0t})^2}{\eta_z}\right\}(s+u^2\eta_y)}\right\}-K_0\left\{\sqrt{\left\{\frac{(x+x_{0t})^2}{\eta_x}+\frac{(z+z_{0t})^2}{\eta_z}\right\}(s+u^2\eta_y)}\right\}\right]dxdu+$$

$$\frac{8}{\pi^3(x_{02\diamond}-x_{01\diamond})}\int_0^\infty\int_0^\infty\int_0^\infty\frac{1}{n}\left\{\frac{n\eta_x\bar{\bar{\psi}}_{yz}(m,l,s)+m\eta_y\bar{\bar{\psi}}_{xz}(n,l,s)+\frac{1}{\phi c_t}\bar{\bar{\psi}}_{xy}(n,m,s)}{(s+\eta_xn^2+\eta_ym^2+\eta_zl^2)}\right\}\times$$

$$\cos(lz)\sin(my)\{\cos(nx_{01\diamond})-\cos(nx_{02\diamond})\}dndmdl+$$

$$\frac{1}{2\pi^2(x_{02\diamond}-x_{01\diamond})\sqrt{\eta_y\eta_z}}\int_0^\infty\int_0^\infty\int_0^\infty\varphi(u,v,w)\int_0^\infty\frac{1}{n}\left[K_0\left\{\sqrt{\left\{\frac{(z-w)^2}{\eta_x}+\frac{(y-v)^2}{\eta_y}\right\}(s+n^2\eta_x)}\right\}+\right.$$

$$\left.K_0\left\{\sqrt{\left\{\frac{(z+w)^2}{\eta_x}+\frac{(y-v)^2}{\eta_y}\right\}(s+n^2\eta_x)}\right\}-K_0\left\{\sqrt{\left\{\frac{(z-w)^2}{\eta_x}+\frac{(y+v)^2}{\eta_y}\right\}(s+n^2\eta_x)}\right\}-\right.$$

$$\left.K_0\left\{\sqrt{\left\{\frac{(z+w)^2}{\eta_x}+\frac{(y+v)^2}{\eta_y}\right\}(s+n^2\eta_x)}\right\}\right]\sin(nu)\{\cos(nx_{01\diamond})-\cos(nx_{02\diamond})\}dndudvdw$$

(10.4.22)

$$p=\frac{1}{8\phi c_t\pi(x_{02\diamond}-x_{01\diamond})\sqrt{\eta_x\eta_y}}\sum_{t=0}^{L}U(t-t_{0t})\int_0^{t-t_{0t}}\frac{q_t(t-t_{0t}-u)}{u}\left\{e^{-\frac{(y-y_{0t})^2}{4\eta_yu}}-e^{-\frac{(y+y_{0t})^2}{4\eta_yu}}\right\}\times\left\{\mathrm{erf}\left(\frac{x_{02\diamond}-x_{0t}}{2\sqrt{\eta_xu}}\right)-\mathrm{erf}\left(\frac{x_{01\diamond}-x_{0t}}{2\sqrt{\eta_xu}}\right)-\mathrm{erf}\left(\frac{x_{02\diamond}+x_{0t}}{2\sqrt{\eta_xu}}\right)+\right.$$

$$\left.\mathrm{erf}\left(\frac{x_{01\diamond}-x_{0t}}{2\sqrt{\eta_xu}}\right)\right\}\times\left\{\mathrm{erf}\left(\frac{z+z_{02t}}{2\sqrt{\eta_zu}}\right)-\mathrm{erf}\left(\frac{z-z_{02t}}{2\sqrt{\eta_zu}}\right)+\mathrm{erf}\left(\frac{z-z_{01t}}{2\sqrt{\eta_zu}}\right)-\mathrm{erf}\left(\frac{z+z_{01t}}{2\sqrt{\eta_zu}}\right)\right\}du+$$

$$\frac{1}{8\phi c_t\pi(x_{02\diamond}-x_{01\diamond})\sqrt{\eta_z\eta_y}}\times\sum_{t=L+1}^{M}U(t-t_{0t})\int_0^{t-t_{0t}}\frac{q_t(t-t_{0t}-u)}{u}\left\{e^{-\frac{(z-z_{0t})^2}{4\eta_zu}}+\right.$$

$$\left.e^{-\frac{(z+z_{0t})^2}{4\eta_zu}}\right\}\left\{e^{-\frac{(y-y_{0t})^2}{4\eta_yu}}-e^{-\frac{(y+y_{0t})^2}{4\eta_yu}}\right\}\times\left[(x_{02\diamond}-x_{01t})\mathrm{erf}\left(\frac{x_{02\diamond}-x_{01t}}{2\sqrt{\eta_xu}}\right)-\right.$$

$$\left.(x_{01\diamond}-x_{01t})erf\left(\frac{x_{01\diamond}-x_{01t}}{2\sqrt{\eta_xu}}\right)+(x_{02\diamond}-x_{01t})\mathrm{erf}\left(\frac{x_{02\diamond}+x_{01t}}{2\sqrt{\eta_xu}}\right)-(x_{01\diamond}+x_{01t})\mathrm{erf}\left(\frac{x_{01\diamond}+x_{01t}}{2\sqrt{\eta_xu}}\right)+\right.$$

$$2\sqrt{\frac{\eta_xu}{\pi}}\left\{e^{-\frac{(x_{02\diamond}-x_{01t})^2}{4\eta_xu}}-e^{-\frac{(x_{01\diamond}-x_{01t})^2}{4\eta_xu}}\right\}+2\sqrt{\frac{\eta_xu}{\pi}}\left\{e^{-\frac{(x_{02\diamond}+x_{01t})^2}{4\eta_xu}}-\right.$$

$$\left.e^{-\frac{(x_{01\diamond}+x_{01t})^2}{4\eta_xu}}\right\}-(x_{02\diamond}-x_{02t})\mathrm{erf}\left(\frac{x_{02\diamond}-x_{02t}}{2\sqrt{\eta_xu}}\right)-(x_{01\diamond}+x_{02t})\mathrm{erf}\left(\frac{x_{01\diamond}-x_{02t}}{2\sqrt{\eta_xu}}\right)-$$

$$(x_{02\diamond}+x_{02t})\mathrm{erf}\left(\frac{x_{02\diamond}+x_{02t}}{2\sqrt{\eta_xu}}\right)-(x_{01\diamond}+x_{02t})erf\left(\frac{x_{01\diamond}+x_{02t}}{2\sqrt{\eta_xu}}\right)+$$

$$2\sqrt{\frac{\eta_xu}{\pi}}\left\{e^{-\frac{(x_{02\diamond}-x_{02t})^2}{4\eta_xu}}-e^{-\frac{(x_{01\diamond}-x_{01t})^2}{4\eta_xu}}\right\}+2\sqrt{\frac{\eta_xu}{\pi}}\left\{e^{-\frac{(x_{02\diamond}+x_{02t})^2}{4\eta_xu}}-\right.$$

$$\left.\left.e^{-\frac{(x_{01\diamond}+x_{02t})^2}{4\eta_xu}}\right\}\right]du+\frac{1}{8\phi c_t\pi(x_{02\diamond}-x_{01\diamond})\sqrt{\eta_z\eta_x}}\sum_{t=M+1}^{N}U(t-$$

$$t_{0t})\int_0^{t-t_{0t}}\frac{q_t(t-t_{0t}-u)}{u}\left\{e^{-\frac{(z-z_{0t})^2}{4\eta_zu}}+e^{-\frac{(z+z_{0t})^2}{4\eta_zu}}\right\}\times$$

$$\left\{\mathrm{erf}\left(\frac{x_{02\diamond}-x_{0t}}{2\sqrt{\eta_xu}}\right)-\mathrm{erf}\left(\frac{x_{01\diamond}-x_{0t}}{2\sqrt{\eta_xu}}\right)-\mathrm{erf}\left(\frac{x_{02\diamond}+x_{0t}}{2\sqrt{\eta_xu}}\right)+\mathrm{erf}\left(\frac{x_{01\diamond}-x_{0t}}{2\sqrt{\eta_xu}}\right)\right\}\times$$

$$\left\{ \mathrm{erf}\left(\frac{y-y_{01t}}{2\sqrt{\eta_y u}}\right) + \mathrm{erf}\left(\frac{y+y_{01t}}{2\sqrt{\eta_y u}}\right) - \mathrm{erf}\left(\frac{y-y_{02t}}{2\sqrt{\eta_y u}}\right) - \mathrm{erf}\left(\frac{y+y_{02t}}{2\sqrt{\eta_y u}}\right) \right\} du +$$

$$\frac{8}{\pi^3 (x_{02\diamond} - x_{01\diamond})} \int_0^\infty \int_0^\infty \int_0^\infty \int_0^t \frac{1}{n} \left\{ n\eta_x \overline{\overline{\psi}}_{yz}(m,l,t-\tau) + \right.$$

$$\left. m\eta_y \overline{\overline{\psi}}_{xz}(n,l,t-\tau) + \frac{1}{\phi c_t} \overline{\overline{\psi}}_{xy}(n,m,t-\tau) \right\} \times \{\cos(nx_{01\diamond}) -$$

$$\cos(nx_{02\diamond})\} e^{\eta_x n^2 \tau} \sin(my) e^{-\eta_y m^2 \tau} \cos(lz) e^{-\eta_z l^2 \tau} d\tau dn dm dl +$$

$$\frac{1}{8(\pi t)^{\frac{3}{2}}(x_{02\diamond}-x_{01\diamond})\sqrt{\eta_x\eta_y\eta_z}} \int_0^\infty \int_0^\infty \int_0^\infty \varphi(u,v,w) \left\{ e^{-\frac{(z-w)^2}{4\eta_z t}} + \right.$$

$$\left. e^{-\frac{(z+w)^2}{4\eta_z t}} \right\} \left\{ e^{-\frac{(y-v)^2}{4\eta_y t}} - e^{-\frac{(y+v)^2}{4\eta_y t}} \right\} \times \left\{ \mathrm{erf}\left(\frac{u+x_{01\diamond}}{2\sqrt{\eta_x t}}\right) + \right.$$

$$\left. \mathrm{erf}\left(\frac{u+x_{01\diamond}}{2\sqrt{\eta_x t}}\right) - \mathrm{erf}\left(\frac{u-x_{02\diamond}}{2\sqrt{\eta_x t}}\right) - \mathrm{erf}\left(\frac{u+x_{02\diamond}}{2\sqrt{\eta_x t}}\right) \right\} du dv dw$$

10.5 The problem of 10.4, except the initial pressure $p(x,y,z,0)=p_\iota$, a constant for all $x>0$, $y>0$, and $z>0$.

The solution for the continuous point source is $$\overline{p} = \frac{q(s)e^{-st_0}s^{\frac{1}{4}}}{\phi c_t (2\pi)^{\frac{3}{2}} \sqrt{\eta_x\eta_y\eta_z}} \left[ \frac{K_{\frac{1}{2}}\left(\sqrt{\left\{\frac{(x-x_0)^2}{\eta_x}+\frac{(y-y_0)^2}{\eta_y}+\frac{(z-z_0)^2}{\eta_z}\right\}s}\right)}{\left\{\frac{(x-x_0)^2}{\eta_x}+\frac{(y-y_0)^2}{\eta_y}+\frac{(z-z_0)^2}{\eta_z}\right\}^{\frac{1}{4}}} - \frac{K_{\frac{1}{2}}\left(\sqrt{\left\{\frac{(x+x_0)^2}{\eta_x}+\frac{(y-y_0)^2}{\eta_y}+\frac{(z-z_0)^2}{\eta_z}\right\}s}\right)}{\left\{\frac{(x+x_0)^2}{\eta_x}+\frac{(y-y_0)^2}{\eta_y}+\frac{(z-z_0)^2}{\eta_z}\right\}^{\frac{1}{4}}} - \right.$$

$$\frac{K_{\frac{1}{2}}\left(\sqrt{\left\{\frac{(x-x_0)^2}{\eta_x}+\frac{(y+y_0)^2}{\eta_y}+\frac{(z-z_0)^2}{\eta_z}\right\}s}\right)}{\left\{\frac{(x-x_0)^2}{\eta_x}+\frac{(y+y_0)^2}{\eta_y}+\frac{(z-z_0)^2}{\eta_z}\right\}^{\frac{1}{4}}} + \frac{K_{\frac{1}{2}}\left(\sqrt{\left\{\frac{(x+x_0)^2}{\eta_x}+\frac{(y+y_0)^2}{\eta_y}+\frac{(z-z_0)^2}{\eta_z}\right\}s}\right)}{\left\{\frac{(x+x_0)^2}{\eta_x}+\frac{(y+y_0)^2}{\eta_y}+\frac{(z-z_0)^2}{\eta_z}\right\}^{\frac{1}{4}}} + \frac{K_{\frac{1}{2}}\left(\sqrt{\left\{\frac{(x-x_0)^2}{\eta_x}+\frac{(y-y_0)^2}{\eta_y}+\frac{(z+z_0)^2}{\eta_z}\right\}s}\right)}{\left\{\frac{(x-x_0)^2}{\eta_x}+\frac{(y-y_0)^2}{\eta_y}+\frac{(z+z_0)^2}{\eta_z}\right\}^{\frac{1}{4}}} -$$

$$\frac{K_{\frac{1}{2}}\left(\sqrt{\left\{\frac{(x+x_0)^2}{\eta_x}+\frac{(y-y_0)^2}{\eta_y}+\frac{(z+z_0)^2}{\eta_z}\right\}s}\right)}{\left\{\frac{(x+x_0)^2}{\eta_x}+\frac{(y-y_0)^2}{\eta_y}+\frac{(z+z_0)^2}{\eta_z}\right\}^{\frac{1}{4}}} - \frac{K_{\frac{1}{2}}\left(\sqrt{\left\{\frac{(x-x_0)^2}{\eta_x}+\frac{(y+y_0)^2}{\eta_y}+\frac{(z+z_0)^2}{\eta_z}\right\}s}\right)}{\left\{\frac{(x-x_0)^2}{\eta_x}+\frac{(y+y_0)^2}{\eta_y}+\frac{(z+z_0)^2}{\eta_z}\right\}^{\frac{1}{4}}} + \frac{K_{\frac{1}{2}}\left(\sqrt{\left\{\frac{(x+x_0)^2}{\eta_x}+\frac{(y+y_0)^2}{\eta_y}+\frac{(z+z_0)^2}{\eta_z}\right\}s}\right)}{\left\{\frac{(x+x_0)^2}{\eta_x}+\frac{(y+y_0)^2}{\eta_y}+\frac{(z+z_0)^2}{\eta_z}\right\}^{\frac{1}{4}}} \right] +$$

$$\frac{8}{\pi^3} \int_0^\infty \int_0^\infty \int_0^\infty \left\{ \frac{n\eta_x \overline{\overline{\overline{\psi}}}_{yz}(m,l,s) + m\eta_y \overline{\overline{\overline{\psi}}}_{xz}(n,l,s) + \frac{1}{\phi c_t} \overline{\overline{\overline{\psi}}}_{xy}(n,m,s)}{(s+\eta_x n^2 + \eta_y m^2 + \eta_z l^2)} \right\} \sin(nx)\sin(my)\cos(lz) dn dm dl +$$

$$\frac{2p_\iota}{\pi} \int_0^\infty \frac{\left\{1-e^{-x\sqrt{\frac{s+\eta_y m^2}{\eta_x}}}\right\}\sin(my)}{m(s+\eta_y m^2)} dm$$ (10.5.1)

and $$p = \frac{U(t-t_0)}{8\phi c_t \pi^{\frac{3}{2}} \sqrt{\eta_x\eta_y\eta_z}} \int_0^{t-t_0} \frac{q(t-t_0-\tau)}{\tau^{\frac{3}{2}}} \left\{ e^{-\frac{(x-x_0)^2}{4\eta_x\tau}} - e^{-\frac{(x+x_0)^2}{4\eta_x\tau}} \right\} \left\{ e^{-\frac{(y-y_0)^2}{4\eta_y\tau}} - e^{-\frac{(y+y_0)^2}{4\eta_y\tau}} \right\} \times$$ (10.5.2)

$$\left\{ e^{-\frac{(z-z_0)^2}{4\eta_z\tau}} + e^{-\frac{(z+z_0)^2}{4\eta_z\tau}} \right\} d\tau + \frac{8}{\pi^3} \int_0^\infty \int_0^\infty \int_0^\infty \int_0^t \left\{ n\eta_x \overline{\overline{\psi}}_{yz}(m,l,t-\tau) + m\eta_y \overline{\overline{\psi}}_{xz}(n,l,t-\tau) + \right.$$

-continued $$\frac{1}{\phi c_t}\overline{\overline{\psi}}_{xy}(n,m,t-\tau)\bigg\} \times \sin(nx)e^{-\eta_x n^2 \tau}\sin(my)e^{-\eta_y m^2 \tau}\cos(lz)e^{-\eta_z l^2 \tau}\,d\tau\,dn\,dm\,dl + p_I\,\text{erf}\!\left(\frac{x}{2\sqrt{\eta_x t}}\right)\text{erf}\!\left(\frac{y}{2\sqrt{\eta_y t}}\right)$$

where $\overline{\overline{\psi}}_{xz}(n,l,s) = \int_0^\infty \int_0^\infty \overline{\psi}_{xz}(x,z,s)\sin(nx)\cos(lz)\,dx\,dz$, $\overline{\overline{\psi}}_{yz}(m,l,s) = \int_0^\infty \int_0^\infty \overline{\psi}_{yz}(y,z,s)\sin(my)\cos(lz)\,dy\,dz$, $\overline{\overline{\psi}}_{xy}(n,m,s) = \int_0^\infty \int_0^\infty \overline{\psi}_{xy}(x,y,s)\sin(nx)\sin(my)\,dx\,dy$, $\overline{\overline{\psi}}_{xz}(n,l,t) = \int_0^\infty \int_0^\infty \psi_{xz}(x,z,t)\sin(nx)\cos(lz)\,dx\,dz$, $\overline{\overline{\psi}}_{yz}(m,l,t) = \int_0^\infty \int_0^\infty \psi_{yz}(y,z,t)\sin(my)\cos(lz)\,dy\,dz$, $\overline{\overline{\psi}}_{xy}(n,m,t) = \int_0^\infty \int_0^\infty \psi_{xy}(x,y,t)\sin(nx)\sin(my)\,dx\,dy$, $\overline{\psi}_{xz}(x,z,s) = \int_0^\infty \psi_{xz}(x,z,t)e^{-st}\,dt$, $\overline{\psi}_{yz}(y,z,s) = \int_0^\infty \psi_{yz}(y,z,t)e^{-st}\,dt$, and $\overline{\psi}_{xy}(x,y,s) = \int_0^\infty \psi_{xy}(x,y,t)e^{-st}\,dt$.

(i) A line of finite length $[z_{02} - z_{01}]$ passing through $(x_0, y_0)$.

$$\overline{p} = \frac{q(s)e^{-st_0}}{\phi c_t \pi^2 \sqrt{\eta_x \eta_y}} \int_0^\infty \frac{\cos(lz)}{l}\{\sin(lz_{02}) - \sin(lz_{01})\}\left[K_0\!\left\{\sqrt{\left\{\frac{(x-x_0)^2}{\eta_x} + \frac{(y-y_0)^2}{\eta_y}\right\}(s + l^2\eta_z)}\right\} - \right.\tag{10.5.3}$$

$$K_0\!\left\{\sqrt{\left\{\frac{(x+x_0)^2}{\eta_x} + \frac{(y-y_0)^2}{\eta_y}\right\}(s+l^2\eta_z)}\right\} - K_0\!\left\{\sqrt{\left\{\frac{(x-x_0)^2}{\eta_x} + \frac{(y+y_0)^2}{\eta_y}\right\}(s+l^2\eta_z)}\right\} + K_0\!\left\{\sqrt{\left\{\frac{(x+x_0)^2}{\eta_x} + \frac{(y+y_0)^2}{\eta_y}\right\}(s+l^2\eta_z)}\right\}\right] dl +$$

$$\frac{8}{\pi^3} \int_0^\infty \int_0^\infty \int_0^\infty \left\{\frac{n\eta_x \overline{\overline{\psi}}_{yz}(m,l,s) + m\eta_y \overline{\overline{\psi}}_{xz}(n,l,s) + \frac{1}{\phi c_t}\overline{\overline{\psi}}_{xy}(n,m,s)}{(s + \eta_x n^2 + \eta_y m^2 + \eta_z l^2)}\right\}\sin(nx)\sin(my)\cos(lz)\,dn\,dm\,dl +$$

$$\frac{2p_I}{\pi}\int_0^\infty \frac{\left\{1 - e^{-x\sqrt{\frac{s+\eta_y m^2}{\eta_x}}}\right\}\sin(my)}{m(s + \eta_y m^2)}\,dm$$

and $$p = \frac{U(t-t_0)}{8\phi c_t \pi \sqrt{\eta_x \eta_y}} \int_0^{t-t_0} \frac{q(t-t_0-\tau)}{\tau}\left\{e^{-\frac{(x-x_0)^2}{4\eta_x \tau}} - e^{-\frac{(x+x_0)^2}{4\eta_x \tau}}\right\}\left\{e^{-\frac{(y-y_0)^2}{4\eta_y \tau}} - e^{-\frac{(y+y_0)^2}{4\eta_y \tau}}\right\} \times \left\{\text{erf}\!\left(\frac{z+z_{02}}{2\sqrt{\eta_z \tau}}\right) - \text{erf}\!\left(\frac{z-z_{02}}{2\sqrt{\eta_z \tau}}\right) + \right.\tag{10.5.4}$$

$$\text{erf}\!\left(\frac{z-z_{01}}{2\sqrt{\eta_z \tau}}\right) - \text{erf}\!\left(\frac{z+z_{01}}{2\sqrt{\eta_z \tau}}\right)\right\} d\tau + \frac{8}{\pi^3}\int_0^\infty \int_0^\infty \int_0^\infty \int_0^t \left\{n\eta_x \overline{\overline{\psi}}_{yz}(m,l,t-\tau) + m\eta_y \overline{\overline{\psi}}_{xz}(n,l,t-\tau) + \frac{1}{\phi c_t}\overline{\overline{\psi}}_{xy}(n,m,t-\tau)\right\} \times$$

$$\sin(nx)e^{-\eta_x n^2 \tau}\sin(my)e^{-\eta_y m^2 \tau}\cos(lz)e^{-\eta_z l^2 \tau}\,d\tau\,dn\,dm\,dl + p_I\,\text{erf}\!\left(\frac{x}{2\sqrt{\eta_x t}}\right)\text{erf}\!\left(\frac{y}{2\sqrt{\eta_y t}}\right)$$

The spatial average pressure response of the line $[z_{02}-z_{01}]$ is obtained by a further integration.

$$\overline{p} = \frac{q(s)e^{-st_0}}{\phi c_t \pi^2 (z_{02}-z_{01})\sqrt{\eta_x \eta_y}} \int_0^\infty \frac{1}{l^2}\{\sin(lz_{02}) - \sin(lz_{01})\}^2\left[K_0\!\left\{\sqrt{\left\{\frac{(x-x_0)^2}{\eta_x} + \frac{(y-y_0)^2}{\eta_y}\right\}(s+l^2\eta_z)}\right\} - \right.\tag{10.5.5}$$

$$K_0\!\left\{\sqrt{\left\{\frac{(x+x_0)^2}{\eta_x} + \frac{(y-y_0)^2}{\eta_y}\right\}(s+l^2\eta_z)}\right\} - K_0\!\left\{\sqrt{\left\{\frac{(x-x_0)^2}{\eta_x} + \frac{(y+y_0)^2}{\eta_y}\right\}(s+l^2\eta_z)}\right\} +$$

$$K_0\!\left\{\sqrt{\left\{\frac{(x+x_0)^2}{\eta_x} + \frac{(y+y_0)^2}{\eta_y}\right\}(s+l^2\eta_z)}\right\}\right] dl + \frac{8}{\pi^3(z_{02}-z_{01})}\int_0^\infty \int_0^\infty \int_0^\infty \frac{1}{l}\left\{\frac{n\eta_x \overline{\overline{\psi}}_{yz}(m,l,s) + m\eta_y \overline{\overline{\psi}}_{xz}(n,l,s) + \frac{1}{\phi c_t}\overline{\overline{\psi}}_{xy}(n,m,s)}{(s+\eta_x n^2 + \eta_y m^2 + \eta_z l^2)}\right\} \times$$

$$\sin(nx)\sin(my)\{\sin(lz_{02}) - \sin(lz_{01})\}\,dn\,dm\,dl + \frac{2p_I}{\pi}\int_0^\infty \frac{\left\{1 - e^{-x\sqrt{\frac{s+\eta_y m^2}{\eta_x}}}\right\}\sin(my)}{m(s+\eta_y m^2)}\,dm$$

and

-continued $$p = \frac{U(t-t_0)}{4\phi c_t \pi (z_{02}-z_{01})\sqrt{\eta_x \eta_y}} \int_0^{t-t_0} \frac{q(t-t_0-\tau)}{\tau} \left[ (z_{02}-z_{01})\mathrm{erf}\left(\frac{z_{02}-z_{01}}{2\sqrt{\eta_z\tau}}\right) - (z_{02}+z_{01})\mathrm{erf}\left(\frac{z_{02}+z_{01}}{2\sqrt{\eta_z\tau}}\right) + 2\sqrt{\frac{\eta_z\tau}{\pi}} \left\{ 2e^{-\frac{(z_{01}^2+z_{02}^2)}{4\eta_z\tau}} \cosh\left(\frac{z_{01}z_{02}}{2\eta_z\tau}\right) - 1 \right\} + \tag{10.5.6}$$

$$z_{02}\,\mathrm{erf}\left(\frac{z_{02}}{\sqrt{\eta_z\tau}}\right) - z_{01}\,\mathrm{erf}\left(\frac{z_{01}}{\sqrt{\eta_z\tau}}\right) - \sqrt{\frac{\eta_z\tau}{\pi}}\left(e^{-\frac{z_{01}^2}{\eta_z\tau}} - e^{-\frac{z_{02}^2}{\eta_z\tau}}\right)\right] \left\{ e^{-\frac{(x-x_0)^2}{4\eta_x\tau}} - e^{-\frac{(x+x_0)^2}{4\eta_x\tau}} \right\} \left\{ e^{-\frac{(y-y_0)^2}{4\eta_y\tau}} - e^{-\frac{(y+y_0)^2}{4\eta_y\tau}} \right\} d\tau +$$

$$\frac{8}{\pi^3(z_{02}-z_{01})} \int_0^\infty \int_0^\infty \int_0^\infty \int_0^t \frac{1}{l} \left\{ n\eta_x \overline{\overline{\psi}}_{yz}(m,l,t-\tau) + m\eta_y \overline{\overline{\psi}}_{xz}(n,l,t-\tau) + \frac{1}{\phi c_t}\overline{\overline{\psi}}_{xy}(n,m,t-\tau) \right\} \times$$

$$\sin(nx)e^{-\eta_x n^2 \tau}\sin(my)e^{-\eta_y m^2 \tau}\{\sin(lz_{02})-\sin(lz_{01})\}e^{-\eta_z l^2 \tau}\,d\tau\,dn\,dm\,dl + p_I\,\mathrm{erf}\left(\frac{x}{2\sqrt{\eta_x t}}\right)\mathrm{erf}\left(\frac{y}{2\sqrt{\eta_y t}}\right)$$

(ii) A line of finite length $[x_{02}\text{-}x_{01}]$ passing through $(y_0, z_0)$.

$$\bar{p} = \frac{q(s)e^{-st_0}}{\phi c_t \pi^2 \sqrt{\eta_y \eta_z}} \int_0^\infty \frac{\sin(ux)}{u}\{\cos(ux_{01})-\cos(ux_{02})\}\left[ K_0\left\{ \sqrt{\left\{\frac{(y-y_0)^2}{\eta_y}+\frac{(z-z_0)^2}{\eta_x}\right\}(s+u^2\eta_x)}\right\} + \tag{10.5.7}$$

$$K_0\left\{\sqrt{\left\{\frac{(y-y_0)^2}{\eta_y}+\frac{(z+z_0)^2}{\eta_x}\right\}(s+u^2\eta_x)}\right\} - K_0\left\{\sqrt{\left\{\frac{(y+y_0)^2}{\eta_y}+\frac{(z-z_0)^2}{\eta_x}\right\}(s+u^2\eta_x)}\right\} - K_0\left\{\sqrt{\left\{\frac{(y+y_0)^2}{\eta_y}+\frac{(z+z_0)^2}{\eta_x}\right\}(s+u^2\eta_x)}\right\} \right] du +$$

$$\frac{8}{\pi^3} \int_0^\infty \int_0^\infty \int_0^\infty \left\{ \frac{n\eta_x \overline{\overline{\psi}}_{yz}(m,l,s)+m\eta_y \overline{\overline{\psi}}_{xz}(n,l,s)+\frac{1}{\phi c_t}\overline{\overline{\psi}}_{xy}(n,m,s)}{(s+\eta_x n^2+\eta_y m^2+\eta_z l^2)} \right\} \sin(nx)\sin(my)\cos(lz)\,dn\,dm\,dl +$$

$$\frac{2p_I}{\pi}\int_0^\infty \frac{\left\{1-e^{-x\sqrt{\frac{s+\eta_y m^2}{\eta_x}}}\right\}\sin(my)}{m(s+\eta_y m^2)}dm$$

and $$p = \frac{U(t-t_0)}{8\phi c_t \pi \sqrt{\eta_y \eta_z}}\int_0^{t-t_0}\frac{q(t-t_0-u)}{u}\left\{e^{-\frac{(y-y_0)^2}{4\eta_y u}}-e^{-\frac{(y+y_0)^2}{4\eta_y u}}\right\}\left\{e^{-\frac{(z-z_0)^2}{4\eta_x(t-t_0)}}+e^{-\frac{(z+z_0)^2}{4\eta_x(t-t_0)}}\right\}\times\left\{\mathrm{erf}\left(\frac{x-x_{01}}{2\sqrt{\eta_x u}}\right)+\right. \tag{10.5.8}$$

$$\left.\mathrm{erf}\left(\frac{x+x_{01}}{2\sqrt{\eta_x u}}\right)-\mathrm{erf}\left(\frac{x-x_{02}}{2\sqrt{\eta_x u}}\right)-\mathrm{erf}\left(\frac{x+x_{02}}{2\sqrt{\eta_x u}}\right)\right\}du+\frac{8}{\pi^3}\int_0^\infty\int_0^\infty\int_0^\infty\int_0^t\left\{n\eta_x\overline{\overline{\psi}}_{yz}(m,l,t-\tau)+m\eta_y\overline{\overline{\psi}}_{xz}(n,l,t-\tau)+\frac{1}{\phi c_t}\overline{\overline{\psi}}_{xy}(n,m,t-\tau)\right\}\times$$

$$\sin(nx)e^{-\eta_x n^2\tau}\sin(my)e^{-\eta_y m^2\tau}\cos(lz)e^{-\eta_z l^2\tau}\,d\tau\,dn\,dm\,dl+p_I\,\mathrm{erf}\left(\frac{x}{2\sqrt{\eta_x t}}\right)\mathrm{erf}\left(\frac{y}{2\sqrt{\eta_y t}}\right)$$

The spatial average pressure response of the line $[x_{02}\text{-}x_{01}]$ is obtained by a further integration.

$$\bar{p} = \frac{q(s)e^{-st_0}}{\phi c_t \pi^2 (x_{02}-x_{01})\sqrt{\eta_x \eta_y}}\int_0^\infty \frac{1}{u^2}\{\cos(ux_{01})-\cos(lu_{02})\}^2\left[K_0\left\{\sqrt{\left\{\frac{(z-z_0)^2}{\eta_z}+\frac{(y-y_0)^2}{\eta_y}\right\}(s+u^2\eta_x)}\right\}+\right. \tag{10.5.9}$$

$$K_0\left\{\sqrt{\left\{\frac{(z+z_0)^2}{\eta_z}+\frac{(y-y_0)^2}{\eta_y}\right\}(s+u^2\eta_x)}\right\}-K_0\left\{\sqrt{\left\{\frac{(z-z_0)^2}{\eta_z}+\frac{(y+y_0)^2}{\eta_y}\right\}(s+u^2\eta_x)}\right\}-$$

$$\left.K_0\left\{\sqrt{\left\{\frac{(z+z_0)^2}{\eta_z}+\frac{(y+y_0)^2}{\eta_y}\right\}(s+u^2\eta_x)}\right\}\right]du+\frac{8}{\pi^3(x_{02}-x_{01})}\int_0^\infty\int_0^\infty\int_0^\infty\frac{1}{n}\left\{\frac{n\eta_x\overline{\overline{\psi}}_{yz}(m,l,s)+m\eta_y\overline{\overline{\psi}}_{xz}(n,l,s)+\frac{1}{\phi c_t}\overline{\overline{\psi}}_{xy}(n,m,s)}{(s+\eta_x n^2+\eta_y m^2+\eta_z l^2)}\right\}\times$$

-continued $$\cos(lz)\sin(my)\{\cos(nx_{01}) - \cos(nx_{02})\}\,dn\,dm\,dl + p_I\left[\frac{1}{s}\left(1 - e^{-y\sqrt{\frac{x}{\eta_y}}}\right) - \frac{2\sqrt{\eta_x}}{\pi(x_{02\diamond} - x_{01\diamond})}\int_0^\infty \frac{\left\{e^{-x_{01\diamond}\sqrt{\frac{x+\eta_y m^2}{\eta_x}}} - e^{-x_{02\diamond}\sqrt{\frac{x+\eta_y m^2}{\eta_x}}}\right\}\sin(my)}{m(s+\eta_y m^2)^{\frac{3}{2}}}\,dm\right]$$

and $$p = \frac{U(t-t_0)}{4\phi c_t \pi (x_{02}-x_{01})\sqrt{\eta_y \eta_z}} \int_0^{t-t_0} \frac{q(t-t_0-\tau)}{\tau}\left[(x_{02}-x_{01})\mathrm{erf}\left(\frac{x_{02}-x_{01}}{2\sqrt{\eta_x \tau}}\right) + \right. \tag{10.5.10}$$

$$(x_{02}+x_{01})\mathrm{erf}\left(\frac{x_{02}+x_{01}}{2\sqrt{\eta_x \tau}}\right) + 2\sqrt{\frac{\eta_x \tau}{\pi}}\left(2e^{-\frac{(x_{01}^2+x_{02}^2)}{4\eta_x \tau}}\cosh\left(\frac{x_{01} x_{02}}{2\eta_x \tau}\right) - 1\right) -$$

$$x_{02}\,\mathrm{erf}\left(\frac{x_{02}}{\sqrt{\eta_x \tau}}\right) - x_{01}\,\mathrm{erf}\left(\frac{x_{01}}{\sqrt{\eta_x \tau}}\right) - \sqrt{\frac{\eta_x \tau}{\pi}}\left(e^{-\frac{x_{01}^2}{\eta_x \tau}} + e^{-\frac{x_{02}^2}{\eta_x \tau}}\right)\left]\left\{e^{-\frac{(y-y_0)^2}{4\eta_y \tau}} - e^{-\frac{(y+y_0)^2}{4\eta_y \tau}}\right\}\left\{e^{-\frac{(x-x_0)^2}{4\eta_x \tau}} + e^{-\frac{(x+x_0)^2}{4\eta_x \tau}}\right\}d\tau +$$

$$\frac{8}{\pi^3(x_{02}-x_{01})}\int_0^\infty\int_0^\infty\int_0^\infty\int_0^t \frac{1}{n}\left\{n\eta_x\overline{\psi}_{yz}(m,l,t-\tau) + m\eta_y\overline{\psi}_{xz}(n,l,t-\tau) + \frac{1}{\phi c_t}\overline{\psi}_{xy}(n,m,t-\tau)\right\}\times \sin(lz)e^{-\eta_x l^2\tau}\sin(my)e^{-\eta_y m^2\tau}\{\sin(nx_{01}) - $$

$$\sin(nx_{02})\}e^{-\eta_x n^2\tau}d\tau\,dn\,dm\,dl + p_I\,\mathrm{erf}\left(\frac{y}{2\sqrt{\eta_y t}}\right)\left[x_{02\diamond}\,\mathrm{erf}\left(\frac{x_{02\diamond}}{2\sqrt{\eta_x t}}\right) - x_{01\diamond}\,\mathrm{erf}\left(\frac{x_{01\diamond}}{2\sqrt{\eta_x t}}\right) + \frac{\left\{e^{-\frac{x_{02\diamond}^2}{4\eta_x t}} - e^{-\frac{x_{01\diamond}^2}{4\eta_x t}}\right\}}{2\sqrt{\pi \eta_x t}}\right]$$

(iii) Multiple lines of finite length $[z_{02_\iota}\text{-}z_{01_\iota}]$, $[x_{02_\iota}\text{-}x_{01_\iota}]$ and $[y_{02_\iota}\text{-}y_{01_\iota}]$ passing through $(x_{0_\iota}, y_{0_\iota})$ for $\iota=1, 2, \ldots, L$, $(y_{0_\iota}, z_{0_\iota})$ for $\iota=L+1, 2, \ldots, M$, and $(x_{0_\iota}, z_{0_\iota})$ for $\iota=M+1, 2, \ldots, N$ respectively. Where $(L<M<N)$.

$$\overline{p} = \frac{1}{\phi c_t \pi^2 \sqrt{\eta_x \eta_y}} \times \sum_{i=1}^{L} q_i(s) e^{-st_{0i}} \int_0^\infty \frac{\cos(uz)}{u}\{\sin(uz_{02i}) - \sin(uz_{01i})\}\left[K_0\left\{\sqrt{\left\{\frac{(x-x_{0i})^2}{\eta_x} + \frac{(y-y_{0i})^2}{\eta_y}\right\}(s+u^2\eta_z)}\right\} - \right. \tag{10.5.11}$$

$$K_0\left\{\sqrt{\left\{\frac{(x+x_{0i})^2}{\eta_x} + \frac{(y-y_{0i})^2}{\eta_y}\right\}(s+u^2\eta_z)}\right\} - K_0\left\{\sqrt{\left\{\frac{(x-x_{0i})^2}{\eta_x} + \frac{(y+y_{0i})^2}{\eta_y}\right\}(s+u^2\eta_z)}\right\} + K_0\left\{\sqrt{\left\{\frac{(x+x_{0i})^2}{\eta_x} + \frac{(y+y_{0i})^2}{\eta_y}\right\}(s+u^2\eta_z)}\right\}\right]du +$$

$$\frac{1}{\phi c_t \pi^2 \sqrt{\eta_z \eta_y}} \times \sum_{i=L+1}^{M} q_i(s) e^{-st_{0i}} \int_0^\infty \frac{\sin(ux)}{u}\{\cos(ux_{01i}) - \cos(ux_{02i})\}\left[K_0\left\{\sqrt{\left\{\frac{(z-z_{0i})^2}{\eta_z} + \frac{(y-y_{0i})^2}{\eta_y}\right\}(s+u^2\eta_x)}\right\} + \right.$$

$$K_0\left\{\sqrt{\left\{\frac{(z+z_{0i})^2}{\eta_z} + \frac{(y-y_{0i})^2}{\eta_y}\right\}(s+u^2\eta_x)}\right\} - K_0\left\{\sqrt{\left\{\frac{(z-z_{0i})^2}{\eta_z} + \frac{(y+y_{0i})^2}{\eta_y}\right\}(s+u^2\eta_x)}\right\} - K_0\left\{\sqrt{\left\{\frac{(z+z_{0i})^2}{\eta_z} + \frac{(y+y_{0i})^2}{\eta_y}\right\}(s+u^2\eta_x)}\right\}\right]du +$$

$$\frac{1}{\phi c_t \pi^2 \sqrt{\eta_x \eta_y}} \times \sum_{i=M+1}^{N} q_i(s) e^{-st_{0i}} \int_0^\infty \frac{\sin(uy)}{u}\{\cos(uy_{01i}) - \cos(uy_{02i})\}\left[K_0\left\{\sqrt{\left\{\frac{(x-x_{0i})^2}{\eta_x} + \frac{(z-z_{0i})^2}{\eta_z}\right\}(s+u^2\eta_y)}\right\} + \right.$$

$$K_0\left\{\sqrt{\left\{\frac{(x+x_{0i})^2}{\eta_x} + \frac{(z-z_{0i})^2}{\eta_z}\right\}(s+u^2\eta_y)}\right\} - K_0\left\{\sqrt{\left\{\frac{(x-x_{0i})^2}{\eta_x} + \frac{(z+z_{0i})^2}{\eta_z}\right\}(s+u^2\eta_y)}\right\} - K_0\left\{\sqrt{\left\{\frac{(x+x_{0i})^2}{\eta_x} + \frac{(z+z_{0i})^2}{\eta_z}\right\}(s+u^2\eta_y)}\right\}\right]du +$$

$$\frac{8}{\pi^3}\int_0^\infty\int_0^\infty\int_0^\infty \left\{\frac{n\eta_x\overline{\overline{\psi}}_{yz}(m,l,s) + m\eta_y\overline{\overline{\psi}}_{xz}(n,l,s) + \frac{1}{\phi c_t}\overline{\overline{\psi}}_{xy}(n,m,s)}{(s+\eta_x n^2+\eta_y m^2+\eta_z l^2)}\right\}\sin(nx)\sin(my)\cos(lz)\,dn\,dm\,dl +$$

$$\frac{2p_I}{\pi}\int_0^\infty \frac{\left\{1 - e^{-x\sqrt{\frac{x+\eta_y m^2}{\eta_x}}}\right\}\sin(my)}{m(s+\eta_y m^2)}\,dm$$

and $$p = \frac{1}{8\phi c_t \pi \sqrt{\eta_x \eta_y}} \sum_{i=0}^{L} U(t-t_{0i}) \int_0^{t-t_{0i}} \frac{q_i(t-t_{0i}-u)}{u}\left\{e^{-\frac{(x-x_{0i})^2}{4\eta_x u}} - e^{-\frac{(x+x_{0i})^2}{4\eta_x u}}\right\}\left\{e^{-\frac{(y-y_{0i})^2}{4\eta_y u}} - e^{-\frac{(y+y_{0i})^2}{4\eta_y u}}\right\}\times \tag{10.5.12}$$

-continued $$\left\{\operatorname{erf}\left(\frac{z+z_{02i}}{2\sqrt{\eta_z u}}\right)-\operatorname{erf}\left(\frac{z-z_{02i}}{2\sqrt{\eta_z u}}\right)+\operatorname{erf}\left(\frac{z-z_{01i}}{2\sqrt{\eta_z u}}\right)-\right.$$

$$\left.\operatorname{erf}\left(\frac{z+z_{01i}}{2\sqrt{\eta_z u}}\right)\right\}du+\frac{1}{8\phi c_t\pi\sqrt{\eta_x\eta_y}}\sum_{i=L+1}^{M}U(t-t_{0i})\int_0^{t-t_{0i}}\frac{q_i(t-t_{0i}-u)}{u}\left\{e^{-\frac{(x-x_{0i})^2}{4\eta_x u}}+e^{-\frac{(x+x_{0i})^2}{4\eta_x u}}\right\}\left\{e^{-\frac{(y-y_{0i})^2}{4\eta_y u}}-e^{-\frac{(y+y_{0i})^2}{4\eta_y u}}\right\}\times$$

$$\left\{\operatorname{erf}\left(\frac{x-x_{01i}}{2\sqrt{\eta_x u}}\right)+\operatorname{erf}\left(\frac{x+x_{01i}}{2\sqrt{\eta_x u}}\right)-\operatorname{erf}\left(\frac{x-x_{02i}}{2\sqrt{\eta_x u}}\right)-\operatorname{erf}\left(\frac{x+x_{02i}}{2\sqrt{\eta_x u}}\right)\right\}du+$$

$$\frac{1}{8\phi c_t\pi\sqrt{\eta_z\eta_x}}\sum_{i=M+1}^{N}U(t-t_{0i})\int_0^{t-t_{0i}}\frac{q_i(t-t_{0i}-u)}{u}\left\{e^{-\frac{(z-z_{0i})^2}{4\eta_z u}}+e^{-\frac{(z+z_{0i})^2}{4\eta_z u}}\right\}\left\{e^{-\frac{(x-x_{0i})^2}{4\eta_x u}}-e^{-\frac{(x+x_{0i})^2}{4\eta_x u}}\right\}\times\left\{\operatorname{erf}\left(\frac{y-y_{01i}}{2\sqrt{\eta_y u}}\right)+\operatorname{erf}\left(\frac{y+y_{01i}}{2\sqrt{\eta_y u}}\right)-\right.$$

$$\left.\operatorname{erf}\left(\frac{y-y_{02i}}{2\sqrt{\eta_y u}}\right)-\operatorname{erf}\left(\frac{y+y_{02i}}{2\sqrt{\eta_y u}}\right)\right\}du+\frac{8}{\pi^3}\int_0^{\infty}\int_0^{\infty}\int_0^{\infty}\int_0^{t}\left\{n\eta_x\overline{\overline{\psi}}_{yz}(m,l,t-\tau)+m\eta_y\overline{\overline{\psi}}_{xz}(n,l,t-\tau)+\frac{1}{\phi c_t}\overline{\overline{\psi}}_{xy}(n,m,t-\tau)\right\}\times$$

$$\sin(nx)e^{-\eta_x n^2\tau}\sin(my)e^{-\eta_y m^2\tau}\cos(lz)e^{-\eta_z l^2\tau}d\tau\,dn\,dm\,dl+p_I\operatorname{erf}\left(\frac{x}{2\sqrt{\eta_x t}}\right)\operatorname{erf}\left(\frac{y}{2\sqrt{\eta_y t}}\right)$$

The spatial average pressure response of the line $[z_{02\diamond}-z_{01\diamond}]$, $\iota=\diamond$, is given by $$\overline{p}=\frac{1}{\phi c_t\pi^2(z_{02\diamond}-z_{01\diamond})\sqrt{\eta_x\eta_y}}\times \tag{10.5.13}$$

$$\sum_{i=1}^{L}q_i(s)e^{-st_{0i}}\int_0^{\infty}\frac{1}{u^2}\{\sin(uz_{02\diamond})-\sin(uz_{01\diamond})\}\{\sin(uz_{02i})-\cos(uz_{01i})\}\times\left[K_0\left\{\sqrt{\left\{\frac{(x-x_{0i})^2}{\eta_x}+\frac{(y-y_{0i})^2}{\eta_y}\right\}(s+u^2\eta_z)}\right\}-\right.$$

$$K_0\left\{\sqrt{\left\{\frac{(x-x_{0i})^2}{\eta_x}+\frac{(y-y_{0i})^2}{\eta_y}\right\}(s+u^2\eta_z)}\right\}-K_0\left\{\sqrt{\left\{\frac{(x+x_{0i})^2}{\eta_x}+\frac{(y+y_{0i})^2}{\eta_y}\right\}(s+u^2\eta_z)}\right\}+K_0\left\{\sqrt{\left\{\frac{(x+x_{0i})^2}{\eta_x}+\frac{(y+y_{0i})^2}{\eta_y}\right\}(s+u^2\eta_z)}\right\}\right]du+$$

$$\frac{1}{\phi c_t\pi^2(z_{02\diamond}-z_{01\diamond})\sqrt{\eta_z\eta_y}}\times\sum_{i=L+1}^{M}q_i(s)e^{-st_{0i}}\int_0^{\infty}\frac{\sin(ux)}{u}\{\cos(ux_{01i})-\cos(ux_{02i})\}\int_{z_{01\diamond}}^{z_{02\diamond}}\left[K_0\left\{\sqrt{\left\{\frac{(z-z_{0i})^2}{\eta_z}+\frac{(y-y_{0i})^2}{\eta_y}\right\}(s+u^2\eta_x)}\right\}+\right.$$

$$K_0\left\{\sqrt{\left\{\frac{(z+z_{0i})^2}{\eta_z}+\frac{(y-y_{0i})^2}{\eta_y}\right\}(s+u^2\eta_x)}\right\}-K_0\left\{\sqrt{\left\{\frac{(z-z_{0i})^2}{\eta_z}+\frac{(y+y_{0i})^2}{\eta_y}\right\}(s+u^2\eta_x)}\right\}-K_0\left\{\sqrt{\left\{\frac{(z+z_{0i})^2}{\eta_z}+\frac{(y+y_{0i})^2}{\eta_y}\right\}(s+u^2\eta_x)}\right\}\right]dz\,du+$$

$$\frac{1}{\phi c_t\pi^2(z_{02\diamond}-z_{01\diamond})\sqrt{\eta_x\eta_z}}\times\sum_{i=M+1}^{N}q_i(s)e^{-st_{0i}}\int_0^{\infty}\frac{\sin(uy)}{u}\{\cos(uy_{01i})-\cos(uy_{02i})\}\int_{z_{01\diamond}}^{z_{02\diamond}}\left[K_0\left\{\sqrt{\left\{\frac{(x-x_{0i})^2}{\eta_x}+\frac{(z-z_{0i})^2}{\eta_z}\right\}(s+u^2\eta_y)}\right\}+\right.$$

$$K_0\left\{\sqrt{\left\{\frac{(x+x_{0i})^2}{\eta_x}+\frac{(z-z_{0i})^2}{\eta_z}\right\}(s+u^2\eta_y)}\right\}-K_0\left\{\sqrt{\left\{\frac{(x-x_{0i})^2}{\eta_x}+\frac{(z+z_{0i})^2}{\eta_z}\right\}(s+u^2\eta_y)}\right\}-$$

$$K_0\left\{\sqrt{\left\{\frac{(x+x_{0i})^2}{\eta_x}+\frac{(z+z_{0i})^2}{\eta_z}\right\}(s+u^2\eta_y)}\right\}\right]dz\,du+\frac{8}{\pi^3(z_{02\diamond}-z_{01\diamond})}\int_0^{\infty}\int_0^{\infty}\int_0^{\infty}\frac{1}{l}\left\{\frac{n\eta_x\overline{\overline{\psi}}_{yz}(m,l,s)+m\eta_y\overline{\overline{\psi}}_{xz}(n,l,s)+\frac{1}{\phi c_t}\overline{\overline{\psi}}_{xy}(n,m,s)}{(s+\eta_x n^2+\eta_y m^2+\eta_z l^2)}\right\}\times$$

$$\sin(nx)\sin(my)\{\sin(lz_{02\diamond})-\sin(lz_{01\diamond})\}dn\,dm\,dl+\frac{2p_I}{\pi}\int_0^{\infty}\frac{\left\{1-e^{-x\sqrt{\frac{s+\eta_y m^2}{\eta_x}}}\right\}\sin(my)}{m(s+\eta_y m^2)}dm$$

and $$\overline{p}=\frac{1}{8\phi c_t\pi(z_{02\diamond}-z_{01\diamond})\sqrt{\eta_x\eta_y}}\times\sum_{i=0}^{L}U(t-t_{0i})\int_0^{t-t_{0i}}\frac{q_i(t-t-u)}{u}\left\{e^{-\frac{(x-x_{0i})^2}{4\eta_x u}}-e^{-\frac{(x+x_{0i})^2}{4\eta_x u}}\right\}\left\{e^{-\frac{(y-y_{0i})^2}{4\eta_y u}}-e^{-\frac{(y+y_{0i})^2}{4\eta_y u}}\right\}\times \tag{10.5.14}$$

-continued $$\left[(z_{02\diamond}-z_{01i})\mathrm{erf}\left(\frac{z_{02\diamond}-z_{01i}}{2\sqrt{\eta_z u}}\right)-(z_{01\diamond}-z_{01i})\mathrm{erf}\left(\frac{z_{01\diamond}-z_{01i}}{2\sqrt{\eta_z u}}\right)-(z_{02\diamond}-z_{02i})\mathrm{erf}\left(\frac{z_{02\diamond}-z_{02i}}{2\sqrt{\eta_z u}}\right)+(z_{01\diamond}-z_{02i})\mathrm{erf}\left(\frac{z_{01\diamond}-z_{02i}}{2\sqrt{\eta_z u}}\right)+\right.$$

$$2\sqrt{\frac{\eta_z u}{\pi}}\left\{e^{-\frac{(z_{02\diamond}-z_{01i})^2}{4\eta_x u}}-e^{-\frac{(z_{01\diamond}-z_{01i})^2}{4\eta_x u}}-e^{-\frac{(z_{02\diamond}-z_{02i})^2}{4\eta_z u}}+e^{-\frac{(z_{01\diamond}-z_{02i})^2}{4\eta_z u}}\right\}-(z_{02\diamond}+z_{01i})\mathrm{erf}\left(\frac{z_{02\diamond}-z_{01i}}{2\sqrt{\eta_z u}}\right)+(z_{01\diamond}+z_{01i})\mathrm{erf}\left(\frac{z_{01\diamond}+z_{01i}}{2\sqrt{\eta_z u}}\right)+$$

$$(z_{02\diamond}+z_{02i})\mathrm{erf}\left(\frac{z_{02\diamond}+z_{02i}}{2\sqrt{\eta_z u}}\right)-(z_{01\diamond}+z_{02i})\mathrm{erf}\left(\frac{z_{01\diamond}-z_{02i}}{2\sqrt{\eta_z u}}\right)-2\sqrt{\frac{\eta_z u}{\pi}}\left\{e^{-\frac{(z_{02\diamond}+z_{01i})^2}{4\eta_z u}}-e^{-\frac{(z_{01\diamond}+z_{01i})^2}{4\eta_z u}}-e^{-\frac{(z_{02\diamond}+z_{02i})^2}{4\eta_z u}}+e^{-\frac{(z_{01\diamond}+z_{02i})^2}{4\eta_z u}}\right\}\right]du+$$

$$\frac{1}{8\phi c_t(z_{02\diamond}-z_{01\diamond})\sqrt{\pi\eta_y}}\sum_{i=L+1}^{M}U(t-t_{0i})\int_0^{t-t_{0i}}\frac{q_i(t-t_{0i}-u)}{\sqrt{u}}\left\{e^{-\frac{(y-y_{0i})^2}{4\eta_y u}}-e^{-\frac{(y+y_{0i})^2}{4\eta_y u}}\right\}\times$$

$$\left\{\mathrm{erf}\left(\frac{z_{02\diamond}-z_{0i}}{2\sqrt{\eta_z u}}\right)-\mathrm{erf}\left(\frac{z_{01\diamond}-z_{0i}}{2\sqrt{\eta_z u}}\right)+\mathrm{erf}\left(\frac{z_{02\diamond}+z_{0i}}{2\sqrt{\eta_z u}}\right)-\mathrm{erf}\left(\frac{z_{01\diamond}+z_{0i}}{2\sqrt{\eta_z u}}\right)\right\}\times\left\{\mathrm{erf}\left(\frac{x-x_{01i}}{2\sqrt{\eta_x u}}\right)+\mathrm{erf}\left(\frac{x+x_{01i}}{2\sqrt{\eta_x u}}\right)-\right.$$

$$\left.\mathrm{erf}\left(\frac{x-x_{02i}}{2\sqrt{\eta_x u}}\right)-\mathrm{erf}\left(\frac{x+x_{02i}}{2\sqrt{\eta_x u}}\right)\right\}du+\frac{1}{8\phi c_t(z_{02\diamond}-z_{01\diamond})\sqrt{\pi\eta_x}}\sum_{i=M+1}^{N}U(t-t_{0i})\int_0^{t-t_{0i}}\frac{q_i(t-t_{0i}-u)}{\sqrt{u}}\left\{e^{-\frac{(x-x_{0i})^2}{4\eta_x u}}-e^{-\frac{(x+x_{0i})^2}{4\eta_x u}}\right\}\times$$

$$\left\{\mathrm{erf}\left(\frac{z_{02\diamond}-z_{0i}}{2\sqrt{\eta_z u}}\right)-\mathrm{erf}\left(\frac{z_{01\diamond}-z_{0i}}{2\sqrt{\eta_z u}}\right)+\mathrm{erf}\left(\frac{z_{02\diamond}+z_{0i}}{2\sqrt{\eta_z u}}\right)-\mathrm{erf}\left(\frac{z_{01\diamond}+z_{0i}}{2\sqrt{\eta_z u}}\right)\right\}\times\left\{\mathrm{erf}\left(\frac{y-y_{01i}}{2\sqrt{\eta_y u}}\right)+\mathrm{erf}\left(\frac{y+y_{01i}}{2\sqrt{\eta_y u}}\right)-\mathrm{erf}\left(\frac{y-y_{02i}}{2\sqrt{\eta_y u}}\right)-\right.$$

$$\left.\mathrm{erf}\left(\frac{y+y_{02i}}{2\sqrt{\eta_y u}}\right)\right\}du+\frac{8}{\pi^3(z_{02\diamond}-z_{01\diamond})}\int_0^{\infty}\int_0^{\infty}\int_0^{\infty}\int_0^{t}\frac{1}{l}\left\{n\eta_x\overline{\overline{\psi}}_{yz}(m,l,t-\tau)+m\eta_y\overline{\overline{\psi}}_{xz}(n,l,t-\tau)+\frac{1}{\phi c_t}\overline{\overline{\psi}}_{xy}(n,m,t-\tau)\right\}\times$$

$$\sin(nx)e^{-\eta_x n^2 \tau}\sin(my)e^{-\eta_y m^2 \tau}\{\sin(lz_{02\diamond})-\sin(lz_{01\diamond})\}e^{-\eta_x l^2 \tau}d\tau dn dm dl+p_I\,\mathrm{erf}\left(\frac{x}{2\sqrt{\eta_x t}}\right)\mathrm{erf}\left(\frac{y}{2\sqrt{\eta_y t}}\right)$$

The spatial average pressure response of the line $[x_{02\diamond}\text{-}x_{01\diamond}]$, $\iota=\diamond$, is given by $$\overline{p}=\frac{1}{\phi c_t\pi^2(z_{02\diamond}-x_{01\diamond})\sqrt{\eta_x\eta_y}}\times\sum_{i=1}^{L}q_i(s)e^{-st_{0i}}\int_0^{\infty}\frac{\cos(uz)}{u}\{\sin(uz_{02i})-\sin(uz_{01i})\}\int_{x_{01\diamond}}^{x_{02\diamond}}\left[K_0\left\{\sqrt{\left\{\frac{(x-x_{0i})^2}{\eta_x}+\frac{(y-y_{0i})^2}{\eta_y}\right\}(s+u^2\eta_z)}\right\}-\right.$$
(10.5.15)

$$K_0\left\{\sqrt{\left\{\frac{(x+x_{0i})^2}{\eta_x}+\frac{(y-y_{0i})^2}{\eta_y}\right\}(s+u^2\eta_z)}\right\}-K_0\left\{\sqrt{\left\{\frac{(x-x_{0i})^2}{\eta_x}+\frac{(y+y_{0i})^2}{\eta_y}\right\}(s+u^2\eta_z)}\right\}+$$

$$\left.K_0\left\{\sqrt{\left\{\frac{(x+x_{0i})^2}{\eta_x}+\frac{(y+y_{0i})^2}{\eta_y}\right\}(s+u^2\eta_z)}\right\}\right]dxdu+\frac{1}{\phi c_t\pi^2(x_{02\diamond}-x_{01\diamond})\sqrt{\eta_z\eta_y}}$$

$$\sum_{i=L+1}^{M}q_i(s)e^{-st_{0i}}\int_0^{\infty}\frac{1}{u^2}\{\cos(ux_{01\diamond})-\cos(ux_{02\diamond})\}\{\cos(ux_{01i})-\cos(ux_{02i})\}\times\left[K_0\left\{\sqrt{\left\{\frac{(z-z_{0i})^2}{\eta_z}+\frac{(y+y_{0i})^2}{\eta_y}\right\}(s+u^2\eta_x)}\right\}+\right.$$

$$K_0\left\{\sqrt{\left\{\frac{(z+z_{0i})^2}{\eta_z}+\frac{(y-y_{0i})^2}{\eta_y}\right\}(s+u^2\eta_x)}\right\}-K_0\left\{\sqrt{\left\{\frac{(z-z_{0i})^2}{\eta_z}+\frac{(y+y_{0i})^2}{\eta_y}\right\}(s+u^2\eta_x)}\right\}-K_0\left\{\sqrt{\left\{\frac{(z+z_{0i})^2}{\eta_z}+\frac{(y+y_{0i})^2}{\eta_y}\right\}(s+u^2\eta_x)}\right\}\right]du+$$

$$\frac{1}{\phi c_t\pi^2(x_{02\diamond}-x_{01\diamond})\sqrt{\eta_x\eta_z}}\times\sum_{i=M+1}^{N}q_i(s)e^{-st_{0i}}\int_0^{\infty}\frac{\sin(uy)}{u}\{\cos(uy_{01i})-\cos(uy_{02i})\}\int_{x_{01\diamond}}^{x_{02\diamond}}\left[K_0\left\{\sqrt{\left\{\frac{(x-x_{0i})^2}{\eta_x}+\frac{(z-z_{0i})^2}{\eta_z}\right\}(s+u^2\eta_y)}\right\}+\right.$$

$$K_0\left\{\sqrt{\left\{\frac{(x+x_i)^2}{\eta_x}+\frac{(z-z_{0i})^2}{\eta_z}\right\}(s+u^2\eta_y)}\right\}-K_0\left\{\sqrt{\left\{\frac{(x-x_{0i})^2}{\eta_x}+\frac{(z+z_{0i})^2}{\eta_z}\right\}(s+u^2\eta_y)}\right\}-K_0\left\{\sqrt{\left\{\frac{(x+x_{0i})^2}{\eta_x}+\frac{(z+z_{0i})^2}{\eta_z}\right\}(s+u^2\eta_y)}\right\}\right]dxdu+$$

$$\frac{8}{\pi^3(x_{02\diamond}-x_{01\diamond})}\int_0^{\infty}\int_0^{\infty}\int_0^{\infty}\frac{1}{n}\left\{\frac{n\eta_x\overline{\overline{\psi}}_{yz}(m,l,s)+m\eta_y\overline{\overline{\psi}}_{xz}(n,l,s)+\frac{1}{\phi c_t}\overline{\overline{\psi}}_{xy}(n,m,s)}{(s+\eta_x n^2+\eta_y m^2+\eta_z l^2)}\right\}\times\cos(lz)\sin(my)\{\cos(nx_{01\diamond})-$$

-continued $$\cos(nx_{02\diamond})\}dn\,dm\,dl + p_I\left[\frac{1}{s}\left(1-e^{-y\sqrt{\frac{x}{\eta_y}}}\right) - \frac{2\sqrt{\eta_x}}{\pi(x_{02\diamond}-x_{01\diamond})}\int_0^\infty \frac{\left\{e^{-x_{01\diamond}\sqrt{\frac{x+\eta_y m^2}{\eta_x}}} - e^{-x_{02\diamond}\sqrt{\frac{x+\eta_y m^2}{\eta_x}}}\right\}\sin(my)}{m(s+\eta_y m^2)^{\frac{3}{2}}}\,dm\right]$$

and $$p = \frac{1}{8\phi c_t\pi(x_{02\diamond}-x_{01\diamond})\sqrt{\eta_x\eta_y}}\sum_{i=0}^L U(t-t_{0i})\int_0^{t-t_{0i}} \frac{q_i(t-t_{0i}-u)}{u}\left\{e^{-\frac{(y-y_{0i})^2}{4\eta_y u}} - e^{-\frac{(y+y_{0i})^2}{4\eta_y u}}\right\} \times \qquad (10.5.16)$$

$$\left\{\mathrm{erf}\left(\frac{x_{02\diamond}-x_{0i}}{2\sqrt{\eta_x u}}\right) - \mathrm{erf}\left(\frac{x_{01\diamond}-x_{0i}}{2\sqrt{\eta_x u}}\right) - \mathrm{erf}\left(\frac{x_{02\diamond}+x_{0i}}{2\sqrt{\eta_x u}}\right) + \mathrm{erf}\left(\frac{x_{01\diamond}+x_{0i}}{2\sqrt{\eta_x u}}\right)\right\} \times \left\{\mathrm{erf}\left(\frac{z+z_{02i}}{2\sqrt{\eta_z u}}\right) - \mathrm{erf}\left(\frac{z-z_{02i}}{2\sqrt{\eta_z u}}\right) + \mathrm{erf}\left(\frac{z-z_{01i}}{2\sqrt{\eta_z u}}\right) - \mathrm{erf}\left(\frac{z+z_{01i}}{2\sqrt{\eta_z u}}\right)\right\}du + \frac{1}{8\phi c_t\pi(x_{02\diamond}-x_{01\diamond})\sqrt{\eta_z\eta_y}} \times$$

$$\sum_{i=L+1}^M U(t-t_{0i})\int_0^{t-t_{0i}} \frac{q_i(t-t_{0i}-u)}{u}\left\{e^{-\frac{(z-z_{0i})^2}{4\eta_z u}} + e^{-\frac{(z+z_{0i})^2}{4\eta_z u}}\right\}\left\{e^{-\frac{(y-y_{0i})^2}{4\eta_y u}} - e^{-\frac{(y+y_{0i})^2}{4\eta_y u}}\right\} \times \left[(x_{02\diamond}-x_{01i})\mathrm{erf}\left(\frac{x_{02\diamond}-x_{01i}}{2\sqrt{\eta_x u}}\right) - (x_{01\diamond}-x_{01i})\right.$$

$$\mathrm{erf}\left(\frac{x_{01\diamond}-x_{01i}}{2\sqrt{\eta_x u}}\right) + (x_{02\diamond}+x_{01i})\mathrm{erf}\left(\frac{x_{02\diamond}+x_{01i}}{2\sqrt{\eta_x u}}\right) - (x_{01\diamond}+x_{01i})\mathrm{erf}\left(\frac{x_{01\diamond}+x_{01i}}{2\sqrt{\eta_x u}}\right) + 2\sqrt{\frac{\eta_x u}{\pi}}\left\{e^{-\frac{(x_{02\diamond}-x_{01i})^2}{4\eta_x u}} - e^{-\frac{(x_{01\diamond}-x_{01i})^2}{4\eta_x u}}\right\} +$$

$$2\sqrt{\frac{\eta_x u}{\pi}}\left\{e^{-\frac{(x_{02\diamond}+z_{01i})^2}{4\eta_x u}} - e^{-\frac{(x_{01\diamond}+x_{01i})^2}{4\eta_x u}}\right\} - (x_{02\diamond}-x_{02i})\mathrm{erf}\left(\frac{x_{02\diamond}-x_{02i}}{2\sqrt{\eta_x u}}\right) - (x_{01\diamond}-x_{02i})\mathrm{erf}\left(\frac{x_{01\diamond}-x_{02i}}{2\sqrt{\eta_x u}}\right) - (x_{02\diamond}+x_{02i})\mathrm{erf}\left(\frac{x_{02\diamond}+x_{02i}}{2\sqrt{\eta_x u}}\right) -$$

$$(x_{01\diamond}+x_{02i})\mathrm{erf}\left(\frac{x_{01\diamond}+x_{02i}}{2\sqrt{\eta_x u}}\right) + 2\sqrt{\frac{\eta_x u}{\pi}}\left\{e^{-\frac{(x_{02\diamond}-x_{02i})^2}{4\eta_x u}} - e^{-\frac{(x_{01\diamond}-x_{02i})^2}{4\eta_x u}}\right\} + 2\sqrt{\frac{\eta_x u}{\pi}}\left\{e^{-\frac{(x_{02\diamond}+x_{02i})^2}{4\eta_x u}} - e^{-\frac{(x_{01\diamond}+x_{02i})^2}{4\eta_x u}}\right\}\right]du +$$

$$\frac{1}{8\phi c_t\pi(x_{02\diamond}-x_{01\diamond})\sqrt{\eta_z\eta_x}}\sum_{i=M+1}^N U(t-t_{0i})\int_0^{t-t_{0i}} \frac{q_i(t-t_{0i}-u)}{u}\left\{e^{-\frac{(x-x_{0i})^2}{4\eta_x u}} + e^{-\frac{(x+x_{0i})^2}{4\eta_x u}}\right\} \times \left\{\mathrm{erf}\left(\frac{x_{02\diamond}-x_{0i}}{2\sqrt{\eta_x u}}\right) -\right.$$

$$\mathrm{erf}\left(\frac{x_{01\diamond}-x_{0i}}{2\sqrt{\eta_x u}}\right) - \mathrm{erf}\left(\frac{x_{02\diamond}+x_{0i}}{2\sqrt{\eta_x u}}\right) + \mathrm{erf}\left(\frac{x_{01\diamond}+x_{0i}}{2\sqrt{\eta_x u}}\right)\right\} \times \left\{\mathrm{erf}\left(\frac{y-y_{01i}}{2\sqrt{\eta_y u}}\right) + \mathrm{erf}\left(\frac{y+y_{01i}}{2\sqrt{\eta_y u}}\right) - \mathrm{erf}\left(\frac{y-y_{02i}}{2\sqrt{\eta_y u}}\right) - \mathrm{erf}\left(\frac{y+y_{02i}}{2\sqrt{\eta_y u}}\right)\right\}du +$$

$$\frac{8}{\pi^3(x_{02\diamond}-x_{01\diamond})}\int_0^\infty\int_0^\infty\int_0^\infty\int_0^t \frac{1}{n}\left\{m\eta_x\overline{\overline{\psi}}_{yz}(m,l,t-\tau) + m\eta_y\overline{\overline{\psi}}_{xz}(n,l,t-\tau) + \frac{1}{\phi c_t}\overline{\overline{\psi}}_{xy}(n,m,t-\tau)\right\}\times\{\cos(nx_{01\diamond}) -$$

$$\cos(nx_{02\diamond})\}e^{-\eta_x n^2\tau}\sin(my)e^{-\eta_y m^2\tau}\cos(lz)e^{-\eta_z l^2\tau}d\tau\,dn\,dm\,dl + p_I\,\mathrm{erf}\left(\frac{y}{2\sqrt{\eta_y t}}\right)\left[x_{02\diamond}\,\mathrm{erf}\left(\frac{x_{02\diamond}}{2\sqrt{\eta_x t}}\right) - x_{01\diamond}\,\mathrm{erf}\left(\frac{x_{01\diamond}}{2\sqrt{\eta_x t}}\right) + \frac{\left\{e^{-\frac{x_{02\diamond}^2}{4\eta_x t}} - e^{-\frac{x_{01\diamond}^2}{4\eta_x t}}\right\}}{2\sqrt{\pi\eta_x t}}\right]$$

10.6 The problem 10.1, except for all t>0, p(0,y,z,t)=$\psi_{yz}$(y, z,t), y>0, z>0, p(x,0,z,t)=$\psi_{xz}$(x,z,t), x>0, z,>0, and $$\frac{\partial p(x,y,0,t)}{\partial z} - \lambda_{xy}p(x,y,0,t) = -\left(\frac{\mu}{k_z}\right)\psi_{xy}(x,y,t),$$

x>0, y>0. The initial pressure p(x,y,z,0)=$\Phi$(x,y,z). $\Phi$(x,y,z) and its derivatives tend to zero as x→∞, y→∞ and z→∞.

10.7 The problem of 10.6, except the initial pressure p(x,y,z,0)=$p_1$, a constant for all x>0, y>0, and z>0.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method practiced by an analytical engine adapted for generating a computer model representing a reservoir, comprising:

Solving a set of diffusivity equations in response to input data characterizing said reservoir thereby generating a computer model, said diffusivity equations representing pressure diffusion in a porous medium comprising the steps of:

(a) calculating values in one dimension associated with a single layer in said reservoir, each of said values existing at a single point in space in said reservoir and at a single point in time in said reservoir;

(b) calculating said values in said one dimension associated with multiple layers in said reservoir, each of said values in each of said multiple layers existing at a single point in space in said reservoir and at a single point in time in said reservoir;

(c) calculating said values in three dimensions associated with said multiple layers in said reservoir, each of said values in each of said multiple layers in said three dimensions existing at a single point in space in said reservoir and at a single point in time in said reservoir; and (d) calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir, said computer model being produced in response to the calculating step (d).

2. The method of claim 1, wherein said analytical engine is not a finite difference engine, said diffusivity equations forming a basis for a prediction of a pressure response of a producing well in said reservoir.

3. The method of claim 1, wherein the solving step further comprises: calculating said values in two dimensions associated with multiple layers in said reservoir, each of said values in each of said multiple layers existing at a single point in space in said reservoir and at a single point in time in said reservoir.

4. The method of claim 1, wherein the solving step further comprises: calculating said values in said one dimension associated with multiple layers in said reservoir, each of said values in each of said multiple layers existing at a single point in space in said reservoir and at a single point in time in said reservoir.

5. The method of claim 1, wherein the solving step further comprises: calculating said values in said one dimensions associated with multiple layers in said reservoir, each of said values in each of said multiple layers existing at a single point in space in said reservoir and at a single point in time in said reservoir.

6. The method of claim 1, wherein the solving step further comprises: calculating said values in three dimensions associated with said multiple layers in said reservoir, each of said values in each of said multiple layers in said three dimensions existing at a single point in space in said reservoir and at a single point in time in said reservoir.

7. The method of claim 1, wherein the solving step further comprises: calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir.

8. A program storage device readable by a machine tangibly embodying a set of instructions executable by the machine to perform method steps, which are practiced by an analytical engine, for generating a computer model representing a reservoir, said method steps comprising:

Solving a set of diffusivity equations in response to input data characterizing said reservoir thereby generating a computer model, said diffusivity equations representing pressure diffusion in a porous medium comprising the steps of:

(a) calculating values in one dimension associated with a single layer in said reservoir, each of said values existing at a single point in space in said reservoir and at a single point in time in said reservoir;

(b) calculating said values in said one dimension associated with multiple layers in said reservoir, each of said values in each of said multiple layers existing at a single point in space in said reservoir and at a single point in time in said reservoir;

(c) calculating said values in three dimensions associated with said multiple layers in said reservoir, each of said values in each of said multiple layers in said three dimensions existing at a single point in space in said reservoir and at a single point in time in said reservoir; and (d) calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir, said computer model being generated in response to the calculating step (d).

9. The program storage device of claim 8, wherein said analytical engine is not a finite difference engine, said diffusivity equations forming a basis for a prediction of a pressure response of a producing well in said reservoir.

10. The program storage device of claim 8, wherein the solving step further comprises: calculating said values in two dimensions associated with multiple layers in said reservoir, each of said values in each of said multiple layers existing at a single point in space in said reservoir and at a single point in time in said reservoir.

11. The program storage device of claim 8, wherein the solving step further comprises: calculating said values in said one dimension associated with multiple layers in said reservoir, each of said values in each of said multiple layers existing at a single point in space in said reservoir and at a single point in time in said reservoir.

12. The program storage device of claim 8, wherein the solving step further comprises: calculating said values in two dimensions associated with multiple layers in said reservoir, each of said values in each of said multiple layers existing at a single point in space in said reservoir and at a single point in time in said reservoir.

13. dimensions existing at a single point in space in said reservoir and at a single point in time in said reservoir.

14. The program storage device of claim 8, wherein the solving step further comprises: calculating said values in three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir.

15. A system adapted for generating a computer model representing a reservoir, comprising:

analytical engine apparatus adapted for solving a set of diffusivity equations in response to input data characterizing said reservoir thereby generating a computer model, said diffusivity equations representing pressure diffusion in a porous medium, comprising:

Apparatus adapted for calculating values in one dimension associated with a single layer in said reservoir, each of said values existing at a single point in space in said reservoir and at a single point in time in said reservoir;

Apparatus adapted for calculating said values in said one dimension associated with multiple layers in said reservoir, each of said values in each of said multiple layers existing at a single point in space in said reservoir and at a single point in time in said reservoir;

Apparatus adapted for calculating said values in three dimensions associated with said multiple layers in said reservoir, each of said values in each of said multiple layers in said three dimensions existing at a single point in space in said reservoir and at a single point in time in said reservoir; and Apparatus adapted for calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir.

16. The system of claim 15, wherein said analytical engine apparatus is not a finite difference engine apparatus, said diffusivity equations forming a basis for a prediction of a pressure response of a producing well in said reservoir.

17. The system of claim 15, wherein said analytical engine apparatus further comprises: apparatus adapted for calculating said values in two dimensions associated with multiple layers in said reservoir, each of said values in each of said multiple layers existing at a single point in space in said reservoir and at a single point in time in said reservoir.

18. The system of claim 15, wherein said analytical engine apparatus comprises: apparatus adapted for calculating said values in said one dimension associated with multiple layers in said reservoir, each of said values in each of said multiple layers existing at a single point in space in said reservoir and at a single point in time in said reservoir.

19. The system of claim 15, wherein said analytical engine apparatus comprises: apparatus adapted for calculating said values in two dimensions associated with multiple layers in said reservoir, each of said values in each of said multiple layers existing at a single point in space in said reservoir and at a single point in time in said reservoir.

20. The system of claim 15, wherein said analytical engine apparatus comprises: apparatus adapted for calculating said values in three dimensions associated with said multiple layers in said reservoir, each of said values in each of said multiple layers in said three dimensions existing at a single point in space in said reservoir and at a single point in time in said reservoir.

21. The system of claim 15, wherein said analytical engine apparatus comprises: apparatus adapted for calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir.

22. A method for generating a prediction of a production of a fluid or a gas from a reservoir, the method comprising:
(a) Generating, by an analytical engine, a computer model in response to input data, the generating step (a) including solving a set of diffusivity equations in response to said input data characterizing the reservoir thereby generating said computer model, said diffusivity equations representing pressure diffusion in a porous medium comprising the steps of:
(A1) calculating values in one dimension associated with a single layer in said reservoir, each of said values existing at a single point in space in said reservoir and at a single point in time in said reservoir;
(a2) calculating said values in said one dimension associated with multiple layers in said reservoir, each of said values in each of said multiple layers existing at a single point in space in said reservoir and at a single point in time in said reservoir;
(a3) calculating said values in three dimensions associated with said multiple layers in said reservoir, each of said values in each of said multiple layers in said three dimensions existing at a single point in space in said reservoir and at a single point in time in said reservoir;
(a4) calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir, said computer model being produced in response to the calculating step (a4);
(b) verifying the computer model generated during the generating step (a) thereby generating a verified computer model; and
(c) using said verified computer model to generate said prediction associated with said production of a fluid or a gas from said reservoir.

23. The method of claim 22, wherein said analytical engine is not a finite difference engine, said diffusivity equations forming a basis for a prediction of a pressure response of a producing well in said reservoir.

24. The method of claim 22, wherein the verifying step (b) includes a test interpretation step and a history matching step.

25. The method of claim 22, wherein the solving step (a) further comprises: calculating said values in two dimensions associated with multiple layers in said reservoir, each of said values in each of said multiple layers existing at a single point in space in said reservoir and at a single point in time in said reservoir.

26. The method of claim 22, wherein the solving step (a) comprises:
calculating said values in said one dimension associated with multiple layers in said reservoir, each of said values in each of said multiple layers existing at a single point in space in said reservoir and at a single point in time in said reservoir.

27. The method of claim 22, wherein the solving step (a) comprises:
calculating said values in two dimensions associated with multiple layers in said reservoir, each of said values in each of said multiple layers existing at a single point in space in said reservoir and at a single point in time in said reservoir.

28. The method of claim 22, wherein the solving step (a) comprises:
calculating said values in three dimensions associated with said multiple layers in said reservoir, each of said values in each of said multiple layers in said three dimensions existing at a single point in space in said reservoir and at a single point in time in said reservoir.

29. The method of claim 22, wherein the solving step (a) comprises:
calculating said values in said three dimensions as a function of time, said values being associated with said multiple layers in said reservoir, each of said values in each of said multiple layers in said three dimensions existing at a single point in space in said reservoir, said each of said values in said each of said multiple layers in said three dimensions existing at any future point in time in said reservoir.

* * * * *